United States Patent [19]  [11] 3,907,897
Diamond  [45] Sept. 23, 1975

[54] CYCLOALKYLBENZALDEHYDES
[75] Inventor: Julius Diamond, Lafayette Hills, Pa.
[73] Assignee: William H. Rorer, Inc., Fort Washington, Pa.
[22] Filed: Dec. 11, 1973
[21] Appl. No.: 423,784

Related U.S. Application Data
[62] Division of Ser. No. 164,822, July 21, 1971, abandoned.

[52] U.S. Cl......... 260/599; 260/515 A; 260/515 R; 260/465 D; 260/521 R; 260/521 A; 260/479 R; 260/469; 260/471 R; 260/468 C; 260/456 P; 260/455 C; 260/453 A; 260/454; 260/558 R; 260/600; 260/576; 424/317; 424/298; 424/320; 424/308; 424/311
[51] Int. Cl.² .......................................... C07C 47/54
[58] Field of Search ...................................... 260/599

[56] References Cited
UNITED STATES PATENTS
3,435,075  3/1969  Glamkowski et al. ............... 260/590
3,852,364  12/1974  Diamond ......................... 260/649 R Primary Examiner—Bernard Helfin
Attorney, Agent, or Firm—Erich M. H. Radde

[57] ABSTRACT
Novel cycloalkylphenyl propionic acids and their derivatives are described. Therapeutic compositions and method of treatment of inflammation is also disclosed.

11 Claims, No Drawings

CYCLOALKYLBENZALDEHYDES

CROSS REFERENCES TO RELATED APPLICATIONS

This is a division, of application Ser. No. 164,822, filed July 21, 1971 and now abandoned.

SUMMARY OF THE INVENTION

This invention describes novel α-substituted p-cycloalkylphenylpropionic acids and their derivatives and their use in therapeutic compositions. In addition, this invention relates to the preparation of α-substituted p-cycloalkylphenylpropionic acids. When the compounds of this invention are administered to mammals, they afford significant treatment of inflammation and associated pain and fever.

They further provide analgesic and antipyretic methods for the relief and treatment of pain and fever associated with inflammation.

BACKGROUND OF THE INVENTION

There has been continued efforts in research to develop drugs which would significantly inhibit the development of inflammation and relieve the pain and fever associated with it. Much of these efforts have been carried on in the field of steroids. While many of these compounds have been effective, they have had the drawback of causing many side effects.

I have unexpectedly found that α-mercapto-p-cycloalkylphenylpropionic acid compounds and their derivatives have valuable pharmacologic properties.

I have found that α-mercapto-p-cycloalkylphenylpropionic acid compounds and their derivatives possess useful anti-inflammatory, analgesic and anti-pyretic properties.

I have also found a series of anti-inflammatory compounds which are non-steroidal.

I have further found that these α-mercapto-p-cycloalkylphenylpropionic acid compounds and their derivatives are novel.

I have also found that the compounds of this invention are useful in effectively providing a method for the inhibition of inflammation and the treatment of associated pain and fever.

I have still further found an entirely new class of anti-inflammatory, analgesic and antipyretic pharmaceutical compositions containing the α-mercapto-p-cycloalkylphenylpropionic acids and derivatives of this invention as active ingredient.

I have again found a convenient method for synthesizing these compounds.

DESCRIPTION AND PREFERRED EMBODIMENT

This invention comprises a class of novel chemical compounds which contain a cycloalkyl substituted phenyl radical which is attached to an α-mercapto propionic acid in the β-position. This invention further comprises derivatives of said propionic acids and the method of preparing the same.

This invention also describes a new method of treating inflammation and associated pain and fever as well as novel therapeutic compositions.

The compounds of this invention can be represented by the generic structure which is described by the general formula I.

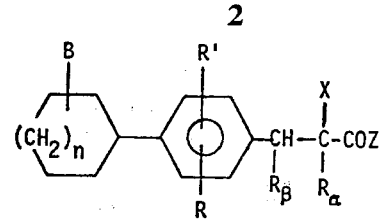

where:

n is 0–2;

B is hydrogen or loweralkyl;

R is halo, nitro, amino, acylamino, mono- & diloweralkylamino, mercapto, acylthio, loweralkylthio, loweralkylsulfinyl, loweralkylsulfonyl, hydroxy, loweralkoxy, acyloxy, haloloweralkyl, cyano, acetyl or loweralkyl;

R' is hydrogen, fluoro, chloro, bromo, trifluoromethyl, cyano, nitro or loweralkylsulfonyl;

X is halo, hydroxy, loweralkoxy, loweracyloxy, aroyloxy, carbloweralkoxyoxy, carbamyloxy, loweralkylcarbamyloxy, diloweralkylcarbamyloxy, loweralkanesulfonyloxy, benzenesulfonyloxy, toluenesulfonyloxy, carboxyacyloxy, carboxyaroyloxy, mercapto, loweralkylthio, acylthio, carboxyacylthio, aroylthio, carboxyaroylthio, sulfino, sulfo, loweralkylsulfinyl, loweralkylsulfonyl, thiosulfo, amidinothio, thiocyanato, thioacylthio, loweralkoxythiocarbonylthio, loweralkoxycarbonylthio, arloweralkoxycarbonylthio, carbamylthio, loweralkylcarbamylthio, diloweralkylcarbamylthio, diloweralkylthiocarbamylthio, cyano, amino, mono- & diloweralkylamino or acylamino;

$R_\alpha$ and $R_\beta$ are hydrogen or loweralkyl; and

Z is —OH, loweralkoxy, arloweralkoxy, —NH₂, loweralkylamino, diloweralkylamino, cycloloweralkylamino, —NA (where A is loweralkyldienyl or heteroloweralkylidenyl), —NHOH, —NHNH₂ or —OM (where M is an alkali, alkaline earth or aluminum metal or an ammonium salt).

The compounds of this invention contain asymmetric carbon atoms in the alpha-position of the acid side chain. As a result, the above compounds of formula I may be obtained as racemic mixtures of their dextro (+) and levorotatory (−) isomers. It is to be understood that said d and l isomers as well as the dl mixtures thereof are embraced within the scope of this invention.

When B is loweralkyl, two racemic mixtures may exist in the case of 2'- or 3'-loweralkylcyclohexylphenyllactate, 2'- or 3'-loweralkylcyclopentylphenyllactate, 2'- or 3'- or 4'-loweralkylcycloheptylphenyllactate, or their derivatives. It is understood that both racemic mixtures are embraced within the scope of this invention.

A special embodiment of this invention is described by structural formula I where R and R' are in the 3 & 5 positions of the phenyl ring.

The preferred compounds of this embodiment describe the cyclohexyl class of chemical compounds which have particular usefulness as anti-inflammatory, analgesic and antipyretic agents. These compounds are described in formula II.

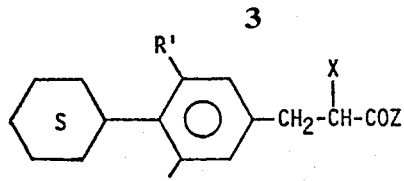

where:
R, R', X and Z are as described above.

The more preferred compounds of this invention describe a class of chemical compounds which have particular usefulness as anti-inflammatory, analgesic and antipyretic agents. These compounds are described in formula III.

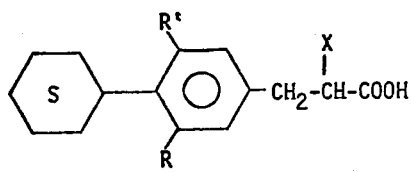

where:
R is halo, nitro, loweralkyl, haloloweralkyl or cyano;
R' is hydrogen, chloro, bromo or nitro;
X is halo, hydroxy, loweralkoxy, loweracyloxy, aroyloxy, carbloweralkoxyoxy, carbamyloxy, loweralkylcarbamyloxy, diloweralkylcarbamyloxy, loweralkanesulfonyloxy, benzenesulfonyloxy, toluenesulfonyloxy, carboxyacyloxy, carboxyaroyloxy, mercapto, loweralkylthio, acylthio, carboxyacylthio, aroylthio, carboxyaroylthio, sulfino, sulfo, loweralkylsulfinyl, loweralkylsulfonyl, thiosulfo, amidinothio, thiocyanato, thioacylthio, loweralkoxythiocarbonylthio, loweralkoxycarbonylthio, arloweralkoxycarbonylthio, carbamylthio, loweralkylcarbamylthio, diloweralkylcarbamylthio, diloweralkylthiocarbamylthio, cyano, amino, mono- & diloweralkylamino or acylamino.

A special embodiment of this invention which describes novel compounds that are effective in inhibiting inflammation and the treatment of pain and fever associated with inflammation as well as having analgesic and antipyretic effectiveness for the relief and treatment of pain and fever not symptomatically related to an inflammation indication are described by formula IV.

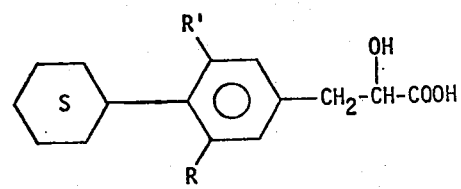

where:
R is chloro, bromo, nitro, methylsulfonyl, trifluoromethyl or cyano;
R' is hydrogen, chloro, bromo or nitro.
Included within the scope of this further special embodiment are the racemic mixtures as well as the dextro and levorotatory isomers thereof.

Another special embodiment which describes novel compounds that are effective in inhibiting inflammation and the treatment of pain and fever associated with inflammation as well as having analgesic and antipyretic effectiveness for the relief and treatment of pain and fever or symptomatically related to an inflammation indication are described by formula V.

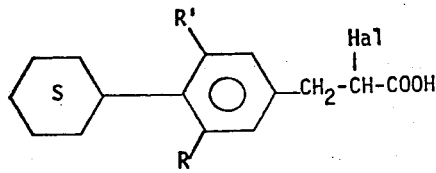

where:
R is chloro, bromo, nitro, methylsulfonyl, trifluoromethyl or cyano;
R' is hydrogen, chloro, bromo or nitro; and
Hal is fluoro, chloro or bromo.
Those compounds where Hal is chloro are even more preferred.

Included within the scope of this further special embodiment are the racemic mixtures as well as the dextro and levorotatory isomers thereof.

A further special embodiment which describes novel compounds that are effective in inhibiting inflammation and the treatment of pain and fever associated with inflammation as well as having analgesic and antipyretic effectiveness for the relief and treatment of pain and fever or symptomatically related to an inflammation indication are described by formula VI

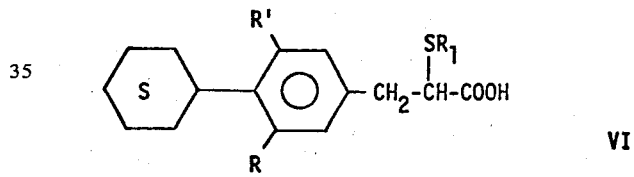

where:
$R_1$ is hydrogen, acyl, aroyl, loweralkoxythiocarbonyl, loweralkoxycarbonyl, arloweralkoxycarbonyl, loweralkyl, amidino, thioacyl, cyano, carbamyl, loweralkylcarbamyl, diloweralkylcarbamyl, diloweralkylthiocarbamyl, carboxyacyl, carboxyaroyl, or sulfo;
R is chloro, bromo, nitro, methylsulfonyl, trifluoromethyl or cyano; and
R' is hydrogen, chloro, bromo or nitro.

In the descriptive portions of this invention, the following definitions apply:

The term "lower alkyl" refers to a lower alkyl hydrocarbon group containing from 1 to about 6 carbon atoms which may be straight chained or branched.

The "acyl" radical may be any organic radical derived from an organic acid by the removal of its hydroxyl group such as acetyl, propionyl, 3-carboxypropionyl, 3-carboxy-2-propenoyl, camphoryl, etc.

The preferred "aroyl" is benzoyl, loweralkylbenzoyl such as toluoyl or halobenzoyl such as p-chlorobenzoyl, 2-carboxybenzyl, etc.

"Lower alkoxy" signifies an alkoxy group containing from 1 to about 6 carbon atoms which may be straight chained or branched.

The term "loweralkylidenyl" refers to a loweralkylidenyl hydrocarbon group containing from 2 to about 6 carbon atoms. "Heteroloweralkylidenyl" refers to a loweralkylidenyl hydrocarbon group containing from about 2 to 5 carbon atoms and having one or more hetero atoms in the chain selected from O, N or S, such as piperidinyl, morpholinyl, etc.

The preferred "alkali" or "alkaline earth" metals are sodium, potassium, calcium and magnesium.

The term "ammonium salt" refers to the cation formed when ammonia or an organic amine react with the carboxyl group to form ammonium salts of the structure given in the formula. The ammonium salts are formed with a (1) loweralkylamines such as methylamine, diethylamine, triethylamine; (2) hydroxyloweralkylamines such as β-hydroxyethylamine; (3) heterocyclic amines such as 2-aminopyridine, piperazine; piperidine, (4) aralkylamines such as α-methylbenzylamine, phenethylamine; (5) cycloalkylamines such as cyclohexylamine; (6) alkaloids such as quinine, cinchonidine, cinchonine, ephedrine.

It will further be appreciated by one skilled in the art that the following radicals may also be employed in the practice of this invention where:

R and R' may also be carboxy, carbloweralkoxy, carbamyl, loweralkyl, cyanato, thiocyanato, thiocarbamoyl, thioformyl, formamido, formyl, formyloxy, hydroxyloweralkyl, mercaptoloweralkyl, aminoloweralkyl, hydroxyamino, hydrazino, sulfo, sulfonate, sulfamoyl, diloweralkylsulfamoyl, trifluoromethylsulfonyl, trifluoroacetyl, trifluoroacetoxy or trifluorocarbomethoxy;

X may also be alkoxy, metaloxy, loweralkylsulfinyl, loweralkylsulfonyl, loweralkylsulfonate, metalsulfonate, loweralkylxanthyl, isothioureido, thiosulfonate, carboxy, carbalkoxy, carbamyl, loweralkylcarbamyl, diloweralkylcarbamyl, loweralkylidenylamino, heteroloweralkylidenylamino, hydroxyamino, hydrazino;

R$_\alpha$ and R$_\beta$ may be loweralkenyl, cycloloweralkyl, cycloloweralkylloweralkyl or cycloloweralkylloweralkyl.

Representative compounds of this invention which are particularly useful are as follows:

β-(3-chloro-4-cyclohexylphenyl)lactic acid
β-(3-chloro-4-cyclohexylphenyl)lactic acid
β-(3-bromo-4-cyclohexylphenyl)lactic acid
β-(3-iodo-4-cyclohexylphenyl)lactic acid
β-(3-nitro-4-cyclohexylphenyl)lactic acid
β-(3-trifluoromethyl-4-cyclohexylphenyl)lactic acid
β-(3-mercapto-4-cyclohexylphenyl)lactic acid
β-(3-acetylthio-4-cyclohexylphenyl)lactic acid
β-(3-methylmercapto-4-cyclohexylphenyl)lactic acid
β-(3-methylsulfinyl-4-cyclohexylphenyl)lactic acid
β-(3-methylsulfonyl-4-cyclohexylphenyl)lactic acid
β-(3-cyano-4-cyclohexylphenyl)lactic acid
β-(3-carboxy-4-cyclohexylphenyl)lactic acid
β-(3-carbethoxy-4-cyclohexylphenyl)lactic acid
β-(3-amino-4-cyclohexylphenyl)lactic acid
β-(3-acetylamino-4-cyclohexylphenyl)lactic acid
β-(3-methylamino-4-cyclohexylphenyl)lactic acid
β-(3-dimethylamino-4-cyclohexylphenyl)lactic acid
β-(3-hydroxy-4-cyclohexylphenyl)lactic acid
β-(3-acetyloxy-4-cyclohexylphenyl)lactic acid
β-(3-methoxy-4-cyclohexylphenyl)lactic acid
β-(3-acetoxy-4-cyclohexylphenyl)lactic acid
β-(3-methyl-4-cyclohexylphenyl)lactic acid
β-(3-aminomethyl-4-cyclohexylphenyl)lactic acid
β-(3,5-dichloro-4-cyclohexylphenyl)lactic acid
β-(3-chloro-5-bromo-4-cyclohexylphenyl)lactic acid
β-(3-chloro-5-nitro-4-cyclohexylphenyl)lactic acid
β-(3-chloro-5-trifluoromethyl-4-cyclohexylphenyl)lactic acid
β-(3-chloro-5-methyl-4-cyclohexylphenyl)lactic acid
β-(3-nitro-5-methyl-4-cyclohexylphenyl)lactic acid
β-(3-chloro-5-cyano-4-cyclohexylphenyl)lactic acid
β-(3-chloro-5-methylsulfonyl-4-cyclohexylphenyl)lactic acid
β-(3,5-dibromo-4-cyclohexylphenyl)lactic acid
β-(3,5-dibromo-4-cyclohexylphenyl)lactic acid
β-(3-chloro-5-amino-4-cyclohexylphenyl)lactic acid
β-(3-bromo-5-amino-4-cyclohexylphenyl)lactic acid
β-(3-fluoro-5-amino-4-cyclohexylphenyl)lactic acid
β-(3-methylsulfonyl-5-amino-4-cyclohexylphenyl)lactic acid
β-(3,5-difluoro-4-cyclohexylphenyl)lactic acid
β-(3,5-dinitro-4-cyclohexylphenyl)lactic acid
α-fluoro-β(3-chloro-4-cyclohexylphenyl)propionic acid
α,3-difluro-β-(4-cyclohexylphenyl)propionic acid
α-fluoro-β-(3-bromo-4-cyclohexylphenyl)propionic acid
α-fluoro-β-(3-nitro-4-cyclohexylphenyl)propionic acid
α-fluoro-β-(3-methylsulfonyl-4-cyclohexylphenyl)-propionic acid
α-fluoro-β-(3-trifluoromethyl-4-cyclohexylphenyl)-propionic acid
α-fluoro-β-(3-cyano-4-cyclohexylphenyl)propionic acid
α-chloro-β-(3-fluoro-4-cyclohexylphenyl)propionic acid
α,3-dichloro-β-(4-cyclohexylphenyl)propionic acid
α-chloro-β-(3-bromo-4-cyclohexylphenyl)propionic acid
α-chloro-β-(3-nitro-4-cyclohexylphenyl)propionic acid
α-chloro-β-(3-methylsulfonyl-4-cyclohexylphenyl)-propionic acid
α-chloro-β-(3-trifluoromethyl-4-cyclohexylphenyl)-propionic acid
α-chloro-β-(3-cyano-4-cyclohexylphenyl)propionic acid
α-bromo-β-(3-fluoro-4-cyclohexylphenyl)propionic acid
α-bromo-β-(3-chloro-4-cyclohexylphenyl)propionic acid
α,3-dibromo-β-(4-cyclohexylphenyl)propionic acid
α-bromo-β-(3-nitro-4-cyclohexylphenyl)propionic acid
α-bromo-β-(3-methylsulfonyl-4-cyclohexylphenyl)-propionic acid
α-bromo-β-(3-trifluoromethyl-4-cyclohexylphenyl)-propionic acid
α-bromo-β-(3-cyano-4-cyclohexylphenyl)propionic acid
α-mercapto-β-(3-fluoro-4-cyclohexylphenyl)propionic acid
α-mercapto-β-(3-chloro-4-cyclohexylphenyl)propionic acid
α-mercapto-β-(3-bromo-4-cyclohexylphenyl)propionic acid
α-mercapto-β-(3-nitro-4-cyclohexylphenyl)propionic acid α-mercapto-β-(3-methylsulfonyl-4-cyclohexylphenyl)propionic acid
α-mercapto-β-(3-trifluoromethyl-4-cyclohexylphenyl)propionic acid
α-mercapto-β-(3-cyano-4-cyclohexylphenyl)propionic acid
α-acetylthio-β-(3-fluoro-4-cyclohexylphenyl)propionic acid
α-acetylthio-β-(3-chloro-4-cyclohexylphenyl)propionic acid
α-acetylthio-β-(3-bromo-4-cyclohexylphenyl)propionic acid
α-acetylthio-β-(3-nitro-4-cyclohexylphenyl)propionic acid
α-acetylthio-β-(3-methylsulfonyl-4-cyclohexylphenyl)propionic acid
α-acetylthio-β-(3-trifluoromethyl-4-cyclohexylphenyl)propionic acid
α-acetylthio-β-(3-cyano-4-cyclohexylphenyl)propionic acid
α-methoxy-β-(3-chloro-4-cyclohexylphenyl)propionic acid
α-acetyloxy-β-(3-chloro-4-cyclohexylphenyl)propionic acid
α-benzoyloxy-β-(3-chloro-4-cyclohexylphenyl)propionic acid
α-carbomethoxyoxy-β-(3-chloro-4-cyclohexylphenyl)propionic acid
α-carbamyloxy-β-(3-chloro-4-cyclohexylphenyl)propionic acid
α-ethylcarbamyloxy-β-(3-chloro-4-cyclohexylphenyl)propionic acid
α-dimethylcarbamyloxy-β-(3-chloro-4-cyclohexylphenyl)propionic acid
α-methanesulfonyloxy-β-(3-chloro-4-cyclohexylphenyl)propionic acid
α-benzenesulfonyloxy-β-(3-chloro-4-cyclohexylphenyl)propionic acid
α-toluenesulfonyloxy-β-(3-chloro-4-cyclohexylphenyl)propionic acid
α-carboxyacetyloxy-β-(3-chloro-4-cyclohexylphenyl)propionic acid
α-carboxybenzyloxy-β-(3-chloro-4-cyclohexylphenyl)propionic acid
α-succinoyloxy-β-(3-chloro-4-cyclohexylphenyl)propionic acid
α-maleoyloxy-β-(3-chloro-4-cyclohexylphenyl)propionic acid
α-phthaloyloxy-β-(3-chloro-4-cyclohexylphenyl)propionic acid
α-methylthio-β-(3-chloro-4-cyclohexylphenyl)propionic acid
α-sulfo-β-(3-chloro-4-cyclohexylphenyl)propionic acid
α-methylsulfonyl-β-(3-chloro-4-cyclohexylphenyl)propionic acid
α-thiosulfo-β-(3-chloro-4-cyclohexylphenyl)propionic acid
α-thiocyanato-β-(3-chloro-4-cyclohexylphenyl)propionic acid
α-carbamylthio-β-(3-chloro-4-cyclohexylphenyl)propionic acid
α-ethylcarbamylthio-β-(3-chloro-4-cyclohexylphenyl)propionic acid
α-dibutylcarbamylthio-β-(3-chloro-4-cyclohexylphenyl)propionic acid
α-cyano-β-(3-chloro-4-cyclohexylphenyl)propionic acid
α-amino-β-(3-chloro-4-cyclohexylphenyl)propionic acid
α-ethylamino-β-(3-chloro-4-cyclohexylphenyl)propionic acid
α-dimethylamino-β-(3-chloro-4-cyclohexylphenyl)propionic acid
α-acetylamino-β-(3-chloro-4-cyclohexylphenyl)propionic acid
α-methyl-β-(3-chloro-4-cyclohexylphenyl)lactic acid
α-methyl-α-fluoro-β-(3-chloro-4-cyclohexylphenyl)lactic acid
α-methyl-α-chloro-β-(3-chloro-4-cyclohexylphenyl)lactic acid
α-methyl-α-bromo-β-(3-chloro-4-cyclohexylphenyl)lactic acid
α-methyl-α-mercapto-β-(3-chloro-4-cyclohexylphenyl)lactic acid
α-methyl-α-acetylthio-β-(3-chloro-4-cyclohexylphenyl)lactic acid
β-(3-chloro-4-cyclohexylphenyl)lactic acid, acetate
β-(3-chloro-4-cyclohexylphenyl)lactic acid, benzoate
β-(3-chloro-4-cyclohexylphenyl)lactic acid, ethylcarbonate
β-(3-chloro-4-cyclohexylphenyl)lactic acid, diethylcarbonate
β-(3-chloro-4-cyclohexylphenyl)lactic acid, carbamate
β-(3-chloro-4-cyclohexylphenyl)lactic acid, methanesulfonate
β-(3-chloro-4-cyclohexylphenyl)lactic acid, benzenesulfonate
methyl β-(3-chloro-4-cyclohexylphenyl)lactate
ethyl β-(3-chloro-4-cyclohexylphenyl)lactate
benzyl β-(3-chloro-4-cyclohexylphenyl)lactate
ethyl β-(3-chloro-4-cyclohexylphenyl)lactate, acetate
ethyl β-(3-chloro-4-cyclohexylphenyl)lactate, benzoate
β-(3-chloro-4-cyclohexylphenyl)lactamide
N-methyl β-(3-chloro-4-cyclohexylphenyl)lactamide
N,N-dimethyl β-(3-chloro-4-cyclohexylphenyl)lactamide
N,N-diethyl β-(3-chloro-4-cyclohexylphenyl)lactamide
N,N-ethylmethyl β-(3-chloro-4-cyclohexylphenyl)lactamide
N-isopropyl β-(3-chloro-4-cyclohexylphenyl)lactamide
N-cyclopropyl β-(3-chloro-4-cyclohexylphenyl)lactamide
β-(3-chloro-5-nitro-4-cyclohexylphenyl)lactamide
β-(3-chloro-4-cyclohexylphenyl)lactamide, acetate
β-(3-chloro-4-cyclohexylphenyl)lacthydroxamic acid
β-(3-chloro-4-cyclohexylphenyl)-N-aminolactamide
N,N-pentamethylene-β-(3-chloro-4-cyclohexylphenyl)lactamide
N,N-oxydiethylene-β-(3-chloro-4-cyclohexylphenyl)lactamide
N,N-methylaminoethylenetrimethylene-β-(3-chloro-4-cyclohexylphenyl)lactamide
N,N-thiotrimethylene-β-(3-chloro-4-cyclohexylphenyl)lactamide N,N-pentamethylene-β-(3-chloro-4-cyclohexyl-α-acetoxyphenyl)lactamide
β-(3-chloro-4-cyclohexylphenyl)lactic acid, sodium salt
β-(3-chloro-4-cyclohexylphenyl)lactic acid, potassium salt
β-(3-chloro-4-cyclohexylphenyl)lactic acid, calcium salt
β-(3-chloro-4-cyclohexylphenyl)lactic acid, aluminum salt
β-(3-chloro-4-cyclohexylphenyl)lactic acid, dimethylammonium salt
β-(3-chloro-4-cyclohexylphenyl)lactic acid, β-hydroxyethylammonium salt
β-(3-chloro-4-cyclohexylphenyl)lactic acid, piperazinium salt
β-(3-chloro-4-cyclohexylphenyl)lactic acid, piperidinium salt
β-(3-chloro-4-cyclohexylphenyl)lactic acid, α-methylbenzylammonium salt
β-(3-chloro-4-cyclopentylphenyl)lactic acid acid
β-(3-chloro-4-cycloheptylphenyl)lactic acid
ethyl β-(3-chloro-4-cyclopentylphenyl)lactate
ethyl β-(3-chloro-4-cycloheptylphenyl)lactate
β-(3-chloro-4-cyclopentylphenyl)lactamide
β-(3-chloro-4-cycloheptylphenyl)lactamide
β-(3-chloro-4-cyclopentylphenyl)lactic acid, diethylammonium salt
β-(3-chloro-4-cycloheptylphenyl)lactic acid, diethylammonium salt
β-[3-chloro-4-(2'-methylcyclopentyl)phenyl]lactic acid
β-[3-chloro-4-(2'-methylcycloheptyl)phenyl]lactic acid
β-[3-chloro-4-(2'-methylcyclohexyl)phenyl]lactic acid
β-[3-chloro-4-(3'-methylcyclohexyl)phenyl]lactic acid
β-[3-chloro-4-(4'-methylcyclohexyl)phenyl]lactic acid
β-[3-chloro-5-amino-(2'-methylcyclohexyl)phenyl]-lactic acid
β-[3-fluoro-5-amino-(2'-methylcyclohexyl)phenyl]-lactic acid
β-[3-bromo-5-amino-(2'-methylcyclohexyl)phenyl]-lactic acid
β-[3-nitro-5-amino-(2'-methylcyclohexyl)phenyl]-lactic acid
β-[3-cyano-5-amino-(2'-methylcyclohexyl)phenyl]-lactic acid
d β-(3-chloro-4-cyclohexylphenyl)lactic acid
l β-(3-chloro-4-cyclohexylphenyl)lactic acid
d α-fluoro-β-(3-chloro-4-cyclohexylphenyl)propionic acid
l α-fluoro-β-(3-chloro-4-cyclohexylphenyl)propionic acid
d α,3-dichloro-β-(4-cyclohexylphenyl)propionic acid
l α,3-dichloro-β-(4-cyclohexylphenyl)propionic acid
d α-bromo-β-(3-chloro-4-cyclohexylphenyl)propionic acid
l α-bromo-β-(3-chloro-4-cyclohexylphenyl)propionic acid
d α-mercapto-β-(3-chloro-4-cyclohexylphenyl)propionic acid
l α-mercapto-β-(3-chloro-4-cyclohexylphenyl)propionic acid
d α-acetylthio-β-(3-chloro-4-cyclohexylphenyl)propionic acid
l α-acetylthio-β-(3-chloro-4-cyclohexylphenyl)propionic acid
d α-methyl-β-(3-chloro-4-cyclohexylphenyl)lactic acid
l α-methyl-β-(3-chloro-4-cyclohexylphenyl)lactic acid
d α-methyl-α,3-dichloro-β-(4-cyclohexylphenyl)lactic acid
l α-methyl-α,3-dichloro-β-(4-cyclohexylphenyl)lactic acid
d α-methyl-α-mercapto-β-(3-chloro-4-cyclohexylphenyl)lactic acid
l α-methyl-α-mercapto-β-(3-chloro-4-cyclohexylphenyl)lactic acid
d β-(3,5-dichloro-4-cyclohexylphenyl)lactic acid
l β-(3,5-dichloro-4-cyclohexylphenyl)lactic acid
d β-(3-fluoro-4-cyclohexylphenyl)lactic acid
d β-(3-bromo-4-cyclohexylphenyl)lactic acid
d β-(3-nitro-4-cyclohexylphenyl)lactic acid
d β-(3-trifluoromethyl-4-cyclohexylphenyl)lactic acid
d β-(3-methylsulfonyl-4-cyclohexylphenyl)lactic acid
d β-(3-cyano-4-cyclohexylphenyl)lactic acid
d ethyl β-(3-chloro-4-cyclohexylphenyl)lactate
l ethyl β-(3-chloro-4-cyclohexylphenyl)lactate
d β-(3-chloro-4-cyclohexylphenyl)lactamide
l β-(3-chloro-4-cyclohexylphenyl)lactamide
d β-(3-chloro-4-cyclopentylphenyl)lactic acid
l β-(3-chloro-4-cyclopentylphenyl)lactic acid
d β-(3-chloro-4-cycloheptylphenyl)lactic acid
l β-(3-chloro-4-cycloheptylphenyl)lactic acid
d β-(3-chloro-4-cyclohexylphenyl)lactic acid, acetate
l β-(3-chloro-4-cyclohexylphenyl)lactic acid, acetate
d β-(3-chloro-4-cyclohexylphenyl)lactic acid, diethylcarbonate
l β-(3-chloro-4-cyclohexylphenyl)lactic acid, diethylcarbonate
d β-(3-chloro-4-cyclohexylphenyl)lactic acid, sodium salt
l β-(3-chloro-4-cyclohexylphenyl)lactic acid, sodium salt
d β-(3-chloro-4-cyclohexylphenyl)lactic acid, diethylammonium salt
l β-(3-chloro-4-cyclohexylphenyl)lactic acid, diethylammonium salt
d β-(3,5-dichloro-4-cyclohexylphenyl)lactic acid, diethylammonium salt
l β-(3,5-dichloro-4-cyclohexylphenyl)lactic acid, diethylammonium salt The compounds of this invention may be prepared from known starting materials. p-Cycloalkylbenzaldehyde may be (a) halogenated or (b) nitrated to obtain a corresponding 3-halo-4-cycloalkylbenzaldehyde or a 3-nitro-4-cycloalkylbenzaldehyde. Chlorination or bromination may be carried out in the presence of a small amount of iodine dissolved in an inert solvent such as carbon tetrachloride. A solution of chlorine or bromine is then added while the temperature is held near 0°C. Nitration is carried out with fuming nitric acid at about 0°C. The following reaction equation illustrates this method.

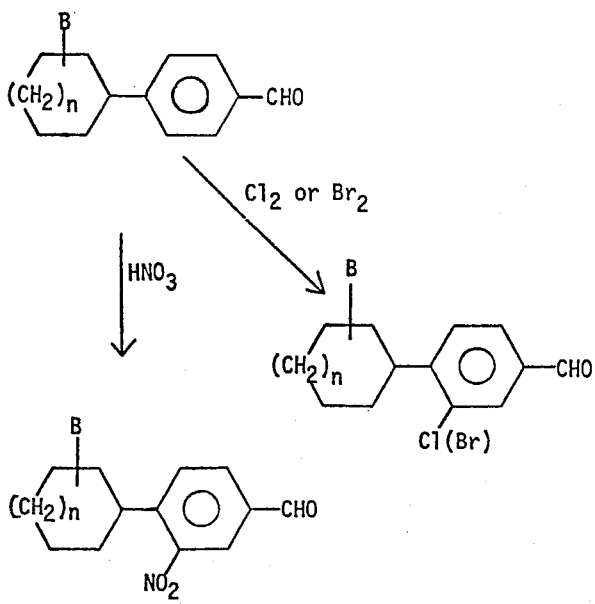
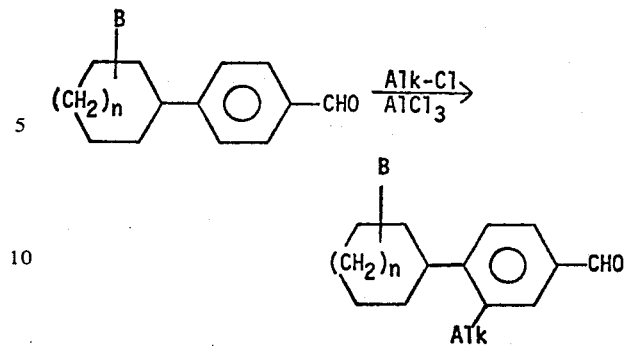

When a loweralkyl group is desired in the benzene ring, then alkylation may be carried out using the alkylhalide and aluminum chloride as desired.

A second nitration or halogenation with chlorine or brimine may be carried out on the 3-substituted-4-cycloalkylbenzaldehyde to obtain the corresponding 3,5-disubsituted-4-cycloalkylbenzaldehyde. However, this may also be carried out at any appropriate stage of the synthesis in order to obtain the desired substituents. Thus, for example, a 3-chloro-4-cycloalkylbenzaldehyde may be nitrated as above to obtain a 3-chloro-5-nitro-4-cycloalkylbenzaldehyde or chlorinated to obtain a 3,5-dichloro-4-cycloalkylbenzaldehyde. A 3-nitro-4-cycloalkylbenzaldehyde can be nitrated to give a 3,5-dinitro-4-cycloalkylbenzaldehyde. A 3-alkyl compound may also be nitrated, chlorinated or brominated to the 3-chloro, 3-bromo or 3-nitro-5-alkyl compounds.

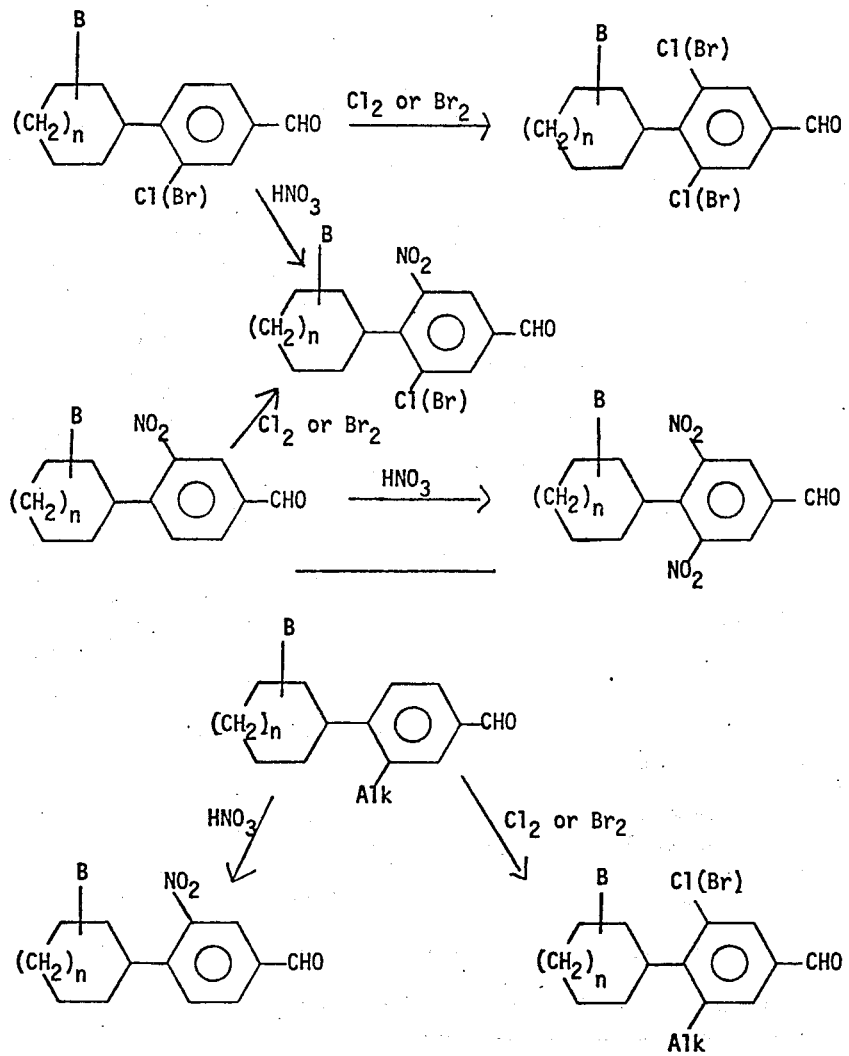

Claisen condensation of a p-cycloalkyl substituted benzaldehyde with an acetic acid ester (preferably the loweralkyl or benzyl ester) in the presence of a metal alkoxide results in a β-(p-cycloalkylphenyl) acrylic ester. The aldehyde may also be subjected to a Perkin reaction with acetic anhydride and an acetic acid salt or, through a Knoevenogel condensation using malonic acid and ammonia in an amine base to obtain a β-(p-cycloalkylphenyl)acrylic acid. Addition to the double bond with chlorine or bromine results in a p-cycloalkylphenyl-α,β-dihalopropionic acid or ester. Alkali hydrolysis of the dihalide results in the β-(p-cycloalkylphenyl) pyruvic acid or ester which on hydrogenation in the presence of platinum oxide catalyst yields the desired lactic acid or ester. This hydrogenation may also be accomplished by selective reduction with sodium borohydride when catalytic hydrogenation is impractical because of the presence of a sensitive nitro group.

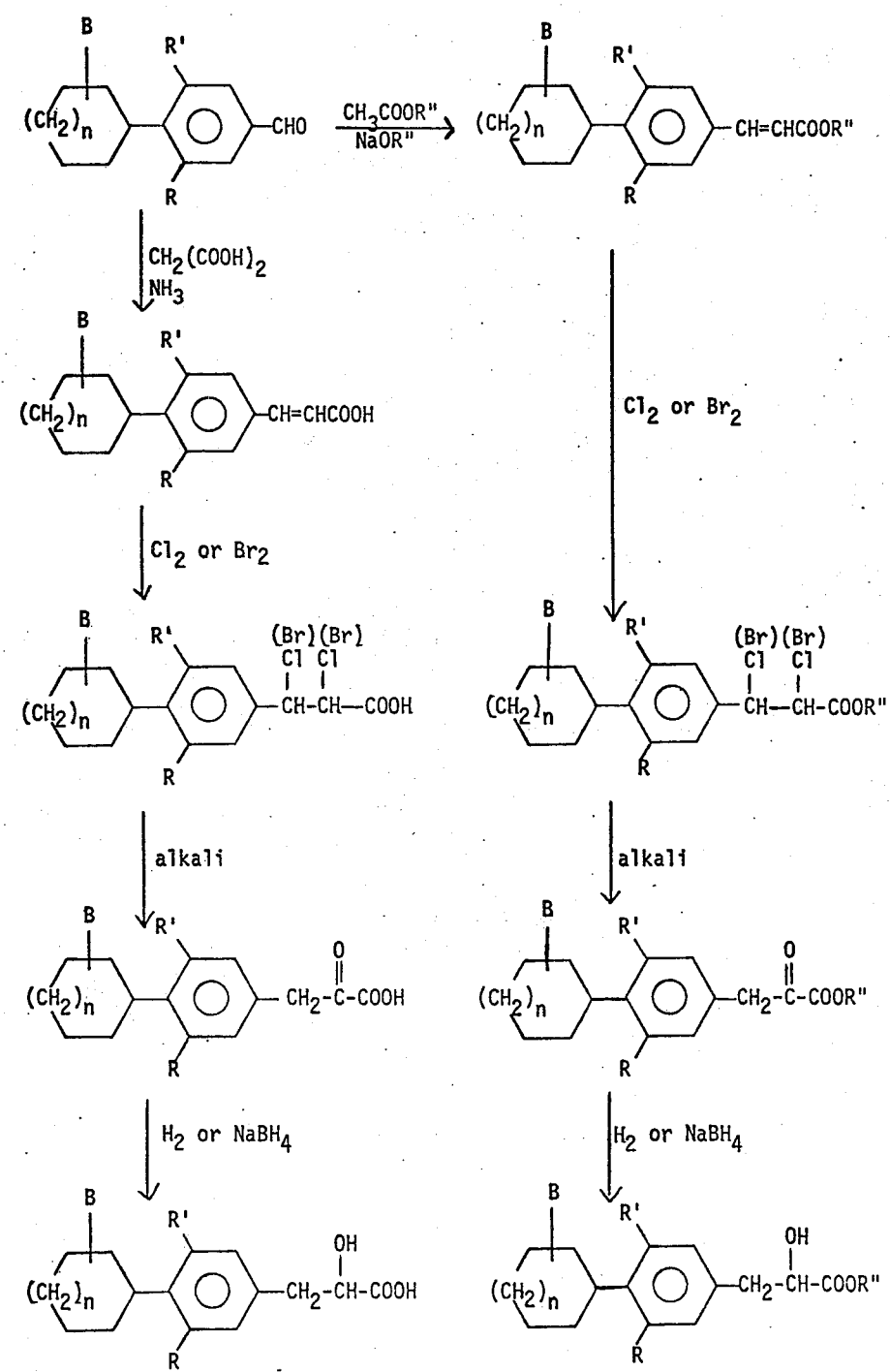

where R″ is loweralkyl or benzyl.

The β-(p-cycloalkylphenyl)pyruvate may also be reacted with one equivalent of a Grignard reagent to form the α-substituted lactic ester which is then hydrolyzed to the acid.

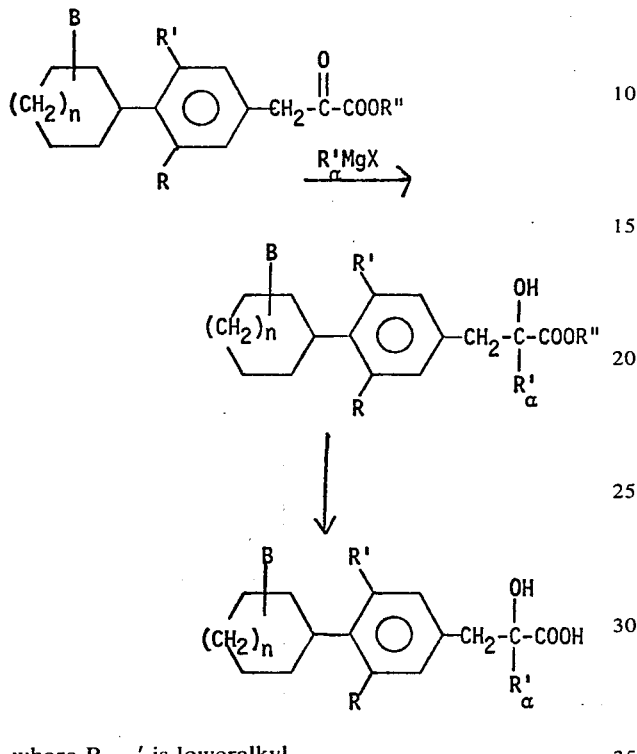

where $R_\alpha{}'$ is loweralkyl.

A substituted p-cycloalkylbenzaldehyde may also be condensed with bippuric acid in the presence of sodium acetate and acetic anhydride according to the method of Cavalline and Massarani as outlined in their Italian Patent No. 611,973 (1960): [Chem. Abstracts 55,19868g]. This condensation results in a 2-phenyl-4-(p-cycloalkyl)-5-oxazolone which on basic hydrolysis results in the β-(p-cycloalkylphenyl)pyruvic acid. This may then be reduced or treated with a Grignard reagent as above to the corresponding lactic acid.

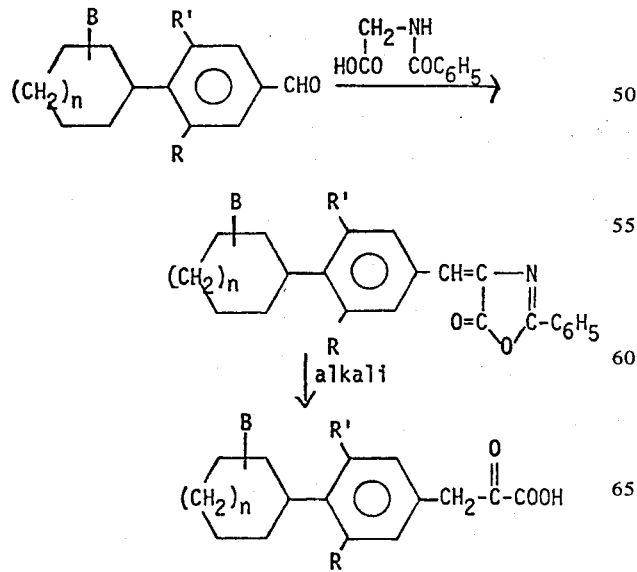

Appropriately desired end products having various R and R′ substituents can be prepared by using suitable reactions in order to convert one group to another. Thus, for example, a 3-halo-4-cycloalkylphenyllactate in which halo is chloro, bromo or iodo may be a. reacted with cuprous cyanide in quinoline at about 150°C to produce a 3-cyano-4-cycloalkylphenyllactate:

b. reacted with trifluoromethyliodide and copper powder at about 150°C in dimethylformamide to obtain a 3-trifluoromethyl-4-cycloalkylphenyllactate: [as described in Tetrahedron Letters: 47,4095 (1959)]

c. reacted with cuprous methanesulfinate in quinoline at about 150°C to obtain a 3-methylsulfonyl-4-cycloalkylphenyllactate:

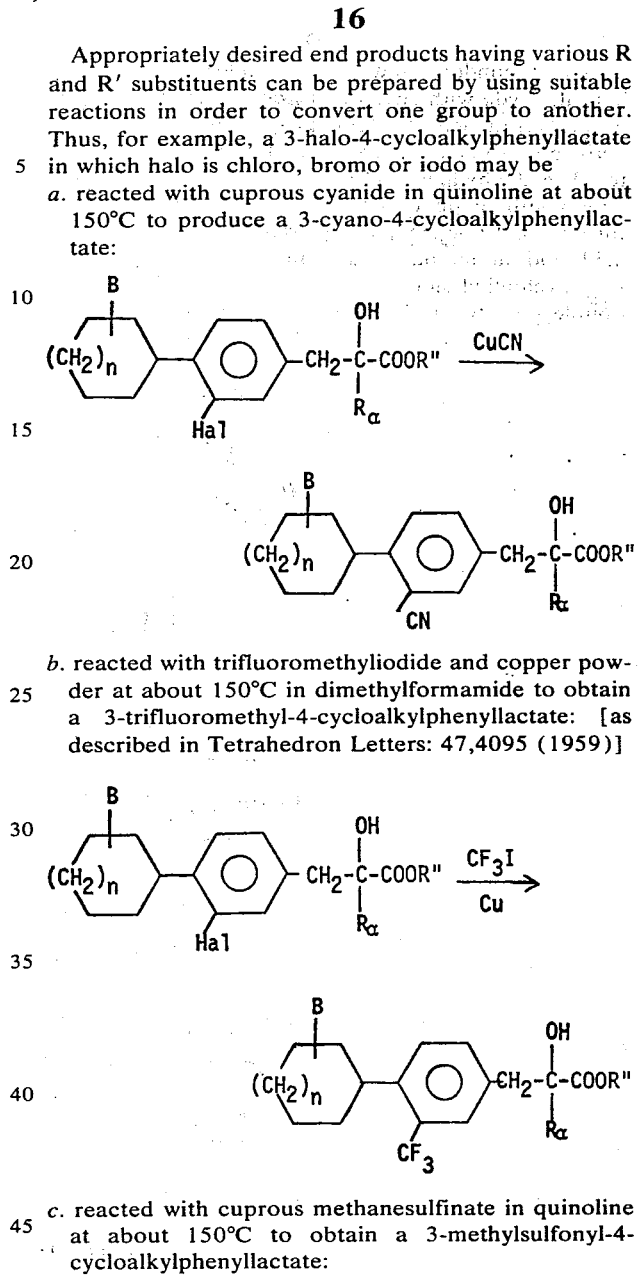

A 3-nitro-4-cycloalkylphenyllactate may be hydrogenated to the corresponding amine.

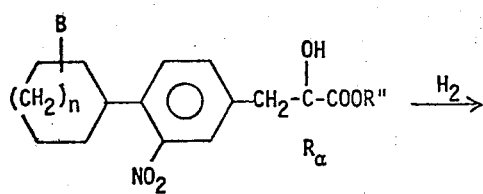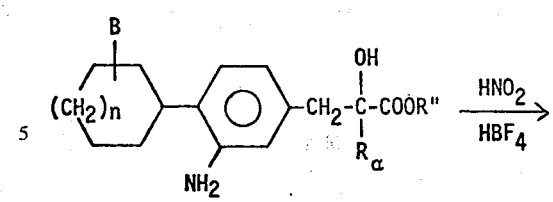

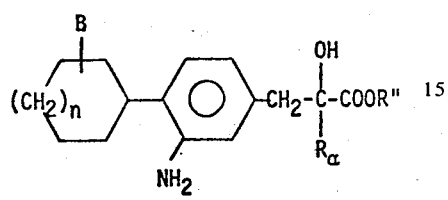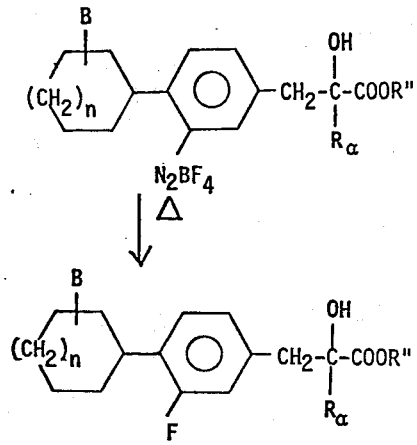

A 3-amino-4-cycloalkylphenyllactate may then be
a. mono- or dialkylated with loweralkyl halides or sulfates or acylated with loweracyl chlorides or anhydrides, c. diazotized and heated in an aqueous medium to form the 3-hydroxy-4-cycloalkylphenyllactate or heated in an alcohol to form the 3-alkoxy-4-cycloalkylphenyllactate. The hydroxyl group may also be alkylated

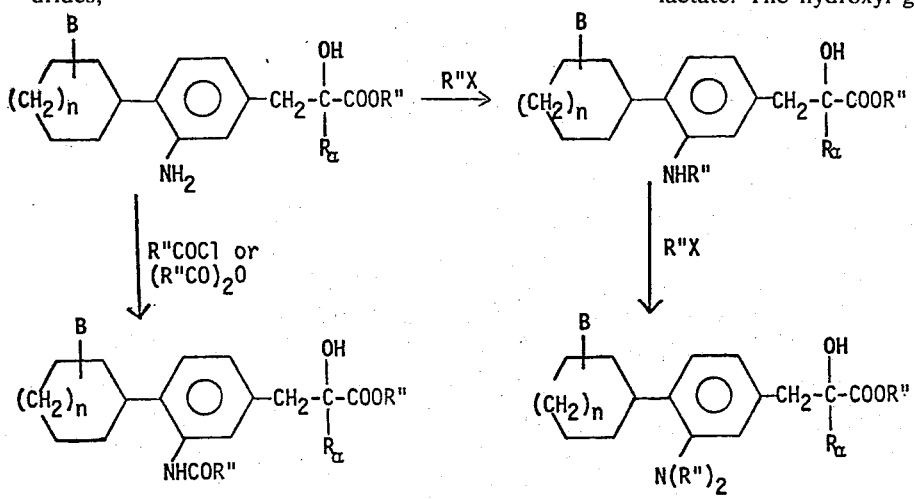

b. diazotized to the diazonium fluoroborate which is then thermally decomposed to the 3-fluoro-4-cycloalkylphenyllactate, with loweralkyl halides or sulfates to the alkoxyl group or acylated with loweracyl chlorides or anhydrides to the acyloxy compound in the presence of a tertiary amine such as pyridine,

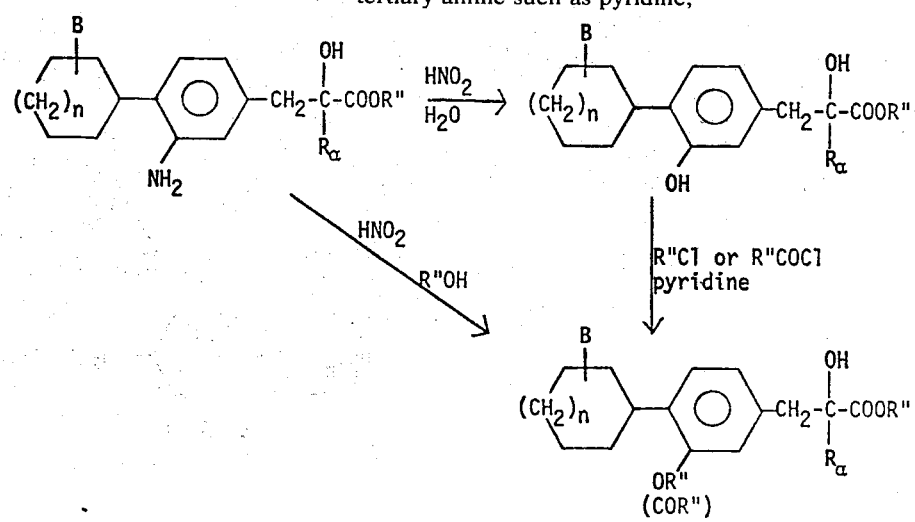

d. diazotized followed by a Sandmeyer type reaction to yield the halo group, f. diazotized and followed by addition of cuprous cyanide to obtain the 3-cyano-4-cycloalkylphenyllactate

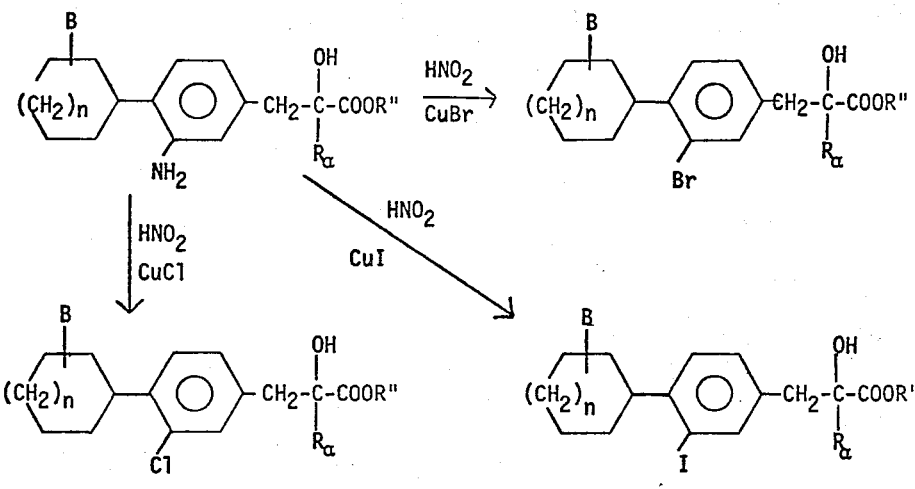

e. diazotized and heated with an aqueous solution of potassium iodide to prepare the 3-iodo-4-cycloalkylphenyllactate, which in turn may be esterified with an alcohol or hydrolyzed to the amide or carboxylic acid of the lactic acid,

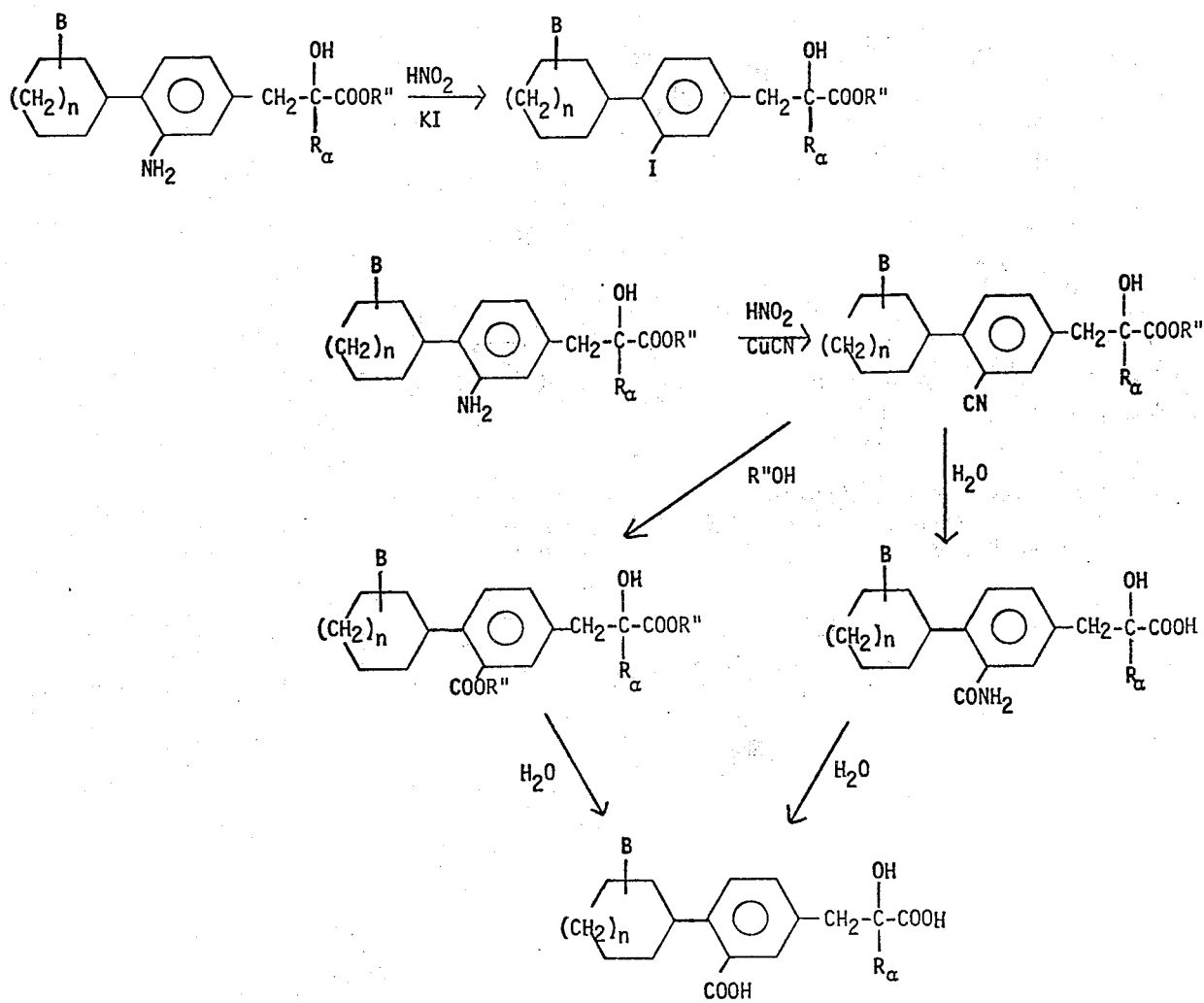

g. diazotized followed by reaction with potassium ethylxanthate followed by hydrolysis to obtain 3-mercapto-4-cycloalkylphenyllactic acid which can be esterified to a 3-mercapto-4-cycloalkylphenyllactate. This in turn can be lower alkylated to the lower alkylthio and oxidized to the loweralkylsulfinyl and loweralkylsulfonyl groups or acylated to the acylthio compounds.

—Continued

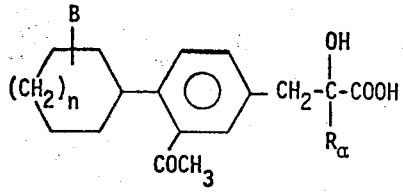

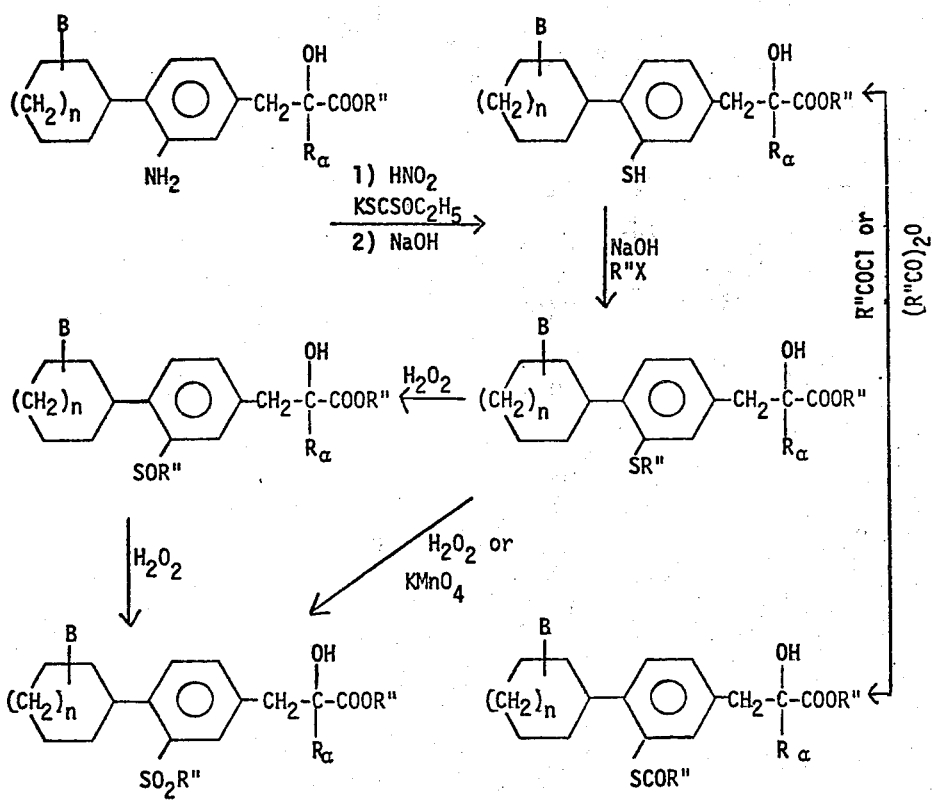

The 3-cyanolactic acid or derivative may be reacted with three equivalents of methylmagnesium iodide in tetrahydrofuran followed by hydrolysis to obtain the 3-acetyllactic acid.

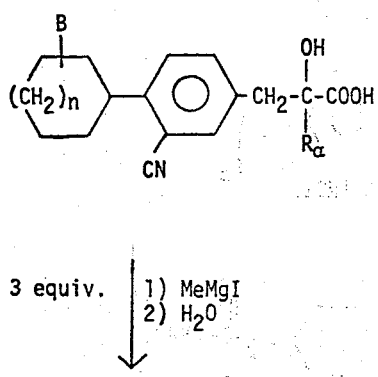

When 3,5-disubstituted compounds are desired, corresponding reactions may be carried out in order to convert one substituent to another. Thus, a 3-chloro-5-nitro-4-cycloalkylphenyllactate can be reduced to a corresponding 3-chloro-5-amino-4-cycloalkylphenyllactate. This may then be mono- or dialkylated or acylated. The amine may also be converted via the diazonium salt to a variety of derivatives as described above.

As a further example of disubstitution, a 3-chloro-5-nitro-4-cycloalkylphenyllactate can be reacted with cuprous cyanide in quinoline at 150°C to obtain a 3-cyano-5-nitro-4-cycloalkylphenyllactate; or with trifluoromethyl iodide and copper powder in quinoline at 150°C to obtain a 3-trifluoromethyl-5-nitro-4-cycloalkylphenyllactate; or with cuprous methanesulfinate in quinoline at 150°C to a 3-methylsulfonyl-5-nitro-4-cycloalkylphenyllactate. Still another example of various disubstitution would be the selective reduction of a 3,5-dinitro-4-cycloalkylphenyllactate with hydrogen or ammonium sulfide to obtain a 3-nitro-5-amino-4-cycloalkylphenyllactate which in turn can be diazotized to the various derivatives.

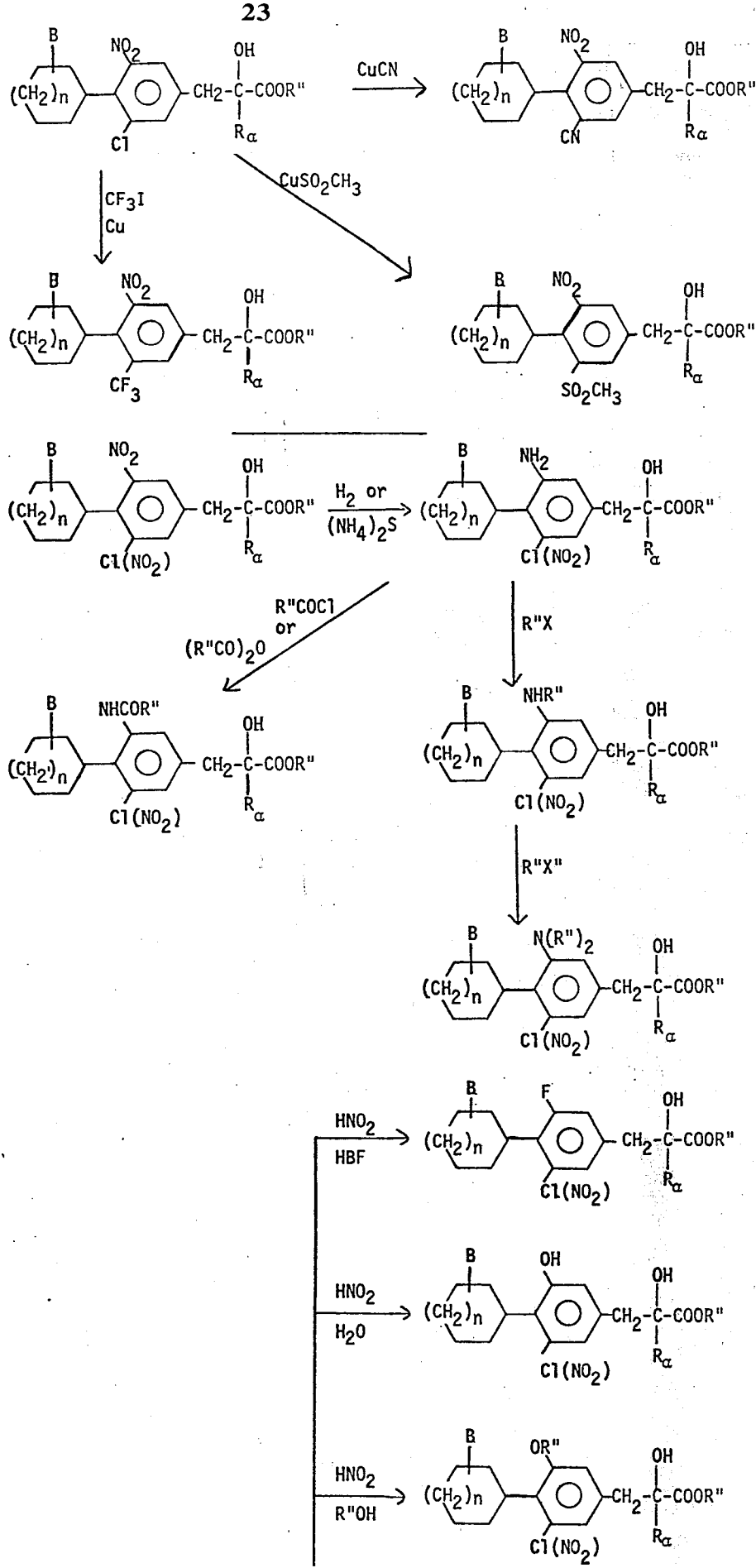

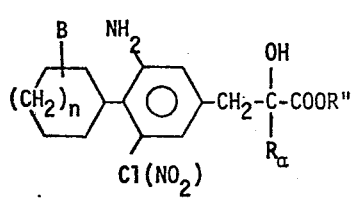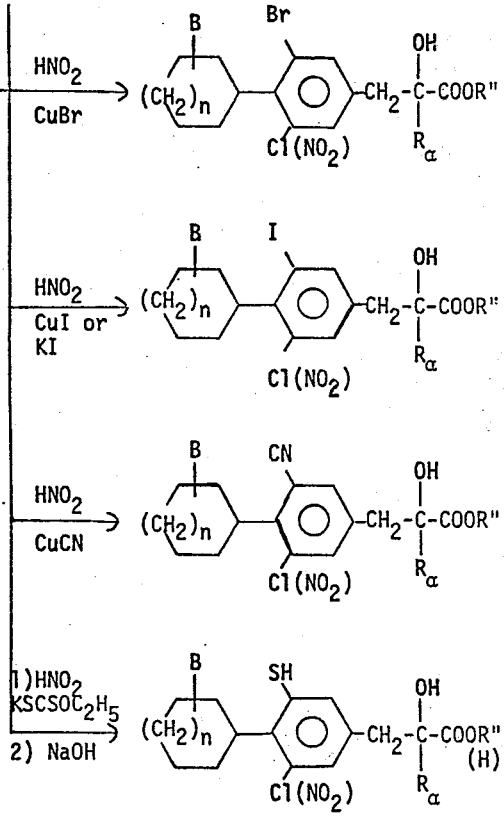

Of course, other reactions may be carried out on the above products by diazotization to obtain the desired substituents as previously described.

Various mono-substituted products may also be nitrated, chlorinated or brominated as above and again, in turn, converted to the various desired substituents. Thus, for example, a 3-fluoro-4-cycloalkylphenyllactate may be nitrated or brominated and the nitro and bromo groups converted to various substituents.

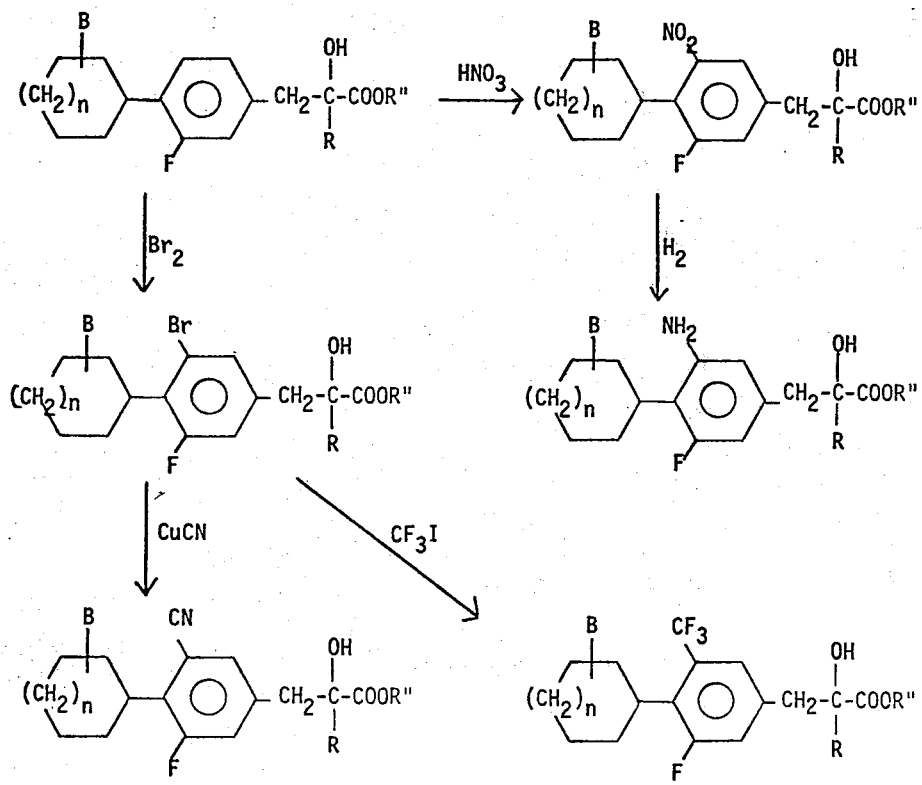

The conversion of the R and R' substituents need not be carried out solely on the lactate but rather at any convenient step of the synthesis that will afford the desired product without having any changes in the remaining part of the molecule.

Thus, for example, it is often convenient to convert one substituent to another before the reduction of the pyruvate to the lactate.

A 3-nitro-4-cycloalkylphenylpyruvate or a 3-chloro-5-nitro-4-cycloalkylphenylpyruvate may be selectively catalytically hydrogenated to the corresponding amine. The amino group can then be diazotized as above to the desired substituents. This may be carried out on any of the nitro compounds as outlined. The diazotized products may then be reduced to the corresponding lactate.

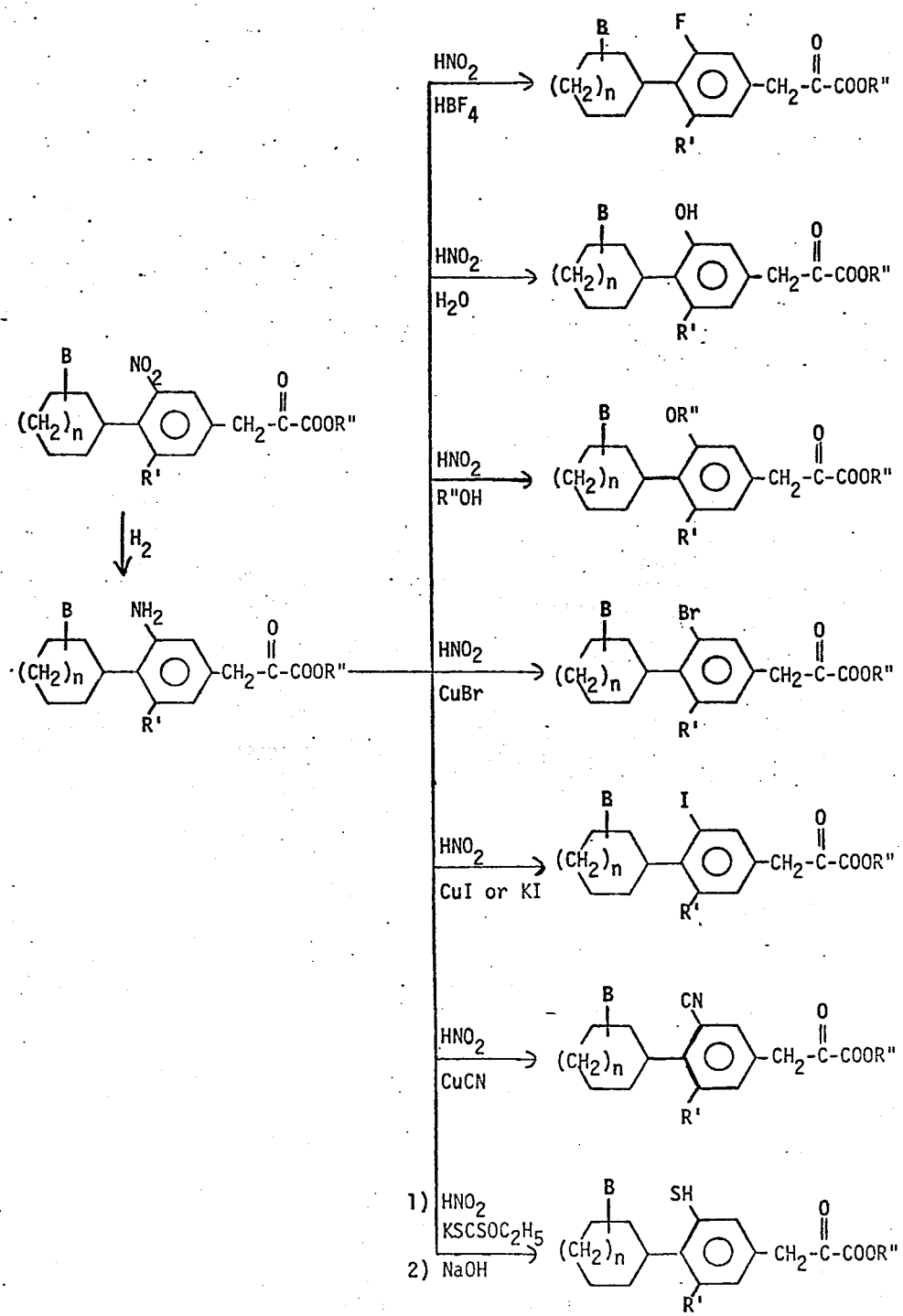

where:
R' is hydrogen, fluoro, chloro, bromo, trifluoromethyl, cynao, nitro or loweralkylsulfonyl.

Other reactions can be carried on in a similar manner to obtain the desired substituent.

β-(p-cycloalkylphenyl)pyruvates react with aqueous-alcoholic alkali hydroxide or alkali carbonate to give the corresponding β-(p-cycloalkylphenyl)pyruvic acid.

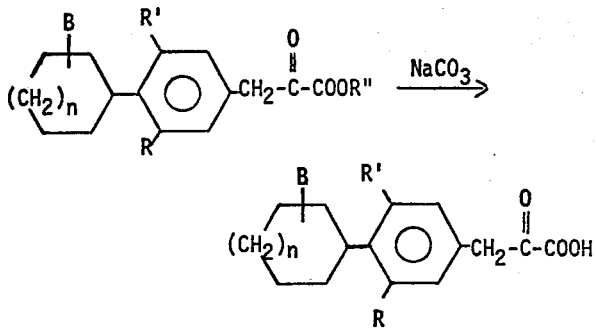

The β-(p-cycloalkylphenyl)pyruvate ester is converted to the corresponding β-(p-cycloalkylphenyl)lactate ester by hydrogenation in the presence of platinum oxide. In the special case where R and R' is a substituent sensitive to catalytic hydrogenation, e.g., when R or R' is NO₂, SH, SR, SOR, I, etc., a selective reduction of the keto function is effected with sodium borohydride to give the β-(p-cycloalkylphenyl) lactate ester. The lactate esters are hydrolyzed with an aqueous alcoholic alkali hydroxide mixture to the corresponding β-(p-cycloalkylphenyl) lactic acid.

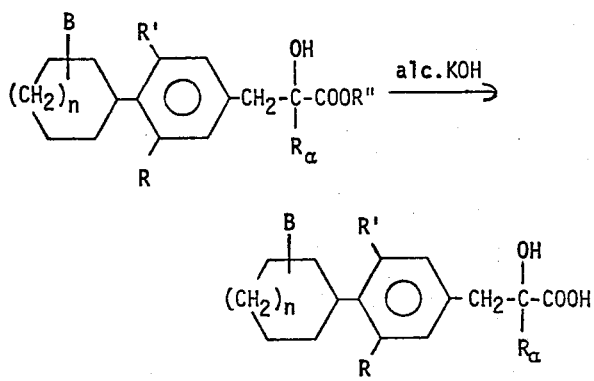

Catalytic hydrogenation of a β-(p-cycloalkylphenyl)-lactate benzyl ester over palladium results in the reduction of the keto group and hydrogenolysis of the benzyl group to give a β-(p-cycloalkylphenyl) lactic acid. This is particularly useful when R or R' is a hydrolyzable group such as acyloxy, acylamino, acylthio, cyano, etc.

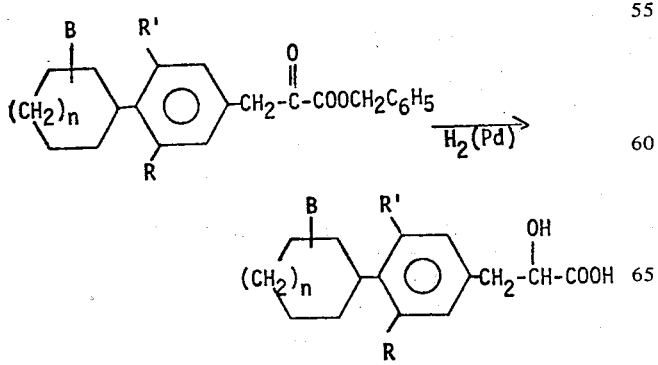

This invention further describes the acid addition salts formed by the action of one equivalent of a suitable base with the β-(p-cycloalkylphenyl)lactic acid. Suitable bases thus include for example the alkali metal alkoxides such as sodium methoxide, etc., and the alkali metal and alkaline earth metal hydroxides, carbonates, bicarbonates, etc. (such as sodium hydroxide, potassium hydroxide, calcium hydroxide, potassium carbonate, sodium bicarbonate, magnesium bicarbonate, etc.). Also, the aluminum salts of the instant products may be obtained by treating the corresponding sodium salt with an appropriate aluminum complex such as aluminum hydroxy chloride hexahydrate, etc. The ammonium salts may be made by reaction with the corresponding amine such as methylamine, diethylamine, β-hydroxyethylamine, piperazine, piperidine, α-methylbenzylamine, cyclohexylamine, triethylamine, phenethylamine, etc. The acid addition salts thus obtained are the functional equivalent of the corresponding β-(p-cycloalkylphenyl)lactic acid products and one skilled in the art will appreciate that to the extent that the instant acids are useful in therapy, the variety of acid addition salts embraced by this invention are limited only by the criterion that the bases employed in forming the therapeutically useful salts be both non-toxic and physiologically acceptable. The alkaloidal salts are useful for effecting optical resolutions.

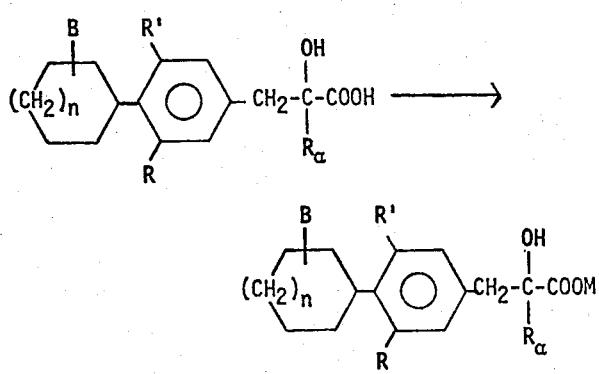

Reaction of a β-(p-cycloalkylphenyl)lactate ester with a nitrogen base such as ammonia, loweralkylamine, diloweralkylamine, cycloloweralkylamine, a nitrogen containing hetero compound such as piperidine, morpholine, piperazine results in the corresponding amide. The lactate ester with hydroxylamine gives the corresponding hydroxamic acid, and with hydrazine gives the corresponding hydrazide.

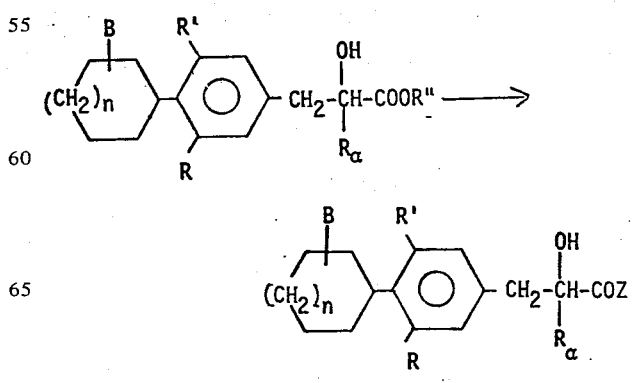

where:

Z is -NH$_2$, loweralkylamine, diloweralkylamino, cycloloweralkylamino, -NA (where A is loweralkylidenyl or heteroloweralkylidenyl), -NHOH or -NHNH$_2$.

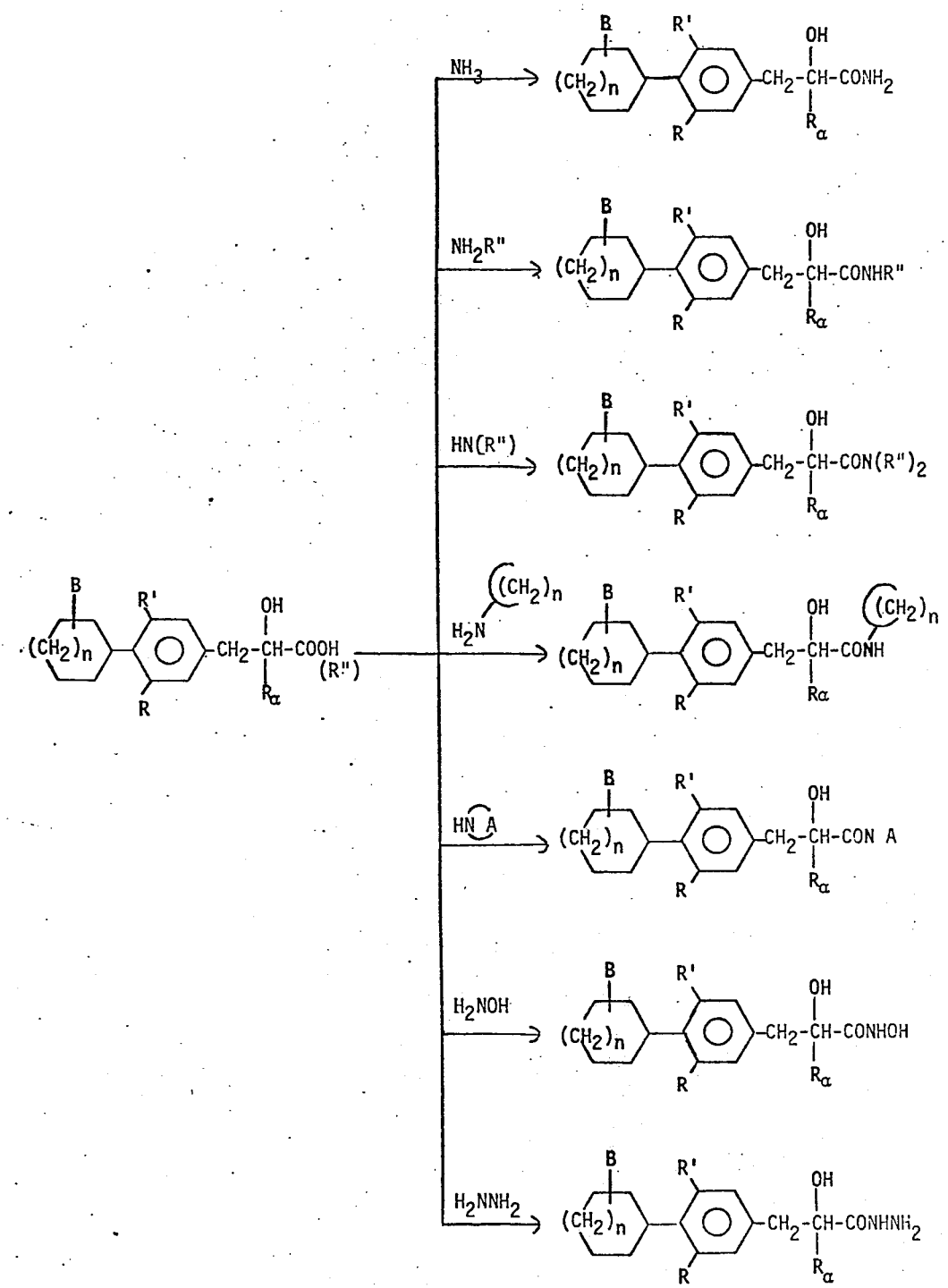

where:

R'' is lower alkyl

Reaction of the β-(p-cycloalkylphenyl)lactate or the lactic acid with an acid chloride or acid anhydride in the presence of a tertiary amine such as pyridine, picoline or quinoline results in the formation of an hydroxy derivative of the lactate or lactic acid. Examples of the acid chloride or acid anhydride include acetyl chloride, acetic anhydride, propionyl chloride, butyryl chloride, succinic anhydride, moleic anhydride, phthalic anhydride, benzoyl chloride, benzoic anhydride, benzyl chlorocarbonate, ethyl chlorocarbonate, dimethylcarbamyl chloride, dibutyl carbamyl chloride, benzenesulfonyl chloride, methanesulfonyl chloride.

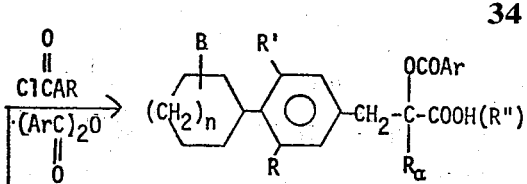
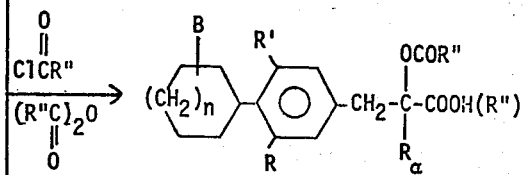
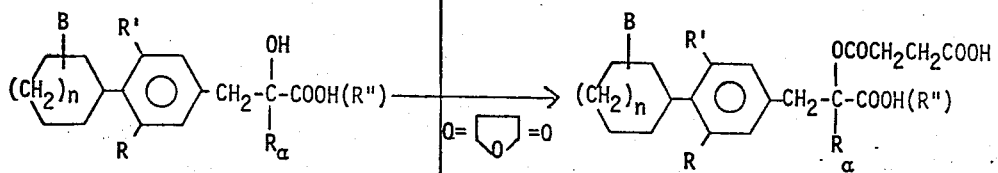
where:
R" is lower alkyl or benzyl.
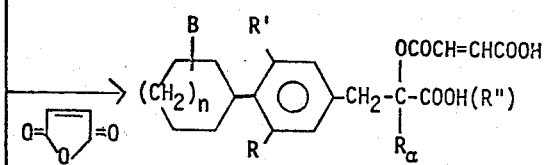
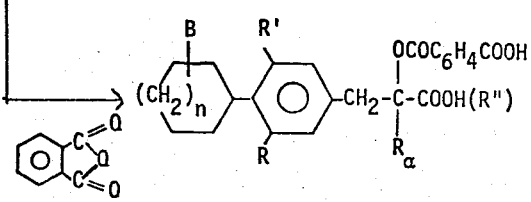
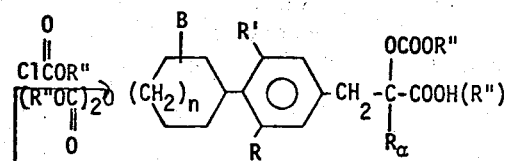
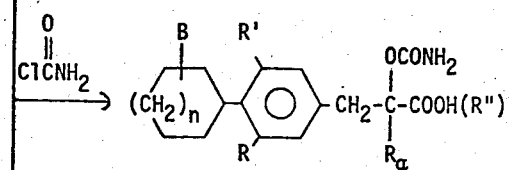
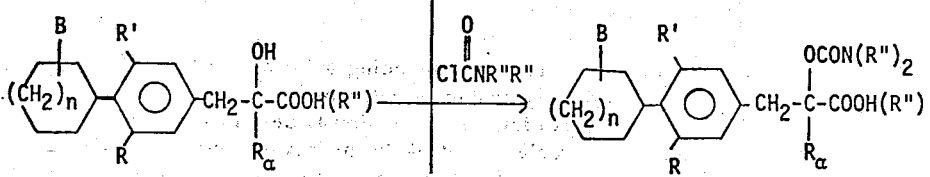

—Continued

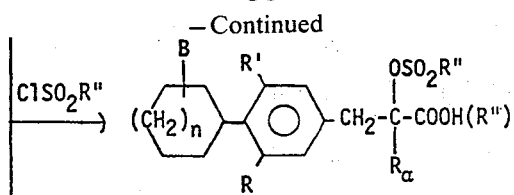

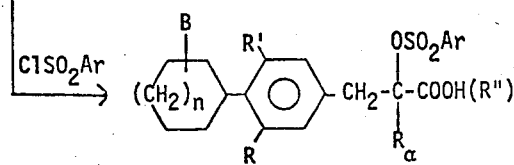

where:
R'' is loweralkyl and Ar is phenyl or tolyl.

The corresponding acid salts, esters and amides of the foregoing alcohol derivatives may be prepared according to the previously described procedures, or the alcohol derivatives may be prepared directly on the acid salts, esters and amides.

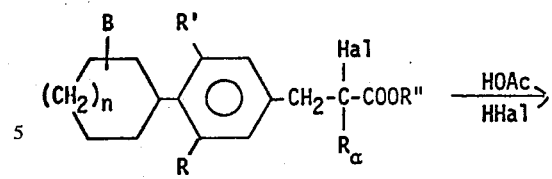

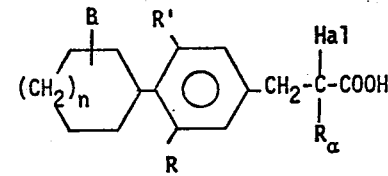

where:
R'' is lower alkyl.

The substituted α-fluoro-β-(p-cycloalkylphenyl)propionic acid derivatives may also be obtained from the corresponding α-iodo, α-bromo or α-chloro-β-(p-cycloalkylphenyl)propionic acid derivatives by reaction with potassium fluoride at about 130°–200°C.

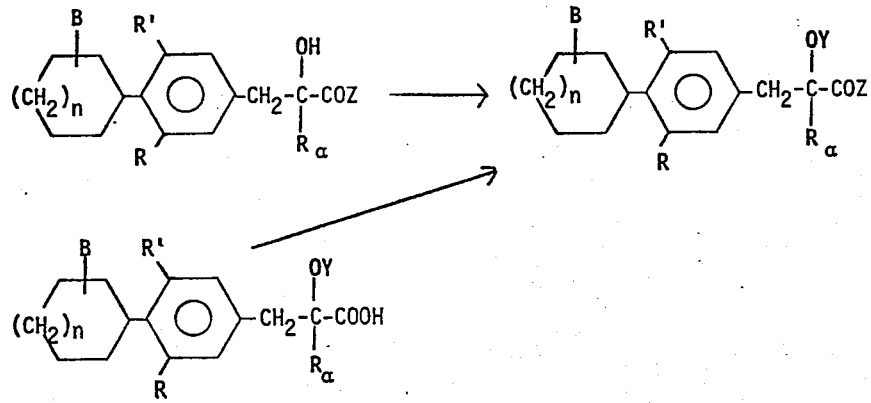

When a substituted α-(p-cycloalkylphenyl)lactate is reacted with a phosphorus trihalide, phosphorus pentahalide, phosphorus oxyhalide, sulfurylhalide, thionyl halide, or sulfuric halide the corresponding α-halo-β-(p-cycloalkylphenyl)propionate is prepared.

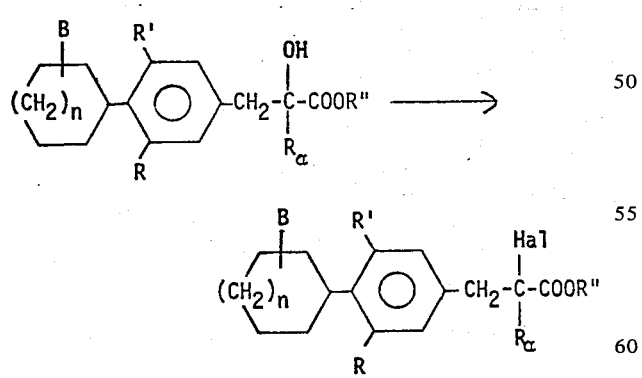

where
R'' is lower alkyl; Hal is fluoro, chloro, bromo or iodo.

The corresponding α-halopropionic acid may be prepared by heating the ester with acetic acid containing the corresponding hydrogen halide.

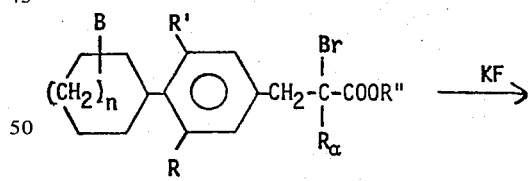

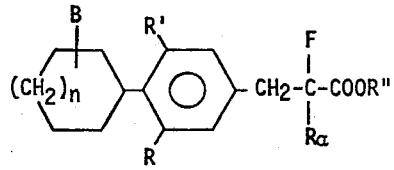

The corresponding acid salts, esters and amides of the foregoing α-haloproionic acids may be prepared according to the previously described procedures on the replacement of the hydroxyl group with halo may be carried out on the desired acid salt, ester or amide.

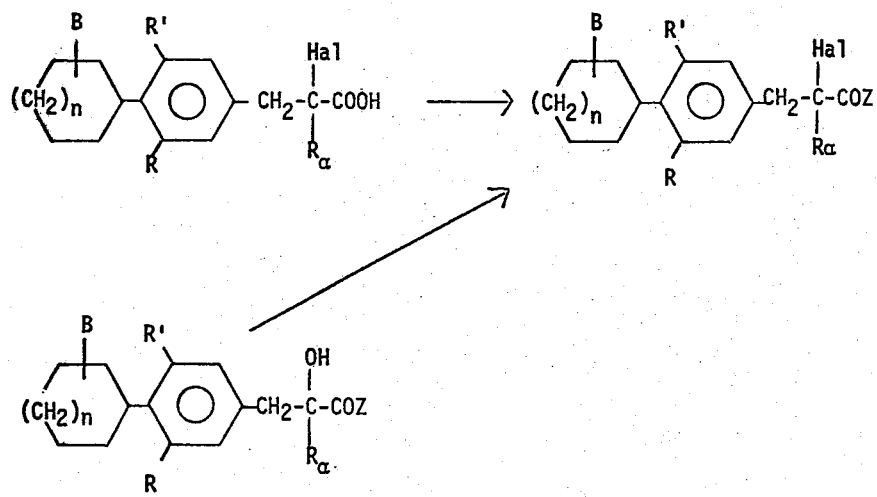

The substituted α-halo-β-(p-cycloalkylphenyl)propionic acids and acid derivatives such as their salts, amides or esters may be reacted with various nucleophilic reagents to replace the α-halogen group. It is preferable to use the alkali metal salt of the carboxylic acid. In particular, sulfur-containing nucleophilic reagents are used such as alkali hydrosulfides, alkali alkylmercaptides, alkali sulfite, alkali alkanesulfinates, alkali thioalkanoates, alkali thiocyanates, alkali thiosulfate.

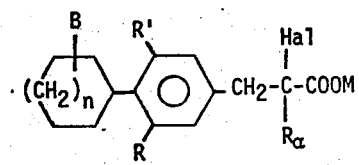
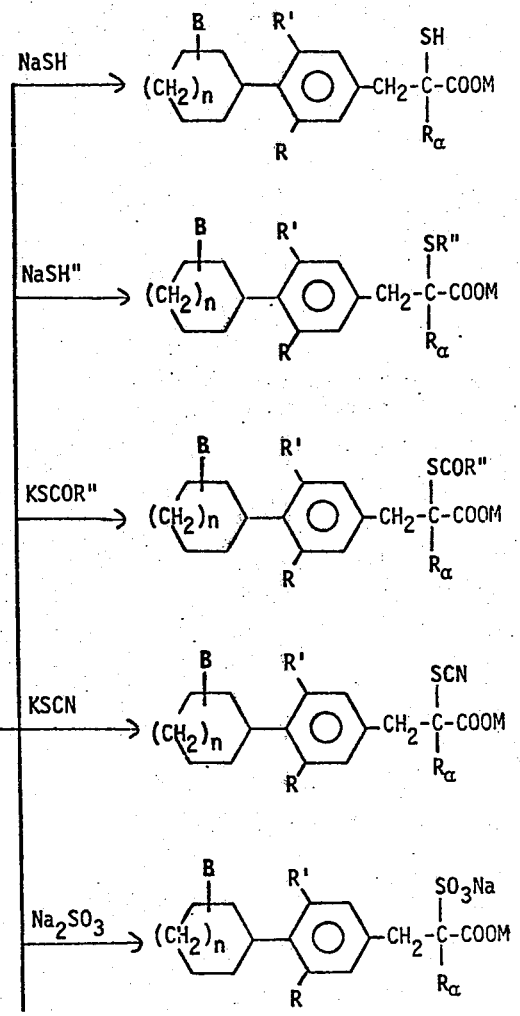

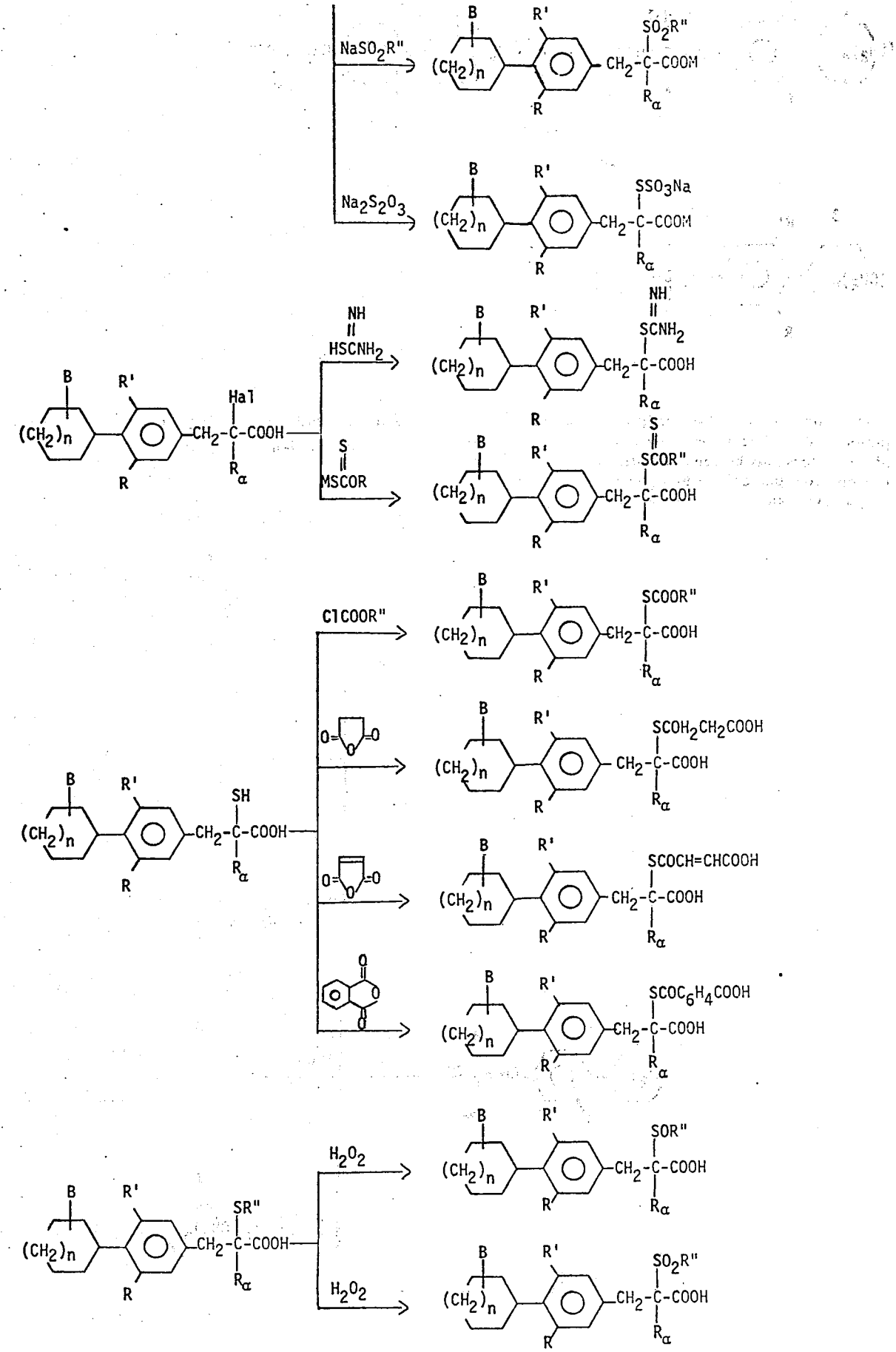

The corresponding acids, esters and amides of the foregoing α-mercapto or α-substituted mercaptopropionic acids may be prepared according to the previously described procedures or the replacement of the halo with the desired mercapto or substituted mercapto group may be carried out on the desired acid salts, ester or amide.

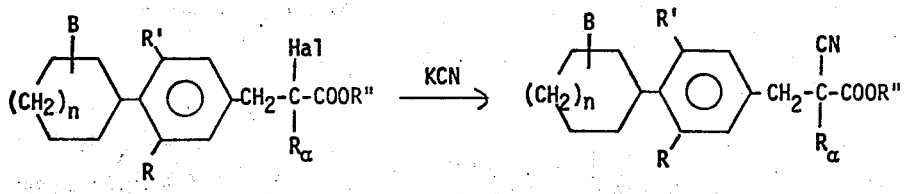

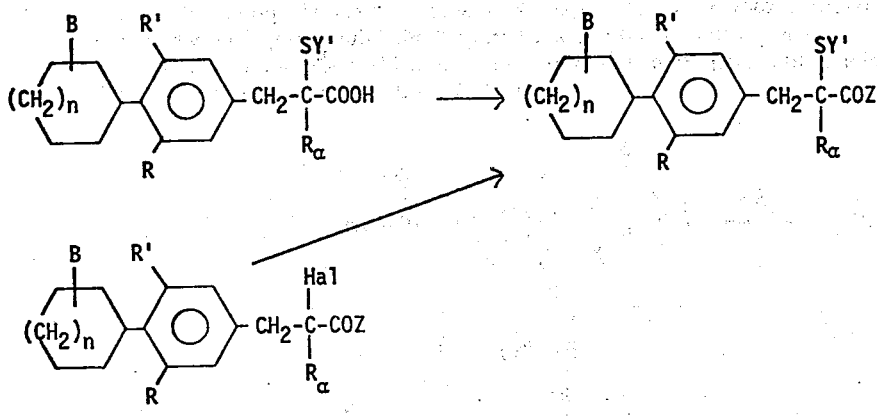

where —SY' is mercapto or substituted thio.

The α-mercaptropropionic acid may be converted to the metal salt which in turn will react with a carbamyl chloride to the corresponding α-carbamylthio, loweralkylcarbamylthio or diloweralkylcarbamylthio compounds.

phenyl)propionic acid derivative with an alkali cyanide produces the corresponding substituted α-cyano-β-(p-cyloalkylphenyl)propionic acid derivative.

The corresponding acids, acid salts, esters and amides of the foregoing α-cyanopropionic acids may be prepared according to the prevously described procedures or the replacement of the halo group with the cyano group may be carried out on the desired acid salt, ester or amide.

Substituted α-amino-β-(p-cycloalkylphenyl)propionic acids and their acid derivatives are prepared from substituted β-(p-cycloalkylphenyl) pyruvic acids by reaction with ammonia or a loweralkylamine and

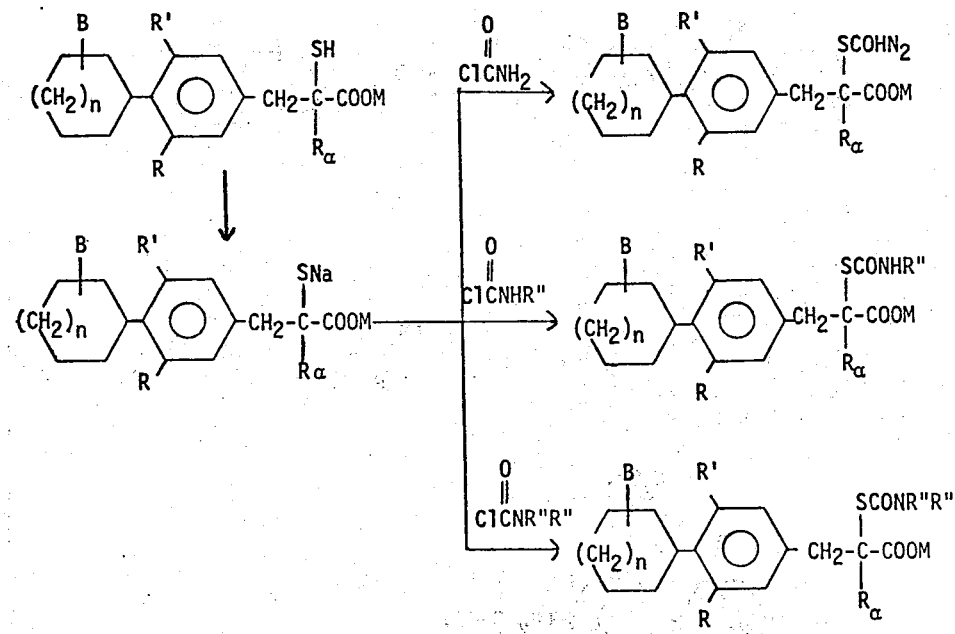

Reaction of a substituted α-halo-β-(p-cycloalkyl- hydrogen over a Raney nickel of platinum catalyst.

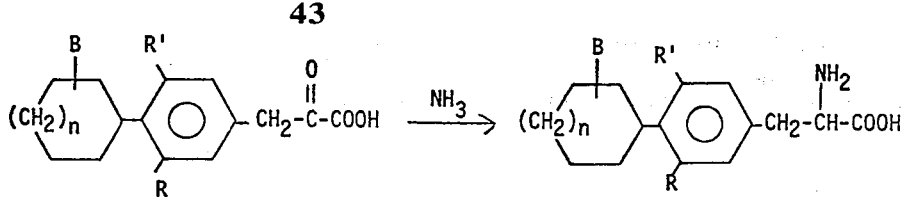

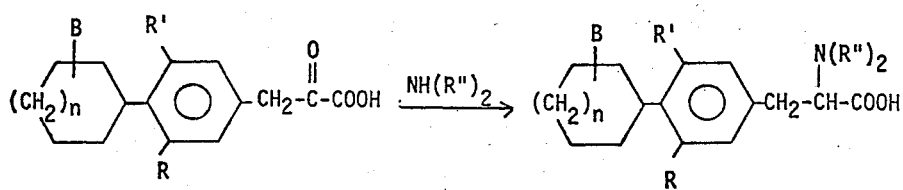

Substituted α-amino-β-(p-cycloalkylphenyl)propionic acids may also be prepared by hydrogenation of a substituted β-(p-cycloalkylphenyl)pyruvic acid oxime over a platinum catalyst. The oxime is obtained from the substituted β-(p-cycloalkylphenyl)pyruvic acid with hydroxylamine.

dride leads to a substituted p-cycloalkylbenzylnitrile. Reaction of the nitrile with a loweralkyl Grignard reagent, produces a substituted p-cycloalkylbenzyl loweralkyl ketone. This latter compound when treated with ammonium chloride and sodium cyanide produces a cyanohydrin which, upon acid hydrolyzes, yields a sub-

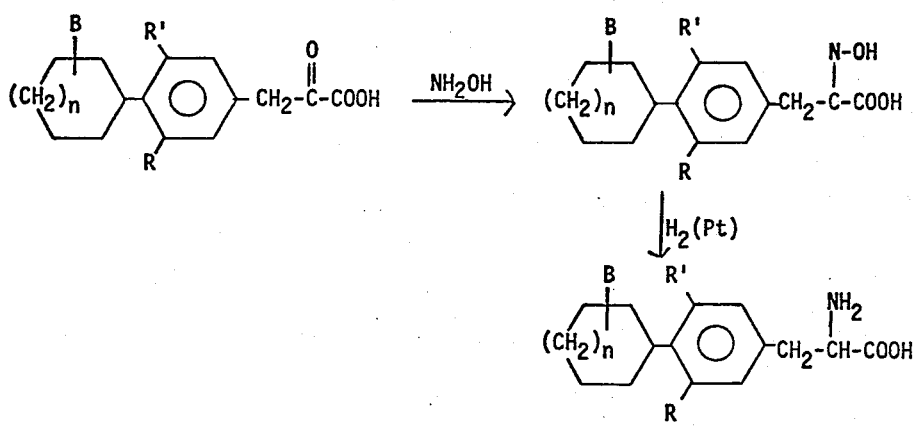

Dehydration of the substituted β-(p-cycloalkylphenyl)pyruvic acid oxime with boiling acetic anhystituted α-amino-β-(p-cycloalkylphenyl)propionic acid.

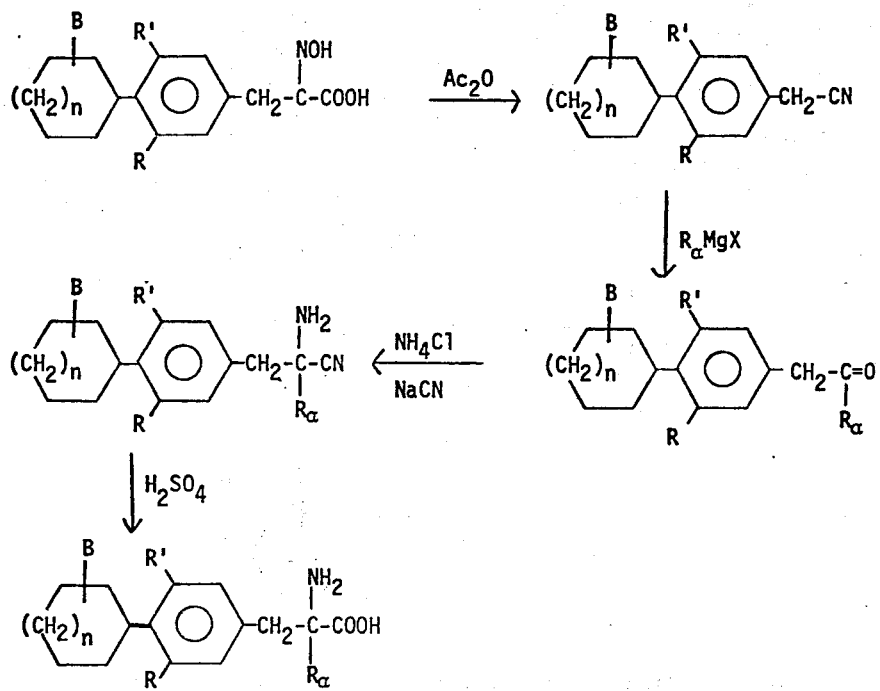

Treatment of the α-amino-β-(p-cycloalkylphenyl)-propionic acid or acid derivatives with an acyl halide results in the corresponding α-acylamino-β-(p-cycloalkylphenyl)propionic acid or corresponding derivative.

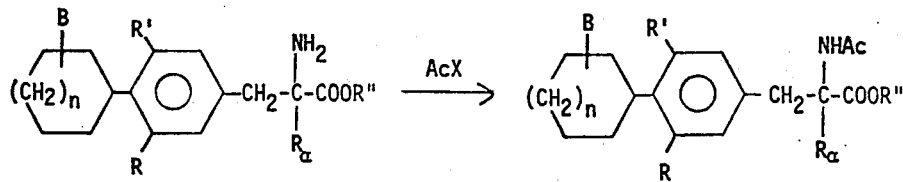

The corresponding acids, acid salts, esters and amides of the foregoing α-aminopropionic acids may be prepared according to the previously described procedures or the α-amino compound may be carried out on the desired ester or amide.

When it is desired to have an alkyl group in the β-position of the side chain, a Reformatsky reaction may be carried out on a substituted p-cycloalkylphenyl alkyl ketone with an α-halo acetate in the presence of zinc. The resultant β-hydroxy-β-alkyl-β-(p-cycloalkylphenyl)propionic acid is then dehydrated with acid at raised temperatures to the β-alkyl-β-(p-cycloalkylphenyl)acrylic acid. This may also be accomplished by carrying out a Doebner modification of the Perkin reaction on the p-cycloalkylphenyl alkyl ketone with malonic acid in the presence of pyridine to obtain the β-alkyl-β-(p-cycloalkylphenyl)acrylic acid. This, in turn, is then reacted as previously described to obtain the desired β-alkyl lactic, α-halopropionic or α-thiopropionic acids and derivatives.

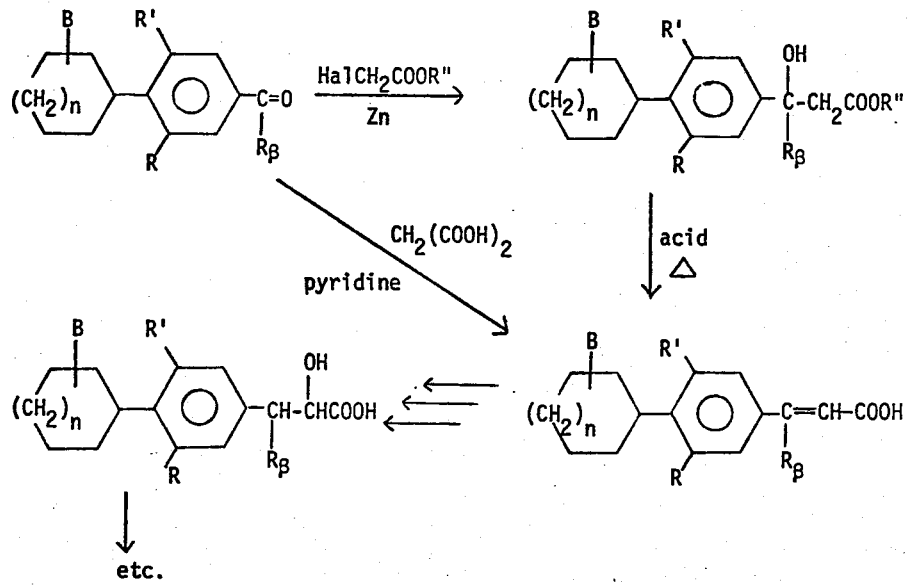

A further method for preparing the compounds of this invention is through the formation of a glycidic ester by the condensation of the proper aldehyde or ketone with an α-halo ester in the presence of an alkali alkoxide, alkali amide, or alkali hydride. The α,β-epoxy ester is then reduced to the corresponding lactate which in turn is then reacted as previously described. This method is also convenient in obtaining the α,β-dialkyl compounds of this invention.

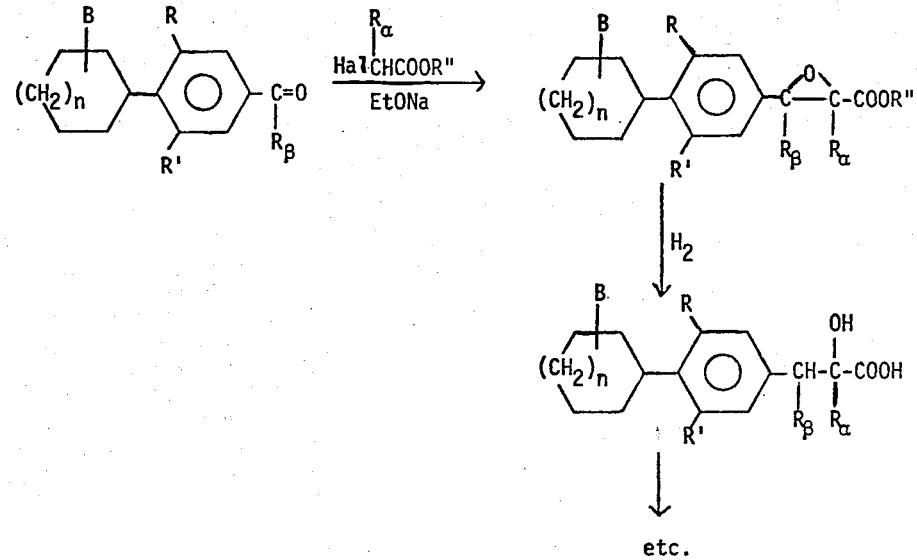

These and other equivalent methods for the preparation of the acid, ester, amide, alcohols and derivatives of the instant products will be apparent to those having ordinary skill in the art.

When the β-carbon is substituted with hydrogen, the products of this invention are obtained as racemic mixtures of their dextro and levorotatory isomers since the α-carbon is asymmetric. When the β-carbon is substituted with an alkyl group, two asymmetric carbon atoms are present and the product may exist as a mixture of two diastereomers, based on syn and anti configurations. These diastereomers may be separated by fractional crystallization. Each diastereomer may then be resolved into dextro and levorotatory optical isomers by conventional methods.

One method of resolution that may be employed is combining the racemic compound with an optically active compound by salt formation, ester formation, or amide formation to form two diasteromeric products. If the instant acids are added to an optically active base, then two diastereomeric salts are produced which posses different properties and different solubilities and can be separated by fractional crystallization. When the salts have been completely separated by repeated crystallization, the base is split off by acid hydrolysis and the pure d and l acids are obtained. Preferably, a cycloalkylphenyl-α-substituted propionic acid is reacted in alcoholic or acetone solution with an equivalent amount of the optically active primary, secondary or tertiary amine such as cinchonidine, cinchonine, quinine, ephedrine, α-methylbenzylamine, sec-butylamine, sec-amylamine, etc. The diastereomeric amine salts produced thereby, are separated by fractional crystallization and each optically salt is hydrolyzed with dilute mineral acid to produce the dextro or levo form of the cycloalkylphenyl-α-substituted propionic acid. Each optical isomer may be reacted then with YCl or YOY to produce the corresponding optically active alcoholic derivative. Alternatively, a cycloalkylphenyl-α-substituted propionate ester may be reacted with an optically active primary or secondary amine such as ephedrine, α-methylbenzylamine, sec-butylamine, etc., to produce a mixture of diastereomeric cycloalkylphenyl-α-substituted propionamide which may be separated by fractional crystallization. Each optically active amide may by hydrolyzed with mineral acid to its respective optically active acid.

Still alternatively, a cycloalkylphenyl-α-substituted propionate may be reacted with an optically active alcohol such as l-menthol or d-borneol, or l-α-methylbenzylalcohol, to produce a mixture of diastereomeric cycloalkylphenyl-α-substituted propionate esters which may be separated by fractional crystallization. Each optically active ester may be hydrolyzed with mineral acid or alkali to its respective optically active acid. The optically active acids can also be recovered from the α-methylbenzyl esters by hydrogenolysis in the presence of palladium. In this manner the α-oxy, α-halo, α-thio, α-cyano or α-amino isomers may be prepared.

I have found that the compounds of this invention exercise a useful degree of anti-inflammatory activity in mammals and are effective in the treatment of associated pain and fever and in like conditions which are responsive to treatment with anti-inflammatory agents. In general, the compounds of this invention are indicated for a wide variety of mammalian conditions where the symptoms of inflammation and associated fever and pain are manifested. Exemplary of such conditions are: rheumatic diseases such as rheumatoid arthritis, osteo-arthritis and other degenerative joint diseases; soft-tissue rheumatism such as tendinitis, muscular rheumatism such as sciatica; pain and inflammation associated with dental surgery and similar human and veterinary disease conditions exhibiting the foregoing symptoms requiring the use of an anti-inflammatory, analgesic and/or antipyretic agent.

For these purposes, the compounds of this invention are normally administered orally, topically, parenterally or rectally. Orally, these may be administered in tablets, capsules, suspensions or syrups; the optimum dosage, of course, depending on the particular compound being used and the type and severity of the condition being treated. In any specific case the appropriate dosage selected will further depend on factors of the patient which may influence response to the drug; for example, general health, age, weight, etc. Although the optimum quantities of the compounds of this invention to be used in such manner will depend on the compound employed and the particular type of disease condition treated, oral dose levels of preferred compounds when administered to a mammal in dosages of 0.5 to 100 milligrams per kilogram of body weight per day are particularly useful. The preferred range is 0.5 to 15 mg/Kg. Comparative dosages may be used in topical, parenteral or rectal administration.

Dosage forms may be prepared according to any method known to the art for the manufacture of pharmaceutical compositions and such compositions may contain one or more agents; for example, sweetening agents, flavoring agents, coloring agents, preserving agents, etc. Further, the active p-cycloalkylphenyl-α-substituted propionic acids or their derivatives may be administered alone or in admixture with antacids such as sodium bicarbonate, magnesium carbonate, magnesium hydroxide, aluminum hydroxide, magnesium silicate, etc., and non-toxic pharmaceutically acceptable excipients. Such excipients may be, for example, inert diluents such as calcium carbonate, lactose, etc., granulating and disintegrating agents; for example maize startch, alginic acid, etc., lubricating agents; for example, magnesium stearate, talc, etc., binding agents; for example, starch gelatin, etc.; suspending agents; for examle, methylcellulose, vegetable oil, etc., dispersing agents; for example, lecithin, etc., thickening agents; for example, beeswax,, hard paraffin, etc., emulsifying agents; for example, naturally-occur-ring gums, etc., and non-irritating excipients; for example, cocoa butter and polyethylene glycols.

Various tests in animals can be carried out to show the ability of the p-cycloalkylphenyl-α-substituted propionic acids and derivatives of this invention to exhibit reactions that can be correlated with antiinflammatory activity in humans. One such test is the carrageenan paw edema test, which shows the ability of the instant compounds to inhibit edema induced by injection of an inflammatory agent such as carrageenan into the tissues of the paw of a rat against non-inflamed controls. This carrageenan testing method is known to correlate well with anti-inflammatory activity in humans and is a standard test used to determine anti-inflammatory activity. This correlation can be shown by the activities of compounds known to be clinically active including such as aspirin, phenylbutazone, cortisone, hydrocortisone, indomethacin and prednisolone. In view of the results of this test, the p-cycloalkylphenyl-α-substituted propionic acids and derivatives can be considered to be active anti-inflammatory agents.

One method for measuring the pain and threshold of the p-cycloalkylphenyl-α-substituted propionic acids and derivatives is the Randall-Selitto test. Analgesic activity is shown by antinocieceptive testing of the inflammed foot of rats and a measurement of their pain response.

Anti-pyretic assay is carried out by yeast-induced fever tests of subcutaneously injected rats. The measurement of rectal temperatures is carried out to determine the response by the test compounds.

In view of the results of the above tests, the p-cycloalkylphenyl-α-substituted propionic acids and derivatives of this invention are considered to have valuable analgesic and antipyretic properties.

Other tests which can be correlated to show significant activities are the "phenylquinone writhing" test for analgesia, "polyarthritis in rats" and "ultra-violet erythema in guinea pigs."

The following are detailed examples which show the preparation of the compounds of this invention. They are to be construed as illustrations of said compounds and not as limitations thereof.

EXAMPLE 1

3-Chloro-4-cyclohexylbenzaldehyde p-Cyclohexylbenzaldehyde 71.5 g. (0.38 mole) and 6.1 g. of iodine (0.048 mole) are dissolved in 100 ml. of carbon tetrachloride. To this solution is added a solution of 40.4 g. (0.57 mole) of chlorine dissolved in 365 ml. of carbon tetrachloride over a period of 2 hours. During the addition, the temperature of the reaction mixture is maintained at 0°C. The mixture is stirred for 3 hours and allowed to stand with gradual warming to room temperature over 15 hours. The solvent is removed by distillation under reduced pressure. The residue is fractionally distilled to obtain 3-chloro-4-cyclohexylbenzaldehyde.

When p-cyclohexylbenzaldehyde in the above example is replaced with the aldehydes of Table I below, then the corresponding product of Table II below is prepared.

TABLE I p-cyclopentylbenzaldehyde
p-(2'-methylcyclopentyl)benzaldehyde
p-cycloheptylbenzaldehyde
p-(2'-methylcycloheptyl)benzaldehyde
p-(2'-methylcyclohexyl)benzaldehyde
p-(3'-methylcyclohexyl)benzaldehyde
p-(4'-methylcyclohexyl)benzaldehyde

TABLE II 3-chloro-4-cyclopentylbenzaldehyde
3-chloro-4-(2'-methylcyclopentyl)benzaldehyde
3-chloro-4-cycloheptylbenzaldehyde
3-chloro-4-(2'-methylcycloheptyl)benzaldehyde
3-chloro-4-(2'-methylcyclohexyl)benzaldehyde
3-chloro-4-(3'-methylcyclohexyl)benzaldehyde
3-chloro-4-(4'-methylcyclohexyl)benzaldehyde

EXAMPLE 2

3,5-dichloro-4-cyclohexylbenzaldehyde p-Cyclohexylbenzaldehyde 35.8 g. (0.19 mole) and 6.1 g. of iodine are dissolved in 100 ml. of carbon tetrachloride. To this solution is added a solution of 56.7 g. (0.8 mole) of chlorine dissolved in 500 ml. of carbon tetrachloride over a period of 3 hours. During the addition, the temperature of the reaction mixture is maintained at 0°C. The mixture is stirred for 3 hours and allowed to stand with gradual warming to room temperature over 30 hours. The solvent is removed in vacuo. The residue is fractionally distilled to obtain 3,5-dichloro-4-cyclohexylbenzaldehyde.

When p-cyclohexylbenzaldehyde in the above example is replaced by the benzaldehydes of Example 2, then the corresponding product of Table I below is prepared.

TABLE I 3,5-dichloro-4-cyclopentylbenzaldehyde
3,5-dichloro-4-(2'-methylcyclopentyl)benzaldehyde
3,5-dichloro-4-cycloheptylbenzaldehyde
3,5-dichloro-4-(2'-methylcycloheptyl)benzaldehyde
3,5-dichloro-4-(2'-methylcyclohexyl)benzaldehyde
3,5-dichloro-4-(3'-methylcyclohexyl)benzaldehyde
3,5-dichloro-4-(4'-methylcyclohexyl)benzaldehyde

EXAMPLE 3

When bromine is used in place of chlorine in Examples 1 and 2, the products obtained are shown in Tables I and II below.

TABLE I 3-bromo-4-cyclopentylbenzaldehyde
3-bromo-4-(2'-methylcyclopentyl)benzaldehyde
3-bromo-4-cycloheptylbenzaldehyde
3-bromo-4-(2'-methylcycloheptyl)benzaldehyde
3-bromo-4-cyclohexylbenzaldehyde
3-bromo-4-(2'-cyclohexyl)benzaldehyde
3-bromo-4-(3'-cyclohexyl)benzaldehyde
3-bromo-4-(4'-cyclohexyl)benzaldehyde

TABLE II 3,5-dibromo-4-cyclopentylbenzaldehyde
3,5-dibromo-4-(2'-methylcyclopentyl)benzaldehyde
3,5-dibromo-4-cycloheptylbenzaldehyde
3,5-dibromo-4-(2'-methylcycloheptyl)benzaldehyde
3,5-dibromo-4-cyclohexylbenzaldehyde
3,5-dibromo-4-(2'-methylcyclohexyl)benzaldehyde
3,5-dibromo-4-(3'-methylcyclohexyl)benzaldehyde
3,5-dibromo-4-(4'-methylcyclohexyl)benzaldehyde

EXAMPLE 4

3-Nitro-4-cyclohexylbenzaldehyde p-Cyclohexylbenzaldehyde 12.4 g. (0.066 mole) is added to ice-cold concentrated sulfuric acid (18 ml.) and stirred with cooling for 5 minutes. Concentrated nitric acid (Sp. G. 1.51) (2.5 ml.) is added dropwise, maintaining the temperature between 30° and 40° by water cooling if necessary. After addition of the nitric acid is complete, the mixture is stirred for ½ hour, then poured into water. The mixture is made alkaline with sodium hydroxide, then extracted with ether. The ether extract is washed, dried over sodium sulfate, evaporated and the residue is fractionally distilled to obtain 3-nitro-4-cyclohexylbenzaldehyde.

When p-cyclohexylbenzaldehyde in the above example is replaced by the benzaldehydes of Example 1, then the corresponding product of Table I below is prepared.

TABLE I 3-nitro-4-cyclopentylbenzaldehyde
3-nitro-4-(2'-methylcyclopentyl)benzaldehyde
3-nitro-4-cycloheptylbenzaldehyde
3-nitro-4-(2'-methylcycloheptyl)benzaldehyde
3-nitro-4-(2'-methylcyclohexyl)benzaldehyde
3-nitro-4-(3'-methylcyclohexyl)benzaldehyde
3-nitro-4-(4'-methylcyclohexyl)benzaldehyde When p-cyclohexylbenzaldehyde in the above example is replaced by the benzaldehyde of Example 2 and Table I of Example 3, then the corresponding product of Table II below is prepared.

TABLE II 3-chloro-5-nitro-4-cyclopentylbenzaldehyde
3-chloro-5-nitro-4-(2'-methylcyclopentyl)benzaldehyde
3-chloro-5-nitro-4-cycloheptylbenzaldehyde
3-chloro-5-nitro-4-(2'-methylcycloheptyl)benzaldhyde
3-chloro-5-nitro-4-(2'-methylcyclohexyl)benzaldehyde
3-chloro-5-nitro-4-(3'-methylcyclohexyl)benzaldehyde
3-chloro-5-nitro-4-(4'-methylcyclohexyl)benzaldehyde
3-chloro-5-nitro-4-cyclohexylbenzaldhyde
3-bromo-5-nitro-4-cyclopentylbenzaldehyde
3-bromo-5-nitro-4-(2'-methylcyclopentyl)benzaldehyde
3-bromo-5-nitro-4-cycloheptylbenzaldehyde
3-bromo-5-nitro-4-(2'-methylcycloheptyl)benzaldehyde
3-bromo-5-nitro-4-cyclohexylbenzaldehyde
3-bromo-5-nitro-4-(2'-methylcyclohexyl)benzaldehyde
3-bromo-5-nitro-4-(3'-methylcyclohexyl)benzaldehyde
3-bromo-5-nitro-4-(4'-methylcyclohexyl)benzaldehyde

EXAMPLE 5

3,5-Dinitro-4-cyclohexylbenzaldehyde p-Cyclohexylbenzaldehyde 12.4 g. (0.066 mole) is added to ice-cold concentrated sulfuric acid (54 ml.) and stirred with cooling for 5 minutes. Concentrated nitric acid (Sp. G. 1.51) (7.5 ml.) is added dropwise, maintaining the temperature between 30° and 40° by water cooling if necessary. After addition of the nitric acid is complete, the mixture is stirred for 3 hours, then poured into water. The mixture is made alkaline with sodium hydroxide, then extracted with ether. The ether extract is washed, dried over sodium sulfite, evaporated and the residue is fractionally distilled to obtain 3,5-dinitro-4-cyclohexylbenzaldehyde.

When p-cyclohexylbenzaldehyde in the above example is replaced by the benzaldehyde of Example 1, then the corresponding product of Table I below is prepared.

TABLE I 3,5-dinitro-4-cyclopentylbenzaldehyde
3,5-dinitro-4-(2'-methylcyclopentyl)benzaldehyde
3,5-dinitro-4-cycloheptylbenzaldehyde
3,5-dinitro-4-(2'-methylcycloheptyl)benzaldehyde
3,5-dinitro-4-(2'-methylcyclohexyl)benzaldehyde
3,5-dinitro-4-(3'-methylcyclohexyl)benzaldehyde
3,5-dinitro-4-(4'-methylcyclohexyl)benzaldehyde

EXAMPLE 6

β-(3-chloro-4-cyclohexylphenyl)cinnamic acid

A mixture of 22.2 g. (0.1 mole) of 3-chloro-4-cyclohexylbenzaldehyde is heated on a steam bath with 13.2 g. of malonic acid and 95 ml. of pyridine containing 5 drops of piperidine. The mixture is heated for 4 hours until the liberation of carbon dioxide ceases. The cooled mixture is poured into a mixture of 110 ml. concentrated hydrochloric acid and 500 ml. of ice-water. The solid which separates is filtered, washed with 15 ml. portions of cold water and then resuspended in 200 ml. of cold water, filtered, washed with cold water and dried at 40°C. The residue is then recrystallized from ethanol to obtain β-(3-chloro-4-cyclohexylphenyl)cinnamic acid.

When 3-chloro-4-cyclohexyl benzaldehyde in the above example is replaced with the benzaldehydes of Examples 1–5 then the corresponding products of Table I below are obtained.

TABLE I

β-(p-cyclopentylphenyl)cinnamic acid
β-[-(2'-methylcyclopentyl)phenyl]cinnamic acid
β-(p-cycloheptylphenyl)cinnamic acid
β-[p-(2'-methylcycloheptyl)phenyl]cinnamic acid
β-[p-(2'-methylcyclohexyl)phenyl]cinnamic acid
β-[p-(3'-methylcyclohexyl)phenyl]cinnamic acid
β-[p-(4'-methylcyclohexyl)phenyl]cinnamic acid
β-(3-chloro-4-cyclopentylphenyl)cinnamic acid
β-[3-chloro-4-(2'-methylcyclopentyl)phenyl]cinnamic acid
β-(p-cyclohexylphenyl)cinnamic acid
β-(3,5-dichloro-4-cyclohexylphenyl)cinnamic acid
β-(3-chloro-cycloheptylphenyl)cinnamic acid
β-[3-chloro-4-(2'-methylcycloheptyl)phenyl]cinnamic acid
β-[3-chloro-4-(2'-methylcyclohexyl)phenyl]cinnamic acid
β-[3-chloro-4-(3'-methylcyclohexyl)phenyl]cinnamic acid
β-[3-chloro-4-(4'-methylcyclohexyl)phenyl]cinnamic acid
β-(3,5-dichloro-4-cyclopentylphenyl)cinnamic acid
β-[3,5-dichloro-4-(2'-methylcyclopentyl)phenyl]cinnamic acid
β-(3,5-dichloro-4-cycloheptylphenyl)cinnamic acid
β-[3,5-dichloro-4-(2'-methylcycloheptyl)phenyl]cinnamic acid
β-[3,5-dichloro-4-(2'-methylcyclohexyl)phenyl]cinnamic acid
β-[3,5-dichloro-4-(3'-methylcyclohexyl)phenyl]cinnamic acid
β-[3,5-dichloro-4-(4'-methylcyclohexyl)phenyl]cinnamic acid
β-(3-bromo-4-cyclopentylphenyl)cinnamic acid
β-[3-bromo-4-(2'-methylcyclopentyl)phenyl]cinnamic acid β-(3-bromo-4-cycloheptylphenyl)cinnamic acid
β-[3-bromo-4-(2'-methylcycloheptyl)phenyl]cinnamic acid
β-(3-bromo-4-cyclohexylphenyl)cinnamic acid
β-[3-bromo-4-(2'-cyclohexyl)phenyl]cinnamic acid
β-[3-bromo-4-(3'-cyclohexyl)phenyl]cinnamic acid
β-[3-bromo-4-(4'-cyclohexyl)phenyl]cinnamic acid
β-(3,5-dibromo-4-cyclopentylphenyl)cinnamic acid
β-[3,5-dibromo-4-(2'-methylcyclopentyl)phenyl]cinnamic acid
β-(3,5-dibromo-4-cycloheptylphenyl)cinnamic acid
β-[3,5-dibromo-4-(2'-methylcycloheptyl)phenyl]cinnamic acid
β-(3,5-dibromo-4-cyclohexylphenyl)cinnamic acid
β-[3,5-dibromo-4-(2'-methylcyclohexyl)phenyl]cinnamic acid
β-[3,5-dibromo-4-(3'-methylcyclohexyl)phenyl]cinnamic acid
β-[3,5-dibromo-4-(4'-methylcyclohexyl)phenyl]cinnamic acid
β-(3-nitro-4-cyclopentylphenyl)cinnamic acid
β-[3-nitro-4-(2'-methylcyclopentyl)phenyl]cinnamic acid
β-(3-nitro-4-cyclohexylphenyl)cinnamic acid
β-(3-nitro-4-cycloheptylphenyl)cinnamic acid
β-[3-nitro-4-(2'-methylcycloheptyl)phenyl]cinnamic acid
β-[3-nitro-4-(2'-methylcyclohexyl)phenyl]cinnamic acid
β-[3-nitro-4-(3'-methylcyclohexyl)phenyl]cinnamic acid
β-[3-nitro-4-(4'-methylcyclohexyl)phenyl]cinnamic acid
β-(3-chloro-5-nitro-4-cyclopentylphenyl)cinnamic acid
β-[3-chloro-5-nitro-4-(2'-methylcyclopentyl)phenyl]cinnamic acid
β-(3-chloro-5-nitro-4-cycloheptylphenyl)cinnamic acid
β-[3-chloro-5-nitro-4-(2'-methylcycloheptyl)phenyl]cinnamic acid
β-[3-chloro-5-nitro-4-(2'-methylcycloheptyl)phenyl]cinnamic acid
β-[3-chloro-5-nitro-4-(3'-methylcycloheptyl)phenyl]cinnamic acid
β-[3-chloro-5-nitro-4-(4'-methylcycloheptyl)phenyl]cinnamic acid
β-(3-chloro-5-nitro-4-cyclohexylphenyl)cinnamic acid
β-(3-bromo-5-nitro-4-cyclopentylphenyl)cinnamic acid
β-[3-bromo-5-nitro-4-(2'-methylcyclopentyl)phenyl]cinnamic acid
β-(3-bromo-5-nitro-4-cycloheptylphenyl)cinnamic acid
β-[3-bromo-5-nitro-4-(2'-methylcycloheptyl)phenyl]cinnamic acid
β-(3-bromo-5-nitro-4-cyclohexylphenyl)cinnamic acid
β-[3-bromo-5-nitro-4-(2'-methylcyclohexyl)phenyl]cinnamic acid
β-[3-bromo-5-nitro-4-(3'-methylcyclohexyl)phenyl]cinnamic acid
β-[3-bromo-5-nitro-4-(4'-methylcyclohexyl)phenyl]cinnamic acid
β-(3,5-dinitro-4-cyclopentylphenyl)cinnamic acid
β-[3,5-dinitro-4-(2'-methylcyclopentyl)phenyl]cinnamic acid
β-(3,5-dinitro-4-cycloheptylphenyl)cinnamic acid
β-[3,5-dinitro-4-(2'-methylcycloheptyl)phenyl]cinnamic acid
β-[3,5-dinitro-4-(2'-methylcyclohexyl)phenyl]cinnamic acid
β-[3,5-dinitro-4-(3'-methylcyclohexyl)phenyl]cinnamic acid
β-[3,5-dinitro-4-(4'-methylcyclohexyl)phenyl]cinnamic acid
β-(3,5-dinitro-4-cyclohexylphenyl)cinnamic acid

EXAMPLE 7

α,β-Dibromo-β-(3-chloro-4-cyclohexylphenyl)propionic acid

A mixture of 35 g. (0.13 mole) of β-(3-chloro-4-cyclohexylphenyl)cinnamic acid is gently boiled with 280 ml. of carbontetrachloride. To this hot suspension is added dropwise with stirring 7.1 ml. (0.13 mole) of bromine diluted with 15 ml. of carbontetrachloride over 50 min. The bath temperature is maintained at about 80°C and stirring and heating continued for 1½ hours. The mixture is then cooled to room temperature and filtered to obtain α,β-dibrom-β-(3-chloro-4-cyclohexylphenyl)propionic acid.

When β-(3-chloro-4-cyclohexylphenyl)cinnamic acid in the above example is replaced with the cinnamic acid compounds of Example 6, then the products obtained are α,β-dibromo-β-(p-cyclopentylphenyl)propionic acid
α,β-dibromo-β-[p-(2'-methylcyclopentyl)phenyl]propionic acid
α,β-dibromo-β-(p-cycloheptylphenyl)propionic acid
α,β-dibromo-β-[p-(2'-methylcycloheptyl)phenyl]propionic acid
α,β-dibromo-β-[p-(2'-methylcyclohexyl)phenyl]propionic acid
α,β-dibromo-β-[p-(3'-methylcyclohexyl)phenyl]propionic acid
α,β-dibromo-β-[p-(4'-methylcyclohexyl)phenyl]propionic acid
α,β-dibromo-β-(3-chloro-4-cyclopentylphenyl)propionic acid
α,β-dibromo-β-[3-chloro-4-(2'-methylcyclopentyl)phenyl]propionic acid
α,β-dibromo-β-(3-chloro-4-cycloheptylphenyl)propionic acid
α,β-dibromo-β-[3-chloro-4-(2'-methylcycloheptyl)phenyl]propionic acid
α,β-dibromo-β-[3-chloro-4-(2'-methylcyclohexyl)phenyl]propionic acid
α,β-dibromo-β-[3-chloro-4-(3'-methylcyclohexyl)phenyl]propionic acid
α,β-dibromo-β-[3-chloro-4-(4'-methylcyclohexyl)phenyl]propionic acid
α,β-dibromo-β-(3,5-dichloro-4-cyclopentylphenyl)propionic acid
α,β-dibromo-β-[3,5-dichloro-4-(2'-methylcyclopentyl)phenyl]propionic acid
α,β-dibromo-β-(3,5-dichloro-4-cycloheptylphenyl)propionic acid
α,β-dibromo-β-[3,5-dichloro-4-(2'-methylcycloheptyl)phenyl]propionic acid
α,β-dibromo-β-(p-cyclohexylphenyl)propionic acid
α,β-dibromo-β-(3,5-dichloro-4-cyclohexylphenyl)propionic acid α,β-dibromo-β-[3(5'-methylcyclohexyl)phenyl]propionic acid
α,β-dibromo-β-[3,5-dichloro-4-(4'-methylcyclohexyl)phenyl]propionic acid
α,β-3-tribromo-β-(4-cyclopentylphenyl)propionic acid
α,β-3-tribromo-β-[4-(2'-methylcyclopentyl)phenyl]propionic acid
α,β-3-tribromo-β-(4-cycloheptylphenyl)propionic acid
α,β-3-tribromo-β-[4-(2'-methylcycloheptyl)phenyl]propionic acid
α,β-3-tribromo-β-(4-cyclohexylphenyl)propionic acid
α,β-3-tribromo-β-[4-(2'-cyclohexyl)phenyl]propionic acid
α,β-3-tribromo-β-[4-(3'-cyclohexyl)phenyl]propionic acid
α,β-3-tribromo-β-[4-(4'-cyclohexyl)phenyl]propionic acid
α,β,3,5-tetrabromo-β-(4-cyclopentylphenyl)propionic acid
α,β,3,5-tetrabromo-β-[4-(2'-methylcyclopentyl)phenyl]propionic acid
α,β,3,5-tetrabromo-β-(4-cycloheptylphenyl)propionic acid
α,β,3,5-tetrabromo-β-[4-(2'-methylcycloheptyl)phenyl]propionic acid
α,β,3,5-tetrabromo-β-(4-cyclohexylphenyl)propionic acid
α,β,3,5-tetrabromo-β-[4-(2'-methylcyclohexyl)phenyl]propionic acid
α,β,3,5-tetrabromo-β-[4-(3'-methylcyclohexyl)phenyl]propionic acid
α,β,3,5-tetrabromo-β-[4-(4'-methylcyclohexyl)phenyl]propionic acid
α,β-dibromo-β-(3-nitro-4-cyclopentylphenyl)propionic acid
α,β-dibromo-β-[3-nitro-4-(2'-methylcyclopentyl)phenyl]propionic acid
α,β-dibromo-β-(3-nitro-4-cycloheptylphenyl)propionic acid
α,β-dibromo-β-[3-nitro-4-(2'-methylcycloheptyl)phenyl]propionic acid
α,β-dibromo-β-[3-nitro-4-(2'-methylcyclohexyl)phenyl]propionic acid
α,β-dibromo-β-[3-nitro-4-(3'-methylcyclohexyl)phenyl]propionic acid
α,β-dibromo-β-[3-nitro-4-(4'-methylcyclohexyl)phenyl]propionic acid
α,β-dibromo-β-(3-chloro-5-nitro-4-cyclopentylphenyl)propionic acid
α,β-dibromo-β-[3-chloro-5-nitro-4-(2'-methylcyclopentyl)phenyl]propionic acid
α,β-dibromo-β-(3-chloro-5-nitro-4-cycloheptylphenyl)propionic acid
α,β-dibromo-β-[3-chloro-5-nitro-4-(2'-methylcycloheptyl)phenyl]propionic acid
α, β-dibromo-β-(3-nitro-4-cyclohexylphenyl)propionic acid
α,β-dibromo-β-(3,5-dinitro-4-cyclohexylphenyl)propionic acid
α,β-dibromo-β-[3-chloro-5-nitro-4-(2'-methylcyclohexyl)phenyl]propionic acid
α,β-dibromo-β-[3-chloro-5-nitro-4-(3'-methylcyclohexyl)phenyl]propionic acid
α,β-dibromo-β-[3-chloro-5-nitro-4-(4'-methylcyclohexyl)phenyl]propionic acid
α,β-dibromo-β-(3-chloro-5-nitro-4-cyclohexylphenyl)propionic acid
α,β,3-tribromo-β-(5-nitro-4-cyclopentylphenyl)propionic acid
α,β,3-tribromo-β-[5-nitro-4-(2'-methylcyclopentyl)phenyl]propionic acid
α,β,3-tribromo-β-(5-nitro-4-cycloheptylphenyl)propionic acid
α,β,3-tribromo-β-[5-nitro-4-(2'-methylcycloheptyl)phenyl]propionic acid
α,β,3-tribromo-β-(5-nitro-4-cyclohexylphenyl)propionic acid
α,β,3-tribromo-β-[5-nitro-4-(2'-methylcyclohexyl)phenyl]propionic acid
α,β,3-tribromo-β-[5-nitro-4-(3'-methylcyclohexyl)phenyl]propionic acid
α,β,3-tribromo-β-[5-nitro-4-(4'-methylcyclohexyl)phenyl]propionic acid
α,β-dibromo-β-(3,5-dinitro-4-cyclopentylphenyl)propionic acid
α,β-dibromo-β-[3,5-dinitro-4-(2'-methylcyclopentyl)phenyl]propionic acid
α,β-dibromo-β-(3,5-dinitro-4-cycloheptylphenyl)propionic acid
α,β-dibromo-β-[3,5-dinitro-4-(2'-methylcycloheptyl)phenyl]propionic acid
α,β-dibromo-β-[3,5-dinitro-4-(2'-methylcyclohexyl)phenyl]propionic acid
α,β-dibromo-β-[3,5-dinitro-4-(3'-methylcyclohexyl)phenyl]propionic acid
α,β-dibromo-β-[3,5-dinitro-4-(4'-methylcyclohexyl)phenyl]propionic acid

EXAMPLE 8

β-(3-Chloro-4-cyclohexylphenyl)pyruvic acid

A mixture of α,β-dibromo-β-(3-chloro-4-cyclohexylphenyl)propionic acid is treated with 3 moles of piperidine following the procedure of Henri Moureu, Paul Chovin and Michel Garein in Compt. Rendu 221, pages 410-2 (1945) to form a tripiperidyl adduct which on refluxing with 2N sulfuric acid gives β-(3-chloro-4-cyclohexylphenyl)pyruvic acid.

When α,β-dibromo-β-(3-chloro-4-cyclohexylphenyl)propionic acid in the above procedure is replaced by the propionic acids of Example 7, then the products prepared are described in Table I below.

β-(p-cyclopentylphenyl)pyruvic acid
β-[p-(2'-methylcyclopentyl)phenyl]pyruvic acid
β-(p-cycloheptylphenyl)pyruvic acid
β-[p-(2'-methylcycloheptyl)phenyl]pyruvic acid
β-[p-(2'-methylcyclohexyl)phenyl]pyruvic acid
β-[p-(3'-methylcyclohexyl)phenyl]pyruvic acid
β-[p-(4'-methylcyclohexyl)phenyl]pyruvic acid
β-(3-chloro-4-cyclopentylphenyl)pyruvic acid
β-[3-chloro-4-(2'-methylcyclopentyl)phenyl]pyruvic acid
β-(p-cyclohexylphenyl)pyruvic acid
β-(3,5-dichloro-4-cyclohexylphenyl)pyruvic acid
β-(3-chloro-4-cycloheptylphenyl)pyruvic acid
β-[3-chloro-4-(2'-methylcycloheptyl)phenyl]pyruvic acid
β-[3-chloro-4-(2'-methylcyclohexyl)phenyl]pyruvic acid
β-[3-chloro-4-(3'-methylcyclohexyl)phenyl]pyruvic acid β-[3-chloro-4-(4'-methylcyclohexyl)phenyl]pyruvic acid
β-(3,5-dichloro-4-cyclopentylphenyl)pyruvic acid
β-[3,5-dichloro-4-(2'-methylcyclopentyl)phenyl]-pyruvic acid
β-(3,5-dichloro-4-cycloheptylphenyl)pyruvic acid
β-[3,5-dichloro-4-(2'-methylcycloheptyl)phenyl]-pyruvic acid
β-[3,5-dichloro-4-(2'-methylcyclohexyl)phenyl]-pyruvic acid
β-[3,5-dichloro-4-(3'-methylcyclohexyl)phenyl]-pyruvic acid
β-[3,5-dichloro-4-(4'-methylcyclohexyl)phenyl]-pyruvic acid
β-(3-bromo-4-cyclopentylphenyl)pyruvic acid
β-[3-bromo-4-(2'-methylcyclopentyl)phenyl]-pyruvic acid
β-(3-bromo-4-cycloheptylphenyl)pyruvic acid
β-[3-bromo-4-(2'-methylcycloheptyl)phenyl]-pyruvic acid
β-(3-bromo-4-cyclohexylphenyl)pyruvic acid
β-[3-bromo-4-(2'-cyclohexyl)phenyl]pyruvic acid
β-[3-bromo-4-(3'-cyclohexyl)phenyl]pyruvic acid
β-[3-bromo-4-(4'-cyclohexyl)phenyl]pyruvic acid
β-(3,5-dibromo-4-cyclopentylphenyl)pyruvic acid
β-[3,5-dibromo-4-(2'-methylcyclopentyl)phenyl]-pyruvic acid
β-(3,5-dibromo-4-cycloheptylphenyl)pyruvic acid
β-[3,5-dibromo-4-(2'-methylcycloheptyl)phenyl]-pyruvic acid
β-(3,5-dibromo-4-cyclohexylphenyl)pyruvic acid
β-[3,5-dibromo-4-(2'-methylcyclohexyl)phenyl]-pyruvic acid
β-[3,5-dibromo-4-(3'-methylcyclohexyl)phenyl]-pyruvic acid
β-[3,5-dibromo-4-(4'-methylcyclohexyl)phenyl]-pyruvic acid
β-(3-nitro-4-cyclopentylphenyl)pyruvic acid
β-[3-nitro-4-(2'-methylcyclopentyl)phenyl]pyruvic acid
β-(3-nitro-4-cyclohexylphenyl)pyruvic acid
β-(3-nitro-4-cycloheptylphenyl)pyruvic acid
β-[3-nitro-4-(2'-methylcycloheptyl)phenyl]pyruvic acid
β-[3-nitro-4-(2'-methylcyclohexyl)phenyl]pyruvic acid
β-[3-nitro-4-(3'-methylcyclohexyl)phenyl]pyruvic acid
β-[3-nitro-4-(4'-methylcyclohexyl)phenyl]pyruvic acid
β-(3-chloro-5-nitro-4-cyclopentylphenyl)pyruvic acid
β-[3-chloro-5-nitro-4-(2'-methylcyclopentyl)-phenyl]pyruvic acid
β-(3-chloro-5-nitro-4-cycloheptylphenyl)pyruvic acid
β-[3-chloro-5-nitro-4-(2'-methylcycloheptyl)-phenyl]pyruvic acid
β-[3-chloro-5-nitro-4-(2'-methylcyclohexyl)-phenyl]pyruvic acid
β-[3-chloro-5-nitro-4-(3'-methylcyclohexyl)-phenyl]pyruvic acid
β-[3-chloro-5-nitro-4-(4'-methylcyclohexyl)-phenyl]pyruvic acid
β-(3-chloro-5-nitro-4-cyclohexylphenyl)pyruvic acid
β-(3-bromo-5-nitro-4-cyclopentylphenyl)pyruvic acid
β-[3-bromo-5-nitro-4-(2'-methylcyclopentyl)-phenyl]pyruvic acid
β-(3-bromo-5-nitro-4-cycloheptylphenyl)pyruvic acid
β-[3-bromo-5-nitro-4-(2'-methylcycloheptyl)-phenyl]pyruvic acid
β-(3-bromo-5-nitro-4-cyclohexylphenyl)pyruvic acid
β-[3-bromo-5-nitro-4-(2'-methylcyclohexyl)-phenyl]pyruvic acid
β-[3-bromo-5-nitro-4-(3'-methylcyclohexyl)-phenyl]pyruvic acid
β-[3-bromo-5-nitro-4-(4'-methylcyclohexyl)-phenyl]pyruvic acid
β-(3,5-dinitro-4-cyclopentylphenyl)pyruvic acid
β-[3,5-dinitro-4-(2'-methylcyclopentyl)phenyl]-pyruvic acid
β-(3,5-dinitro-4-cycloheptylphenyl)pyruvic acid
β-[3,5-dinitro-4-(2'-methylcycloheptyl)phenyl]-pyruvic acid
β-[3,5-dinitro-4-(2'-methylcyclohexyl)phenyl]-pyruvic acid
β-[3,5-dinitro-4-(3'-methylcyclohexyl)phenyl]-pyruvic acid
β-[3,5-dinitro-4-(4'-methylcyclohexyl)phenyl]-pyruvic acid
β-(3,5-dinitro-4-cyclohexylphenyl)pyruvic acid

EXAMPLE 9

2-Phenyl-4-(3-chloro-4-cyclohexylbenzal)-5-oxazolone

A mixture of 13.3 g. (0.06 mole) of 3-chloro-4-cyclohexylbenzaldehyde, 10 g. (0.06 mole) of hippuric acid and 9.6 g. (0.06 mole) of sodium acetate are heated in 200 ml. of acetic anhydride at 100°C with stirring for 4 hours. The reaction mixture is cooled to room temperature and allowed to crystallize. The product is filtered, washed with water and recrystallized from benzene to obtain 2-phenyl-4-(3-chloro-4-cyclohexylbenzal)-5-oxazolone.

When 3-chloro-4-cyclohexylbenzaldehyde in the above example is replaced with the aldehydes of Examples 1–5, then the product obtained is
  2-phenyl-4-(p-cyclopentylbenzal)-5-oxazolone
  2-phenyl-4-[p-(2'-methylcyclopentyl)benzal]-5-oxazolone
  2-phenyl-4-(p-cycloheptylbenzal)-5-oxazolone
  2-phenyl-4-[p-(2'-methylcycloheptyl)benzal]-5-oxazolone
  2-phenyl-4-[p-(2'-methylcyclohexyl)benzal]-oxazolone
  2-phenyl-4-[p-(3'-methylcyclohexyl)benzal]-5-oxazolone
  2-phenyl-4-[p-(4'-methylcyclohexyl)benzal]-5-oxazolone
  2-phenyl-4-(3-chloro-4-cyclopentylbenzal)-5-oxazolone
  2-phenyl-4-[3-chloro-(2'-methylcyclopentyl)ben-zal]-5-oxazolone
  2-phenyl-4-(p-cyclohexylbenzal)-5-oxazolone
  2-phenyl-4-(3,5-dichloro-4-cyclohexylbenzal)-5-oxazolone
  2-phenyl-4-(3-chloro-4-cycloheptylbenzal)-5-oxazolone
  2-phenyl-4-[3-chloro-4-(2'-methylcycloheptyl)ben-zal]-5-oxazolone
  2-phenyl-4-[3-chloro-4-(2'-methylcyclohexyl)ben-zal]-5-oxazolone 2-phenyl-4-[3-chloro-4-(3'-methylcyclohexyl)benzal]-5-oxazolone
2-phenyl-4-[3-chloro-4-(4'-methylcyclohexyl)benzal]-5-oxazolone
2-phenyl-4-(3,5-dichloro-4-cyclopentylbenzal)-5-oxazolone
2-phenyl-4-[3,5-dichloro-4-(2'-methylcyclopentyl)benzal]-5-oxazolone
2-phenyl-4-(3,5-dichloro-4-cycloheptylbenzal)-5-oxazolone
2-phenyl-4-[3,5-dichloro-4-(2'-methylcycloheptyl)benzal]-5-oxazolone
2-phenyl-4-[3,5-dichloro-4-(2'-methylcyclohexyl)benzal)benzal]-5-oxazolone
2-phenyl-4-[3,5-dichloro-4-(3'-methylcyclohexyl)benzal]-5-oxazolone
2-phenyl-4-[3,5-dichloro-4-(4'-methylcyclohexyl)benzal]-5-oxazolone
2-phenyl-4-(3-bromo-4-cyclopentylbenzal)-5-oxazolone
2-phenyl-4-[3-bromo-4-(2'-methylcyclopentyl)benzal]-5-oxazolone
2-phenyl-4-(3-bromo-4-cycloheptylbenzal)-5-oxazolone
2-phenyl-4-[3-bromo-4-(2'-methylcycloheptyl)benzal]-5-oxazolone
2-phenyl-4-(3-bromo-4-cyclohexylbenzal)-5-oxazolone
2-phenyl-4-[3-bromo-4-(2'-cyclohexyl)benzal]-5-oxazolone
2-phenyl-4-[3-bromo-4-(3'-cyclohexyl)benzal]-5-oxazolone
2-phenyl-4-[3-bromo-4-(4'-cyclohexyl)benzal]-5-oxazolone
2-phenyl-4-(3,5-dibromo-4-cyclopentylbenzal)-5-oxazolone
2-phenyl-4-[3,5-dibromo-4-(2'-methylcyclopentyl)benzal]-5-oxazolone
2-phenyl-4-(3,5-dibromo-4-cycloheptylbenzal)-5-oxazolone
2-phenyl-4-[3,5-dibromo-4-(2'-methylcycloheptyl)benzal]5-oxazolone
2-phenyl-4-(3,5-dibromo-4-cyclohexylbenzal)5-oxazolone
2-phenyl-4-[3,5-dibromo-4-(2'-methylcyclohexyl)benzal]-5-oxazolone
2-phenyl-4-[3,5-dibromo-4-(3'-methylcyclohexyl)benzal]-5-oxazolone
2-phenyl-4-[3,5-dibromo-4-(4'-methylcyclohexyl)benzal]-5-oxazolone
2-phenyl-4-(3-nitro-4-cyclopentylbenzal)-5-oxazolone
2-phenyl-4-[3-nitro-4-(2'-methylcyclopentyl)benzal]-5-oxazolone
2-phenyl-4-(3-nitro-4-cyclohexylphenyl)-5-oxazolone
2-phenyl-4-(3-nitro-4-cycloheptylbenzal)-5-oxazolone
2-phenyl-4-[3-nitro-4-(2'-methylcycloheptyl)benzal]-5-oxazolone
2-phenyl-4-[3-nitro-4-(2'-methylcyclohexyl)benzal)-5-oxazolone
2-phenyl-4-[3-nitro-4-(3'-methylcyclohexyl)benzal]-5-oxazolone
2-phenyl-4-[3-nitro-4-(4'-methylcyclohexyl)benzal]-5-oxazolone
2-phenyl-4-(3-chloro-5-nitro-4-cyclopentylbenzal)-5-oxazolone
2-phenyl-4-[3-chloro-5-nitro-4-(2'-methylcyclopentyl)benzal]5-oxazolone
2-phenyl-4-(3-chloro-5-nitro-4-cycloheptylbenzal)-5-oxazolone
2-phenyl-4-[3-chloro-5-nitro-4-(2'-methylcycloheptyl)benzal]-5-oxazolone
2-phenyl-4-[3-chloro-5-nitro-4-(2'-methylcyclohexyl)benzal]-5-oxazolone
2-phenyl-4-[3-chloro-5-nitro-4-(3'-methylcyclohexyl)benzal]-5-oxazolone
2-phenyl-4-[3-chloro-5-nitro-4-(4'-methylcyclohexyl)benzal]-5-oxazolone
2-phenyl-4-(3-chloro-5-nitro-4-cyclohexylbenzal)-5-oxazolone
2-phenyl-4-(3-bromo-5-nitro-4-cyclopentylbenzal)5-oxazolone
2-phenyl-4-[3-bromo-5-nitro-4-(2'-methylcyclopentyl)benzal]-5-oxazolone
2-phenyl-4-(3-bromo-5-nitro-4-cycloheptylbenzal)-5-oxazolone
2-phenyl-4-[3-bromo-5-nitro-4-(2'-methylcycloheptyl)benzal]-5-oxazolone
2-phenyl-4-(3-bromo-5-nitro-4-cyclohexylbenzal)-5-oxazolone
2-phenyl-4-[3-bromo-5-nitro-4-(2'-methylcyclohexyl)benzal]-5-oxazolone
2-phenyl-4-[3-bromo-5-nitro-4-(3'-methylcyclohexyl)benzal]-5-oxazolone
2-phenyl-4-[3-bromo-5-nitro-4-(4'-methylcyclohexyl)benzal]-5-oxazolone
2-phenyl-4-(3,5-dinitro-4-cyclopentylbenzal)-5-oxazolone
2-phenyl-4-[3,5-dinitro-4-(2'-methylcyclohexyl)benzal]-5-oxazolone
2-phenyl-4-(3,5-dinitro-4-cycloheptylbenzal)-5-oxazolone
2-phenyl-4-[3,5-dinitro-4-(2'-methylcycloheptyl)benzal]-5-oxazolone
2-phenyl-4-[3,5-dinitro-4-(2'-methylcyclohexyl)benzal]-5-oxazolone
2-phenyl-4-[3,5-dinitro-4-(3'-methylcyclohexyl)benzal]-5-oxazolone
2-phenyl-4-[3,5-dinitro-4-(4'-methylcyclohexyl)benzal]-5-oxazolone
2-phenyl-4-(3,5-dinitro-4-cyclohexylbenzal)-5-oxazolone

EXAMPLE 10

β-(3-chloro-4-cyclohexylphenyl)pyruvic acid

A mixture of 2-phenyl-4-(3-chloro-4-cyclohexylbenzal)-5-oxazolone, 20 g. (0.055 mole) in 500 ml. of 10 percent NaOH solution under nitrogen atmosphere is refluxed for 15 hours. The hot reaction mixture is filtered. To the cold filtrate, 200 ml. of 6N HCl solution is slowly added with stirring. The solid is collected by filtration and air dried at room temperature. The crude product is dissolved in 210 ml. of glacial acetic acid and heated to boil for 10 minutes. The acid mixture is stirred until room temperature is reached and 105 ml. of water is added drop-wise with stirring. The solid is collected by filtration, washed with water and dried at room temperature in vacuum to yield β-(3-chloro-4-cyclohexylphenyl)pyruvic acid.

When the oxazolones of Example 7 are used in the above procedure in place of 2-phenyl-4-(3-chloro-4- cyclohexylbenzal)-5-oxazolone, then the products obtained are those of Table I, Example 8.

EXAMPLE 11

Ethyl β-(3-chloro-4-cyclohexylphenyl)pyruvate

Reaction of β-(3-chloro-4-cyclohexylphenyl)pyruvic acid with absolute ethanol containing a small amount of anhydrous hydrochloric acid results in ethyl β-(3-chloro-4-cyclohexylphenyl)pyruvate.

When β-(3-chloro-4-cyclohexylphenyl)pyruvic acid is replaced by the pyruvic acid compounds of Example 10, then the products prepared are ethyl β-(p-cyclopentylphenyl)pyruvate
ethyl β-[p-(2'-methylcyclopentyl)phenyl]pyruvate
ethyl β-(p-cycloheptylphenyl)pyruvate
ethyl β-[p-(2'-methylcycloheptyl)phenyl]pyruvate
ethyl β-[p-(2'-methylcyclohexyl)phenyl]pyruvate
ethyl β-[p-(3'-methylcyclohexyl)phenyl]pyruvate
ethyl β-[p-(4'-methylcyclohexyl)phenyl]pyruvate
ethyl β-(3-chloro-4-cyclopentylphenyl)pyruvate
ethyl β-[3-chloro-4-(2'-methylcyclopentyl)phenyl]pyruvate
ethyl β-(p-cyclohexylphenyl)pyruvate
ethyl β-(3,5-dichloro-4-cyclohexylphenyl)pyruvate
ethyl β-(3-chloro-4-cycloheptylphenyl)pyruvate
ethyl β-[3-chloro-4-(2'-methylcycloheptyl)phenyl]pyruvate
ethyl β-[3-chloro-4-(2'-methylcyclohexyl)phenyl]pyruvate
ethyl β-[3-chloro-4-(3'-methylcyclohexyl)phenyl]pyruvate
ethyl β-[3-chloro-4-(4'-methylcyclohexyl)phenyl]pyruvate
ethyl β-(3,5-dichloro-4-cyclopentylphenyl)pyruvate
ethyl β-[3,5-dichloro-4-(2'-methylcyclopentyl)phenyl]pyruvate
ethyl β-(3,5-dichloro-4-cycloheptylphenyl)pyruvate
ethyl β-[3,5-dichloro-4-(2'-methylcycloheptyl)phenyl]pyruvate
ethyl β-[3,5-dichloro-4-(2'-methylcyclohexyl)phenyl]pyruvate
ethyl β-[3,5-dichloro-4-(3'-methylcyclohexyl)phenyl]pyruvate ethyl β-[3,5-dichloro-4-(4'-methylcyclohexyl)phenyl]pyruvate
ethyl β-[3-bromo-4-cyclopentylphenyl)pyruvate
ethyl β-[3-bromo-4-(2'-methylcyclopentyl)phenyl]pyruvate
ethyl β-(3-bromo-4-cycloheptylphenyl)pyruvate
ethyl β-[3-bromo-4-(2'-methylcycloheptyl)phenyl]pyruvate
ethyl β-(3-bromo-4-cyclohexylphenyl)pyruvate
ethyl β-[3-bromo-4-(2'-cyclohexyl)phenyl]pyruvate
ethyl β-[bromo-4-(3'-cyclohexyl)phenyl]pyruvate
ethyl β-[3-bromo-4-(4'-cyclohexyl)phenyl]pyruvate
ethyl β-(3,5-dibromo-4-cyclopentylphenyl)pyruvate
ethyl β-[3,5-dibromo-4-(2'-methylcyclopentyl)phenyl]pyruvate
ethyl β-(3,5-dibromo-4-cycloheptylphenyl)pyruvate
ethyl β-[3,5-dibromo-4-(2'-methylcycloheptyl)phenyl]pyruvate
ethyl β-(3,5-dibromo-4-cyclohexylphenyl)pyruvate
ethyl β-[3,5-dibromo-4-(2'-methylcyclophexyl)phenyl]pyruvate
ethyl β-[3,5-dibromo-4-(3'-methylcyclohexyl)phenyl]pyruvate
ethyl β-[3,5-dibromo-4-(4'-methylcyclohexyl)phenyl]pyruvate
ethyl β-(3-nitro-4-cyclopentylphenyl)pyruvate
ethyl β-[3-nitro-4-(2'-methylcyclopentyl)phenyl]pyruvate
ethyl β-(3-nitro-4-cyclohexylphenyl)pyruvate
ethyl β-(3-nitro-4-cycloheptylphenyl)pyruvate
ethyl β-[3,5-nitro-4-(2'-methylcycloheptyl)phenyl]pyruvate
ethyl β-[3-nitro-4-(2'-methylcyclohexyl)phenyl]pyruvate
ethyl β-[3-nitro-4-(3'-methylcyclohexyl)phenyl]pyruvate
ethyl β-[3-nitro-4-(4'-methylcyclohexyl)phenyl]pyruvate
ethyl β-(3-chloro-5-nitro-4-cyclopentylphenyl)pyruvate
ethyl β-[3-chloro-5-nitro-4-(2'-methylcyclopentyl)phenyl)pyruvate
ethyl β-(3-chloro-5-nitro-4-cycloheptylphenyl)pyruvate
ethyl β-[3-chloro-5-nitro-4-(2'-methylcycloheptyl)phenyl]pyruvate
ethyl β-[3-chloro-5-nitro-4-(2'-methylcyclohexyl)phenyl]pyruvate
ethyl β-3-[3-chloro-5-nitro-4-(3'-methylcyclohexyl)phenyl]pyruvate
ethyl β-[3-chloro-5-nitro-4-(4'-methylcyclohexyl)phenyl]pyruvate
ethyl β-(3-chloro-5-nitro-4-cyclohexylphenyl)pyruvate
ethyl β-(3-bromo-5-nitro-4-cyclopentylphenyl)pyruvate
ethyl β-[3-bromo-5-nitro-4-(2'-methylcyclopentyl)phenyl]pyruvate
ethyl β-(3-bromo-5-nitro-4-cycloheptylphenyl)pyruvate
ethyl β-[3-bromo-5-nitro-4-(2'-methylcycloheptyl)phenyl]pyruvate
ethyl β-(3-bromo-5-nitro-4-cyclohexylphenyl)pyruvate
ethyl β-[3-bromo-5-nitro-4-(2'-methylcyclohexyl)phenyl]pyruvate
ethyl β-[3-bromo-5-nitro-4-(3'-methylcyclohexyl)phenyl]pyruvate
ethyl β-[3-bromo-5-nitro-4-(4'-methylcyclohexyl)phenyl)pyruvate
ethyl β-(3,5-dinitro-4-cyclopentylphenyl)pyruvate
ethyl β-[3,5-dinitro-4-(2'-methylcyclopentyl)phenyl]pyruvate
ethyl β-(3,5-dinitro-4-cycloheptylphenyl)pyruvate
ethyl β-[3,5-dinitro-4-(2'-methylcycloheptyl)phenyl]pyruvate
ethyl β-[3,5-dinitro-4-(2'-methylcyclohexyl)phenyl]pyruvate
ethyl β-[3,5-dinitro-4-(3'-methylcyclohexyl)phenyl]pyruvate
ethyl β-[3,5-dinitro-4-(4'-methylcyclohexyl)phenyl]pyruvate
ethyl β-(3,5-dinitro-4-cyclohexylphenyl)pyruvate

EXAMPLE 12

Ethyl α-methyl-β-(3-chloro-4-cyclohexylphenyl)lactate

A solution of methylmagnesium iodide is prepared from 6.7 g. (0.047 mole) of methyl iodide, 1.24 g. (0.051 g-atom) of magnesium turnings and 40 ml. of anhydrous ether. This solution is added over a period of 1 hour to a solution of (0.05 mole) of ethyl β-(3- chloro-4-cyclohexylphenyl)-pyruvate. The addition is carried out with vigorous stirring at 0°–5°C. The mixture is then allowed to warm to room temperature over 10 hours. The mixture is poured into an ice-cold solution of 0.2 M-sulfuric acid. The ether layer is separated, extracted with 1 percent sulfuric acid, dried over magnesium sulfate, filtered and evaporated to obtain ethyl α-methyl-β-(3-chloro-4-cyclohexylphenyl)lactate.

When ethyl β-(3-chloro-4-cyclohexylphenyl)pyruvate in the above example is replaced by the pyruvates of Example 11, then the corresponding products are prepared.

ethyl α-methyl-β-(p-cyclopentylphenyl)lactate
ethyl α-methyl-β-[p-(2'-methylcyclopentyl)phenyl]lactate
ethyl α-methyl-β-(p-cycloheptylphenyl)lactate
ethyl α-methyl-β-[p-(2'-methylcycloheptyl)phenyl]lactate
ethyl α-methyl-β-[p-(2'-methylcyclohexyl)phenyl]lactate
ethyl α-methyl-β-[p-(3'-methylcyclohexyl)phenyl]lactate
ethyl α-methyl-β-[p-(4'-methylcyclohexyl)phenyl]lactate
ethyl α-methyl-β-(3-chloro-4-cyclopentylphenyl)lactate
ethyl α-methyl-β-[3-chloro-4(2'-methylcyclopentyl)phenyl]lactate
ethyl α-methyl-β-(p-cyclohexylphenyl)lactate
ethyl α-methyl-β-(3,5-dichloro-4-cyclohexylphenyl)lactate
ethyl α-methyl-β-(3-chloro-4-cycloheptylphenyl)lactate
ethyl α-methyl-β-[3-chloro-4-(2'-methylcycloheptyl)phenyl]lactate
ethyl α-methyl-β-[3-chloro-4-(2'-methylcyclohexyl)phenyl]lactate
ethyl α-methyl-β-[3-chloro-4-(3'-methylcyclohexyl)phenyl]lactate
ethyl α-methyl-β-[3-chloro-4-(4'-methylcyclohexyl)phenyl]lactate
ethyl α-methyl-β-(3,5-dichloro-4-cyclopentylphenyl)lactate
ethyl α-methyl-β-[3,5-dichloro-4-(2'-methylcyclopentyl)phenyl]lactate
ethyl α-methyl-β-[3,5-dichloro-4-cycloheptylphenyl)lactate
ethyl α-methyl-β-[3,5-dichloro-4-(2'-methylcycloheptyl)phenyl]lactate
ethyl α-methyl-β-[3,5-dichloro-4-(2'-methylcyclohexyl)phenyl]lactate
ethyl α-methyl-β-[3,5-dichloro-4-(3'-methylcyclohexyl)phenyl]lactate
ethyl α-methyl-β-[3,5-dichloro-4-(4'-methylcyclohexyl)phenyl]lactate
ethyl α-methyl-β-(3-bromo-4-cyclopentylphenyl)lactate
ethyl α-methyl-β-[3-bromo-4-(2'-methylcyclopentyl)phenyl]lactate
ethyl α-methyl-β-(3-bromo-4-cycloheptylphenyl)lactate
ethyl α-methyl-β-[3-bromo-4-(2'-methylcycloheptyl)phenyl]lactate
ethyl α-methyl-β-(3-bromo-4-cyclohexylphenyl)lactate
ethyl α-methyl-β-[3-bromo-4-(2'-cyclohexyl)phenyl]lactate
ethyl α-methyl-β-[3-bromo-4-(3'-cyclohexyl)phenyl]lactate
ethyl α-methyl-β-[3-bromo-4-(4'-cyclohexyl)phenyl]lactate
ethyl α-methyl-β-(3,5-dibromo-4-cyclopehtyl-phenyl)lactate
ethyl α-methyl-β-[3,5-dibromo-4-(2'-methylcyclopentyl)phenyl]lactate
ethyl α-methyl-β-(3,5-dibromo-4-cycloheptyl-phenyl)lactate
ethyl α-methyl-β-[3,5-dibromo-4-(2'-methylcycloheptyl)phenyl]lactate
ethyl α-methyl-β-(3,5-dibromo-4-cyclohexylphenyl)-lactate
ethyl α-methyl-β-[3,5-dibromo-4-(2'-methylcyclohexyl)phenyl]lactate
ethyl α-methyl-β-[3,5-dibromo-4-(3'-methylcyclohexyl)phenyl]lactate
ethyl α-methyl-β-[3,5-dibromo-4-(4'-methylcyclohexyl)phenyl]lactate
ethyl α-methyl-β-(3-nitro-4-cyclopentylphenyl)lactate
ethyl α-methyl-β-[3-nitro-4-(2'-methylcyclopentyl)phenyl]lactate
ethyl α-methyl-β-(3-nitro-4-cyclohexylphenyl)lactate
ethyl α-methyl-β-(3-nitro-4-cycloheptylphenyl)lactate
ethyl α-methyl-β-[3-nitro-4-(2'-methylcycloheptyl)phenyl)lactate
ethyl α-methyl-β-[3-nitro-4-(2'-methylcyclohexyl)phenyl]lactate
ethyl α-methyl-β-[3-nitro-4-(3'-methylcyclohexyl)phenyl]lactate
ethyl α-methyl-β-[3-nitro-4-(4'-methylcyclohexyl)phenyl]lactate
ethyl α-methyl-β-(3-chloro-5-nitro-4-cyclopentylphenyl)lactate
ethyl α-methyl-β-[3-chloro-5-nitro-4-(2'-methylcyclopentyl)phenyl]lactate
ethyl α-methyl-β-(3-chloro-5-nitro-4-cycloheptylphenyl)lactate
ethyl α-methyl-β-[3-chloro-5-nitro-4-(2'-methylcycloheptyl)phenyl]lactate
ethyl α-methyl-β-[3-chloro-5-nitro-4-(2'-methylcyclohexyl)phenyl]lactate
ethyl α-methyl-β-[3-chloro-5-nitro-4-(3'-methylcyclohexyl)phenyl]lactate
ethyl α-methyl-β-[3-chloro-5-nitro-4-(4'-methylcyclohexyl)phenyl]lactate
ethyl α-methyl-β-(3-chloro-5-nitro-4-cyclohexylphenyl)lactate
ethyl α-methyl-β-(3-bromo-5-nitro-4-cyclopentylphenyl)lactate
ethyl α-methyl-β-[3-bromo-5-nitro-4-(2'-methylcyclopentyl)phenyl]lactate
ethyl α-methyl-β-(3-bromo-5-nitro-4-cycloheptylphenyl)lactate
ethyl α-methyl-β-[3-bromo-5-nitro-4-(2'-methylcycloheptyl)phenyl]lactate
ethyl α-methyl-β-(3-bromo-5-nitro-4-cyclohexylphenyl)lactate
ethyl α-methyl-β-[3-bromo-5-nitro-4-(2'-methylcyclohexyl)phenyl]lactate
ethyl α-methyl-β-[3-bromo-5-nitro-4-(3'-methylcyclohexyl)phenyl]lactate ethyl α-methyl-β-[3-bromo-5-nitro-4-(4'-methylcyclohexyl)phenyl]lactate
ethyl α-methyl-β-(3,5-dinitro-4-cyclopentylpheneyl)lactate
ethyl α-methyl-β-[3,5-dinitro-4-(2'-methylcyclopentyl)phenyl]lactate
ethyl α-methyl-β-(3,5-dinitro-4-cycloheptylphenyl)lactate
ethyl α-methyl-β-[3,5-dinitro-4-(2'-methylcycloheptyl)phenyl]lactate
ethyl α-methyl-β-[3,5-dinitro-4-(2'-methylcyclohexyl)phenyl]lactate
ethyl α-methyl-β-[3,5-dinitro-4-(3'-methylcyclohexyl)phenyl]lactate
ethyl α-methyl-β-[3,5-dinitro-4-(4'-methylcyclohexyl)phenyl]lactate
ethyl α-methyl-β-(3,5-dinitro-4-cyclohexylphenyl)lactate When the Grignard reagent used is ethylmagnesium iodide, propylmagnesium iodide or butylmagnesium iodide, then the product prepared is
ethyl α-ethyl-β-(3-chloro-4-cyclohexylphenyl)lactate
ethyl α-propyl-β-(3-chloro-4-cyclohexylphenyl)lactate
ethyl α-butyl-β-(3-chloro-4-cyclohexylphenyl)lactate

EXAMPLE 13

β-(3-chloro-4-cyclohexylphenyl)lactic acid

To a suspension of β-(3-chloro-4-cyclohexylphenyl)pyruvic acid 8.64 g. (0.031 mole) in 300 ml. of 90 percent ethanol is addded 1 ml. of 0.1M ferrous sulfate solution followed by 0.5 g. of platinum oxide catalyst. The mixture is shaken with hydrogen for 3½ hours. The catalyst is filtered off. The dark yellow filtrate is distilled under reduced pressure to yield β-(3-chloro-4-cyclohexylphenyl)lactic acid.

When β-(3-chloro-4-cyclohexylphenyl)pyruvic acid is replaced in the above procedure by the pyruvic acids of Example 8, then the products prepared are
β-(p-cyclopentylphenyl)lactic acid
β-[p-(2'-methylcyclopentyl)phenyl]lactic acid
β-(p-cycloheptylphenyl)lactic acid
β-[p-(2'-methylcycloheptyl)phenyl]lactic acid
β-[p-(2'-methylcyclohexyl)phenyl]lactic acid
β-[p-(3'-methylcyclohexyl)phenyl]lactic acid
β-[p-(4'-methylcyclohexyl)phenyl]lactic acid
β-(3-chloro-4-cyclopentylphenyl)lactic acid
β-[3-chloro-4-(2'-methylcyclopentyl)phenyl]lactic acid
β-(p-cyclohexylphenyl)lactic acid
β-(3,5-dichloro-4-cyclohexylphenyl)lactic acid
β-(3-chloro-4-cycloheptylphenyl)lactic acid
β-[3-chloro-4-(2'-methylcycloheptyl)phenyl]lactic acid
β-[3-chloro-4-(2'-methylcyclohexyl)phenyl]lactic acid
β-[3-chloro-4-(3'-methylcyclohexyl)phenyl]lactic acid
β-[3-chloro-4-(4'-methylcyclohexyl)phenyl]lactic acid
β-(3,5-dichloro-4-cyclopentylphenyl)lactic acid
β-[3,5-dichloro-4-(2'-methylcyclopentyl)phenyl]lactic acid
β-(3,5-dichloro-4-cycloheptylphenyl)lactic acid
β-[3,5-dichloro-4-(2'-methylcycloheptyl)phenyl]lactic acid
β-[3,5-dichloro-4-(2'-methylcyclohexyl)phenyl]lactic acid
β-[3,5-dichloro-4-(3'-methylcyclohexyl)phenyl]lactic acid
β-[3,5-dichloro-4-(4'-methylcyclohexyl)phenyl]lactic acid
β-(3-bromo-4-cyclopentylphenyl)lactic acid
β-[3-bromo-4-(2'-methylcyclopentyl)phenyl]lactic acid
β-(3-bromo-4-cycloheptylphenyl)lactic acid
β-[3-bromo-4-(2'-methylcycloheptyl)phenyl]lactic acid
β-(3-bromo-4-cyclohexylphenyl)lactic acid
β-[3-bromo-4-(2'-cyclohexyl)phenyl]lactic acid
β-[3-bromo-4-(3'-cyclohexyl)phenyl]lactic acid
β-[3-bromo-4-(4'-cyclohexyl)phenyl]lactic acid
β-(3,5-dibromo-4-cyclopentylphenyl)lactic acid
β-[3,5-dibromo-4-(2'-methylcyclopentyl)phenyl]lactic acid
β-(3,5-dibromo-4-cycloheptylphenyl)lactic acid
β-[3,5-dibromo-4-(2'-methylcycloheptyl)phenyl]lactic acid
β-(3,5-dibromo-4-cyclohexylphenyl)lactic acid
β-[3,5-dibromo-4-(2'-methylcyclohexyl)phenyl]lactic acid
β-[3,5-dibromo-4-(3'-methylcyclohexyl)phenyl]lactic acid
β-[3,5-dibromo-4-(4'-methylcyclohexyl)phenyl]lactic acid When the pyruvate esters are used in the above procedures the corresponding products are prepared.
ethyl β-(p-cyclopentylphenyl)lactate
ethyl β-[p-(2'-methylcyclopentyl)phenyl]lactate
ethyl β-(p-cycloheptylphenyl)lactate
ethyl β-[p-(2'-methylcycloheptyl)phenyl]lactate
ethyl β-[p-(2'-methylcyclohexyl)phenyl]lactate
ethyl β-[p-(3'-methylcyclohexyl)phenyl]lactate
ethyl β-[p-(4'-methylcyclohexyl)phenyl]lactate
ethyl β-(3-chloro-4-cyclopentylphenyl)lactate
ethyl β-[3-chloro-4-(2'-methylcyclopentyl)phenyl]lactate
ethyl β-(p-cyclohexylphenyl)lactate
ethyl β-(3,5-dichloro-4-cyclohexylphenyl)lactate
ethyl β-(3-chloro-4-cyclohexylphenyl)lactate
ethyl β-[3-chloro-4-(2'-methylcycloheptyl)phenyl]lactate
ethyl β-[3-chloro-4-(2'-methylcyclohexyl)phenyl]lactate
ethyl β-[3-chloro-4-(3'-methylcyclohexyl)phenyl]lactate
ethyl β-[3-choro-4-(4'-methylcyclohexyl)phenyl]lactate
ethyl β-(3,5-dichloro-4-cyclopentylphenyl)lactate
ethyl β-[3,5-dichloro-4-(2'-methylcyclopentyl)phenyl]lactate
ethyl β-(3,5-dichloro-4-cycloheptylphenyl)lactate
ethyl β-[3,5-dichloro-4-(2'-methylcycloheptyl)phenyl]lactate
ethyl β-[3,5-dichloro-4-(2'-methylcyclohexyl)phenyl]lactate
ethyl β-[3,5-dichloro-4-(3'-methylcyclohexyl)phenyl]lactate
ethyl β-[3,5-dichloro-4-(4'-methylcyclohexyl)phenyl]lactate
ethyl β-(3-bromo-4-cyclopentylphenyl)lactate ethyl β-[3-bromo-4-(2'-methylcyclopentyl)phenyl]lactate
ethyl β-(3-bromo-4-cycloheptylphenyl)lactate
ethyl β-[3-bromo-4-(2'-methylcycloheptyl)phenyl]lactate
ethyl β-(3-bromo-4-cyclohexylphenyl)lactate
ethyl β-[3-bromo-4-(2'-cyclohexyl)phenyl]lactate
ethyl β-[3-bromo-4-(3'-cyclohexyl)phenyl]lactate
ethyl β-[3-bromo-4-(4'-cyclohexyl)phenyl]lactate
ethyl β-(3,5-dibromo-4-cyclopentylphenyl)lactate
ethyl β-[3,5-dibromo-4-(2'-methylcyclopentyl)phenyl]lactate
ethyl β-(3,5-dibromo-4-cycloheptylphenyl)lactate
ethyl β-[3,5-dibromo-4-(2'-methylcycloheptyl)phenyl]lactate
ethyl β-(3,5-dibromo-4-cyclohexylphenyl)lactate
ethyl β-[3,5-dibromo-4-(2'-methylcyclohexyl)phenyl]lactate
ethyl β-[3,5-dibromo-4-(3'-methylcyclohexyl)phenyl]lactate
ethyl β-[3,5-dibromo-4-(4'-methylcyclohexyl)phenyl]lactate

EXAMPLE 14

Ethyl β-(3-nitro-4-cycloxylphenyl)lactate

A sodium borohydride solution (1.142 g., 0.302 mole in 13 ml. of water containing 1 drop of 10 N sodium hydroxide) is added dropwise to a stirred solution of 18.4 g. (0.059 mole) of ethyl β-(3-nitro-4-cyclohexylphenyl)pyruvate, methanol (50 ml.) and water(5 ml.) cooled in an ice-water mixture. The solution is partially neutralized with urea-active acid solution (15 ml. each of acetic acid and urea 0.041 mole). The pH after the addition is near neutral. The pH then is adjusted to acidic by addition of 18 N sulfuric acid (2.8 ml.). The product is extracted with ether, washed with 2 × 25 ml. of saturated sodium bisulfite and then dried over anhydrous sodium sulfite for 2 hours. The drying agent is removed and the solvent is then removed to obtain ethyl β-(3-nitro-4-cyclohexylphenyl)lactate.

When the above procedure is followed using the nitro compounds of this invention then the corresponding products are prepared.

ethyl β-(3-nitro-4-cyclopentylphenyl)lactate
ethyl β-[3-nitro-4-(2'-methylcyclopentyl)phenyl]lactate
ethyl β-(3-nitro-4-cycloxylphenyl)lactate
ethyl β-(3-nitro-4-cycloheptylphenyl)lactate
ethyl β-[3-nitro-4-(2'-methylcycloheptyl)phenyl]lactate
ethyl β-[3-nitro-4-(2'-methylcyclohexyl)phenyl]lactate
ethyl β-[3-nitro-4-(3'-methylcyclohexyl)phenyl]lactate
ethyl β-[3-nitro-4-(4'-methylcyclohexyl)phenyl]lactate
ethyl β-(3-chloro-5-nitro-4-cyclopentylphenyl)lactate
ethyl β-[3-chloro-5-nitro-4-(2'-methylcyclopentyl)phenyl]lactate
ethyl β-(3-chloro-5-nitro-4-cycloheptylphenyl)lactate
ethyl β-[3-chloro-5-nitro-4-(2-'-methylcycloheptyl)phenyl]lactate
ethyl β-[3-chloro-5-nitro-4-(2'-methylcyclohexyl)phenyl]lactate
ethyl β-[3-chloro-5-nitro-4-(3'-methylcyclohexyl)phenyl]lactate
ethyl β-[3-chloro-5-nitro-4-(4'-methylcyclohexyl)phenyl]lactate
ethyl β-(3-chloro-5-nitro-4-cyclohexylphenyl)lactate
ethyl β-(3-bromo-5-nitro-4-cyclopentylphenyl)lactate
ethyl β-[3-bromo-4-(2'-methylcyclopentyl)phenyl]lactate
ethyl β-(3-bromo-5-nitro-4-cycloheptylphenyl)lactate
ethyl β-[3-bromo-5-nitro-4-(2'-methylcyclohexyl)phenyl]lactate
ethyl β-[3-bromo-5-nitro-4-(3'-methylcyclohexyl)phenyl]lactate
ethyl β-[3-bromo-5-nitro-4-(4'-methylcyclohexyl)phenyl]lactate
ethyl β-(3,5-dinitro-4-cyclopentylphenyl)lactate
ethyl β-[3,5-dinitro-4-(2'-methylcyclopentyl)phenyl]lactate
ethyl β-(3,5-dinitro-4-cycloheptylphenyl)lactate
ethyl β-[3,5-dinitro-4-(2'-methylcycloheptyl)phenyl]lactate
ethyl β-[3,5-dinitro-4-(2'-methylcyclohexyl)phenyl]lactate
ethyl β-[3,5-dinitro-4-(3'-methylcycohexyl)phenyl]lactate
ethyl β-[3,5-dinitro-4-(4'-methylcyclohexyl)phenyl]lactate
ethyl β-(3,5-dinitro-4-cyclohexylphenyl)lactate

EXAMPLE 15

Ethyl β-(3-trifluoromethyl-4-cyclohexylphenyl)lactate

To a solution of 0.01 moles of ethyl β-(3-bromo-4-cyclohexylphenyl)-lactate in 50 ml. of dimethylformamide is added 0.15 moles of trifluoromethyl iodide and 0.02 g. of copper powder. The reaction is shaken in a sealed tube for 5 hours at 140°C, cooled, and then filtered and evaporated in vacuo. 200 ml. of water is added to the residue and extracted with ether. The ether extract is dried, evaporated to dryness and distilled to obtain ethyl β-(3-trifluoromethyl-4-cyclohexylphenyl)lactate.

When ethyl β-(3-bromo-4-cyclohexylphenyl)lactate in the above example is replaced by equimolar amounts of the bromo compounds of this invention, then the corresponding trifluoromethyl product is obtained.

EXAMPLE 16

Ethyl β-(3-amino-4-cyclohexylphenyl)lactate

A mixture of 16.1 g. (0.05 moles) of ethyl β-(3-nitro-4-cyclohexylphenyl)lactate in 100 ml. methanol containing 0.05 mole citric acid and 1.5 g. of 5 percent palladium-on-carbon is shaken with hydrogen at 3 atm. pressure and 27°C until 3 moles of hydrogen are absorbed. The mixture is filtered, washed with methanol and the filtrate concentrated in vacuo to obtain ethyl β-(3-amino-4-cyclohexylphenyl)lactate.

When ethyl β-(3-nitro-4-cyclohexylphenyl)lactate in the above example is replaced by equimolar amounts of the nitro compounds of this invention, then the corresponding products are obtained.

EXAMPLE 17

Ethyl β-(3-methylamino-4-cyclohexylphenyl)lactate

To a solution of 0.01 moles of ethyl β-(3-amino-4- cyclohexylphenyl)-lactate in 100 ml. of pyridine is added 0.1 moles of methyl iodide. The reaction mixture is stirred overnight at room temperature, filtered and concentrated. The residue is distilled to obtain ethyl β-(3-methylamino-4-cyclohexylphenyl)lactate.

When ethyl β-(3-amino-4-cyclohexylphenyl)lactate in the above example is replaced by equimolar amounts of amino compounds of this invention, then the corresponding products are obtained.

When 0.01 moles of acetyl chloride is used in place of methyl iodide in the above example, then the product prepared is ethyl β-(3-acetylamino-4-cyclohexylphenyl)lactate.

EXAMPLE 18

Ethyl β-(3-dimethylamino-4-cyclohexylphenyl)lactate

A solution of 0.005 moles of ethyl β-(3-nitro-4-cyclohexylphenyl)-lactate and 1.6 ml. of 37 percent formaldehyde in 50 ml. of methanol is shaken with hydrogen over 0.5 g. of 5 percent palladium-on-charcoal at 42 lbs. and 27°C until five moles of hydrogen are absorbed. The catalyst is filtered off and the filtrate is evaporated in vacuo. The residue is then distilled to obtain ethyl β-(3-dimethylamino-4-cyclohexylphenyl)lactate.

When ethyl β-(3-nitro-4-cyclohexylphenyl)lactate in the above example is replaced by equimolar amounts of the nitro compounds of this invention, then the corresponding products are obtained.

EXAMPLE 19

Ethyl β-(3-cyano-4-cyclohexylphenyl)lactate

To 29.1 g. (0.1 moles) of ethyl β-(3-amino-4-cyclohexylphenyl)-lactate in 35 ml. of 28 percent hydrochloric acid and 100 ml. of cracked ice to maintain the temperature at 0°C is added a solution of 7.1 g. (0.102 moles) of sodium nitrite in 20 ml. of water. The reaction mixture is then neutralized with sodium carbonate. This diazonium mixture is added to a cuprous cyanide solution (prepared from 31.5 g. of copper sulfate and 16.2 g. of soduim cyanide in 75 ml. of water). 250 ml. of toluene is also added and the mixture is stirred for ½ hour. The reaction is then allowed to stir an additional 2 hours while warming gradually to 50°C. This is then cooled and the toluene separated, dried over sodium sulfate and evaporated to dryness to obtain ethyl β-(3-cyano-4-cyclohexylphenyl)lactate.

When ethyl β-(3-amino-4-cyclohexylphenyl)actate in the above example is replaced by equimolar amounts of the amiano compounds of this invention, then the corresponding products are obtained.

EXAMPLE 20

Ethyl β-(3-fluoro-4-cyclohexylphenyl)lactate

To 43.7 g. (0.15 moles) of ethyl β-(3-amino-4-cyclohexylphenyl)lactate is added at 0°C 44 ml. of 1.5 moles of concentrated hydrochloric acid. The reaction mixture is maintained at 0°C and the diazonium salt is prepared with 23.2 g. (0.32 moles) of 95 percent sodium nitrite in 80 ml. of water. To this mixture is rapidly added a solution of 10.4 g. (0.17 moles) of boric acid dissolved in 22 g. (0.66 moles) of 60 percent hydrofluoric acid. The reaction mixture is then stirred for ½ hour and filtered, washed with 3 × 25 ml. of water, 2 × 25 ml. of methanol and 25 ml. of ether. The residual cake is then treated in vacuo. The treated cake is then placed in a distilling flask and heated to permit spontaneous decomposition. After the decomposition, the residue is then fractionally distilled to obtain ethyl β-(3-fluoro-4-cyclohexylphenyl)lactate.

When ethyl β-(3-amino-4-cyclohexylphenyl)lactate in the above example is replaced by the amino compounds of this invention, then the corresponding products are obtained.

EXAMPLE 21

β-(3-Hydroxy-4-cyclohexylphenyl)lactic acid

To 4.5 g. of ethyl β-(3-amino-4-cyclohexylphenyl)-lactate suspension in 125 ml. of 80 percent hydrochloric acid and cooled to 0°C is added dropwise a solution of 1.2 g. of sodium nitrite in 15 ml. of water. After about 10 min., 200 ml. of 50 percent hydrochloric acid is added portion wise and stirred for 15 hours. The reaction mixture is then poured onto ice water and extracted with chloroform, dried over sodium sulfate and concentrated in vacuo. The residue is crystallized to obtain β-(3-hydroxy-4-cyclohexylphenyl)lactic acid.

The ethyl ester of the product is formed by reaction with absolute ethanol containing a small amount of anhydrous hydrochloric acid.

When ethyl β-(3-amino-4-cyclohexylphenyl)lactate in the above example is replaced by equimolar amounts of the amino compounds of this invention, then the corresponding products are obtained.

EXAMPLE 22

Ethyl β-(3-methoxy-4-cyclohexylphenyl)lactate

To a stirred suspension of 0.01 moles of sodium hydride in 25 ml. of dry dimethylformamide which has been cooled to 0°C is added dropwise a solution of 0.01 moles of ethyl β-(3-hydroxy-4-cyclohexylphenyl)lactate in 10 ml. of dimethylformamide. The reaction mixture is stirred for 15 minutes and 0.015 moles of methyliodide is then added dropwise. The mixture is allowed to stir overnight at room temperature. 200 ml. of water is added and the resulting mixture is extracted well with ether. The ether extract is washed with water, dried over sodium sulfate, evaporated to dryness and distilled to obtain ethyl β-(3-methoxy-4-cyclohexylphenyl)lactate.

When ethyl β-(3-hydroxy-4-cyclohexylphenyl)lactate in the above example is replaced by equimolar amounts of the hydroxy compounds of this invention, then the corresponding products are obtained.

When 0.01 moles of acetyl chloride is used in place of methyliodide in the above reaction, then the product prepared is ethyl β-(3-acetyloxy-4-cyclohexylphenyl)-lactate.

EXAMPLE 23

β-(3-Bromo-4-cyclohexylphenyl)lactic acid

To 11.5 g. (0.044 moles) of ethyl β-(3-amino-4-cyclohexylphenyl)-lactate suspension in 225 ml. of 40 percent hydrobromic acid and cooled to 0°C is added dropwise a solution of 2.34 g. of sodium nitrite in 30 ml. of water. To this mixture is added a solution of 20 g. of cuprous bromide in 350 ml. of 40 percent hydrobromic acid added portion wise and stirred for 15 hours. The reaction mixture is then poured onto ice water, extracted with chloroform, dried over sodium sulfate and concentrated in vacuo. The residue is then crystallized to obtain β-(3-bromo-4-cyclohexylphenyl)-lactic acid.

The ethyl ester of the product is formed by reaction with absolute ethanol containing a small amount of anhydrous hydrochloric acid.

When ethyl β-(3-amino-4-cyclohexylphenyl)lactate in the above example is replaced by the amino compounds of this invention, then the corresponding products are obtained.

EXAMPLE 24

β-(3-Iodo-4-cyclohexylphenyl)lactic acid

To .05 moles of ethyl β-(3-amino-4-cyclohexylphenyl)lactate dissolved in a mixture of 50 g. of ice water and .06 moles of concentrated sulfuric acid at 0°C is added a solution of 0.05 moles of 95 percent sodium nitrite in 8 ml. of water. Stirring is continued for ½ hour and then 1.5 ml. of concentrated sulfuric acid is added. This solution is poured into an ice cold solution of .06 moles of potassium iodide in 10 ml. of water. To this is added 0.075 g. copper bronze with stirring and the solution is warmed slowly on a water bath to about 80°C for 2 hours. After cooling to room temperature the reaction mixture is extracted thrice with 15 ml. portions of chloroform. This is then washed with dilute thiosulfate solution, water, dried over sodium sulfate and evaporated in vacuo. The residue is crystallized to obtain β-(3-iodo-4-cyclohexylphenyl)lactic acid.

The ethyl ester of the product is formed by reaction with absolute ethanol containing a small amount of anhydrous hydrochloric acid.

When ethyl β-(3-amino-4-cyclohexylphenyl)lactate in the above example is replaced by equimolar amounts of the amino compounds of this invention, then the corresponding products are obtained.

EXAMPLE 25

β-(3-Mercapto-4-cyclohexylphenyl)lactic acid

To 17.3 g. of ethyl β-(3-amino-4-cyclohexylphenyl)-lactate in 11.1 ml. of concentrated hydrochloric acid and 20 g. of ice is added 4.1 g. of sodium nitrite in 2 ml. of water. This mixture is stirred for 10 min. and then added gradually to an ice cold solution of 10.3 g. of potassium ethyl xanthate in 14 ml. of water. The reaction is gradually heated over 45 minutes to 50°C and stirred an additional 45 minutes. The mixture is then cooled, extracted with ether which is then washed with water, dilute sodium hydroxide and water, dried over sodium sulfate and evaporated in vacuo. The residue is dissolved in 35 ml. of boiling ethanol to which is added gradually 13 g. of potassium hydroxide. The reaction is refluxed an additional hour and then evaporated to dryness in vacuo. The residue is dissolved in water and extracted with ether. The alkaline phase is acidified with 6N sulfuric acid and extracted with ether. The ether is washed with water, dried over sodium sulfate and evaporated to dryness to obtain β-(3-mercapto-4-cyclohexylphenyl)lactic acid.

The ethyl ester of the product is formed by reaction with absolute ethanol containing a small amount of anhydrous hydrochloric acid.

When ethyl β-(3-amino-4-cyclohexylphenyl)lactate in the above example is replaced by equimolar amounts of the amino compounds of this invention, then the corresponding products are prepared.

EXAMPLE 26

Ethyl β-(3-methylthio-4-cyclohexylphenyl)lactate

To 3.85 g. of ethyl β-(3-mercapto-4-cyclohexylphenyl)lactate in 40 ml. of water containing 0.65 g. of sodium hydroxide is added 2 ml. of dimethyl sulfate with stirring. The reaction mixture is gradually warmed to 40°C and stirred for 2 hours. The mixture is cooled and extracted with ether which is washed with water, dried and evaporated in vacuo. The residue is distilled to obtain ethyl β-(3-methylthio-4-cyclohexylphenyl)-lactate.

When the above β-(3-methylthio-4-cyclohexylphenyl)lactate is treated with 30 percent H₂O₂, then the resultant product is ethyl β-(3-methylsulfinyl-4-cyclohexylphenyl)lactate or ethyl β-(3-methylsulfonyl-4-cyclohexylphenyl)lactate.

When ethyl β-(3-mercapto-4-cyclohexylphenyl)lactate in the above example is replaced by the mercapto compounds of this invention, then the corresponding products are prepared.

When an equimolar amount of acetyl chloride is used in place of dimethyl sulfate in the above reaction, then the product prepared is ethyl β-(3-acetylthio-4-cyclohexylphenyl)lactate.

EXAMPLE 27

Ethyl β-(3-nitro-5-trifluoromethyl-4-cyclohexylphenyl)lactate

To a solution of 0.01 moles of ethyl β-(3-bromo-5-nitro-4-cyclohexylphenyl)lactate in 50 ml. of dimethylformamide is added 0.15 moles of trifluoromethyl iodide and 0.02 g. of copper powder. The reaction is shaken in a sealed tube for 5 hours at 140°C, cooled, filtered and evaporated in vacuo. 200 ml. of water is added to the residue and extracted with ether. The ether extract is dried, evaporated to dryness and distilled to obtain ethyl β-(3-nitro-5-trifluoromethyl-4-cyclohexylphenyl)lactate.

When ethyl β-(3-bromo-5-nitro-4-cyclohexylphenyl)lactate in the above reaction is replaced by ethyl β-(3-bromo-5-fluoro-4-cyclohexylphenyl)-lactate or ethyl β-(3-bromo-5-chloro-4-cyclohexylphenyl)lactate, then the products obtained are ethyl β-(3-fluoro-5-trifluoromethyl-4-cyclohexylphenyl)lactate and ethyl β-(3-chloro-5-trifluoromethyl-4-cyclohexylphenyl)-lactate.

EXAMPLE 28

Ethyl β-(3-amino-5-nitro-4-cyclohexylphenyl)lactate

A mixture of 17.6 g. (0.05 moles) of ethyl β-(3,5-dinitro-4-cyclohexylphenyl)lactate in 100 ml. of methanol containing 0.05 moles of citric acid and 1.5 g. of 5 percent palladium-on-carbon is shaken with hydrogen at 3 atm. pressure and 27°C until 3 moles of hydrogen are absorbed. The mixture is filtered, washed with methanol and the filtrate concentrated in vacuo to obtain ethyl β-(3-amino-5-nitro-4-cyclohexylphenyl)lactate isolated as the citrate salt.

When ethyl β-(3,5-dinitro-4-cyclohexylphenyl)lactate in the above example is replaced by ethyl β-(3-chloro-5-nitro-4-cyclohexylphenyl)lactate, ethyl β-(3-bromo-5-nitro-4-cyclohexylphenyl)lactate, ethyl β-(3-fluoro-5-nitro-4-cyclohexylphenyl)lactate or ethyl β-(3-trifluoromethyl-5-nitro-4-cyclohexylphenyl)lactate, then the products obtained are ethyl β-(3-amino-5-chloro-4-cyclohexylphenyl)lactate, ethyl β-(3-amino-5-bromo-4-cyclohexylphenyl)lactate, ethyl β-(3-amino-5-fluoro-4-cyclohexylphenyl)lactate and ethyl β-(3-amino-5-trifluoromethyl-4-cyclohexylphenyl)lactate.

EXAMPLE 29

When the procedures of Examples 1–28 are followed using the appropriate starting material, then the corresponding product is obtained.

| STARTING MATERIAL | PRODUCT | EXAMPLE |
|---|---|---|
| ethyl β-(3-amino-5-bromo-4-cyclohexylphenyl)lactate | ethyl β-(3-cyano-5-bromo-4-cyclohexylphenyl)lactate | 19 |
| ethyl β-(3-trifluoromethyl-4-cyclohexylphenyl)lactate | ethyl β-(3-trifluoromethyl-5-chloro-4-cyclohexylphenyl)lactate | 10 |
| ethyl β-(3-amino-5-nitro-4-cyclohexylphenyl)lactate | ethyl β-(3-methylthio-5-nitro-4-cyclohexylphenyl)lactate | 26 |
| ethyl β-(3-amino-5-fluoro-4-cyclohexylphenyl)lactate | ethyl β-(3-iodo-5-fluoro-4-cyclohexylphenyl)lactate | 24 |
| ethyl β-(3-amino-5-chloro-4-cyclohexylphenyl)lactate | ethyl β-(3-methoxy-5-chloro-4-cyclohexylphenyl)lactate | 22 |
| ethyl β-(3-amino-5-trifluoromethyl-4-cyclohexylphenyl)-lactate | ethyl β-(3-hydroxy-5-trifluoromethyl-4-cyclohexylphenyl)-lactate | 21 |
| ethyl β-(3-amino-5-fluoro-4-cyclohexylphenyl)lactate | ethyl β-(3,5-difluoro-4-cyclohexylphenyl)lactate | 20 |
| ethyl β-(3-nitro-5-fluoro-4-cyclohexylphenyl)lactate | ethyl β-(3-dimethylamino-5-fluoro-4-cyclohexylphenyl)lactate | 18 |
| ethyl β-(3-amino-5-chloro-4-cyclohexylphenyl)lactate | ethyl β-(3-methylamino-5-chloro-4-cyclohexylphenyl)lactate | 17 |
| ethyl β-(3-amino-5-nitro-4-cyclohexylphenyl)lactate | ethyl β-(3-mercapto-5-nitro-4-cyclohexylphenyl)lactate | 25 |
| ethyl β-(3-amino-5-nitro-4-cyclohexylphenyl)lactate | ethyl β-(3-methylsulfonyl-5-nitro-4-cyclohexylphenyl)lactate | 25,26 |
| ethyl β-(3-nitro-5-trifluoromethyl-4-cyclohexylphenyl)-lactate | ethyl β-(3-amino-5-trifluoromethyl-4-cyclohexylphenyl)-lactate | 16 |
| ethyl 62-(3-amino-5-trifluoromethyl-4-cyclohexyl)phenyl)-lactate | ethyl β-(3-trifluoromethyl-5-methylsulfonyl-4-cyclohexylphenyl)-lactate | 25,26 |
| ethyl β-(3-amino-5-trifluoromethyl-4-cyclohexylphenyl)-lactate | ethyl β-(3-fluoro-5-trifluoromethyl-4-cyclohexylphenyl)-lactate | 20 |
| ethyl β-(3,5-diamino-4-cyclohexylphenyl)lactate | ethyl β-(3,5-diiodo-4-cyclohexylphenyl)lactate | 24 |
| ethyl β-(3-amino-5-nitro-4-cyclohexylphenyl)lactate | ethyl β-(3-carbamyl-5-nitro-4-cyclohexylphenyl)lactate | 19 |
| ethyl β-(3-amino-5-nitro-4-cyclohexylphenyl)lactate | ethyl β-(3-carbethoxy-5-nitro-4-cyclohexylphenyl)lactate | 19 |
| ethyl β-(3-amino-5-nitro-4-cyclohexylphenyl)lactate | ethyl β-(3-carboxy-5-nitro-4-cyclohexylphenyl)lactate | 19 |
| ethyl β-(3-mercapto-5-nitro-4-cyclohexylphenyl)lactate | ethyl β-(3-methylsulfinyl-5-nitro-4-cyclohexylphenyl)lactate | 26 |
| ethyl β-(3-amino-5-bromo-4-cyclohexhenyl)lactate | ethyl β-(3-methylsulfonyl-5-bromo-4-cyclohexylphenyl)lactate | 25,26 |
| ethyl β-(3-fluoro-4-cyclohexylphenyl)lactate | ethyl β-(3-nitro-5-fluoro-4-cyclohexylphenyl)lactate | 13 |
| ethyl β-(3-fluoro-4-cyclohexylphenyl)lactate | ethyl β-(3-bromo-5-fluoro-4-cyclohexylphenyl)lactate | 12 |
| ethyl β-(3-methylsulfonyl-4-cyclohexylphenyl)lactate | ethyl β-(3-chloro-5-methylsulfonyl-4-cyclohexylphenyl)lactate | 10 |
| ethyl β-(3-amino-5-nitro-4-cyclohexylphenyl)lactate | ethyl β-(3-cyano-5-nitro-4-cyclohexylphenyl)lactate | 19 |
| ethyl β-(3-amino-5-trifluoromethyl-4-cyclohexylphenyl)-lactate | ethyl β-(3-trifluoromethyl-5-iodo-4-cyclohexylphenyl)lactate | 24 |
| ethyl β-(3-iodo-4-cyclohexylphenyl)lactate | ethyl β-(3-amino-iodo-4-cyclohexylphenyl)lactate | 13,16 |
| ethyl β-(3-fluoro-4-cyclohexylphenyl)lactate | ethyl β-(3-chloro-5-fluoro-4-cyclohexylphenyl)lactate | 10 |
| ethyl β-(3,5-dinitro-4-cyclohexylphenyl)lactate | ethyl β-(3-acetylamino-5-nitro-4-cyclohexylphenyl)lactate | 28,17 |
| ethyl β-(3-amino-5-chloro-4-cyclohexylphenyl)lactate | ethyl β-(3-acetyloxy-5-chloro-4-cyclohexylphenyl)lactate | 21,22 |
| ethyl β-(3-amino-5-nitro-4-cyclohexylphenyl)lactate | ethyl β-(3-acetylthio-5-nitro-4-cyclohexylphenyl)lactate | 25,26 |
| ethyl β-(3-nitro-5-bromo-4-cyclohexylphenyl)lactate | ethyl β-(3,5-ditrifluoromethyl-4-cyclohexylphenyl)lactate | 27,16,23,15 |
| ethyl β-[3-fluoro-4-(2'-methylcyclohexyl)phenyl]lactate | ethyl β-[3-nitro-5-fluoro-4-(2'-methylcyclohexyl)phenyl]-lactate | 13 |
| ethyl β-[3-bromo-5-nitro-4-(2'-methylcyclohexyl)phenyl]-lactate | ethyl β-[3-nitro-5-trifluoromethyl-4-(2'-methylcyclohexyl)-phenyl]lactate | 15 |
| ethyl β-[3-fluoro-4-(2'-methylcyclohexyl)phenyl]lactate | ethyl β-[3-chloro-5-fluoro-4-(2'-methylcyclohexyl)phenyl]-lactate | 10 |
| ethyl β-[3-amino-5-fluoro-4-(2'-methylcyclohexyl)-phenyl]-lactate | ethyl β-[3-fluoro-5-bromo-4-(2'-methylcyclohexyl)phenyl]-lactate | 23 |
| ethyl β-[3-cyano-4-(2'-methylcyclohexyl)phenyl]lactate | ethyl β-[3-cyano-5-chloro-4-(2'-methylcyclohexyl)phenyl]-lactate | 10 |
| ethyl β-[3,5-dinitro-4-(2'-methylcyclohexyl)phenyl]lactate | ethyl β-[3-amino-5-nitro-4-(2'-methylcyclohexyl)phenyl]lactate | 28 |
| ethyl β-[3,5-dinitro-4-(3'-methylcyclohexyl)phenyl]lactate | ethyl β-[3-amino-5-nitro-4-(3'-methylcyclohexyl)phenyl]lactate | 28 |
| ethyl β-[3,5-dinitro-4-(4'-methylcyclohexyl)phenyl]lactate | ethyl β-[3-amino-5-nitro-4-(4'-methylcyclohexyl)phenyl]lactate | 28 |
| ethyl β-[3-chloro-5-bromo-4-(4'-methylcyclohexyl)-phenyl]-lactate | ethyl β-[3-chloro-5-trifluoromethyl-4-(4'-methylcyclohexyl)-phenyl]lactate | 15 |
| ethyl β-[3-chloro-4-(4'-methylcyclohexyl)phenyl]lactate | ethyl β-[3-bromo-5-chloro-4-(4'-methylcyclohexyl)phenyl]-lactate | 12 |
| ethyl β-[3-amino-5-trifluoromethyl-4-(4'-methylcyclohexyl)phenyl]lactate | ethyl β-[3-trifluoromethyl-5-fluoro-4-('-methylcyclohexyl)-phenyl]lactate | 20 |
| ethyl β-[p-(4'-methylcyclohexyl)phenyl]lactate | ethyl β-[3,5-dichloro-4-(4'-methylcyclohexyl)phenyl]lactate | 11 |
| ethyl β-[3-chloro-4-(4'-methylcyclohexyl)phenyl]lactate | ethyl β[3-nitro-5-chloro-4-(4'-methylcyclohexyl)phenyl]lactate | 13 |
| ethyl β-[3-chloro-4-(2'-methylcyclohexyl)phenyl]lactate | ethyl β-[3-nitro-5-chloro-4-(2'-methylcyclohexyl)phenyl]lactate | 13 |
| ethyl β-[p-(4'-methylcyclohexyl)phenyl]lactate | ethyl β-[3,5-dinitro-4-(4'-methylcyclohexyl)phenyl]lactate | 14 |
| ethyl β-[3-chloro-4-(4'-methylcyclohexyl)phenyl]lactate | ethyl β-[3,5-dichloro-4-(4'-methylcyclohexyl)phenyl]lactate | 10 |
| ethyl β-(p-cyclohexylphenyl)lactate | ethyl β-(3-methyl-4-cyclohexylphenyl)lactate | 9 |

| STARTING MATERIAL | PRODUCT | EXAMPLE |
|---|---|---|
| ethyl β-(3-methyl-4-cyclohexylphenyl)lactate | ethyl β-(3-chloro-5-methyl-4-cyclohexylphenyl)lactate | 10 |
| ethyl β-(3-methyl-4-cyclohexylphenyl)lactate | ethyl β-(3-nitro-5-methyl-4-cyclohexylphenyl)lactate | 11 |
| ethyl β-(3-methyl-5-nitro-4-cyclohexylphenyl)lactate | ethyl β-(3-amino-5-methyl-4-cyclohexylphenyl)lactate | 16 |
| ethyl β-(3-methyl-4-cyclohexylphenyl)lactate | ethyl β-(3-bromo-5-methyl-4-cyclohexylphenyl)lactate | 12 |
| ethyl β-(3-bromo-5-methyl-4-cyclohexylphenyl)lactate | ethyl β-(3-methyl-5-trifluoromethyl-4-cyclohexylphenyl)lactate | 15 |
| ethyl β-(3-amino-5-methyl-4-cyclohexylphenyl)lactate | ethyl β-(3-fluoro-5-methyl-4-cyclohexylphenyl)lactate | 20 |
| ethyl β-[p-(2'-methylcyclohexyl)phenyl]lactate | ethyl β-(3,2'-dimethyl-4-cyclohexylphenyl)lactate | 9 |
| ethyl β-(3,2'-dimethyl-4-cyclohexylphenyl)lactate | ethyl β-(3,2'-dimethyl-5-nitro-4-cyclohexylphenyl)lactate | 11 |

EXAMPLE 30

Ethyl α-methyl-β-(3-chloro-4-cyclohexylphenyl)lactate

A solution of methylmagnesium iodide is prepared from 6.7 g. (0.047 mole) of methyl iodide, 1.24 g. (0.051 g-atom) of magnesium turnings, and 40 ml. of anhydrous ether. This solution is added over a period of 1 hour to a solution of 15 g. (0.0508 mole) of ethyl β-(3-chloro-4-cyclohexylphenyl)pyruvate. The addition is carried out with vigorous stirring at 0° to 5°C. The red-brown solution is then allowed to stand at room temperature overnight. The mixture is poured into an ice-cold solution of 0.2 M-sulfuric acid. The ether layer is separated, extracted with 3 × 70 ml. of 1 percent sulfuric acid, dried over magnesium sulfate, filtered and evaporated to obtain ethyl α-methyl-β-(3-chloro-4-cyclohexylphenyl)lactate.

EXAMPLE 31

When ethyl β-(3-chloro-4-cyclohexylphenyl)pyruvate is replaced by ethyl β-(3,5-dichloro-4-cyclohexylphenyl)pyruvate, then the product prepared is ethyl α-methyl-β-(3,5-dichloro-4-cyclohexylphenyl)lactate.

EXAMPLE 32

When the procedure of Examples 30–31 is followed but the Grignard reagent used is ethylmagnesium iodide, propylmagnesium iodide or butylmagnesium iodide, then the product prepared is
    ethyl α-ethyl-β-(3-chloro-4-cyclohexylphenyl)lactate
    ethyl α-propyl-β-(3-chloro-4-cyclohexylphenyl)lactate
    ethyl α-butyl-β-(3-chloro-4-cyclohexylphenyl)lactate
    ethyl α-ethyl-β-(3,5-dichloro-4-cyclohexylphenyl)lactate
    ethyl α-propyl-β-(3,5-dichloro-4-cyclohexylphenyl)lactate
    ethyl α-butyl-β-(3,5-dichloro-4-cyclohexylphenyl)lactate

EXAMPLE 33

Ethyl α-methyl-β-(3-nitro-4-cyclohexylphenyl)lactate

A solution of 0.05 moles of methylmagnesium iodide in 50 ml. of anhydrous ether is added over a period of 1 hour to a solution of 0.05 moles of ethyl-β-(3-nitro-4-cyclohexylphenyl)pyruvate at 0°C. The reaction mixture is allowed to stand and warm gradually to room temperature over 10 hours, poured over ice-cold solution of 0.2 M sulfuric acid. The organic layer is separated, extracted with 1 percent sulfuric acid solution, dried over magnesium sulfate and evaporated to obtain ethyl α-methyl-β-(3-nitro-4-cyclohexylphenyl)lactate.

EXAMPLE 34

When ethyl β-(3-chloro-4-cyclohexylphenyl)pyruvate, ethyl β-(3,5-dichloro-4-cyclohexylphenyl)pyruvate or ethyl β-(3-nitro-4-cyclohexylphenyl)-pyruvate in Examples 30 to 33 is replaced by an equimolar amount of the pyruvate esters of this invention, then the corresponding lactate product is prepared. A representative list of the compounds prepared is shown in Table I, below.

TABLE I ethyl α-methyl-β-(3-methoxy-5-chloro-4-cyclohexylphenyl)lactate
ethyl α-methyl-β-(3-methyl-5-chloro-4-cyclohexylphenyl)lactate
ethyl α-methyl-β-(3-bromo-5-chloro-4-cyclohexylphenyl)lactate
ethyl α-methyl-β-(3-methyl-5-fluoro-4-cyclohexylphenyl)lactate
ethyl α-methyl-β-(3-methyl-5-bromo-4-cyclohexylphenyl)lactate
ethyl α-methyl-β-(3-methyl-5-trifluoromethyl-4-cyclohexylphenyl)lactate
ethyl α-methyl-β-(3-acetyl-5-chloro-4-cyclohexylphenyl)lactate
ethyl α-methyl-β-(3-methyl-5-nitro-4-cyclohexylphenyl)lactate
ethyl α-methyl-β-(3,5-difluoro-4-cyclohexylphenyl)lactate
ethyl α-methyl-β-(3-cyano-5-fluoro-4-cyclohexylphenyl)lactate
benzyl α-methyl-β-(3-cyano-5-fluoro-4-cyclohexylphenyl)lactate
ethyl α-methyl-β-(3-bromo-5-fluoro-4-cyclohexylphenyl)lactate
ethyl α-methyl-β-(3-acetyl-5-fluoro-4-cyclohexylphenyl)lactate
ethyl α-methyl-β-(3-cyano-5-bromo-4-cyclohexylphenyl)lactate
benzyl α-methyl-β-(3-cyano-5-bromo-4-cyclohexylphenyl)lactate
ethyl α-methyl-β-(3,5-dibromo-4-cyclohexylphenyl)lactate ethyl α-methyl-β-(3-acetyl-5-bromo-4-cyclohexylphenyl)lactate
ethyl α-methyl-β-(3-fluoro-5-trifluoromethyl-4-cyclohexylphenyl)lactate
ethyl α-methyl-β-(3-cyano-5-trifluoromethyl-4-cyclohexylphenyl)lactate
ethyl α-methyl-β-(3-dimethylamino-5-trifluoromethyl-4-cyclohexylphenyl)lactate
ethyl α-methyl-β-(3-bromo-5-trifluoromethyl-4-cyclohexylphenyl)lactate
ethyl α-methyl-β-(3-hydroxy-5-trifluoromethyl-4-cyclohexylphenyl)lactate
ethyl α-methyl-β-(3-acetyl-5-trifluoromethyl-4-cyclohexylphenyl)lactate
ethyl α-methyl-β-(3,5-ditrifluoromethyl-4-cyclohexylphenyl)lactate
ethyl α-methyl-β-(3-chloro-4-cyclopentylphenyl)lactate
ethyl α-methyl-β-(3-bromo-4-cyclopentylphenyl)lactate
ethyl α-methyl-β-(3-chloro-4-cycloheptylphenyl)lactate
ethyl α-methyl-β-(3-bromo-4-cycloheptylphenyl)lactate
ethyl α-methyl-β-(3-cyano-4-cyclohexylphenyl)lactate
benzyl α-methyl-β-(3-cyano-4-cyclohexylphenyl)lactate
ethyl α-methyl-β-(3-trifluoromethyl-4-cyclohexylphenyl)lactate
ethyl α-methyl-β-(3-amino-4-cyclohexylphenyl)lactate
ethyl α-methyl-β-(3-methylamino-4-cyclohexylphenyl)lactate
ethyl α-methyl-β-(3-dimethylamino-4-cyclohexylphenyl)lactate
ethyl α-methyl-β-(3-fluoro-4-cyclohexylphenyl)lactate
ethyl α-methyl-β-(3-hydroxy-4-cyclohexylphenyl)lactate
ethyl α-methyl-β-(3-methoxy-4-cyclohexylphenyl)lactate
ethyl α-methyl-β-(3-bromo-4-cyclohexylphenyl)lactate
ethyl α-methyl-β-(3-acetyl-4-cyclohexylphenyl)lactate
ethyl α-methyl-β-(3,2'-dimethyl-4-cyclohexylphenyl)lactate
ethyl α-methyl-β-(3-methyl-4-cyclohexylphenyl)lactate
ethyl α-methyl-β-(3-amino-5-methyl-4-cyclohexylphenyl)lactate
ethyl α-methyl-β-(3-amino-5-fluoro-4-cyclohexylphenyl)lactate
ethyl α-methyl-β-(3-amino-5-chloro-4-cyclohexylphenyl)lactate
ethyl α-methyl-β-(3-amino-5-bromo-4-cyclohexylphenyl)lactate
ethyl α-methyl-β-(3-amino-5-trifluoromethyl-4-cyclohexylphenyl)lactate
ethyl α-methyl-β-(3-amino-5-cyano-4-cyclohexylphenyl)lactate
ethyl α-methyl-β-(3-methylamino-5-chloro-4-cyclohexylphenyl)lactate
ethyl α-methyl-β-(3-dimethylamino-5-chloro-4-cyclohexylphenyl)lactate
ethyl α-methyl-β-(3-cyano-5-chloro-4-cyclohexylphenyl)lactate
benzyl α-methyl-β-(3-cyano-5-chloro-4-cyclohexylphenyl)lactate
ethyl α-methyl-β-(3-fluoro-5-chloro-4-cyclohexylphenyl)lactate
ethyl α-methyl-β-(3-trifluoro-5-chloro-4-cyclohexylphenyl)lactate
ethyl α-methyl-β-(3-hydroxy-5-chloro-4-cyclohexylphenyl)lactate
ethyl α-methyl-β-(3,5-dichloro-4-cyclopentylphenyl)lactate
ethyl α-methyl-β-(3,5-dichloro-4-cycloheptylphenyl)lactate
methyl α-methyl-β-(3-chloro-4-cyclohexylphenyl)lactate
methyl α-methyl-β-(3,5-dichloro-4-cyclohexylphenyl)lactate
propyl α-methyl-β-(3,5-dichloro-4-cyclohexylphenyl)lactate
i-propyl α-methyl-β-(3-chloro-4-cyclohexylphenyl)lactate
i-propyl α-methyl-β-(3,5-dichloro-4-cyclohexylphenyl)lactate
t-butyl α-methyl-β-(3-chloro-4-cyclohexylphenyl)lactate
t-butyl α-methyl-β-(3,5-dichloro-4-cyclohexylphenyl)lactate
ethyl α-methyl-β-[3-chloro-4-(2'-methylcyclopentyl)phenyl]lactate
ethyl α-methyl-β-[3,5-dichloro-4-(2'-methylcyclopentyl)phenyl]lactate
ethyl α-methyl-β-[3-chloro-4-(2'-methylcyclohexyl)phenyl]lactate
ethyl α-methyl-β-[3,5-dichloro-4-(2'-methylcyclohexyl)phenyl]lactate
ethyl α-methyl-β-[3-chloro-4-(2'-methylcycloheptyl)phenyl]lactate
ethyl α-methyl-β-[3,5-dichloro-4-(2'-methylcycloheptyl)phenyl]lactate
ethyl α-methyl-β-[3-chloro-4-(3'-methylcyclohexyl)phenyl]lactate
ethyl α-methyl-β-[3,5-dichloro-4-(3'-methylcyclohexyl)phenyl]lactate
ethyl α-methyl-β-[3-chloro-4-(4'-methylcyclohexyl)phenyl]lactate
ethyl α-methyl-β-[3,5-dichloro-4-(4'-methylcyclohexyl)phenyl]lactate
ethyl α-methyl-β-[3-chloro-5-fluoro-(2'-methylcyclohexyl)phenyl]lactate
ethyl α-methyl-β-[3-fluoro-5-bromo-(2'-methylcyclohexyl)phenyl]lactate
ethyl α-methyl-β-[3-cyano-5-chloro-(2'-methylcyclohexyl)phenyl]lactate
ethyl α-methyl-β-[3-chloro-5-trifluoromethyl-(4'-methylcyclohexyl)-phenyl]lactate
ethyl α-methyl-β-[3-bromo-5-chloro-(4'-methylcyclohexyl)phenyl]lactate
ethyl α-methyl-β-[3-fluoro-5-trifluoromethyl-(4'-methylcyclohexyl)phenyl]lactate
ethyl α-methyl-β-[3,5-dichloro-(4'-methylcyclohexyl)phenyl]lactate
ethyl α-ethyl-β-(3-trifluoromethyl-4-cyclohexylphenyl)lactate
ethyl α-propyl-β-(3-trifluoromethyl-4-cyclohexylphenyl)lactate ethyl α-butyl-β-(3-trifluoromethyl-4-cyclohexylphenyl)lactate
ethyl α-methyl-β-(3-nitro-4-cyclopentylphenyl)lactate
ethyl α-methyl-β-(3-nitro-4-cycloheptylphenyl)lactate
ethyl α-methyl-β-(3,5-dinitro-4-cyclohexylphenyl)lactate
ethyl α-methyl-β-(3,5-dinitro-4-cyclopentylphenyl)lactate
ethyl α-methyl-β-(3,5-dinitro-4-cycloheptylphenyl)lactate
ethyl α-methyl-β-(3-nitro-5-chloro-4-cyclohexylphenyl)lactate
ethyl α-methyl-β-(3-cyano-5-nitro-4-cyclohexylphenyl)lactate
benzyl α-methyl-β-(3-cyano-5-nitro-4-cyclohexylphenyl)lactate
ethyl α-methyl-β-(3-amino-5-nitro-4-cyclohexylphenyl)lactate
ethyl α-methyl-β-(3-dimethylamino-5-nitro-4-cyclohexylphenyl)lactate
ethyl α-methyl-β-(3-fluoro-5-nitro-4-cyclohexylphenyl)lactate
ethyl α-methyl-β-(3-hydroxy-5-nitro-4-cyclohexylphenyl)lactate
ethyl α-methyl-β-(3-methoxy-5-nitro-4-cyclohexylphenyl)lactate
ethyl α-methyl-β-(3-bromo-5-nitro-4-cyclohexylphenyl)lactate
ethyl α-methyl-β-(3-trifluoromethyl-5-nitro-4-cyclohexylphenyl)lactate
ethyl α-methyl-β-(3-iodo-5-nitro-4-cyclohexylphenyl)lactate
ethyl α-methyl-β-(3-mercapto-5-nitro-4-cyclohexylphenyl)lactate
ethyl α-methyl-β-(3-methylthio-5-nitro-4-cyclohexylphenyl)lactate
ethyl α-methyl-β-(3-acetylthio-5-nitro-4-cyclohexylphenyl)lactate
ethyl α-methyl-β-(3-acetyloxy-5-nitro-4-cyclohexylphenyl)lactate
ethyl α-methyl-β-(3-acetylamino-5-nitro-4-cyclohexylphenyl)lactate
ethyl α-methyl-β-(3-methylsulfonyl-5-nitro-4-cyclohexylphenyl)lactate
ethyl α-methyl-β-(3-amino-5-iodo-4-cyclohexylphenyl)lactate
ethyl α-methyl-β-(3-amino-5-methylsulfonyl-4-cyclohexylphenyl)lactate
ethyl α-methyl-β-(3-trifluoromethyl-5-methylsulfonyl-4-cyclohexylphenyl)lactate
ethyl α-methyl-β-(3-nitro-5-methylsulfinyl-4-cyclohexylphenyl)lactate
ethyl α-methyl-β-(3-bromo-5-methylsulfinyl-4-cyclohexylphenyl)lactate
ethyl α-methyl-β-(3-chloro-5-methylsulfinyl-4-cyclohexylphenyl)lactate
ethyl α-methyl-β-(3-methylsulfinyl-4-cyclohexylphenyl)lactate
ethyl α-methyl-β-(3-methylsulfonyl-4-cyclohexylphenyl)lactate
ethyl α-methyl-β-(3-iodo-4-cyclohexylphenyl)lactate
ethyl α-methyl-β-(3-mercapto-4-cyclohexylphenyl)lactate
ethyl α-methyl-β-(3-iodo-5-chloro-4-cyclohexylphenyl)lactate
ethyl α-methyl-β-(3-mercapto-5-chloro-4-cyclohexylphenyl)lactate
ethyl α-methyl-β-(3-iodo-5-fluoro-4-cyclohexylphenyl)lactate
ethyl α-methyl-β-(3-mercapto-5-fluoro-4-cyclohexylphenyl)lactate
ethyl α-methyl-β-(3-iodo-5-bromo-4-cyclohexylphenyl)lactate
ethyl α-methyl-β-(3-iodo-5-acetyl-4-cyclohexylphenyl)lactate
ethyl α-methyl-β-(3-iodo-5-methylsulfonyl-4-cyclohexylphenyl)lactate
ethyl α-methyl-β-[3-nitro-4-(2'-methylcyclopentyl)phenyl]lactate
ethyl α-methyl-β-[3-nitro-4-(2'-methylcyclohexyl)phenyl]lactate
ethyl α-methyl-β-[3-nitro-4-(2'-methylcycloheptyl)phenyl]lactate
ethyl α-methyl-β-[3-nitro-4-(3'-methylcyclohexyl)phenyl]lactate
ethyl α-methyl-β-[3-nitro-4-(4'-methylcyclohexyl)phenyl]lactate
ethyl α-methyl-β-[3-amino-5-nitro-4-(2'-methylcyclohexyl)phenyl]lactate
ethyl α-methyl-β-[3-amino-5-nitro-4-(3'-methylcyclohexyl)phenyl]lactate
ethyl α-methyl-β-[3-amino-5-nitro-4-(4'-methylcyclohexyl)phenyl]lactate
ethyl α-methyl-β-[3,5-dinitro-4-(4'-methylcyclohexyl)phenyl]lactate

EXAMPLE 35

β-(3-chloro-4-cyclohexylphenyl)lactic acid

To a solution of 0.144 moles of ethyl β-(3-chloro-4-cyclohexylphenyl)lactate dissolved in 220 ml. of isopropanol is added 38 g. (0.7 mole) of potassium hydroxide. This mixture is then heated at reflux temperature in a nitrogen atmosphere. The solution is concentrated in vacuo to a viscous oil, which is then dissolved in 500 ml. of water and filtered. The filtrate is acidified with 10 percent HCl and the precipitate is taken up in ether. The ether layer is dried, filtered and the filtrate concentrated to dryness. Recrystallization of residue from benzene-cyclohexane 1:1 gives β-(3-chloro-4-cyclohexylphenyl)lactic acid.

EXAMPLE 36

α-Methyl-β-(3,5-dichloro-4-cyclohexylphenyl)lactic acid

To a solution of 0.15 moles of ethyl α-methyl-β-(3,5-dichloro-4-cyclohexylphenyl)lactate dissolved in 225 ml. of isopropanol is added 40 g. of potassium hydroxide. This mixture is then heated to reflux temperature in a nitrogen atmosphere. The solution is concentrated in vacuo and the residue is dissolved in 500 ml. of water and acidified with 10 percent HCl. The mixture is extracted with ether, dried and evaporated to dryness. The residue is recrystallized from benzene-cyclohexane to give α-methyl-β-(3,5-dichloro-4-cyclohexylphenyl)lactic acid.

EXAMPLE 37

When an equimolar amount of the lactate compounds of this invention are used in Examples 35–36, then the corresponding lactic acid is prepared. A representative list of compounds so prepared are described below.

TABLE I

β-(3-chloro-4-cyclopentylphenyl)lactic acid
β-(3-bromo-4-cyclopentylphenyl)lactic acid
β-(3-chloro-4-cycloheptylphenyl)lactic acid
β-(3-bromo-4-cycloheptylphenyl)lactic acid
β-(3-trifluoromethyl-4-cyclohexylphenyl)lactic acid
β-(3-amino-4-cyclohexylphenyl)lactic acid
β-(3-methylamino-4-cyclohexylphenyl)lactic acid
β-(3-dimethylamino-4-cyclohexylphenyl)lactic acid
β-(3-fluoro-4-cyclohexylphenyl)lactic acid
β-(3-hydroxy-4-cyclohexylphenyl)lactic acid
β-(3-methoxy-4-cyclohexylphenyl)lactic acid
β-(3-bromo-4-cyclohexylphenyl)lactic acid
β-(3-acetyl-4-cyclohexylphenyl)lactic acid
β-(3,2'-dimethyl-4-cyclohexylphenyl)lactic acid
β-(3-methyl-4-cyclohexylphenyl)lactic acid
β-(3-amino-5-methyl-4-cyclohexylphenyl)lactic acid
β-(3-amino-5-fluoro-4-cyclohexylphenyl)lactic acid
β-(3-amino-5-chloro-4-cyclohexylphenyl)lactic acid
β-(3-amino-5-bromo-4-cyclohexylphenyl)lactic acid
β-(3-amino-5-trifluoromethyl-4-cyclohexylphenyl)lactic acid
β-(3-amino-5-cyano-4-cyclohexylphenyl)lactic acid
β-(3-methylamino-5-chloro-4-cyclohexylphenyl)lactic acid
β-(3-dimethylamino-5-chloro-4-cyclohexylphenyl)lactic acid
β-(3-fluoro-5-chloro-4-cyclohexylphenyl)lactic acid
β-(3-trifluoromethyl-5-chloro-4-cyclohexylphenyl)lactic acid
β-(3-hydroxy-5-chloro-4-cyclohexylphenyl)lactic acid
β-(3-methoxy-5-chloro-4-cyclohexylphenyl)lactic acid
β-(3-methyl-5-chloro-4-cyclohexylphenyl)lactic acid
β-(3-bromo-5-chloro-4-cyclohexylphenyl)lactic acid
β-(3-methyl-5-fluoro-4-cyclohexylphenyl)lactic acid
β-(3-methyl-5-bromo-4-cyclohexylphenyl)lactic acid
β-(3-methyl-5-trifluoromethyl-4-cyclohexylphenyl)lactic acid
β-(3-acetyl-5-chloro-4-cyclohexylphenyl)lactic acid
β-(3-methyl-5-nitro-4-cyclohexylphenyl)lactic acid
β-(3,5-difluoro-4-cyclohexylphenyl)lactic acid
β-(3-bromo-5-fluoro-4-cyclohexylphenyl)lactic acid
β-(3-acetyl-5-fluoro-4-cyclohexylphenyl)lactic acid
β-(3,5-dibromo-4-cyclohexylphenyl)lactic acid
β-(3-acetyl-5-bromo-4-cyclohexylphenyl)lactic acid
β-(3-fluoro-5-trifluoromethyl-4-cyclohexylphenyl)lactic acid
β-(3-carboxy-5-trifluoromethyl-4-cyclohexylphenyl)lactic acid
β-(3-dimethylamino-5-trifluoromethyl-4-cyclohexylphenyl)lactic acid
β-(3-bromo-5-trifluoromethyl-4-cyclohexylphenyl)lactic acid
β-(3-hydroxy-5-trifluoromethyl-4-cyclohexylphenyl)lactic acid
β-(3-acetyl-5-trifluoromethyl-4-cyclohexylphenyl)lactic acid
β-(3,5-ditrifluoromethyl-4-cyclohexylphenyl)lactic acid
β-(3-acetyl-5-carboxy-4-cyclohexylphenyl)lactic acid
β-(3-chloro-4-cyclohexylphenyl)lactic acid
β-[3-chloro-4-(2'-methylcyclopentyl)phenyl]lactic acid (2 racemates)
β-[3-chloro-4-(2'-methylcyclohexyl)phenyl]lactic acid (2 racemates)
β-[3-chloro-4-(2'-methylcycloheptyl)phenyl]lactic acid (2 racemates)
β-[3-chloro-4-(3'-methylcyclohexyl)phenyl]lactic acid (2 racemates)
β-[3-chloro-4-(4'-methylcyclohexyl)phenyl]lactic acid
β-[3-chloro-5-fluoro-(2'-methylcyclohexyl)phenyl]lactic acid (2 racemates)
β-[3-fluoro-5-bromo-(2'-methylcyclohexyl)phenyl]lactic acid (2 racemates)
β-[3-chloro-5-fluoro-(2'-methylcyclohexyl)phenyl]lactic acid (2 racemates)
β-[3-carboxy-5-chloro-(2'-methylcyclohexyl)phenyl]lactic acid (2 racemates)
β-[3-chloro-5-trifluoromethyl-(4'-methylcyclohexyl)phenyl]lactic acid
β-[3-bromo-5-chloro-(4'-methylcyclohexyl)phenyl]lactic acid
β-[3-fluoro-5-trifluoromethyl-(4'-methylcyclohexyl)phenyl]lactic acid
β-[3,5-dichloro-(4'-methylcyclohexyl)phenyl]lactic acid
β-(3-nitro-4-cyclopentylphenyl)lactic acid
β-(3-nitro-4-cycloheptylphenyl)lactic acid
β-(3,5-dinitro-4-cyclohexylphenyl)lactic acid
β-(3,5-dinitro-4-cyclopentylphenyl)lactic acid
β-(3,5-dinitro-4-cycloheptylphenyl)lactic acid
β-(3-nitro-5-chloro-4-cyclohexylphenyl)lactic acid
β-(3-amino-5-nitro-4-cyclohexylphenyl)lactic acid
β-(3-dimethylamino-5-nitro-4-cyclohexylphenyl)lactic acid
β-(3-fluoro-5-nitro-4-cyclohexylphenyl)lactic acid
β-(3-hydroxy-5-nitro-4-cyclohexylphenyl)lactic acid
β-(3-methoxy-5-nitro-4-cyclohexylphenyl)lactic acid
β-(3-bromo-5-nitro-4-cyclohexylphenyl)lactic acid
β-(3-trifluoromethyl-5-nitro-4-cyclohexylphenyl)lactic acid
β-(3-iodo-5-nitro-4-cyclohexylphenyl)lactic acid
β-(3-mercapto-5-nitro-4-cyclohexylphenyl)lactic acid
β-(3-methylthio-5-nitro-4-cyclohexylphenyl)lactic acid
β-(3-methyl-5-nitro-4-cyclohexylphenyl)lactic acid
β-(3-carboxy-5-nitro-4-cyclohexylphenyl)lactic acid
β-(3,2'-dimethyl-5-nitro-4-cyclohexylphenyl)lactic acid
β-(3-methylsulfonyl-5-nitro-4-cyclohexylphenyl)lactic acid
β-(3-amino-5-iodo-4-cyclohexylphenyl)lactic acid
β-(3-amino-5-methylsulfonyl-4-cyclohexylphenyl)lactic acid
β-(3-trifluoromethyl-5-methylsulfonyl-4-cyclohexylphenyl)lactic acid
β-(3-nitro-5-methylsulfinyl-4-cyclohexylphenyl)lactic acid
β-(3-bromo-5-methylsulfinyl-4-cyclohexylphenyl)lactic acid β-(3-chloro-5-methylsulfinyl-4-cyclohexylphenyl)-lactic acid
β-(3-methylsulfinyl-4-cyclohexylphenyl)lactic acid
β-(3-methylsulfonyl-4-cyclohexylphenyl)lactic acid
β-(3-iodo-4-cyclohexylphenyl)lactic acid
β-(3-mercapto-4-cyclohexylphenyl)lactic acid
β-(3-iodo-5-chloro-4-cyclohexylphenyl)lactic acid
β-(3-mercapto-5-chloro-4-cyclohexylphenyl)lactic acid
β-(3-iodo-5-fluoro-4-cyclohexylphenyl)lactic acid
β-(3-mercapto-5-fluoro-4-cyclohexylphenyl)lactic acid
β-(3-iodo-5-bromo-4-cyclohexylphenyl)lactic acid
β-(3-iodo-5-acetyl-4-cyclohexylphenyl)lactic acid
β-(3-iodo-5-methylsulfonyl-4-cyclohexylphenyl)lactic acid
β-[3-nitro-4-(2'-methylcyclopentyl)phenyl]]lactic acid (2 racemates)
β-[3-nitro-4-(2'-methylcycloheptyl)phenyl]]lactic acid (2 racemates)
β-[3-nitro-4-(2'-methylcyclohexyl)phenyl]lactic acid (2 racemates)
β-[3-nitro-4-(3'-methylcyclohexyl)phenyl]lactic acid (2 racemates)
β-[3-nitro-4-(4'-methylcyclohexyl)phenyl]lactic acid
β-[3-amino-5-nitro-4-(2'-methylcyclohexyl)phenyl]-lactic acid (2 racemates)
β-[3-amino-5-nitro-4-(3'-methylcyclohexyl)phenyl]-lactic acid (2 racemates)
β-[3-amino-5-nitro-4-(4'-methylcyclohexyl)phenyl]-lactic acid
β-[3,5-dinitro-4-(4'-methylcyclohexyl)phenyl]lactic acid
α-methyl-β-(3,2'-dimethyl-5-chloro-4-cyclohexyl-phenyl)lactic acid
α-methyl-β-(3,3'-dimethyl-5-chloro-4-cyclohexyl-phenyl)lactic acid
α-methyl-β-(3,4'-dimethyl-5-chloro-4-cyclohexyl-phenyl)lactic acid
α-methyl-β-[3-fluoro-4-(4'-methylcyclohexyl)-phenyl]]lactic acid
α-methyl-β-[3-nitro-4-(4'-methylcyclohexyl)-phenyl]]lactic acid
α-methyl-β-[3-bromo-4-(4'-methylcyclohexyl)-phenyl]]lactic acid
α-methyl-β-(3-chloro-4-cyclopentylphenyl)lactic acid
α-methyl-β-(3-bromo-4-cyclopentylphenyl)lactic acid
α-methyl-β-(3-chloro-4-cycloheptylphenyl)lactic acid
α-methyl-β-(3-bromo-4-cycloheptylphenyl)lactic acid
α-methyl-β-(3-trifluoromethyl-4-cyclohexylphenyl)-lactic acid
α-methyl-β-(3-amino-4-cyclohexylphenyl)lactic acid
α-methyl-β-(3-methylamino-4-cyclohexylphenyl)-lactic acid
α-methyl-β-(3-dimethylamino-4-cyclohexylphenyl)-lactic acid
α-methyl-β-(3-fluoro-4-cyclohexylphenyl)lactic acid
α-methyl-β-(3-hydroxy-4-cyclohexylphenyl)lactic acid
α-methyl-β-(3-methoxy-4-cyclohexylphenyl)lactic acid
α-methyl-β-(3-bromo-4-cyclohexylphenyl)lactic acid
α-methyl-β-(3-acetyl-4-cyclohexylphenyl)lactic acid
α-methyl-β-(3,2'-dimethyl-4-cyclohexylphenyl)lactic acid
α-methyl-β-(3-methyl-4-cyclohexylphenyl)lactic acid
α-methyl-β-(3-amino-5-methyl-4-cyclohexylphenyl)-lactic acid
α-methyl-β-(3-amino-5-fluoro-4-cyclohexylphenyl)-lactic acid
α-methyl-β-(3-amino-5-chloro-4-cyclohexylphenyl)-lactic acid
α-methyl-β-(3-amino-5-bromo-4-cyclohexylphenyl)-lactic acid
α-methyl-β-(3-amino-5-trifluoromethyl-4-cyclohexylphenyl)lactic acid
α-methyl-β-(3-amino-5-cyano-4-cyclohexylphenyl)-lactic acid
α-methyl-β-(3-methylamino-5-chloro-4-cyclohexyl-phenyl)lactic acid
α-methyl-β-(3-dimethylamimo-5-chloro-4-cyclohex-ylphenyl)lactic acid
α-methyl-β-(3-fluoro-5-chloro-4-cyclohexylphenyl)-lactic acid
α-methyl-β-(3-trifluoromethyl-5-chloro-4-cyclohex-ylphenyl)lactic acid
α-methyl-β-(3-hydroxy-5-chloro-4-cyclohexyl-phenyl)lactic acid
α-methyl-β-(3-methoxy-5-chloro-4-cyclohexyl-phenyl)lactic acid
α-methyl-β-(3-methyl-5-chloro-4-cyclohexyl-phenyl)lactic acid
α-methyl-β-(3-bromo-5-chloro-4-cyclohexylphenyl)-lactic acid
α-methyl-β-(3-methyl-5-fluoro-4-cyclohexylphenyl)-lactic acid
α-methyl-β-(3-methyl-5-bromo-4-cyclohexyl-phenyl)lactic acid
α-methyl-β-(3-methyl-5-trifluoromet-yl-4-cyclohex-ylphenyl)lactic acid
α-methyl-β-(3-acetyl-5-chloro-4-cyclohexylphenyl)-lactic acid
α-methyl-β-(3-methyl-5-nitro-4-cyclohexylphenyl)-lactic acid
α-methyl-β-(3,5-difluoro-4-cyclohexylphenyl)lactic acid
α-methyl-β-(3-bromo-5-fluoro-4-cyclohexylphenyl)-lactic acid
α-methyl-β-(3-acetyl-5-fluoro-4-cyclohexylphenyl)-lactic acid
α-methyl-β-(3,5-dibromo-4-cyclohexylphenyl)lactic acid
α-methyl-β-(3-acetyl-5-bromo-4-cyclohexylphenyl)-lactic acid
α-methyl-β-(3-fluoro-5-trifluoromethyl-4-cyclohex-ylphenyl)lactic acid
α-methyl-β-(3-carboxy-5-trifluoromethyl-4-cyclohexylphenyl)lactic acid
α-methyl -β-(3-dimethylamino-5-trifluoromethyl-4-cyclohexylphenyl)lactic acid
α-methyl-β-(3-bromo-5-trifluoromethyl-4-cyclohex-ylphenyl)lactic acid
α-methyl-β-(3-hydroxy-5-trifluoromethyl-4-cyclohexylphenyl)lactic acid
α-methyl-β-(3-acetyl-5-trifluoromethyl-4-cyclohex-ylphenyl)lactic acid α-methyl-β-(3,5-ditrifluoromethyl-4-cyclohexylphenyl)lactic acid α-methyl-β-(3-acetyl-5-carboxy-4-cyclohexylphenyl)lactic acid
α-methyl-β-(3-chloro-4-cyclohexylphenyl)lactic acid
α-methyl-β-[3-chloro-4-(2'-methylcyclopentyl)phenyl]]lactic acid (2 racemates)
α-methyl-β-[3-chloro-4-(2'-methylcyclohexyl)phenyl]]lactic acid (2 racemates)
α-methyl-β-[3-chloro-4-(2'-methylcycloheptyl)phenyl]]lactic acid (2 racemates)
α-methyl-β-[3-chloro-4-(3'-methylcyclohexyl)phenyl]]lactic acid (2 racemates)
α-methyl-β-[3-chloro-4-(4'-methylcyclohexyl)phenyl]]lactic acid
α-methyl-β-[3-chloro-5-fluoro-(2'-methylcyclohexyl)phenyl]lactic acid (2 racemates)
α-methyl-β-[3-fluoro-5-bromo-(2'-methylcyclohexyl)phenyl]lactic acid (2 racemates)
α-methyl-β-[3-chloro-5-fluoro-(2'-methylcyclohexyl)phenyl]]lactic acid (2 racemates)
α-methyl-β-[3-carboxy-5-chloro-(2'-methylcyclohexyl)phenyl]]lactic acid (2 racemates)
α-methyl-β-[3-chloro-5-trifluoromethyl-(4'-methylcyclohexyl)phenyl]]lactic acid
α-methyl-β-[3-bromo-5-chloro-(4'-methylcyclohexyl)phenyl]lactic acid
α-methyl-β-[3-fluoro-5-trifluoromethyl-(4'-methylcyclohexyl)phenyl]]lactic acid
α-methyl-β-[3,5-dichloro-(4'-methylcyclohexyl)phenyl]]lactic acid
α-methyl-β-(3-nitro-4-cyclopentylphenyl)lactic acid
α-methyl-β-(3-nitro-4-cycloheptylphenyl)lactic acid
α-methyl-β-(3,5-dinitro-4-cyclohexylphenyl)lactic acid
α-methyl-β-(3,5-dinitro-4-cyclopentylphenyl)lactic acid
α-methyl-β-(3,5-dinitro-4-cycloheptylphenyl)lactic acid
α-methyl-β-(3-nitro-5-chloro-4-cyclohexylphenyl)-lactic acid
α-methyl-β-(3-amino-5-nitro-4-cyclohexylphenyl)-lactic acid
α-methyl-β-(3-dimethylamino-5-nitro-4-cyclohexylphenyl)lactic acid
α-methyl-β-(3-fluoro-5nitro-4-cyclohexylphenyl)lactic acid
α-methyl-β-(3-hydroxy-5-nitro-4-cyclohexylphenyl)-lactic acid
α-methyl-β-(3-methoxy-5-nitro-4-cyclohexylphenyl)lactic acid
α-methyl-β-(3-bromo-5-nitro-4-cyclohexylphenyl)-lactic acid
β-methyl-β-(3-trifluoromethyl-5-nitro-4-cyclohexylphenyl)lactic acid
α-methyl-β-(3-iodo-5-nitro-4-cyclohexylphenyl)lactic acid
α-methyl-β-(3-mercapto-5-nitro-4-cyclohexylphenyl)lactic acid
α-methyl-β-(3-methylthio-5-nitro-4-cyclohexylphenyl)lactic acid
α-methyl-β-(3-methyl-5-nitro-4-cyclohexylphenyl)-lactic acid
α-methyl-β-(3-carboxy-5-nitro-4-cyclohexylphenyl)-lactic acid
α-methyl-β-(3,2'-dimethyl-5-nitro-4-cyclohexylphenyl)lactic acid
α-methyl-β-(3-methylsulfonyl-5-nitro-4-cyclohexylphenyl)lactic acid
α-methyl-β-(3-amino-5-iodo-4-cyclohexylphenyl)-lactic acid
α-methyl-β-(3-amino-5-methylsulfonyl-4-cyclohexylphenyl)lactic acid
α-methyl-β-(3-trifluoromethyl-5-methylsulfonyl-4-cyclohexylphenyl)lactic acid
α-methyl-β-(3-nitro-5-methylsulfinyl-4-cyclohexylphenyl)lactic acid
α-methyl-β-(3-bromo-5-methylsulfinyl-4-cyclohexylphenyl)lactic acid
α-methyl-β-(3-chloro-5-methylsulfinyl-4-cyclohexylphenyl)lactic acid
α-methyl-β-(3-Methylsulfinyl-4-cyclohexylphenyl)-lactic acid
α-methyl-β-(3-methylsulfonyl-4-cyclohexylphenyl)-lactic acid
α-methyl-β-(3-iodo-4-cyclohexylphenyl)lactic acid
α-methyl-β-(3-mercapto-4-cyclohexylphenyl)lactic acid
α-methyl-β-(3-iodo-5-chloro-4-cyclohexylphenyl)-lactic acid
α-methyl-β-(3-mercapto-5-chloro-4-cyclohexylphenyl)lactic acid
α-methyl-β-(3-iodo-5-fluoro-4-cyclohexylphenyl)-lactic acid
α-methyl-β-(3-mercapto-5-fluoro-4-cyclohexylphenyl)lactic acid
α-methyl -β-(3-iodo-5-bromo-4-cyclohexylphenyl)-lactic acid
α-methyl-β-(3-iodo-5-acetyl-4-cyclohexylphenyl)-lactic acid
α-methyl-β-(3-iodo-5-methylsulfonyl-4-cyclohexylphenyl)lactic acid
α-methyl-β-[3-nitro-4-(2'-methylcyclopentyl)phenyl]]lactic acid (2 racemates)
α-methyl-β-[3-nitro-4-(2'-methylcycloheptyl)phenyl]]lactic acid (2 racemates)
α-methyl-β-[3-nitro-4-(2'-methylcyclohexyl)phenyl]]lactic acid (2 racemates)
α-methyl-β-[3-nitro-4-(3'-methylcyclohexyl)phenyl]]lactic acid (2 racemates)
α-methyl -β-[3-nitro-4-(4'-methylcyclohexyl)phenyl]]lactic acid
α-methyl -β-[3-amino-5-nitro-4-(2'-methylcyclohexyl)phenyl]]lactic acid (2 racemates)
α-methyl-β-[3-amino-5-nitro-4-(3'-methylcyclohexyl)phenyl]]lactic acid (2 racemates)
α-methyl-β-[3-amino-5-nitro-4-(4'-methylcyclohexyl)phenyl]acetic acid
α-methyl-β-[3,5-dinitro-4-(4'-methylcyclohexyl)phenyl]acetic acid

EXAMPLE 38

β-(3-Cyano-4-cyclohexylphenyl)lactic acid

A solution of 0.01 moles of benzyl β-(3-cyano-4-cyclohexylphenyl)-lactate dissolved in 100 ml. of acetic acid and containing 0.01 mole of hydrogen chloride is shaken with hydrogen over a 5 percent Pd carbon catalyst until 0.01 moles of hydrogen is absorbed. The catalyst is then filtered and the solution is evaporated to dryness and crystallized to obtain β-(3-cyano-4-cyclohexylphenyl)lactic acid.

When the benzyl ester used is
benzyl β-(3-cyano-4-cyclohexylphenyl)lactate benzyl α-methyl-β-(3-cyano-4-cyclohexylphenyl)lactate
benzyl β-(3-cyano-5-chloro-4-cyclohexylphenyl)lactate
benzyl α-methyl-β-(3-cyano-5-chloro-4-cyclohexylphenyl)lactate
benzyl β-(3-cyano-5-fluoro-4-cyclohexylphenyl)lactate
benzyl β-(3-cyano-5-bromo-4-cyclohexylphenyl)lactate
benzyl β-(3,5-dicyano-4-cyclohexylphenyl)lactate
benzyl β-(3-cyano-5-nitro-4-cyclohexylphenyl)lactate
benzyl β-(3-acetylamino-4-cyclohexylphenyl)lactate
benzyl β-(3-acetylthio-4-cyclohexylphenyl)lactate
benzyl β-(3-acetyloxy-4-cyclohexylphenyl)lactate
then the products obtained are
β-(3-cyano-4-cyclohexylphenyl)lactic acid
α-methyl-β-(3-cyano-4-cyclohexylphenyl)lactic acid
β-(3-cyano-5-chloro-4-cyclohexylphenyl)lactic acid
α-methyl-β-(3-cyano-5-chloro-4-cyclohexylphenyl)-lactic acid
β-(3-cyano-5-fluoro-4-cyclohexylphenyl)lactic acid
β-(3-cyano-5-bromo-4-cyclohexylphenyl)lactic acid
β-(3,5-dicyano-4-cyclohexylphenyl)lactic acid
β-(3-cyano-5-nitro-4-cyclohexylphenyl)lactic acid
β-(3-acetylamino-4-cyclohexylphenyl)lactic acid
β-(3-acetylthio-4-cyclohexylphenyl)lactic acid
β-(3-acetyloxy-4-cyclohexylphenyl)lactic acid.

EXAMPLE 39 l β-(3-Chloro-4-cyclohexylphenyl)lactic acid

To a boiling solution of 29.4 g. (0.10 mole) of cinchonidine in 1 liter of absolute ethanol is added a boiling solution of 26.9 g. (0.10 mole) of dl β-(3-chloro-4-cyclohexylphenyl)lactic acid in 500 ml. of absolute ethanol. The solution is stirred briefly then allowed to cool to room temperature overnight. The precipitate is collected and washed with 2 × 25 ml. of ethanol and air dried. Recrystallization from isopropanol gives white needle crystals. This material is hydrolyzed with 200 ml. of 1.2 N-HCl. The white solid is collected, washed with 3 × 50 ml. water and dried at 55°C overnight. Recrystallization from benzene-cyclohexane 3:2 gives lβ-(3-chloro-4-cyclohexylphenyl)lactic acid.

When modifications of the above resolution procedure is followed but dl β-(3-chloro-4-cyclohexylphenyl)lactic acid is replaced by an equimolar amount of the dl lactic acids of Examples 35 – 38, then the corresponding l-isomer is prepared.

EXAMPLE 40 d β-(3-Chloro-4-cyclohexylphenyl)lactic acid

The combined ethanol and isopropanol filtrates from Example 39 are evaporated to dryness. This material is triturated with 1 liter of boiling acetone. The material which does not go into solution is filtered off. The filtrate is evaporated to dryness and hydrolyzed with 100 ml. of 1.2 N-HCl. The precipitate is collected, washed with 3 × 25 ml. of water, and dried at 55°C. Recrystallization from benzene-cyclohexane 3:2 gives d β-(3-chloro-4-cyclohexylphenyl)lactic acid.

When modifications of the above resolution procedure is followed but dl β-(3-chloro-4-cyclohexylphenyl)lactic acid is replaced by an equimolar amount of the dl lactic acids of Examples 35 – 38, then the corresponding d-isomer is prepared.

EXAMPLE 41

β-(3-Chloro-4-cyclohexylphenyl)lactic acid, sodium salt

A solution of 12.4 g. of sodium bicarbonate in 135 ml. of water is added dropwise to a stirred solution of 46.3 g. (0.164 moles) of β-(3-chloro-4-cyclohexylphenyl)lactic acid in 150 ml. of methanol. The solvent is removed in vacuo and the residue is dried by repeated distillations with anhydrous ethanol. The crystalline residue is triturated with ether (100 ml.), collected and washed with ether. The residue is dried in a vacuum desiccator to obtain β-(3-chloro-4-cyclohexylphenyl)lactic acid, sodium salt.

When an equimolar amount of sodium bicarbonate in the above reaction is replaced by the compounds of Table I below, then the corresponding salt of Table II below is prepared.

TABLE I sodium hydroxide
potassium hydroxide
calcium hydroxide
potassium carbonate
magnesium bicarbonate

TABLE II

β-(3-chloro-4-cyclohexylphenyl)lactic acid, sodium salt
β-(3-chloro-4-cyclohexylphenyl)lactic acid, potassium salt
β-(3-chloro-4-cyclohexylphenyl)lactic acid, calcium salt
β-(3-chloro-4-cyclohexylphenyl)lactic acid, magnesium salt When the dl, d and l lactic acid compounds of this invention are used in the above reaction, then the corresponding salt is prepared.

EXAMPLE 42

β-(3-Chloro-4-cyclohexylphenyl)lactic acid, diethylammonium salt

Anhydrous diethylamine (0.11 moles) is added dropwise to a stirred solution of β-(3-chloro-4-cyclohexylphenyl)lactic acid (0.10 moles) in 100 ml. of n-hexane at 0°C. The precipitated diethylammonium salt is collected on a filt-er washed with n-hexane and dried in a vacuum desiccator to obtain β-(3-chloro-4-cyclohexylphenyl)lactic acid, diethylammonium salt.

When diethylamine in the above reaction is replaced by an equimolar amount of the compounds of Table I, below, then the corresponding product of Table II, below is prepared.

Table I

| | |
|---|---|
| dimethylamine | α-methylbenzylamine |
| β-hydroxyethylamine | cyclohexylamine |
| piperazine | triethylamine |
| piperidine | phenethylamine |

TABLE II

β-(3-chloro-4-cyclohexylphenyl)lactic acid, dimethylammonium salt
β-(3-chloro-4-cyclohexylphenyl)lactic acid, β-hydroxyethylammonium salt β-(3-chloro-4-cyclohexylphenyl)lactic acid, piperazinium salt β-(3-chloro-4-cyclohexylphenyl)lactic acid, piperidinium salt β-(3-chloro-4-cyclohexylphenyl)lactic acid, α-methylbenzylammonium salt β-(3-chloro-4-cyclohexylphenyl)lactic acid, cyclohexylammonium salt β-(3-chloro-4-cyclohexylphenyl)lactic acid, triethylammonium salt β3-chloro-4-cyclohexylphenyl)lactic acid, phenethylammonium salt When the dl, d and l lactic acids of this invention are used in the above reaction, then the corresponding salt is prepared.

EXAMPLE 43

N-isopropyl-β-(3-chloro-4-cyclohexylphenyl)lactamide

Ethyl β-(3-chloro-4-cyclohexylphenyl)acetate 31 g. (0.1 mole) is stirred with 20 ml. of isopropylamine at about 35°C with stirring overnight and the temperature is then raised to reflux for 28 hours. The reaction mixture is evaporated in vacuo and the residue distilled to obtain N-isopropyl-β-(3-chloro-4-cyclohexylphenyl)-lactamide.

When isopropylamine in the above reaction is replaced by an equimolar amount of the compound of Table I, below, then the corresponding product of Table II below is prepared.

Table I

| | |
|---|---|
| diethylamine | isothiazolidine |
| ethylmethylamine | piperidine |
| t-butylamine | morpholine |
| cyclopropylamine | N-methylpiperazine |
| | N-methylhomopiperazine |

TABLE II

N,N-diethyl-β-(3-chloro-4-cyclohexylphenyl)lactamide

N-met-yl-N-ethyl-β-(3-chloro-4-cyclohexylphenyl)-lactamide

N-t-butyl-β-(3-chloro-4-cyclohexylphenyl)lactamide

N-cyclopropyl-β-(3-chloro-4-cyclohexylphenyl)lactamide

N,N-pentamethylene-β-(3-chloro-4-cyclohexylphenyl)lactamide

N,N-oxydiethylene-β-(3-chloro-4-cyclohexylphenyl)lactamide

N,N-methylaminodiethylene-β-(3-chloro-4-cyclohexylphenyl)lactamide

N,N-methylaminoethylenetrimethylene-β-(3-chloro-4-cyclohexylphenyl)lactamide

N,N-thiotrimethylene-β-(3-chloro-4-cyclohexylphenyl)lactamide.

When isopropylamine in the above reaction is replaced by ammonia, methylamine or dimethylamine and the reaction carried out in a bomb at 150°C, then the product prepared is β-(3-chloro-4-cyclohexylphenyl)lactamide, N-methyl-β-(3-chloro-4-cyclohexylphenyl-lactamide or N,N-dimethyl-β-(3-chloro-4-cyclohexylphenyl)lactamide.

When the dl, d or l lactic acids of this invention are used in the above reaction, then the corresponding amide is prepared.

EXAMPLE 44

Ethyl α-chloro-β-(3-chloro-4-cyclohexylphenyl)propionate

A mixture of 232 g. (0.747 mole) of ethyl β-(3-chloro-4-cyclohexylphenyl)lactate is stirred with 106.67 g. (0.895 mole) of thionyl chloride at room temperature for 24 hours and then heated to reflux for 6 hours. The cold reaction mixture is poured into 1125 ml. of ice-cold water with stirring. The mixture is extracted with 800 ml. of ether. The ethereal solution is washed with 450 ml. of cold saturated sodium hydrocarbonate solution followed by washing twice, each time with 250 ml. of cold water. The ethereal solution is dried over anhydrous sodium sulfate and filtered. The solvent is removed in vacuo to obtain ethyl α-chloro-β-(3-chloro-4-cyclohexylphenyl)-propionate.

EXAMPLE 45

Ethyl α-chloro-β-(3,5-dichloro-4-cyclohexylphenyl)propionate

To a mixture of 23.8 g. (0.077 moles) of ethyl β-(3,5-dichloro-4-cyclohexylphenyl)propionate in 35 ml. of benzene is added 19.2 g. (0.092 moles) of phosphorous pentachloride in small portions over 1½ hours. The mixture is stirred for 20 hours and then poured into an ice-cold mixture. The reaction mixture is extracted with petroleum ether which is then washed with cold 10 percent sodium bicarbonate solution followed by water. On drying, the mixture is evaporated in vacuo to ethyl α-chloro-β-(3,5-dichloro-4-cyclohexylphenyl)-propionate.

EXAMPLE 46

When the procedures of Examples 44 and 45 are followed but ethyl β-(3-chloro-4-cyclohexylphenyl)lactate is replaced by the dl, d and l lactates of this invention, then the corresponding dl, d and l α-chloropropionate products are prepared. A representative list of the compounds obtained is shown in Table I, below.

TABLE I ethyl α-chloro-β-(3,5-ditrifluoromethyl-4-cyclohexylphenyl)propionate ethyl α-chloro-β-(3-dichloro-4-cyclopentylphenyl)propionate ethyl α-chloro-β-(3-bromo-4-cyclopentylphenyl)lactate ethyl α-chloro-β-(3-chloro-4-cyclohexylphenyl)propionate ethyl α-chloro-β-(3-chloro-4-cycloheptylphenyl)propionate ethyl α-chloro-β-(3-bromo-4-cycloheptylphenyl)propionate ethyl α-chloro-β-(3-cyano-4-cyclohexylphenyl)propionate benzyl α-chloro-β-(3-cyano-4-cyclohexylphenyl)propionate ethyl α-chloro-β-(3-trifluoromethyl-4-cyclohexylphenyl)propionate ethyl α-chloro-β-(3-dimethylamino-4-cyclohexylphenyl)propionate ethyl α-chloro-β-(3-fluoro-4-cyclohexylphenyl)propionate ethyl α-chloro-β-(3-hydroxy-4-cyclohexylphenyl)-propionate
ethyl α-chloro-β-(3-methoxy-4-cyclohexylphenyl)-propionate
ethyl α-chloro-β-(3-bromo-4-cyclohexylphenyl)propionate
ethyl α-chloro-β-(3-acetyl-4-cyclohexylphenyl)propionate
ethyl α-chloro-β-(3,2'-dimethyl-4-cyclohexylphenyl)propionate
ethyl β-chloro-β-(3-methyl-4-cyclohexylphenyl)propionate
ethyl α-chloro-β-(3-nitro-5-methyl-4-cyclohexylphenyl)propionate
ethyl α-chloro-β-(3-nitro-5-fluoro-4-cyclohexylphenyl)propionate
ethyl α-chloro-β-(3-chloro-5-nitro-4-cyclohexylphenyl)propionate
ethyl α-chloro-β-(3-nitro-5-bromo-4-cyclohexylphenyl)propionate
ethyl α-chloro-β-(3-nitro-5-trifluoromethyl-4-cyclohexylphenyl)propionate
ethyl α-chloro-β-(3-nitro-3-amino-5-cyano-4-cyclohexylphenyl)propionate
ethyl α-chloro-β-(3-chloro-5-dimethylamino-4-cyclohexylphenyl)propionate
ethyl α-chloro-β-(3-chloro-5-cyano-4-cyclohexylphenyl)propionate
benzyl α-chloro-β-(3-chloro-5-cyano-4-cyclohexylphenyl)propionate
ethyl α-chloro-β-(3-chloro-5-fluoro-4-cyclohexylphenyl)propionate
ethyl α-chloro-β-(3-chloro-5-trifluoromethyl-4-cyclohexylphenyl)propionate
ethyl α-chloro-β-(3-chloro-5-methyl-4-cyclohexylphenyl)propionate
ethyl α-chloro-β-(3-chloro-5-methylsulfonyl-4-cyclohexylphenyl)propionate
ethyl α-chloro-α-(3-chloro-5-iodo-4-cyclohexylphenyl)propionate
ethyl α-chloro-β-(3-chloro-5-fluoro-4-cyclohexylphenyl)propionate
ethyl α-chloro-β-(3-chloro-5-methoxy-4-cyclohexylphenyl)propionate
ethyl α-chloro-β-(3-chloro-5-methyl-4-cyclohexylphenyl)propionate
ethyl α-chloro-β-(3-chloro-5-bromo-4-cyclohexylphenyl)propionate
ethyl α-chloro-β-(3-methyl-5-fluoro-4-cyclohexylphenyl)propionate
ethyl α-chloro-β-(3-methyl-5-bromo-4-cyclohexylphenyl)propionate
ethyl α-chloro-β-(3-methyl-5-trifluoromethyl-4-cyclohexylphenyl)propionate
ethyl α-chloro-β-(3-chloro-5-acetyl-4-cyclohexylphenyl)propionate
ethyl α-chloro-β-(3-methyl-5-nitro-4-cyclohexylphenyl)propionate
ethyl α-chloro-β-(3,5-difluoro-4-cyclohexylphenyl)propionate
ethyl α-chloro-β-(3-cyano-5-fluoro-4-cyclohexylphenyl)propionate
benzyl α-chloro-β-(3-cyano-5-fluoro-4-cyclohexylphenyl)propionate
ethyl α-chloro-β-(3-bromo-5-fluoro-4-cyclohexylphenyl)propionate
ethyl α-chloro-β-(3-acetyl-5-fluoro-4-cyclohexylphenyl)propionate
ethyl α-chloro-β-(3-cyano-5-bromo-4-cyclohexylphenyl)propionate
benzyl α-chloro-β-(3-cyano-5-bromo-4-cyclohexylphenyl)propionate
ethyl α-chloro-β-(3,5-dibromo-4-cyclohexylphenyl)propionate
ethyl α-chloro-β-(3-acetyl-5-bromo-4-cyclohexylphenyl)propionate
ethyl α-chloro-β-(3-fluoro-5-trifluoromethyl-4-cyclohexylphenyl)propionate
ethyl α-chloro-β-(3-cyano-5-trifluoromethyl-4-cyclohexylphenyl)propionate
ethyl α-chloro-β-(3-dimethylamino-5-trifluoromethyl-4-cyclohexylphenyl)propionate
ethyl α-chloro-β-(3-bromo-5-trifluoromethyl-4-cyclohexylphenyl)propionate
ethyl α-chloro-β-(3-hydroxy-5-trifluoromethyl-4-cyclohexylphenyl)propionate
ethyl α-chloro-β-(3-acetyl-5-trifluoromethyl-4-cyclohexylphenyl)propionate
ethyl α-chloro-β-(3,5-ditrifluoromethyl-4-cyclohexylphenyl)propionate
ethyl α-chloro-β-(3,5-dichloro-4-cyclopentylphenyl)propionate
ethyl α-chloro-β-(3,5-dichloro-4-cycloheptylphenyl)propionate
methyl α-chloro-β-(3-chloro-4-cyclohexylphenyl)-propionate
methyl α-chloro-β-(3,5-dichloro-4-cyclohexylphenyl)propionate
propyl α-chloro-β-(3-chloro-4-cyclohexylphenyl)-propionate
propyl α-chloro-β-(3,5-dichloro-4-cyclohexylphenyl)propionate
i-propyl α-chloro-β-(3-chloro-4-cyclohexylphenyl)-propionate
i-propyl α-chloro-β-(3,5-dichloro-4-cyclohexylphenyl)propionate
t-butyl α-chloro-β-(3-chloro-4-cyclohexylphenyl)-propionate
t-butyl α-chloro-β-(3,5-dichloro-4-cyclohexylphenyl)propionate
ethyl α-chloro-β-[3-chloro-4-(2'-methylcyclopentyl)phenyl]propionate
ethyl α-chloro-β-[3,5-dichloro-4-(2'-methylcyclopentyl)]propionate
ethyl α-chloro-β-[3-chloro-4-(2'-methylcyclohexyl)phenyl]propionate
ethyl α-chloro-β-[3,5-dichloro-4-(2'-methylcyclohexyl)phenyl]propionate
ethyl α-chloro-β-[3-chloro-4-(2'-methylcycloheptyl)phenyl]propionate
ethyl α-chloro-β-[3,5-dichloro-4-(2'-methylcycloheptyl)phenyl]propionate
ethyl α-chloro-β-[3-chloro-4-(3'-methylcyclohexyl)phenyl]propionate
ethyl α-chloro-β-[3,5-dichloro-4-(3'-methylcyclohexyl)phenyl]propionate
ethyl α-chloro-β-[3-chloro-4-(4'-methylcyclohexyl)phenyl]propionate
ethyl α-chloro-β-[3,5-dichloro-4-(4'-methylcyclohexyl)phenyl]propionate
ethyl α-chloro-β-[3-chloro-5-fluoro-(2'-methylcyclohexyl)phenyl]propionate ethyl α-chloro-β-[3-fluoro-5-bromo-(2'-methylcyclohexyl)phenyl]propionate
ethyl α-chloro-β[3-chloro-5-cyano-(2'-methylcyclohexyl)phenyl]propionate
ethyl α-chloro-β-[3-chloro-5-trifluoromethyl-(4'-methylcyclohexyl)phenyl]-propionate
ethyl α-chloro-β-[3-chloro-5-bromo-(4'-methylcyclohexyl)phenyl]propionate
ethyl α-chloro-β-[3-fluoro-5-trifluoromethyl-(4'-methylcyclohexyl)phenyl]-propionate
ethyl α-chloro-β-[3,5-dichloro-(4'-methylcyclohexyl)phenyl]propionate
ethyl α-chloro-β(3-nitro-4-cyclopentylphenyl)propionate
ethyl α-chloro-β-(3-nitro-4-cycloheptylphenyl)propionate
ethyl α-chloro-β-(3,5-dinitro-4-cyclohexylphenyl)-propionate
ethyl α-chloro-β-(3,5-dinitro-4-cyclopentylphenyl)-propionate
ethyl α-chloro-β-(3,5-dinitro-4-cycloheptylphenyl)-propionate
ethyl α-chloro-β-(3-chloro-5-nitro-4-cyclopentylphenyl)propionate
ethyl α-chloro-β-(3-dimethylamino-5-nitro-4-cyclohexylphenyl)propionate
ethyl α-chloro-β-(3-methoxy-5-nitro-4-cyclohexylphenyl)propionate
ethyl α-chloro-β-(3-iodo-5-nitro-4-cyclohexylphenyl)propionate
ethyl α-chloro-β-(3-mercapto-5-nitro-4-cyclohexylphenyl)propionate
ethyl α-chloro-β-(3-methylthio-5-nitro-4-cyclohexylphenyl)propionate
ethyl α-chloro-β-(3-acetylthio-5-nitro-4-cyclohexylphenyl)propionate
ethyl α-chloro-β-(3-acetyloxy-5-nitro-4-cyclohexylphenyl)propionate
ethyl α-chloro-β-(3-acetylamino-5-nitro-4-cyclohexylphenyl)propionate
ethyl α-chloro-β-(3-methylsulfonyl-5-nitro-4-cyclohexylphenyl)propionate
ethyl α-chloro-β-(3-trifluoromethyl-5-methylsulfonyl-4-cyclohexylphenyl)-propionate
ethyl α-chloro-β-(3-nitro-5-methylsulfonyl-4-cyclohexylphenyl)propionate
ethyl α-chloro-β-(3-bromo-5-methylsulfonyl-4-cyclohexylphenyl)propionate
ethyl α-chloro-β-(3-chloro-5-methylsulfonyl-4-cyclohexylphenyl)propionate
ethyl α-chloro-β-(3-methylsulfinyl-4-cyclohexylphenyl)propionate
ethyl α-chloro-β-(3-methylsulfonyl-4-cyclohexylphenyl)propionate
ethyl α-chloro-β-(3-iodo-4-cyclohexylphenyl)propionate
ethyl α-chloro-β-(3-mercapto-4-cyclohexylphenyl)propionate
ethyl α-chloro-β-(3-chloro-5-iodo-4-cyclohexylphenyl)propionate
ethyl α-chloro-β-(3-chloro-5-mercapto-4-cyclohexylphenyl)propionate
ethyl α-chloro-β-(3-iodo-5-fluoro-4-cyclohexylphenyl)propionate
ethyl α-chloro-β-(3-mercapto-5-fluoro-4-cyclohexylphenyl)propionate
ethyl α-chloroβ-(3-iodo-5-bromo-4-cyclohexylphenyl)propionate
ethyl α-chloro-β-(3-iodo-5-acetyl-4-cyclohexylphenyl)propionate
ethyl α-chloro-β-(3-iodo-5-methylsulfonyl-4-cyclohexylphenyl)propionate
ethyl α-chloro-β-[3-nitro-4-(2'-methylcyclopentyl)-phenyl]propionate
ethyl α-chloro-β-[3-nitro-4-(2'-methylcycloheptyl)-phenyl]propionate
ethyl α-chloro-β-[3-nitro-4-(2'-methylcyclohexyl)-phenyl]propionate
ethyl α-chloro-β-[3-nitro-4-(3'-methylcyclohexyl)-phenyl]propionate
ethyl α-chloro-β-[3-nitro-4-(4'-methylcyclohexyl)-phenyl]propionate
ethyl α-chloro-β-[3,5-dinitro-4-(4'-methylcyclohexyl)phenyl]propionate
ethyl α-methyl-α-chloro-β-(3,5-ditrifluoromethyl-4-cyclohexylphenyl)propionate
ethyl α-methyl-α-chloro-β-(3-chloro-4-cyclopentylphenyl)propionate
ethyl α-methyl-α-chloro-β-(3-bromo-4-cyclopentylphenyl)propionate
ethyl α-methyl-α-chloro-β-(3-chloro-4-cyclohexylphenyl)propionate
ethyl α-methyl-α-chloro-β-(3-chloro-4-cycloheptylphenyl)propionate
ethyl α-methyl-α-chloro-β-(3-bromo-4-cycloheptylphenyl)propionate
ethyl α-methyl-α-chloro-β-(3-cyano-4-cyclohexylphenyl)propionate
benzyl α-methyl-α-chloro-β-(3-cyano-4-cyclohexylphenyl)propionate
ethyl α-methyl-α-chloro-β-(3-trifluoromethyl-4-cyclohexylphenyl)propionate
ethyl α-methyl-α-chloro-β-(3-dimethylamino-4-cyclohexylphenyl)propionate
ethyl α-methyl-α-chloro-β-(3-fluoro-4-cyclohexylphenyl)propionate
ethyl α-methyl-α-chloro-β-(3-hydroxy-4-cyclohexylphenyl)propionate
ethyl α-methyl-α-chloro-α-(3-methoxy-4-cyclohexylphenyl)propionate
ethyl α-methyl-α-chloro-β-(3-bromo-4-cyclohexylphenyl)propionate
ethyl α-methyl-α-chloro-β-(3-acetyl-4-cyclohexylphenyl)propionate
ethyl α-methyl-α-chloro-β-(3,2'-dimethyl-4-cyclohexylphenyl)propionate
ethyl α-methyl-α-chloro-α-(3-methyl-4-cyclohexylphenyl)propionate
ethyl α-methyl-α-chloro-β-(3-nitro-5-methyl-4-cyclohexylphenyl)propionate
ethyl α-methyl-α-chloro-β-(3-nitro-5-fluoro-4-cyclohexylphenyl)propionate
ethyl α-methyl-α-chloro-β-(3-chloro-5-nitro-4-cyclohexylphenyl)propionate
ethyl α-methyl-α-chloro-β-(3-nitro-5-bromo-4-cyclohexylphenyl)propionate
ethyl α-methyl-α-chloro-β-(3-nitro-5-trifluoromethyl-4-cyclohexylphenyl)-propionate
ethyl α-methyl-α-chloro-β-(3-nitro-3-amino-5-cyano-4-cyclohexylphenyl)propionate
ethyl α-methyl-α-chloro-β-(3-chloro-5-dimethylamino-4-cyclohexylphenyl)propionate ethyl α-methyl-α-chloro-β-(3-chloro-5-cyano-4-cyclohexylphenyl)propionate
benzyl α-methyl-α-chloro-β-(3-chloro-5-cyano-4-cyclohexylphenyl)propionate
ethyl α-methyl-α-chloro-β-(3-chloro-5-fluoro-4-cyclohexylphenyl)propionate
ethyl α-methyl-α-chloro-β-(3-chloro-5-trifluoromethyl-4-cyclohexylphenyl)-propionate
ethyl α-methyl-α-chloro-β-(3-chloro-5-methyl-4-cyclohexylphenyl)propionate
ethyl α-methyl-α-chloro-β-(3-chloro-5-methylsulfonyl-4-cyclohexylphenyl)-propionate
ethyl α-methyl-α-chloro-β-(3-chloro-5-iodo-4-cyclohexylphenyl)propionate
ethyl α-methyl-α-chloro-β-(3-chloro-5-fluoro-4-cyclohexylphenyl)propionate
ethyl α-methyl-α-chloro-β-(3-chloro-5-methoxy-4-cyclohexylphenyl)propionate
ethyl α-methyl-α-chloro-β-(3-chloro-5-methyl-4-cyclohexylphenyl)propionate
ethyl α-methyl-α-chloro-β-(3-chloro-5-bromo-4-cyclohexylphenyl)propionate
ethyl α-methyl-α-chloro-β-(3-methyl-5-fluoro-4-cyclohexylphenyl)propionate
ethyl α-methyl-α-chloro-β-(3-methyl-5-bromo-4-cyclohexylphenyl)propionate
ethyl α-methyl-α-chloro-β-(3-methyl-5-trifluoromethyl-4-cyclohexylphenyl)-propionate
ethyl α-methyl-α-chloro-β-(3-chloro-5-acetyl-4-cyclohexylphenyl)propionate
ethyl α-methyl-α-chloro-β-(3-methyl-5-nitro-4-cyclohexylphenyl)propionate
ethyl α-methyl-α-chloro-β-(3,5-difluoro-4-cyclohexylphenyl)propionate
ethyl α-methyl-α-chloro-β-(3-cyano-5-fluoro-4-cyclohexylphenyl)propionate
benzyl α-methyl-α-chloro-β-(3-cyano-5-fluoro-4-cyclohexylphenyl)propionate
ethyl α-methyl-α-chloro-β-(3-bromo-5-fluoro-4-cyclohexylphenyl)propionate
ethyl α-methyl-α-chloro-β-(3-acetyl-5-fluoro-4-cyclohexylphenyl)propionate
ethyl α-methyl-α-chloro-β-(3-cyano-5-bromo-4-cyclohexylphenyl)propionate
benzyl α-methyl-α-chloro-β-(3-cyano-5-bromo-4-cyclohexylphenyl)propionate
ethyl α-methyl-α-chloro-β-(3,5-dibromo-4-cyclohexylphenyl)propionate
ethyl α-methyl-α-chloro-β-(3-acetyl-5-bromo-4-cyclohexylphenyl)propionate
ethyl α-methyl-α-chloro-β-(3-fluoro-5-trifluoromethyl-4-cyclohexylphenyl)-propionate
ethyl α-methyl-α-chloro-β-(3-cyano-5-trifluoromethyl-4-cyclohexylphenyl)-propionate
ethyl α-methyl-α-chloro-β-(3-dimethylamino-5-trifluoromethyl-4-cyclohexylphenyl)propionate
ethyl α-methyl-α-chloro-β-(3-bromo-5-trifluoromethyl-4-cyclohexylphenyl)-propionate
ethyl α-methyl-α-chloro-β-(3-hydroxy-5-trifluoromethyl-4-cyclohexylphenyl)-propionate
ethyl α-methyl-α-chloro-β-(3-acetyl-5-trifluoromethyl-4-cyclohexylphenyl)-propionate
ethyl α-methyl-α-chloro-β-(3,5-ditrifluoromethyl-4-cyclohexylphenyl)propionate
ethyl α-methyl-α-chloro-β-(3,5-dichloro-4-cyclopentylphenyl)propionate
ethyl α-methyl-α-chloro-β-(3,5-dichloro-4-cycloheptylphenyl)propionate
methyl α-methyl-α-chloro-β-(3-chloro-4-cyclohexylphenyl)propionate
methyl α-methyl-α-chloro-β-(3,5-dichloro-4-cyclohexylphenyl)propionate
propyl α-methyl-α-chloro-β-(3-chloro-4-cyclohexylphenyl)propionate
propyl α-methyl-α-chloro-β-(3,5-dichloro-4-cyclohexylphenyl)propionate
i-propyl α-methyl-α-chloro-β-(3-chloro-4-cyclohexylphenyl)propionate
i-propyl α-methyl-α-chloro-β-(3,5-dichloro-4-cyclohexylphenyl)propionate
t-butyl α-methyl-α-chloro-β-(3-chloro-4-cyclohexylphenyl)propionate
t-butyl α-methyl-α-chloro-β-(3,5-dichloro-4-cyclohexylphenyl)propionate
ethyl α-methyl-α-chloro-β-[3-chloro-4-(2'-methylcyclopentyl)phenyl]propionate
ethyl α-methyl-α-chloro-β-[3,5-dichloro-4-(2'-methylcyclopentyl)phenyl]-propionate
ethyl α-methyl-α-chloro-β-[3-chloro-4-(2'-methylcyclohexyl)phenyl]propionate
ethyl α-methyl-α-chloro-β-[3,5-dichloro-4-(2'-methylcyclohexyl)phenyl]propionate
ethyl α-methyl-α-chloro-β-[3-chloro-4-(2'-methylcycloheptyl)phenyl]propionate
ethyl α-methyl-α-chloro-β-[3,5-dichloro-4-(2'-methylcycloheptyl)phenyl]-propionate
ethyl α-methyl-α-chloro-β-[3-chloro-4-(3'-methylcyclohexyl)phenyl]propionate
ethyl α-methyl-α-chloro-β-(3,5-dichloro-4-(3'-methylcyclohexyl)phenyl]propionate
ethyl α-methyl-α-chloro-β-[3-chloro-4-(4'-methylcyclohexyl)phenyl]propionate
ethyl α-methyl-α-chloro-β-[3,5-dichloro-4-(4'-methylcyclohexyl)phenyl]propionate
ethyl α-methyl-α-chloro-β-[3-chloro-5-fluoro-(2'-methylcyclohexyl)-phenyl]propionate
ethyl α-methyl-α-chloro-β-[3-fluoro-5-bromo-(2'-methylcyclohexyl)-phenyl]propionate
ethyl α-methyl-α-chloro-β-[3-chloro-5-cyano-(2'-methylcyclohexyl)-phenyl]propionate
ethyl α-methyl-α-chloro-β-[3-chloro-5-trifluoromethyl-(4'-methylcyclohexyl)-phenyl]propionate
ethyl α-methyl-α-chloro-β-[3-chloro-5-bromo-(4'-methylcyclohexyl)phenyl]-propionate
ethyl α-methyl-α-chloro-β-[3-fluoro-5-trifluoromethyl-(4'-methylcyclohexyl)phenyl]propionate
ethyl α-methyl-α-chloro-β-[3,5-dichloro-(4'-methylcyclohexyl)phenyl]propionate
ethyl α-methyl-α-chloro-β-(3-nitro-4-cyclopentylphenyl)propionate
ethyl α-methyl-α-chloro-β-(3-nitro-4-cycloheptylphenyl)propionate
ethyl α-methyl-α-chloro-β-(3,5-dinitro-4-cyclohexylphenyl)propionate
ethyl α-methyl-α-chloro-β-(3,5-dinitro-4-cyclopentylphenyl)propionate
ethyl α-methyl-α-chloro-β-(3,5-dinitro-4-cycloheptylphenyl)propionate
ethyl α-methyl-α-chloro-β-(3-chloro-5-nitro-4-cyclopentylphenyl)propionate ethyl α-methyl-α-chloro-β-(3-dimethylamino-5-nitro-4-cyclohexylphenyl)-propionate
ethyl α-methyl-α-chloro-β-(3-methoxy-5-nitro-4-cyclohexylphenyl)propionate
ethyl α-methyl-α-chloro-β-(3-iodo-5-nitro-4-cyclohexylphenyl)propionate
ethyl α-methyl-α-chloro-β-(3-mercapto-5-nitro-4-cyclohexylphenyl)propionate
ethyl α-methyl-α-chloro-β-(3-methylthio-5-nitro-4-cyclohexylphenyl)propionate
ethyl α-methyl-α-chloro-β-(3-acetylthio-5-nitro-4-cyclohexylphenyl)propionate
ethyl α-methyl-α-chloro-β-(3-acetyloxy-5-nitro-4-cyclohexylphenyl)propionate
ethyl α-methyl-α-chloro-β-(3-acetylamino-5-nitro-4-cyclohexylphenyl)propionate
ethyl α-methyl-α-chloro-β-(3-methylsulfonyl-5-nitro-4-cyclohexylphenyl)-propionate
ethyl α-methyl-α-chloro-β-(3-trifluoromethyl-5-methylsulfonyl-4-cyclohexyl-phenyl)propionate
ethyl α-methyl-α-chloro-β-(3-nitro-5-methylsulfonyl-4-cyclohexylphenyl)-propionate
ethyl α-methyl-α-chloro-β-(3-bromo-5-methylsulfonyl-4-cyclohexylphenyl)-propionate
ethyl α-methyl-α-chloro-β-(3-chloro-5-methylsulfonyl-4-cyclhexylphenyl)-propionate
ethyl α-methyl-α-chloro-β-(3-methylsulfinyl-4-cyclohexylphenyl)propionate
ethyl α-methyl-α-chloro-β-(3-methylsulfonyl-4-cyclohexylphenyl)propionate
ethyl α-methyl-α-chloro-β-(3-iodo-4-cyclohexylphenyl)propionate
ethyl α-methyl-α-chloro-β-(3-mercapto-4-cyclohexylphenyl)propionate
ethyl α-methyl-α-chloro-β-(3-chloro-5-iodo-4-cyclohexylphenyl)propionate
ethyl α-methyl-α-chloro-β-(3-chloro-5-mercapto-4-cyclohexylphenyl)propionate
ethyl α-methyl-α-chloro-β-(3-iodo-5-fluoro-4-cyclohexylphenyl)propionate
ethyl α-methyl-α-chloro-β-(3-mercapto-5-fluoro-4-cyclohexylphenyl)propionate
ethyl α-methyl-α-chloro-β-(3-iodo-5-bromo-4-cyclohexylphenyl)propionate
ethyl α-methyl-α-chloro-β-(3-iodo-5-acetyl-4-cyclohexylphenyl)propionate
ethyl α-methyl-α-chloro-β-(3-iodo-5-methylsulfonyl-4-cyclohexylphenyl)propionate
ethyl α-methyl-α-chloro-β-[3-nitro-4-(2'-methylcyclopentyl)phenyl]propionate
ethyl α-methyl-α-chloro-β-[3-nitro-4-(2'-methylcycloheptyl)phenyl]propionate
ethyl α-methyl-α-chloro-β-[3-nitro-4-(2'-methylcyclohexyl)phenyl]propionate
ethyl α-methyl-α-chloro-β-[3-nitro-4-(3'-methylcyclohexyl)phenyl]propionate
ethyl α-methyl-α-chloro-β-[3-nitro-4-(4'-methylcyclohexyl)phenyl]propionate
ethyl α-methyl-α-chloro-β-[3,5-dinitro-4-(4'-methylcyclohexyl)phenyl]propionate

EXAMPLE 47

When the procedures of Examples 44–45 are followed but ethyl β-(3-chloro-4-cyclohexylphenyl)lactate is replaced by amides of Table II, Example 43, then the products obtained are shown in Table I, below.

N-methyl-α-chloro-β-(3-chloro-4-cyclohexylphenyl)propionamide
N,N-dimethyl-α-chloro-β-(3-chloro-4-cyclohexylphenyl)propionamide
N-isopropyl-α-chloro-β-(3-chloro-4-cyclohexylphenyl)propionamide
N,N-diethyl-α-chloro-β-(3-chloro-4-cyclohexylphenyl)propionamide
N-methyl-N-ethyl-α-chloro-β-(3-chloro-4-cyclohexylphenyl)propionamide
N-t-butyl-α-chloro-β-(3-chloro-4-cyclohexylphenyl)propionamide
N-cyclopropyl-α-chloro-β-(3-chloro-4-cyclohexylphenyl)propionamide
N,N-pentamethylene-α-chloro-β-(3-chloro-4-cyclohexylphenyl)propionamide
N,N-oxydiethylene-α-chloro-β-(3-chloro-4-cyclohexylphenyl)propionamide
N,N-methylaminodiethylene-α-chloro-β-(3-chloro-4-cyclohexylphenyl)propionamide
N,N-methylaminoethylenetrimethylene-α-chloro-β-(3-chloro-4-cyclohexylphenyl)-propionamide
N,N-thiotrimethylene-α-chloro-β-(3-chloro-4-cyclohexylphenyl)propionamide When the dl, d and l lactates of this invention are used in the above reaction, then the corresponding amide is prepared.

EXAMPLE 48

α-Chloro-β-(3-chloro-4-cyclohexylphenyl)propionic acid

A mixture of 54.8 g. (0.167 moles) of the ethyl α-chloro-β-(3-chloro-4-cyclohexylphenyl)propionate and 160 ml. of glacial acetic acid containing 40 ml. of 37 percent hydrochloric acid is refluxed for 20 hours. The mixture is concentrated under reduced pressure to give a gummy residue. The latter material is dissolved in 300 ml. of n-hexane, washed with icecold water (100 ml. total), dried over sodium sulfate and filtered. The hexane is removed to give α-chloro-β-(3-chloro-4-cyclohexylphenyl)propionic acid.

EXAMPLE 49

α-Methyl-α-chloro-β-(3,5-dichloro-4-cyclohexylphenyl)propionic acid

A solution of 24.6 g. of ethyl α-methyl-α-chloro-β-(3,5-dichloro-4-cyclohexylphenyl)propionate dissolved in 50 ml. of glacial acetic acid is heated for 24 hours with 75 ml. of concentrated hydrochloric acid. The solvent is then removed and the residue dissolved in 180 ml. of n-hexane. The hexane solution is then washed with cold water, dried over sodium sulfate and evaporated in vacuo to dryness. The residue is then triturated with n-hexane and filtered. The filtrate is then concentrated in vacuo to obtain α-methyl-α-chloro-β-(3,5-dichloro-4-cyclohexylphenyl)propionic acid.

EXAMPLE 50

When the procedures of Examples 48–49 are followed but ethyl α-chloro-β-(3-chloro-4-cyclohexylphenyl)propionate and ethyl α-methyl-α-chloro-β-(3,5-dichloro-4-cyclohexylphenyl)propionate are replaced by the dl, d and l α-chloroacetates of this invention, then the corresponding dl, d and l α-chloroacetic acids are prepared. A representative list of the products obtained are shown in Table I, below.

TABLE I

α-chloro-β-(3,5-ditrifluoromethyl-4-cyclohexylphenyl)propionic acid  α-chloro-β-(3-chloro-4-cyclopentylphenyl)propionic acid
α-chloro-β-(3-bromo-4-cyclopentylphenyl)propionic acid
α-chloro-β-(3-chloro-4-cycloheptylphenyl)propionic acid
α-chloro-β-(3-bromo-4-cycloheptylphenyl)propionic acid
α-chloro-β-(3-cyano-4-cyclohexylphenyl)propionic acid
α-chloro-β-(3-cyano-4-cyclohexylphenyl)propionic acid
α-chloro-β-(3-trifluoromethyl-4-cyclohexylphenyl)propionic acid
α-chloro-β-(3-dimethylamino-4-cyclohexylphenyl)propionic acid
α-chloro-β-(3-fluoro-4-cyclohexylphenyl)propionic acid
α-chloro-β-(3-hydroxy-4-cyclohexylphenyl)propionic acid
α-chloro-β-(3-methoxy-4-cyclohexylphenyl)propionic acid
α-chloro-β-(4-bromo-4-cyclohexylphenyl)propionic acid
α-chloro-β-(3-acetyl-4-cyclohexylphenyl)propionic acid
α-chloro-β-(3,2'-dimethyl-4-cyclohexylphenyl)propionic acid
α-chloro-β-(3-methyl-4-cyclohexylphenyl)propionic acid
α-chloro-β-(5-methyl-3-nitro-4-cyclohexylphenyl)propionic acid
α-chloro-β-(3-nitro-5-fluoro-4-cyclohexylphenyl)propionic acid
α-chloro-β-(3-chloro-5-nitro-4-cyclohexylphenyl)propionic acid
α-chloro-β-(3-nitro-5-bromo-4-cyclohexylphenyl)propionic acid
α-chloro-β-(3-nitro-5-trifluoromethyl-4-cyclohexylphenyl)propionic acid
α-chloro-β-(3-nitro-3-amino-5-cyano-4-cyclohexylphenyl)propionic acid
α-chloro-β-(3-chloro-5-dimethylamino-4-cyclohexylphenyl)propionic acid
α-chloro-β-(3-chloro-5-cyano-4-cyclohexylphenyl)propionic acid
α-chloro-β-(3-chloro-5-cyano-4-cyclohexylphenyl)propionic acid
α-chloro-β-(3-chloro-5-fluoro-4-cyclohexylphenyl)propionic acid
α-chloro-β-(3-chloro-5-trifluoromethyl-4-cyclohexylphenyl)propionic acid
α-chloro-β-(5-methyl-3-chloro-4-cyclohexylphenyl)propionic acid
α-chloro-β-(3-chloro-5-methylsulfonyl-4-cyclohexylphenyl)propionic acid
α-chloro-β-(3-chloro-5-iodo-4-cyclohexylphenyl)propionic acid
α-chloro-β-(3-chloro-5-fluoro-4-cyclohexylphenyl)propionic acid
α-chloro-β-(3-chloro-5-methoxy-4-cyclohexylphenyl)propionic acid
α-chloro-β-(5-methyl-3-chloro-4-cyclohexylphenyl)propionic acid
α-chloro-β-(3-chloro-5-bromo-4-cyclohexylphenyl)propionic acid
α-chloro-β-(3-methyl-5-fluoro-4-cyclohexylphenyl)propionic acid
α-chloro-β-(3-methyl-5-bromo-4-cyclohexylphenyl)propionic acid
α-chloro-β-(3-methyl-5-trifluoromethyl-4-cyclohexylphenyl)propionic acid
α-chloro-β-(3-chloro-5-acetyl-4-cyclohexylphenyl)propionic acid
α-chloro-β-(3-methyl-5-nitro-4-cyclohexylphenyl)propionic acid
α-chloro-β-(3,5-difluoro-4-cyclohexylphenyl)propionic acid
α-chloro-β-(3-cyano-5-fluoro-4-cyclohexylphenyl)propionic acid
α-chloro-β-(3-cyano-5-fluoro-4-cyclohexylphenyl)propionic acid
α-chloro-β-(3-bromo-5-fluoro-4-cyclohexylphenyl)propionic acid
α-chloro-β-(3-acetyl-5-fluoro-4-cyclohexylphenyl)propionic acid
α-chloro-β-(3-cyano-5-bromo-4-cyclohexylphenyl)propionic acid
α-chloro-β-(3,5-dibromo-4-cyclohexylphenyl)propionic acid
α-chloro-β-(3-acetyl-5-bromo-4-cyclohexylphenyl)propionic acid
α-chloro-β-(3-fluoro-5-trifluoromethyl-4-cyclohexylphenyl)propionic acid
α-chloro-β-(3-cyano-5-trifluoromethyl-4-cyclohexylphenyl)propionic acid
α-chloro-β-(3-dimethylamino-5-trifluoromethyl-4-cyclohexylphenyl)propionic acid
α-chloro-β-(3-bromo-5-trifluoromethyl-4-cyclohexylphenyl)propionic acid
α-chloro-β-(3-hydroxy-5-trifluoromethyl-4-cyclohexylphenyl)propionic acid
α-chloro-β-(3-acetyl-5-trifluoromethyl-4-cyclohexylphenyl)propionic acid
α-chloro-β-(3,5-ditrifluoromethyl-4-cyclohexylphenyl)propionic acid
α-chloro-β-(3,5-dichloro-4-cyclopentylphenyl)propionic acid
α-chloro-β-(3-chloro-4-cyclohexylphenyl)propionic acid
α-chloro-β-(3,5-dichloro-4-cyclohexylphenyl)propionic acid
α-chloro-β-[3-chloro-4-(2'-methylcyclopentyl)phenyl]propionic acid
α-chloro-β-[3,5-dichloro-4-(2'-methylcyclopentyl)phenyl]propionic acid
α-chloro-β-[3-chloro-4-(2'-methylcyclohexyl)phenyl]propionic acid
α-chloro-β-[3,5-dichloro-4-(2'-methylcyclohexyl)phenyl]propionic acid
α-chloro-β-[3-chloro-4-(2'-methylcycloheptyl)phenyl]propionic acid
α-chloro-β-[3,5-dichloro-4-(2'-methylcycloheptyl)phenyl]propionic acid
α-chloro-β-[3-chloro-4-(3'-methylcyclohexyl)phenyl]propionic acid
α-chloro-β-[3,5-dichloro-4-(3'-methylcyclohexyl)phenyl]propionic acid
α-chloro-β-[3-chloro-4-(4'-methylcyclohexyl)phenyl]propionic acid α-chloro-β-[3,5-dichloro-4-(4'-methylcyclohexyl)-phenyl]propionic acid
α-chloro-β-[3-chloro-5-fluoro-(2'-methylcyclohexyl)phenyl]propionic acid
α-chloro-β-[3-fluoro-5-bromo-(2'-methylcyclohexyl)phenyl]propionic acid
α-chloro-β-[3-chloro-5-cyano-(2'-methylcyclohexyl)phenyl]propionic acid
α-chloro-β-[3-chloro-5-trifluoromethyl-(4'-methylcyclohexyl)phenyl]propionic acid
α-chloro-β-[3-chloro-5-bromo-(4'-methylcyclohexyl)phenyl]propionic acid
α-chloro-β-[3-fluoro-5-trifluoromethyl-(4'-methylcyclohexyl)phenyl]-propionic acid
α-chloro-β-[3,5-dichloro-(4'-methylcyclohexyl)-phenyl]propionic acid
α-chloro-β-(3-nitro-4-cyclopentylphenyl)propionic acid
α-chloro-β-(3-nitro-4-cycloheptylphenyl)propionic acid
α-chloro-β-(3,5-dinitro-4-cyclohexylphenyl)propionic acid
α-chloro-β-(3,5-dinitro-4-cyclopentylphenyl)propionic acid
α-chloro-β-(3,5-dinitro-4-cycloheptylphenyl)propionic acid
α-chloro-β-(3-chloro-5-nitro-4-cyclopentylphenyl)-propionic acid
α-chloro-β-(3-dimethylamino-5-nitro-4-cyclohexylphenyl)propionic acid α-chloro-β-(3-methoxy-5-nitro-4-cyclohexylphenyl)propionic acid
α-chloro-β-(3-iodo-5-nitro-4-cyclohexylphenyl)propionic acid
α-chloro-β-(3-mercapto-5-nitro-4-cyclohexylphenyl)propionic acid
α-chloro-β-(3-methylthio-5-nitro-4-cyclohexylphenyl)propionic acid
α-chloro-β-(3-acetylthio-5-nitro-4-cyclohexylphenyl)propionic acid
α-chloro-β-(3-acetyloxy-5-nitro-4-cyclohexylphenyl)propionic acid
α-chloro-β-(3-acetylamino-5-nitro-4-cyclohexylphenyl)propionic acid
α-chloro-β-(3-methylsulfonyl-5-nitro-4-cyclohexylphenyl)propionic acid
α-chloro-β-(3-trifluoromethyl-5-methylsulfonyl-4-cyclohexylphenyl)-propionic acid
α-chloro-β-(3-nitro-5-methylsulfonyl-4-cyclohexylphenyl)propionic acid
α-chloro-β-(3-bromo-5-methylsulfonyl-4-cyclohexylphenyl)propionic acid
α-chloro-β-(3-chloro-5-methylsulfonyl-4-cyclohexylphenyl)propionic acid
α-chloro-β-(3-methylsulfinyl-4-cyclohexylphenyl)-propionic acid
α-chloro-β-(3-methylsulfonyl-4-cyclohexylphenyl)-propionic acid
α-chloro-β-(3-iodo-4-cyclohexylphenyl)propionic acid
α-chloro-β-(3-mercapto-4-cyclohexylphenyl)propionic acid
α-chloro-β-(3-chloro-5-iodo-4-cyclohexylphenyl)-propionic acid
α-chloro-β-(3-chloro-5-mercapto-4-cyclohexylphenyl)propionic acid
α-chloro-β-(3-iodo-5-fluoro-4-cyclohexylphenyl)-propionic acid
α-chloro-β-(3-mercapto-5-fluoro-4-cyclohexylphenyl)propionic acid
α-chloro-β-(3-iodo-5-bromo-4-cyclohexylphenyl)-propionic acid
α-chloro-β-(3-iodo-5-acetyl-4-cyclohexylphenyl)-propionic acid
α-chloro-β-(3-iodo-5-methylsulfonyl-4-cyclohexylphenyl)propionic acid
α-chloro-β-[3-nitro-4-(2'-methylcyclopentyl)-phenyl]propionic acid
α-chloro-β-[3-nitro-4-(2'-methylcycloheptyl)-phenyl]propionic acid
α-chloro-β-[3-nitro-4-(2'-methylcyclohexyl)-phenyl]propionic acid
α-chloro-β-[3-nitro-4-(3'-methylcyclohexyl)-phenyl]propionic acid
α-chloro-β-[3-nitro-4-(4'-methylcyclohexyl)-phenyl]propionic acid
α-chloro-β-[3,5-dinitro-4-(4'-methylcyclohexyl)-phenyl]propionic acid
α-methyl-α-chloro-β-(3,5-ditrifluoromethyl-4-cyclohexylphenyl)propionic acid
α-methyl-α-chloro-β-(3-chloro-4-cyclopentylphenyl)propionic acid
α-methyl-α-chloro-β-(3-bromo-4-cyclopentylphenyl)propionic acid
α-methyl-α-chloro-β-(3-chloro-4-cycloheptylphenyl)propionic acid
α-methyl-α-chloro-β-(3-bromo-4-cycloheptylphenyl)propionic acid
α-methyl-α-chloro-β-(3-cyano-4-cyclohexylphenyl)-propionic acid
α-methyl-α-chloro-β-(3-cyano-4-cyclohexylphenyl)-propionic acid
α-methyl-α-chloro-β-(3-trifluoromethyl-4-cyclohexylphenyl)propionic acid
α-methyl-α-chloro-β-(3-dimethylamino-4-cyclohexylphenyl)propionic acid
α-methyl-α-chloro-β-(3-fluoro-4-cyclohexylphenyl)-propionic acid
α-methyl-α-chloro-β-(3-hydroxy-4-cyclohexylphenyl)propionic acid
α-methyl-α-chloro-β-(3-methoxy-4-cyclohexylphenyl)propionic acid
α-methyl-α-chloro-β-(4-bromo-4-cyclohexylphenyl)propionic acid
α-methyl-α-chloro-β-(3-acetyl-4-cyclohexylphenyl)-propionic acid
α-methyl-α-chloro-β-(3,2'-dimethyl-4-cyclohexylphenyl)propionic acid
α-methyl-α-chloro-β-(3-methyl-4-cyclohexylphenyl)propionic acid
α-methyl-α-chloro-β-(5-methyl-3-nitro-4-cyclohexylphenyl)propionic acid
α-methyl-α-chloro-β-(3-nitro-5-fluoro-4-cyclohexylphenyl)propionic acid
α-methyl-α-chloro-β-(3-chloro-5-nitro-4-cyclohexylphenyl)propionic acid
α-methyl-α-chloro-β-(3-nitro-5-bromo-4-cyclohexylphenyl)propionic acid
α-methyl-α-chloro-β-(3-nitro-5-trifluoromethyl-4-cyclohexylphenyl)-propionic acid
α-methyl-α-chloro-β-(3-nitro-3-amino-5-cyano-4-cyclohexylphenyl)propionic acid
α-methyl-α-chloro-β-(3-chloro-5dimethylamino-4-cyclohexylphenyl)propionic acid α-methyl-α-chloro-β-(3-chloro-5-cyano-4-cyclohexylphenyl)propionic acid
α-methyl-α-chloro-β-(3-chloro-5-cyano-4-cyclohexylphenyl)propionic acid
α-methyl-α-chloro-β-(3-chloro-5-fluoro-4-cyclohexylphenyl)propionic acid
α-methyl-α-chloro-β-(3-chloro-5-trifluoromethyl-4-cyclohexylphenyl)-propionic acid
α-methyl-α-chloro-β-(5-methyl-3-chloro-4-cyclohexylphenyl)propionic acid
α-methyl-α-chloro-β(3-chloro-5-methylsulfonyl-4-cyclohexylphenyl)-propionic acid
α-methyl-α-chloro-β-(3-chloro-5-iodo-4-cyclohexylphenyl)propionic acid
α-methyl-α-chloro-β-(3-chloro-5-fluoro-4-cyclohexylphenyl)propionic acid
α-methyl-α-chloro-β-(3-chloro-5-methoxy-4-cyclohexylphenyl)propionic acid
α-methyl-α-chloro-β-(5-methyl-3-chloro-4-cyclohexylphenyl)propionic acid
α-methyl-α-chloro-β-(3-5-bromo-4-cyclohexylphenyl)propionic acid
α-methyl-α-chloro-β-(3-methyl-5-fluoro-4-cyclohexylphenyl)propionic acid
α-methyl-α-chloro-β-(3-methyl-5-bromo-4-cyclohexylphenyl)propionic acid
α-methyl-α-chloro-β-(3-methyl-5-trifluoromethyl-4-cyclohexylphenyl)propionic acid
α-met-yl-α-chloro-β-(3-chloro-5-acetyl-4-cyclohexylphenyl)propionic acid
α-methyl-α-chloro-β-(3-methyl-5-nitro-4-cyclohexylphenyl)propionic acid
α-methyl-α-chloro-β-(3,5-difluoro-4-cyclohexylphenyl)propionic acid
α-methyl-α-chloro-β-(3-cyano-5-fluoro-4-cyclohexylphenyl)propionic acid
α-methyl-α-chloro-β-(3-cyano-5-fluoro-4-cyclohexylphenyl)propionic acid
α-methyl-α-chloro-β-(3-bromo-5-fluoro-4-cyclohexylphenyl)propionic acid
α-methyl-α-chloro-β-(3-acetyl-5-fluoro-4-cyclohexylphenyl)propionic acid
α-methyl-α-chloro-β-(3-cyano-5-bromo-4-cyclohexylphenyl)propionic acid
α-methyl-α-chloro-β-(3,5-dibromo-4-cyclohexylphenyl)propionic acid
α-methyl-α-chloro-β-(3-acetyl-5-bromo-4-cyclohexylphenyl)propionic acid
α-methyl-α-chloro-β-(3-fluoro-5-trifluoromethyl-4-cyclohexylphenyl)-propionic acid
α-methyl-α-chloro-β-(3-cyano-5-trifluoromethyl-4-cyclohexylphenyl)-propionic acid
α-methyl-α-chloro-β-(3-dimethylamino-5-trifluoromethyl-4-cyclohexylphenyl)-propionic acid
α-methyl-α-chloro-β-(3-bromo-5-trifluoromethyl-4-cyclohexylphenyl)propionic acid
α-methyl-α-chloro-β-(3-hydroxy-5-trifluoromethyl-4-cyclohexylphenyl)-propionic acid
α-methyl-α-chloro-β-(3-acetyl-5-trifluoromethyl-4-cyclohexylphenyl)-propionic acid.
α-methyl-α-chloro-β-(3,5-ditrifluoromethyl-4-cyclohexylphenyl)propionic acid
α-methyl-α-chloro-β-(3,5-dichloro-4-cyclopentylphenyl)propionic acid
α-methyl-α-chloro-β-(3-chloro-4-cyclohexylphenyl)-propionic acid
α-methyl-α-chloro-β-(3,5-dichloro-4-cyclohexylphenyl)propionic acid
α-methyl-α-chloro-β-[3-chloro-4(2'-methylcyclopentyl)phenyl]propionic acid
α-methyl-α-chloro-β-[3,5-dichloro-4(2'-methylcyclopentyl)phenyl]-propionic acid
α-methyl-α-chloro-β-[3-chloro-4-(2'-methylcyclohexyl)phenyl]propionic acid
α-methyl-α-chloro-β-[3,5-dichloro-4(2'-methylcyclohexyl)phenyl]propionic acid
α-methyl-α-chloro-β-[3-chloro-4-(2'-methylcycloheptyl)phenyl]propionic acid
α-methyl-α-chloro-β-[3,5-dichloro-4-(2'-methylcycloheptyl)phenyl]propionic acid
α-methyl-α-chloro-β-[3-chloro-4-(3'-methylcyclohexyl)phenyl]propionic acid
α-methyl-α-chloro-β-[3,5-dichloro-4-(3'-methylcyclohexyl)phenyl]propionic acid
α-methyl-α-chloro-β-[3-chloro-4-(4'-methylcyclohexyl)phenyl]propionic acid
α-methyl-α-chloro-β-[3,5-dichloro-4-(4'-methylcyclohexyl)phenyl]propionic acid
α-methyl-α-chloro-β-[3-chloro-5-fluoro-(2'-methylcyclohexyl)phenyl]-propionic acid
α-methyl-α-chloro-β-[3-fluoro-5-bromo-(2'-methylcyclohexyl)phenyl)propionic acid
α-methyl-α-chloro-β-[3-chloro-5-cyano-(2'-methylcyclohexyl)phenyl]propionic acid
α-methyl-α-chloro-β-[3-chloro-5-trifluoromethyl-(4'-methylcyclohexyl)phenyl]-propionic acid
α-methyl-α-chloro-β-[3-chloro-5-bromo-(4'-methylcyclohexyl)phenyl]propionic acid
α-methyl-α-chloro-β-[3-fluoro-5-trifluoromethyl-(4'-methylcyclohexyl)phenyl]-propionic acid
α-methyl-α-chloro-β-[3,5-dichloro-(4'-methylcyclohexyl)phenyl]propionic acid
α-methyl-α-chloro-β-(3-nitro-4-cyclopentylphenyl)-propionic acid
α-methyl-α-chloro-β-(3-nitro-4-cycloheptylphenyl)-propionic acid
α-methyl-α-chloro-β-(3,5-dinitro-4-cyclohexylphenyl)propionic acid
α-methyl-α-chloro-β-(3,5-dinitro-4-cyclopentylphenyl)propionic acid
α-methyl-α-chloro-β-(3,5-dinitro-4-cycloheptylphenyl)propionic acid
α-methyl-α-chloro-β-(3-chloro-5-nitro-4-cyclopentylphenyl)propionic acid
α-methyl-α-chloro-β-(3-dimethylamino-5-nitro-4-cyclohexylphenyl)propionic acid
α-methyl-α-chloro-β-(3-methoxy-5-nitro-4-cyclohexylphenyl)propionic acid
α-methyl-α-chloro-β-(3-iodo-5-nitro-4-cyclohexylphenyl)propionic acid
α-methyl-α-chloro-β-(3-mercapto-5-nitro-4-cyclohexylphenyl)propionic acid
α-methyl-α-chloro-β-(3-methylthio-5-nitro-4-cyclohexylphenyl)propionic acid
α-methyl-α-chloro-β-(3-acetyloxy-5-nitro-4-cyclohexylphenyl)propionic acid
α-methyl-α-chloro-β-(3-acetylamino-5-nitro-4-cyclohexylphenyl)propionic acid
α-methyl-α-chloro-β-(3-methylsulfonyl-5-nitro-4-cyclohexylphenyl)propionic acid
α-methyl-α-chloro-β-(3-trifluoromethyl-5-methylsulfonyl-4-cyclohexylphenyl)-propionic acid α-methyl-α-chloro-β-(3-nitro-5-methylsulfonyl-4-cyclohexylphenyl)propionic acid
α-methyl-α-chloro-β-(3-bromo-5-methylsulfonyl-4-cyclohexylphenyl)propionic acid
α-methyl-α-chloro-β-(3-chloro-5-methylsulfonyl-4-cyclohexylphenyl)propionic acid
α-methyl-α-chloro-β-(3-methylsulfinyl-4-cyclohexylphenyl)propionic acid
α-methyl-α-chloro-β-(3-methylsulfonyl-4-cyclohexylphenyl)propionic acid
α-methyl-α-chloro-β-(3-iodo-4-cyclohexylphenyl)propionic acid
α-methyl-α-chloro-β-(3-mercapto-4-cyclohexylphenyl)propionic acid
α-methyl-α-chloro-β-(3-chloro-5-iodo-4-cyclohexylphenyl)propionic acid
α-methyl-α-chloro-β-(3-chloro-5-mercapto-4-cyclohexylphenyl)propionic acid
α-methyl-α-chloro-β-(3-iodo-5-fluoro-4-cyclohexylphenyl)propionic acid
α-methyl-α-chloro-β-(3-mercapto-5-fluoro-4-cyclohexylphenyl)propionic acid
α-methyl-α-chloro-β-(3-iodo-5-bromo-4-cyclohexylphenyl)propionic acid
α-methyl-α-chloro-β-(3-iodo-5-acetyl-4-cyclohexylphenyl)propionic acid
α-methyl-α-chloro-β-(3-iodo-5-methylsulfonyl-4-cyclohexylphenyl)propionic acid
α-methyl-α-chloro-β[3-nitro-4-(2'-methylcyclopentyl)phenyl]propionic acid
α-methyl-α-chloro-β-[3-nitro-4-(2'-methylcycloheptyl)phenyl]propionic acid
α-methyl-α-chloro-β-[3-nitro-4-(2'-methylcyclohexyl)phenyl)propionic acid
α-methyl-α-chloro-β-[3-nitro-4-(3'-methylcyclohexyl)phenyl]propionic acid
α-methyl-α-chloro-β-[3-nitro-4-(4'-methylcyclohexyl)phenyl]propionic acid
α-methyl-α-chloro-β-[3,5-dinitro-4-(4'-methylcyclohexyl)phenyl]propionic acid

EXAMPLE 51

α-Chloro-β-(3-chloro-4-cyclohexylphenyl)propionic acid, sodium salt

A solution of 12.4 g. of sodium bicarbonate in 135 ml. of water is added dropwise to a stirred solution of 49.3 g. (0.164 moles) of α-chloro-β-(3-chloro-4-cyclohexylphenyl)propionic acid in 150 cc. of methanol. The solvent is removed in vacuo and the residue is dried by repeated distillations with anhydrous ethanol. The crystalline residue is triturated with ether (100 cc.), collected on a filter, and washed with ether. Drying in a vacuum desiccator affords α-chloro-β(3-chloro-4-cyclohexylphenyl)propionic acid, sodium salt.

When an equimolar amount of sodium bicarbonate in the above reaction is replaced by the compounds of Table I below, then the corresponding salt of Table II below is prepared.

TABLE I sodium hydroxide
potassium hydroxide
calcium hydroxide
potassium carbonate
magnesium bicarbonate

TABLE II

α-chloro-β-(3-chloro-4-cyclohexylphenyl)propionic acid, sodium salt
α-chloro-β-(3-chloro-4-cyclohexylphenyl)propionic acid, potassium salt
α-chloro-β-(3-chloro-4-cyclohexylphenyl)propionic acid, calcium salt
α-chloro-β-(3-chloro-4-cyclohexylphenyl)propionic acid, magnesium salt When α-chloro-β-(3-chloro-4-cyclohexylphenyl)propionic acid is replaced by d α-chloro-β-(3-chloro-4-cyclohexylphenyl)propionic acid and l α-chloro-β-(3-chloro-4-cyclohexylphenyl)propionic acid, then the products prepared are:

d α-chloro-β-(3-chloro-4-cyclohexylphenyl)propionic acid, sodium salt
d α-chloro-β-(3-chloro-4-cyclohexylphenyl)propionic acid, potassium salt
d α-chloro-β-(3-chloro-4-cyclohexylphenyl)propionic acid, calcium salt
d α-chloro-β-(3-chloro-4-cyclohexylphenyl)propionic acid, magnesium salt
l α-chloro-β-(3-chloro-4-cyclohexylphenyl)propionic acid, sodium salt
l α-chloro-β-(3-chloro-4-cyclohexylphenyl)propionic acid, potassium salt
l α-chloro-β-(3-chloro-4-cyclohexylphenyl)propionic acid, calcium salt When the dl, d and l α-chloropropionic acid compounds of this invention are used in the above reaction, then the corresponding salt is prepared

EXAMPLE 52

α-Chloro-β-(3-chloro-4-cyclohexylphenyl)propionic acid, diethylammonium salt

Anhydrous diethylamine (0.11 moles) is added dropwise to a stirred solution of α-chloro-β-(3-chloro-4-cyclohexylphenyl)propionic acid (0.10 moles) in 100 ml. of n-hexane at 0°C. The precipitate is collected on a filter, washed with n-hexane, and dried in a vacuum desiccator to obtain α-chloro-β-(3-chloro-4-cyclohexylphenyl)propionic acid, diethylammonium salt.

When diethylamine in the above reaction is replaced by an equimolar amount of the compounds of Table I, below, then the corresponding product of Table II, below is prepared.

TABLE I dimethylamine
β-hydroxyethylamine
piperazine
piperidine
α-methylbenzylamine
cyclohexylamine
triethylamine
phenethylamine

TABLE II

α-chloro-β-(3-chloro-4-cyclohexylphenyl)propionic acid, dimethylammonium salt
α-chloro-β-(3-chloro-4-cyclohexylphenyl)propionic acid, β-hydroxyethylammonium salt
α-chloro-β-(3-chloro-4-cyclohexylphenyl)propionic acid, piperazinium salt α-chloro-β-(3-chloro-4-cyclohexylphenyl)propionic acid, piperidinium salt α-chloro-β-(3-chloro-4-cyclohexylphenyl)propionic acid, α-methylbenzylammonium salt α-chloro-β-(3-chloro-4-cyclohexylphenyl)propionic acid, cyclohexylammonium salt α-chloro-β-(3-chloro-4-cyclohexylphenyl)propionic acid, triethylammonium salt α-chloro-β-(3-chloro-4-cyclohexylphenyl)propionic acid, phenethylammonium salt

EXAMPLE 53

N-isopropyl-α-chloro-β-(3-chloro-4-cyclohexylphenyl)propionamide

A mixture of 5 g. (0.016 moles) of ethyl α-chloro-β-(3-chloro-4-cyclohexylphenyl)propionate and 5.5 ml. of anhydrous ispropylamine are stirred over Linde 4A molecular sieve for 16 hours at room temperature. The reaction mixture is filtered and excess isopropylamine is removed in vacuo. The residue is taken up in ether and washed three times with 15 ml. of 10% hydrochloric acid. The ether layer is dried over sodium sulfate, filtered, and the ether is removed. The residue is triturated with n-hexane and the precipitate is collected to obtain N-isopropyl-α-chloro-β-(3-chloro-4-cyclohexylphenyl)propionamide.

When isopropylamine in the above reaction is replaced by an equimolar amount of the compound of Table I, below then the corresponding product of Table II below is prepared.

Table I

| | |
|---|---|
| diethylamine | isothiazolidine |
| ethylmethylamine | piperidine |
| t-butylamine | morpholine |
| cyclopropylamine | N-methylpiperazine |
| | N-methylhomopiperazine |

TABLE II

N,N-diethyl-α-chloro-β-(3-chloro-4-cyclohexylphenyl)propionamide

N-methyl-N-ethyl-α-chloro-β-(3-chloro-4-cyclohexylphenyl)propionamide

N-t-butyl-α-chloro-β-(3-chloro-4-cyclohexylphenyl)propionamide

N-cyclopropyl-α-chloro-β-(3-chloro-4-cyclohexylphenyl)propionamide

N,N-pentamethylene-α-chloro-β-(3-chloro-4-cyclohexylphenyl)propionamide

N,N-oxydiethylene-α-chloro-β-(3-chloro-4-cyclohexylphenyl)propionamide

N,N-methylaminodiethylene-α-chloro-β-(chloro-4-cyclohexylphenyl)propionamide

N,N-methylaminoethylenetrimethylene-α-chloro-β-(chloro-4-cyclohexylphenyl)-propionamide N,N-thiotrimethylene-α-chloro-β-(3-chloro-4-cyclohexylphenyl)propionamide When isopropylamine in the above reaction is replaced by ammonia, methylamine or dimethylamine and the reaction is carried out in a bomb at 150°C, then the product prepared is α-chloro-β-(3-chloro-4-cyclohexylphenyl)propionamide, N-methyl-α-chloro-β-(3-chloro-4-cyclohexylphenyl)-propionamide or N,-N-dimethyl-α-chloro-β-(3-chloro-4-cyclohexylphenyl)-propionamide.

When dl, or d or l α-chloropropionates of this invention are used in the above reaction, then the corresponding amide is prepared.

EXAMPLE 54

Ethyl α-bromo-β-(3-chloro-4-cyclohexylphenyl)propionate

To 15.6 g. (0.0476 moles) of ethyl β-(3-chloro-4-cyclohexylphenyl)-lactate there is added slowly with stirring at 40°–50°C 23 g. (0.053 moles) of phosphorus pentabromide. The mixture is stirred at room temperature for 16 hours, the diluted with 70 ml. of petroleum ether, and poured into 125 ml. of ice-cold water. The organic phase is separated, washed with saturated aqueous sodium hydrogen carbonate solution, dried over anhydrous sodium sulfate, filtered and the solvent removed in vacuo to obtain ethyl α-bromo-β-(3-chloro-4-cyclohexylphenyl)propionate.

When ethyl β-(3-chloro-4-cyclohexylphenyl)lactate in the above procedure is replaced by d ethyl β-(3-chloro-4-cyclohexylphenyl)lactate, l ethyl β-(3-chloro-4-cyclohexylphenyl)lactate or N-isopropyl-β-(3-chloro-4-cyclohexylphenyl)lactamide, then the products prepared are d ethyl α-bromo-β-(3-chloro-4-cyclohexylphenyl)propionate, l ethyl α-bromo-β-(3-chloro-4-cyclohexylphenyl)lactate or N-isopropyl α-bromo-β-(3-chloro-4-cyclohexylphenyl)lactamide.

when the above procedure is followed using the various lactates and lactamides of this invention, then the corresponding α-bromopropionates and α-bromompropionamides are prepared.

EXAMPLE 55

When a α-bromopropionates of Example 54 are hydrolyzed according to the procedures of Examples 48-50, then the corresponding dl, d and l α-bromo-β-(3-chloro-4-cyclohexylphenyl)propionic acid compounds and the various αbromopropionic acids are prepared.

EXAMPLE 56

When the α-bromopropionic acid compounds are reacted according to the procedures of Examples 51–52, then the corresponding α-bromopropionic acid salts are prepared.

EXAMPLE 57

Ethyl α-fluoro-β-(3-chloro-4-cyclohexylphenyl)propionate

A mixture of 123 g. (0.33 moles) of ethyl α-bromo-β-(3-chloro-4-cyclohexylphe-yl)propionate is vigorously stirred at 130°–140°C with 29 g. (0.5 moles) of potassium fluoride in 100 ml. of ethylene glycol for 12 hours. The reaction mixture is cooled and 400 ml. of water is added and the crude product separates. The aqueous glycol mixture is extracted with ether, the ether is then dried, evaporated to dryness and upon distillation results in ethyl α-fluoro-β-(3-chloro-4-cyclohexylphenyl)propionate.

When ethyl α-bromo-β-(3-chloro-4-cyclohexylphenyl)propionate in the above procedure is replaced by d ethyl α-ethyl α-bromo-β-(3-chloro-4-cyclohexylphenyl)propionate, l ethyl α-bromo3(chloro-4-cyclohexylphenyl)propionate or N-isopropyl α-bromo-β-(3-chloro-4-cyclonexylphenyl)propionamide, then the products prepared are d ethyl α-fluoro-β-(3-chloro- 4-cyclohexylphenyl)-propionate, l ethyl α-fluoro-β-(3-chloro-4-cyclohexylphenyl)propionate or N-isopropyl α-fluoro-β-(3,5-dichloro-4-cyclohexylphenyl)propionamide.

When the above procedure is followed using the various α-bromo-propionates and α-bromopropionamides of this invention, then the corresponding α-fluoropropionates and fluoropropionamides are prepared.

EXAMPLE 58

When the α-fluoropropionates of Example 57 are hydrolyzed according to the procedures of Examples 48–50, then the corresponding α-fluoro-β-(3-chloro-4-cyclohexylphenyl)propionic acid compounds and the various α-fluoropropionic acids are prepared.

EXAMPLE 59

When the α-fluoropropionic acid compounds are reacted according to the procedures of Examples 51–52, then the corresponding α-fluoropropionic acid salts are prepared.

EXAMPLE 60

Ethyl α-iodo-β-(3-chloro-4-cyclohexylphenyl)propionate

A mixture of 37.3 g. (0.1 moles) of ethyl α-bromo-β-(3-chloro-4-cyclohexylphenyl)propionate and 150 g. of sodium iodide in 1 liter of anhydrous acetone is refluxed for 4 hours. The reaction mixture is then evaporated to dryness and extracted with ether. The ether is then washed with water, dried and evaporated to dryness to obtain ethyl α-iodo-β-(3-chloro-4-cyclohexylphenyl)propionate.

When ethyl α-bromo-β-(3-chloro-4-cyclohexylphenyl)propionate in the above procedure is replaced by d ethyl α-bromo-β-(3-chloro-4-cyclohexylphenyl)propionate, l ethyl α-bromo-β-(3-bromo-4-cyclohexylphenyl)propionate or N-isopropyl α-bromo-β-(3,5-dichloro-4-cyclohexylphenyl)propionamide, then the products prepared are d ethyl α-iodo-β-(3-chloro-4-cyclohexylphenyl)propionate, l ethyl α-iodo-β-(3-chloro-4-cyclohexylphenyl)propionate or N-isopropyl α-iodo-β-(3-chloro-4-cyclohexylphenyl)propionamide.

When the above procedure is followed using the various α-bromopropionates and α-bromopropionamides of this invention, then the corresponding α-iodopropionates and α-iodopropionamides are prepared.

EXAMPLE 61

When the α-iodopropionates of Example 60 are hydrolyzed according to the procedures of Examples 48–50, then the corresponding α-iodo-β-(3-chloro-4-cyclohexylphenyl)propionic acid compounds and the various α-iodopropionic acids are prepared.

EXAMPLE 62

When the α-iodopropionic acid compounds are reacted according to the procedures of Examples 51–52, then the corresponding α-iodopropionic acid salts are prepared.

EXAMPLE 63

α-mercapto-β-(3-chloro-4-cyclohexylphenyl)propionic acid

A mixture of 14 g. (0.05 moles) of α-chloro-β-(3-chloro-4-cyclohexylphenyl)propionic acid and 5 g. of sodium hydrosulfide in 100 ml. of absolute ethanol and under a nitrogen atmosphere is stirred for 15 hours. The mixture is then acidified with 6 N hydrochloric acid. The solvent is removed in vacuo and the residue is extracted into ether, washed with water, saturated sodium chloride solution, dried and evaporated to dryness to obtain α-mercapto-β-(3-chloro-4-cyclohexylphenyl)propionic acid.

When the α-chloropropionic acids, α-chloropropionates and α-chloropropionamides of this invention are used in the above reaction, then the corresponding α-mercaptopropionic acids, α-mercaptopropionates and α-mercaptopropionamides are prepared.

EXAMPLE 64

α-Methylthio-β-(3-chloro-4-cyclohexylphenyl)propionic acid

Methyl mercaptan is bubbled into a solution of 18.4 g. of potassium t-butoxide in 100 ml. of t-butanol for ¾ hours and under a nitrogen atmosphere. To this is added 12 g. (0.041 moles) of α-chloro-β-(3-chloro-4-cyclohexylphenyl)propionic acid in 60 ml. of dry tetrahydrofuran. The mixture is then refluxed for 3 hours and allowed to stir at room temperature for 15 hours, acidified with 30 ml. of 6 N hydrochloric acid. The solvent is removed in vacuo and the residue extracted into ether, washed with water, saturated sodium chloride solution, dried and evaporated to dryness to obtain α-methylthio-β-(3-chloro-4-cyclohexylphenyl)propionic acid.

When the α-chloropropionic acids, α-chloropropionates and α-chloropropionamides of this invention are used in the above reaction, then the corresponding α-methylthiopropionic acids, α-methylthiopropionates and α-methylthiopropionamides are prepared.

EXAMPLE 65

α-Acetylthio-β-(3-chloro-4-cyclohexylphenyl)propionic acid

To a solution of 600 ml. of anhydrous ethanol and 21 g. (0.317 moles) of potassium hydroxide is added 45 ml. of thioacetic acid dropwise. To this mixture is then added 70 g. (0.244 moles) of α-chloro-β-(3-chloro-4-cyclohexylphenyl)propionic acid and stirring is continued for 15 hours. The solid which forms is filtered off and washed with ethanol. The filtrate is evaporated to dryness and the residue is dissolved in 500 ml. of ether and washed several times with water. Drying the ether and evaporation to dryness results in α-acetylthio-β-(3-chloro-4-cyclohexylphenyl)propionic acid.

In a similar manner, the α-propionylthio-β-(3-chloro-4-cyclohexylphenyl)propionic acid compounds are prepared.

When the α-chloropropionic acids, α-chloropropionates and α-chloropropionamides of this invention are used in the above reaction, then the corresponding α-acetylthiopropionic acids, α-acetylthiopropionates and α-acetylthiopropionamides are prepared.

EXAMPLE 66

α-Benzoylthio-β-(3-chloro-4-cyclohexylphenyl)propionic acid

To 17.5 ml. of 2N alcoholic potassium hydroxide solution (0.035 mole) is added 4.84 g. (0.035 mole) of thiobenzoic acid. The solution is cooled to room temperature and to this is added in small portions 10.05 g.

(0.035 mole) of α-chloro-β-(3-chloro-4-cyclohexylphenyl)propionic acid. The reaction mixture is stirred at room temperature for 25 hours, then the solvent is removed, the residue dissolved in ether, filtered and washed with cold water. The ethereal solution is then dried over magnesium sulfate and evaporated to dryness to obtain α-benzoylthio-β-(3-chloro-4-cyclohexylphenyl)propionic acid.

When the α-chloropropionic acids, α-chloropropionates and α-chloropropionamides of this invention are used in the above reaction, then the corresponding α-benzoylthiopropionic acids, α-benzoylthiopropionates and α-benzoylthiopropionamides are prepared.

EXAMPLE 67

Ethyl α-thioacetylthio-β-(3-chloro-4-cyclohexylphenyl)propionate

A mixture of 0.2 moles of sodium dithioacetate and 38 g. (0.12 moles) of ethyl α-chloro-β-(3-chloro-4-cyclohexylphenyl)propionate in 300 ml. of absolute ethanol is stirred at room temperature for 15 hours. The reaction mixture is filtered, washed with absolute ethanol and evaporated to dryness in vacuo. The residue is treated with ether, filtered and evaporated to dryness to obtain ethyl α-thioacetylthio-β-(3-chloro-4-cyclohexylphenyl)propionate.

When the α-chloropropionic acids, α-chloropropionates and α-chloropropionamides of this invention are used in the above reaction, then the corresponding α-thioacetylthiopropionic acids, α-thioacetylthiopropionates and α-thioacetylthiopropionamides are prepared.

When sodium dithioformate is used in the above procedure in place of sodium dithioacetate then the product prepared is ethyl α-thioformylthio-β-(3-chloro-4-cyclohexylphenyl)propionate.

EXAMPLE 68

α-Thiocyanato-β-(3-chloro-4-cyclohexylphenyl)propionic acid

To a solution of 300 ml. of anhydrous ethanol and 0.15 moles of sodium thiocyanate is added 35 g. (0.12 moles) of α-chloro-β-(3-chloro-4-cyclohexylphenyl)propionic acid and stirred for 15 hours. The reaction mixture is filtered and washed with absolute ethanol. The filtrate is evaporated to dryness, the residue is dissolved in 250 ml. of ether and washed several times with water. The ether is then dried and evaporated to dryness to obtain α-thiocyanato-β-(3-chloro-4-cyclohexylphenyl)propionic acid.

When the α-chloropropionic acids, α-chloropropionate and α-chloropropionamides of this invention are used in the above reaction, then the corresponding α-thiocyanatopropionic acids, α-thiocyanatopropionates and α-thiocyanatopropionamides are prepared.

EXAMPLE 69

α-Sulfo-β-(3-chloro-4-cyclohexylphenyl)propionic acid, disodium salt

To a solution of 250 ml. of anhydrous ethanol and 0.12 moles of sodium sulfite is added 29 g. (0.1 moles) of α-chloro-β-(3-chloro-4-cyclohexylphenyl)propionic acid, sodium salt. The reaction mixture is stirred for 15 hours, filtered and the residue worked with ethanol. The filtrate is evaporated to dryness to obtain α-sulfo-β-(3-chloro-4-cyclohexylphenyl)propionic acid, disodium salt.

When sodium sulfinate is used in the above procedure in place of sodium sulfite, then the product obtained is α-sulfino-β-(3-chloro-4-cyclohexylphenyl)propionic acid, disodium salt.

When the α-chloropropionates and α-chloropropionamides of this invention are used in the above reactions, then the corresponding α-sulfo and α-sulfinopropionates and amides are prepared.

EXAMPLE 70

Ethyl α-thiosulfo-β-(3-chloro-4-cyclohexylphenyl)propionate, sodium salt

A mixture of 7.2 g. (0.023 moles) of ethyl α-chloro-β-(3-chloro-4-cyclohexylphenyl)propionate and 5.7 g. of sodium thiosulfate pentahydrate in 75 ml. of 40.45 water alcohol mixture is refluxed for 2 hours. An additional 0.8 g. of sodium thiosulfate pentahydrate is then added and refluxing continued another ½ hour. The reaction mixture is then evaporated to dryness in vacuo, azeotroped with ethanol and evaporated to dryness in vacuo again. The residue is triturated with ether, filtered and evaporated to dryness. The residue is then triturated with hexane and the resultant gum is dissolved in alcohol and evaporated to dryness in vacuo to obtain ethyl α-thiosulfo-β-(3-chloro-4-cyclohexylphenyl)propionate, sodium salt.

When the α-chloropropionates and α-chloropropionamides of this invention are used in the above reaction, then the corresponding α-thiosulfopropionates and α-thiosulfopropionamides are prepared.

EXAMPLE 71

α-Amidinothio-β-(3-chloro-4-cyclohexylphenyl)propionic acid, hydrochloride

Thiourea 15.2 g. (0.2 moles) is dissolved in 150 ml. of absolute ethanol and to this is added 31.6 g. (0.11 moles) of α-chloro-β-(3-chloro-4-cyclohexylphenyl)propionic acid. The mixture is stirred for 15 hours at 0°C. The mixture is then filtered to obtain α-amidinothio-β-(3-chloro-4-cyclohexylphenyl)propionic acid, hydrochloride.

When the α-chloropropionic acids, esters and amides of this invention are used in the above procedures then the corresponding α-amidinopropionic acids, esters and amides are prepared.

EXAMPLE 72

α-Ethoxythiocarbamylthio-β-(3-chloro-4-cyclohexylphenyl)propionic acid

Ethylxanthic acid, potassium salt, 3.63 g. (0.22 moles) is dissolved in 150 ml. of absolute ethanol with stirring. To this sollution is added 3.16 g. (0.11 moles of α-chloro-β-(3-chloro-4-cyclohexylphenyl)propionic acid and the mixture stirred for 15 hours. The solid which collects is separated and washed with absolute ethanol. The solid is then treated with acetone and the insoluble material filtered off. The filtrate is concentrated to dryness to obtain α-ethoxythiocarbamylthio-β-(3-chloro-4-cyclohexylphenyl)propionic acid.

When the α-chloropropionic acids, esters and amides of this invention are used in the above procedure, then the corresponding α-ethylxanthylpropionic acids, esters and amides are prepared.

EXAMPLE 73

α-Ethoxycarbonylthio-β-(3-chloro-4-cyclohexyl-phenyl)propionic acid

A solution of α-mercapto-β-(3-chloro-4-cyclohexylphenyl)propionic acid 5.6 g. (0.02 moles) in 25 ml. of pyridine is cooled in an ice bath. To this is added dropwise 2.1 ml. (0.022 moles) of ethyl chloroformate. The mixture is then stirred for 2 hours, diluted with ether and filtered. The mixture is basified with 10 percent sodium bicarbonate solution. The alkaline mixture is worked with ether, then acidified with 10 percent hydrochloric acid, washed with ether, dried and filtered. The solvent is removed and the residue is triturated with hexane to obtain α-ethoxycarbonylthio-β-(3-chloro-4-cyclohexylphenyl)propionic acid.

When the α-mercaptopropionic acids, esters and amides of this invention are used in the above procedure then the corresponding α-ethoxycarbonylthiopropionic acids, esters and amides are prepared.

EXAMPLE 74

α-Diethylcarbamylthio-β-(3-chloro-4-cyclohexyl-phenyl)propionic acid

A solution of α-mercapto-β-(3-chloro-4-cyclohexylphenyl)propionic acid 5.6 g. (0.2 moles) in 25 ml. of pyridine is cooled in an ice bath. To this is added dropwise 0.022 moles of diethylcarbamyl chloride. The mixture is then stirred for 2 hours, diluted with ether and filtered. The mixture is then basified with 10 percent sodium bicarbonate solution. The alkaline mixture is washed with ether, acidified with 10 percent hydrochloric acid, extracted with ether which in turn is washed with cold water, dried and evaporated to dryness. Trituration with hexane results in α-diethylcarbamylthio-β-(3-chloro-4-cyclohexylphenyl)propionic acid.

When diethylcarbamylchloride is replaced in the above procedure by carbamyl chloride (prepared in situ from potassium cyanate and anhydrous hydrogen chloride in anhydrous chloroform), ethylcarbamyl chloride or dimethylcarbamyl chloride, then the products prepared are α-carbamylthio-β-(3-chloro-4-cyclohexylphenyl)propionic acid, α-ethylcarbamylthio-β-(3-chloro-4-cyclohexylphenyl)propionic acid or α-dimethylcarbamylthio-β-(3-chloro-4-cyclohexyl-phenyl)propionic acid.

When the α-mercaptopropionic acids, esters and amides of this invention are used in the above procedure, then the corresponding α-carbamylthiopropionic acids, esters and amides are prepared.

EXAMPLE 75

When the procedure of Example 74 is followed but diethylcarbonate is replaced by succinic anhydride, maleic anhydride or phthalic anhydride, then the products prepared are α-butyrylthio-β-(3-chloro-4-cyclohexylphenyl)propionic acid, α-butenoylthio-β-(3-chloro-4-cyclohexylphenyl)-propionic acid and α-(σ-carboxybenzoylthio-β-(3-chloro-4-cyclohexylphenyl)-propionic acid.

When the various α-mercaptopropionic acids, esters and amides of this invention are used in the above procedure, then the corresponding product is obtained.

EXAMPLE 76

When α-methylthio-β-(3-chloro-4-cyclohexyl-phenyl)propionic acid is treated with 30 percent hydrogen peroxide, then the resultant product is α-methylsulfinyl-β-(3-chloro-4-cyclohexylphenyl)propionic acid or α-methylsulfonyl-β-(3-chloro-4-cyclohexylphenyl)-propionic acid.

Example 77

When the procedures of Examples 1–76 are followed but using the starting materials below, then the corresponding products are obtained.

| STARTING MATERIAL | PRODUCT | EXAMPLE |
|---|---|---|
| α-chloro-β-(3-fluoro-4-cyclohexylphenyl)propionic acid | α-acetylthio-β-(3-fluoro-4-cyclohexylphenyl)propionic acid | 65 |
| α-chloro-β-(3-bromo-4-cyclohexylphenyl)propionic acid | α-acetylthio-β-(3-bromo-4-cyclohexylphenyl)propionic acid | 65 |
| α-chloro-β-(3-iodo-4-cyclohexylphenyl)propionic acid | α-acetylthio-β-(3-iodo-4-cyclohexylphenyl)propionic acid | 65 |
| α-chloro-β-(3-nitro-4-cyclohexylphenyl)propionic acid | α-acetylthio-β-(3-nitro-4-cyclohexylphenyl)propionic acid | 65 |
| α-chloro-β-(3-trifluoromethyl-4-cyclohexylphenyl)propionic acid | α-acetylthio-β-(3-trifluoromethyl-4-cyclohexylphenyl)propionic acid | 65 |
| α-chloro-β-(3-mercapto-4-cyclohexylphenyl)propionic acid | α-acetylthio-β-(3-mercapto-4-cyclohexylphenyl)propionic acid | 65 |
| α-chloro-β-(3-acetylthio-4-cyclohexylphenyl)propionic acid | α-acetylthio-β-(3-acetylthio-4-cyclohexylphenyl)propionic acid | 65 |
| α-chloro-β-(3-methylmercapto-4-cyclohexylphenyl)-propionic acid | α-acetylthio-β-(3-methylmercapto-4-cyclohexylphenyl)propionic acid | 65 |
| α-chloro-β-(3-methylsulfinyl-4-cyclohexylphenyl)propionic acid | α-acetylthio-β-(3-methylsulfinyl-4-cyclohexylphenyl)propionic acid | 65 |
| α-chloro-β-(3-methylsulfonyl-4-cyclohexylphenyl)propionic acid | α-acetylthio-β-(3-methylsulfonyl-4-cyclohexylphenyl)propionic acid | 65 |
| α-chloro-β-(3-cyano-4-cyclohexylphenyl)propionic acid | α-acetylthio-β-(3-cyano-4-cyclohexylphenyl)propionic acid | 65 |
| α-chloro-β-(3-amino-4-cyclohexylphenyl)propionic acid | α-acetylthio-β-(3-amino-4-cyclohexylphenyl)propionic acid | 65 |
| α-chloro-β-(3-acetylamino-4-cyclohexylphenyl)propionic acid | α-acetylthio-β-(3-acetylamino-4-cyclohexylphenyl)propionic acid | 65 |
| α-chloro-β-(3-methylamino-4-cyclohexylphenyl)propionic acid | α-acetylthio-β-(3-methylamino-4-cyclohexylphenyl)propionic acid | 65 |
| α-chloro-β-(3-dimethylamino-4-cyclohexylphenyl)propionic acid | α-acetylthio-β-(3-dimethylamino-4-cyclohexylphenyl)propionic acid | 65 |
| α-chloro-β-(3-hydroxy-4-cyclohexylphenyl)propionic acid | α-acetylthio-β-(3-hydroxy-4-cyclohexylphenyl)propionic acid | 65 |
| α-chloro-β-(3-acetyloxy-4-cyclohexylphenyl)propionic acid | α-acetylthio-β-(3-acetyloxy-4-cyclohexylphenyl)propionic acid | 65 |

Example 77—Continued

When the procedures of Examples 1–76 are followed but using the starting materials below, then the corresponding products are obtained.

| STARTING MATERIAL | PRODUCT | EXAMPLE |
|---|---|---|
| α-chloro-β-(3-methoxy-4-cyclohexylphenyl)propionic acid | α-acetylthio-β-(3-methoxy-4-cyclohexylphenyl)propionic acid | 65 |
| α-chloro-β-(3-acetoxy-4-cyclohexylphenyl)propionic acid | α-acetylthio-β-(3-acetoxy-4-cyclohexylphenyl)propionic acid | 65 |
| α-chloro-β-(3-methyl-4-cyclohexylphenyl)propionic acid | α-acetylthio-β-(3-methyl-4-cyclohexylphenyl)propionic acid | 65 |
| α-chloro-β-(3-chloro-5-fluoro-4-cyclohexylphenyl)propionic acid | α-acetylthio-β-(3-chloro-5-fluoro-4-cyclohexylphenyl)propionic acid | 65 |
| α-chloro-β-(3,5-dichloro-4-cyclohexylphenyl)propionic acid | α-acetylthio-β-(3,5-dichloro-4-cyclohexylphenyl)propionic acid | 65 |
| α-chloro-β-(3-chloro-5-bromo-4-cyclohexylphenyl)propionic acid | α-acetylthio-β-(3-chloro-5-bromo-4-cyclohexylphenyl)propionic acid | 65 |
| α-chloro-β-(3-chloro-5-nitro-4-cyclohexylphenyl)propionic acid | α-acetylthio-β-(3-chloro-5-nitro-4-cyclohexylphenyl)propionic acid | 65 |
| α-chloro-β-(3-chloro-5-trifluoromethyl-4-cyclohexylphenyl)propionic acid | α-acetylthio-β-(3-chloro-5-trifluoromethyl-4-cyclohexylphenyl)propionic acid | 65 |
| α-chloro-β-(3-chloro-5-cyano-4-cyclohexylphenyl)propionic acid | α-acetylthio-β-(3-chloro-5-cyano-4-cyclohexylphenyl)propionic acid | 65 |
| α-chloro-β-(3-chloro-5-methylsulfonyl-4-cyclohexylphenyl)propionic acid | α-acetylthio-β-(3-chloro-5-methylsulfonyl-4-cyclohexylphenyl)propionic acid | 65 |
| α-chloro-β-(3-bromo-5-fluoro-4-cyclohexylphenyl)propionic acid | α-acetylthio-β-(3-bromo-5-fluoro-4-cyclohexylphenyl)propionic acid | 65 |
| α-chloro-β-(3,5-dibromo-4-cyclohexylphenyl)propionic acid | α-acetylthio-β-(3,5-dibromo-4-cyclohexylphenyl)propionic acid | 65 |
| α-chloro-β-(3-bromo-5-nitro-4-cyclohexylphenyl)propionic acid | α-acetylthio-β-(3-bromo-5-nitro-4-cyclohexylphenyl)propionic acid | 65 |
| α-chloro-β-(3-bromo-5-trifluoromethyl-4-cyclohexylphenyl)-α-chloro-β-(3-bromo-5-cyano-4-cyclohexylphenyl)propionic acid | α-acetylthio-β-(3-bromo-5-trifluoromethyl-4-cyclohexylphenyl)propionic acid α-acetylthio-β-(3-bromo-5-cyano-4-cyclohexylphenyl)propionic acid | 65 65 |
| α-chloro-β-(3-bromo-5-methylsulfonyl-4-cyclohexylphenyl)propionic acid | α-acetylthio-β-(3-bromo-5-methylsulfonyl-4-cyclohexylphenyl)propionic acid | 65 |
| α-chloro-β-(3-nitro-5-fluoro-4-cyclohexylphenyl)propionic acid | α-acetylthio-β-(3-nitro-5-fluoro-4-cyclohexylphenyl)propionic acid | 65 |
| α-chloro-β-(3,5-dinitro-4-cyclohexylphenyl)propionic acid | α-acetylthio-β-(3,5-dinitro-4-cyclohexylphenyl)propionic acid | 65 |
| α-chloro-β-(3-nitro-5-trifluoromethyl-4-cyclohexylphenyl)propionic acid | α-acetylthio-β-(3-nitro-5-trifluoromethyl-4-cyclohexylphenyl)propionic acid | 65 |
| α-chloro-β-(3-nitro-5-cyano-4-cyclohexylphenyl)propionic acid | α-acetylthio-β-(3-nitro-5-cyano-4-cyclohexylphenyl)propionic acid | 65 |
| α-chloro-β-(3-nitro-5-methylsulfonyl-4-cyclohexylphenyl)propionic acid | α-acetylthio-β-(3-nitro-5-methylsulfonyl-4-cyclohexylphenyl)propionic acid | 65 |
| α-chloro-β-(3-trifluoromethyl-5-fluoro-4-cyclohexylphenyl)propionic acid | α-acetylthio-β-(3-trifluoromethyl-5-fluoro-4-cyclohexylphenyl)propionic acid | 65 |
| α-chloro-β-(3,5-ditrifluoromethyl-4-cyclohexylphenyl)propionic acid | α-acetylthio-β-(3,5-ditrifluoromethyl-4-cyclohexylphenyl)propionic acid | 65 |
| α-chloro-β-(3-trifluoromethyl-5-cyano-4-cyclohexylphenyl)propionic acid | α-acetylthio-β-(3-trifluoromethyl-5-cyano-4-cyclohexylphenyl)propionic acid | 65 |
| α-chloro-β-(3-trifluoromethyl-5-methylsulfonyl-4-cyclohexylphenyl)propionic acid | α-acetylthioβ-(3-trifluoromethyl-5-methylsulfonyl-4-cyclohexylphenyl)propionic acid | 65 |
| α-chloro-β-(3-fluoro-4-cyclohexylphenyl)propionic acid | α-mercapto-β-(3-fluoro-4-cyclohexylphenyl)propionic acid | 63 |
| α-chloro-β-(3-bromo-4-cyclohexylphenyl)propionic acid | α-propionylthio-β-(3-bromo-4-cyclohexylphenyl)propionic acid | 65 |
| α-chloro-β-(3-nitro-4-cyclohexylphenyl)propionic acid | α-butyrylthio-β-(3-nitro-4-cyclohexylphenyl)propionic acid | 63,75 |
| α-chloro-β-(3-trifluoromethyl-4-cyclohexylphenyl)propionic acid | α-butenoythio-β-(3-trifluoromethyl-4-cyclohexylphenyl)propionic acid | 63,75 |
| α-chloro-β-(3-cyano-4-cyclohexylphenyl)propionic acid | α-benzoylthio-β-(3-cyano-4-cyclohexylphenyl)propionic acid | 66 |
| α-chloro-β-(3-dimethylsulfonyl-4-cyclohexylphenyl)propionic acid | α-methylsulfonyl-β-(3-dimethylsulfonyl-4-cyclohexylphenyl-propionic acid | 64,76 |
| α-chloro-β-(3-chloro-5-fluoro-4-cyclohexylphenyl)propionic acid | α-methylthio-β-(3-chloro-5-fluoro-4-cyclohexylphenyl)propionic acid | 64 |
| α-chloro-β-(3,5-dichloro-4-cyclohexylphenyl)propionic acid | α-diethylcarbamylthio-β-(3,5-dichloro-4-cyclohexylphenyl)propionic acid | 63,74 |
| α-chloro-β-(3-chloro-5-bromo-4-cyclohexylphenyl)propionic acid | α-ethylcarbamylthio-β-(3-chloro-5-bromo-4-cyclohexylphenyl)propionic acid | 63,74 |
| α-chloro-β-(3-chloro-5-nitro-4-cyclohexylphenyl)propionic acid | α-i-propylthio-β-(3-chloro-5-nitro-4-cyclohexylphenyl)propionic acid | 64 |
| α-chloro-β-(3-chloro-5-trifluoromet-yl-4-cyclohexylphenyl)propionic acid | α-thiosulfo-β-(3-chloro-5-trifluoromethyl-4-cyclohexylphenyl)propionic acid | 70 |
| α-chloro-β-(3-chloro-5-cyano-4-cyclohexylphenyl)propionic acid | α-thiocyanato-β-(3-chloro-5-cyano-4-cyclohexylphenyl)propionic acid | 68 |
| α-chloro-β-(3-fluoro-4-cyclohexylphenyl)propionic acid | α-benzoylthio-β-(3-fluoro-4-cyclohexylphenyl)propionic acid | 66 |
| α-chloro-β-(3-bromo-4-cyclohexylphenyl)propionic acid | α-benzoylthio-β-(3-bromo-4-cyclohexylphenyl)propionic acid | 66 |
| α-chloro-β-(3-nitro-4-cyclohexylphenyl)propionic acid | α-sulfino-β-(3-nitro-4-cyclohexylphenyl)propionic acid | 69 |
| α-chloro-β-(3-trifluoromethyl-4-cyclohexylphenyl)propionic acid | α-sulfo-β-(3-trifluoromethyl-4-cyclohexylphenyl)propionic acid | 69 |
| α-chloro-β-(3-cyano-4-cyclohexylphenyl)propionic acid | α-amidinothio-β-(3-cyano-4-cyclohexylphenyl)propionic acid | 71 |
| α-chloro-β-(3-chloro-5-fluoro-4-cyclohexylphenyl)propionic acid | α-benzyloxycarbonylthio-β-(3-chloro-5-fluoro-4-cyclohexylphenyl)propionic acid | 63,73 |
| α-chloro-β-(3,5-dichloro-4-cyclohexylphenyl)propionic acid | α-methylsulfinyl-β-(3,5-dichloro-4-cyclohexylphenyl)propionic acid | 64,76 |
| α-chloro-β-(3,5-chloro-4-cyclohexylphenyl)propionic acid | α-methylsulfonyl-β-(3,5-dichloro-4-cyclohexylphenyl)propionic acid | 64,76 |
| α-chloro-β-(3-chloro-5-nitro-4-cyclohexylphenyl)propionic acid | α-(σ-carboxybenzoylthio)-β-(3-chloro-5-nitro-4-cyclohexylphenyl)propionic acid | 63,75 |

Example 77—Continued

When the procedures of Examples 1–76 are followed but using the starting materials below, then the corresponding products are obtained.

| STARTING MATERIAL | PRODUCT | EXAMPLE |
|---|---|---|
| α-chloro-β-(3-chloro-5-trifluoromethyl-4-cyclohexylphenyl)propionic acid | α-(σ-carboxybenzoylthio)-β-(3-chloro-5-trifluoromethyl-4-cyclohexylphenyl)propionic acid | 63.75 |
| α-chloro-β-(3-chloro-5-cyano-4-cyclohexylphenyl)propionic acid | α-thiosulfo-β-(3-chloro-5-cyano-4-cyclohexylphenyl)propionic acid | 70 |
| methyl α-chloro-β-(3-chloro-4-cyclohexylphenyl)propionate | methyl α-acetylthio-β-(3-chloro-4-cyclohexylphenyl)propionate | 65 |
| ethyl α-chloro-β-(3-chloro-4-cyclohexylphenyl)propionate | ethyl α-acetylthio-β-(3-chloro-4-cyclohexylphenyl)propionate | 65 |
| benzyl α-chloro-β-(3-chloro-4-cyclohexylphenyl)propionate | benzyl α-acetylthio-β-(3-chloro-4-cyclohexylphenyl)propionate | 65 |
| N-methyl-α-chloro-β-(3-chloro-4-cyclohexylphenyl)propionamide | N-methyl α-acetylthio-β-(3-chloro-4-cyclohexylphenyl)propionamide | 65 |
| N,N-dimethyl α-chloro-β-(3-chloro-4-cyclohexylphenyl)propionamide | N,N-dimethyl α-acetylthio-β-(3-chloro-4-cyclohexylphenyl)propionamide | 65 |
| N,N-dimethyl α-chloro-β-(3-chloro-4-cyclohexylphenyl)propionamide | N,N-diethyl α-acetylthio-β-(3-chloro-4-cyclohexylphenyl)propionamide | 65 |
| N,N-ethylmethyl α-chloro-β-(3-chloro-4-cyclohexylphenyl)propionamide | N,N-ethylmethyl α-acetylthio-β-(3-chloro-4-cyclohexylphenyl)propionamide | 65 |
| N-isopropyl α-chloro-β-(3-chloro-4-cyclohexylphenyl)propionamide | N-isopropyl α-acetylthio-β-(3-chloro-4-cyclohexylphenyl)propionamide | 65 |
| N-cyclopropyl α-chloro-β-(3-chloro-4-cyclohexylphenyl)propionamide | N-cyclopropyl α-acetylthio-β-(3-chloro-4-cyclohexylphenyl)propionamide | 65 |
| N,N-pentamethylene α-chloro-β-(3-chloro-4-cyclohexylphenyl)propionamide | N,N-pentamethylene α-acetylthio-β-(3-chloro-4-cyclohexylphenyl)propionamide | 65 |
| N,N-oxydiethylene α-cloro-β-(3-chloro-4-cyclohexylphenyl)propionamide | N,N-oxydiethylene α-acetylthio-β-(3-chloro-4-cyclohexylphenyl)propionamide | 65 |
| N,N-methylaminoethylenetrimethylene α-chloro-β-(3-chloro-4-cyclohexylphenyl)propionamide | N,N-methylaminoethylenetrimethylene α-acetylthio-β-3-chloro-4-cyclohexylphenyl)propionamide | 65 |
| N,N-thiotrimethylene α-chloro-β-(3-chloro-4-cyclohexylphenyl)propionamide | N,N-thiotrimethylene α-acetylthio-β-(3-chloro-4-cyclohexylphenyl)propionamide | 65 |
| α-acetylthio-β-(3-chloro-4-cyclohexylphenyl)propionic acid, sodium salt | α-acetylthio-β-(3-chloro-4-cyclohexylphenyl)propionic acid, sodium salt | 51 |
| α-acetylthio-β-(3-chloro-4-cyclohexylphenyl)propionic acid | α-acetylthio-β-(3-chloro-4-cyclohexylphenyl)propionic acid, potassium salt | 51 |
| α-acetylthio-β-(3-chloro-4-cyclohexylphenyl)propionic acid | α-acetylthio-β-(3-chloro-4-cyclohexylphenyl)propionic acid, calcium salt | 51 |
| α-acetylthio-β-(3-chloro-4-cyclohexylphenyl)propionic acid | α-acetylthio-β-(3-chloro-4-cyclohexylphenyl)propionic acid, aluminum salt | 51 |
| α-acetylthio-β-(3-chloro-4-cyclohexylphenyl)propionic acid | α-acetylthio-β-(3-chloro-4-cyclohexylphenyl)propionic acid, dimethylammonium salt | 52 |
| α-acetylthio-β-(3-chloro-4-cyclohexylphenyl)propionic acid | α-acetylthio-β-(3-chloro-4-cyclohexylphenyl)propionic acid, diethylammonium salt | 52 |
| α-acetylthio-β-(3-chloro-4-cyclohexylphenyl)propionic acid | α-acetylthio-β-(3-chloro-4-cyclohexylphenyl)propionic acid, β-hydroxyethylammonium salt | 52 |
| α-acetylthio-β-(3-chloro-4-cyclohexylphenyl)propionic acid | α-acetylthio-β-(3-chloro-4-cyclohexylphenyl)propionic acid, piperazinium salt | 52 |
| α-acetylthio-β-(3-chloro-4-cyclohexylphenyl)propionic acid | α-acetylthio-β-(3-chloro-4-cyclohexylphenyl)propionic acid, piperidinium salt | 52 |
| α-acetylthio-β-(3-chloro-4-cyclohexylphenyl)propionic acid | α-acetylthio-β-(3-fluoro-4-cyclopentylphenyl)propionic acid, α-methylbenzylammonium salt | 52 |
| α-chloro-β-(3-fluoro-4-cyclopentylphenyl)propionic acid | α-acetylthio-β-(3-fluoro-4-cyclopentylphenyl)propionic acid | 65 |
| α-chloro-β-(3-chloro-4-cyclopentylphenyl)propionic acid | α-acetylthio-β-(3-chloro-4-cyclopentylphenyl)propionic acid | 65 |
| α-chloro-β-(3-bromo-4-cyclopentylphenyl)propionic acid | α-acetylthio-β-(3-bromo-4-cyclopentylphenyl)propionic acid | 65 |
| α-chloro-β-(3-nitro-4-cyclopentylphenyl)propionic acid | α-acetylthio-β-(3-nitro-4-cyclopentylphenyl)propionic acid | 65 |
| α-chloro-β-(3-trifluoromethyl-4-cyclopentylphenyl)propionic acid | α-acetylthio-β-(3-trifluoromethyl-4-cyclopentylphenyl)propionic acid | 65 |
| α-chloro-β-(3-cyano-4-cyclopentylphenyl)propionic acid | α-acetylthio-β-(3-cyano-4-cyclopentylphenyl)propionic acid | 65 |
| α-chloro-β-(3-methylsulfonyl-4-cyclopentylphenyl)propionic acid | α-acetylthio-β-(3-methylsulfonyl-4-cyclopentylphenyl)propionic acid | 65 |
| α-chloro-β-(3-chloro-5-fluoro-4-cyclopentylphenyl)propionic acid | α-acetylthio-β-(3-chloro-5-fluoro-4-cyclopentylphenyl)propionic acid | 65 |
| α-chloro-β-(3,5-dichloro-4-cyclopentylphenyl)propionic acid | α-acetylthio-β-(3,5-dichloro-4-cyclopentylphenyl)propionic acid | 65 |
| α-chloro-β-(3-chloro-5-bromo-4-cyclopentylphenyl)propionic acid | α-acetylthio-β-(3-chloro-5-bromo-4-cyclopentylphenyl)propionic acid | 65 |
| α-chloro-β-(3-chloro-5-nitro-4-cyclopentylphenyl)propionic acid | α-acetylthio-β-(3-chloro-5-nitro-4-cyclopentylphenyl)propionic acid | 65 |
| α-chloro-β-(3-chloro-5-trifluoromethyl-4-cyclopentylphenyl)propionic acid | α-acetylthio-β-(3-chloro-5-trifluoromethyl-4-cyclopentylphenyl)propionic acid | 65 |
| α-chloro-β-(3-chloro-5-cyano-4-cyclopentylphenyl)propionic acid | α-acetylthio-β-(3-chloro-5-cyano-4-cyclopentylphenyl)propionic acid | 65 |
| α-chloro-β-(3-chloro-5-methylsulfonyl-4-cyclopentylphenyl)propionic acid | α-acetylthio-β-(3-chloro-5-methylsulfonyl-4-cyclopentylphenyl)propionic acid | 65 |
| α-chloro-β-(3-chloro-4-cyclopentylphenyl)propionic acid | α-mercapto-β-(3-chloro-4-cyclopentylphenyl)propionic acid | 63 |
| α-chloro-β-(3-nitro-4-cyclopentylphenyl)propionic acid | α-benzoylthio-β-(3-nitro-4-cyclopentylphenyl)propionic acid | 66 |

Example 77 – Continued

When the procedures of Examples 1–76 are followed but using the starting materials below, then the corresponding products are obtained.

| STARTING MATERIAL | PRODUCT | EXAMPLE |
|---|---|---|
| α-chloro-β-(3,5-dichloro-4-cyclopentylphenyl)propionic acid | α-diethylcarbamylthio-β-(3,5-dichloro-4-cyclopentylphenyl)propionic acid | 63,74 |
| α-chloro-β-(3-chloro-5-nitro-4-cyclopentylphenyl)propionic acid | α-methylthio-β-(3-chloro-5-nitro-4-cyclopentylphenyl)propionic acid | 64 |
| α-chloro-β-(3-chloro-4-cyclopentylphenyl)propionic acid | α-thiosulfo-β-(3-chloro-4-cyclopentylphenyl)propionic acid | 70 |
| α-chloro-β-(3-nitro-4-cyclopentylphenyl)propionic acid | α-mercapto-β-(3-nitro-4-cyclopentylphenyl)propionic acid | 63 |
| α-chloro-β-(3,5-dichloro-4-cyclopentylphenyl)propionic acid | α-ethoxythiocarbamylthio-β-(3,5-dichloro-4-cyclopentylphenyl)propionic acid | 72 |
| α-chloro-β-(3-chloro-5-nitro-4-cyclopentylphenyl)propionic acid | α-ethoxycarbonylthio-β-(3-chloro-5-nitro-4-cyclopentylphenyl)propionic acid | 63 |
| methyl α-chloro-β-(3-chloro-4-cyclopentylphenyl)propionic acid | methyl α-acetylthio-β-(3-chloro-4-cyclopentylphenyl)propionate | 65 |
| benzyl α-chloro-β-(3-chloro-4-cyclopentylphenyl)propionate | benzyl α-acetylthio-β-(3-chloro-4-cyclopentylphenyl)propionate | 65 |
| N-methyl α-chloro-β-(3-chloro-4-cyclopentylphenyl)propionamide | N-methyl α-acetylthio-β-(3-chloro-4-cyclopentylphenyl)propionamide | 65 |
| N,N-diethyl α-chloro-β-(3-chloro-4-cyclopentylphenyl)propionamide | N,N-diethyl α-acetylthio-β-(3-chloro-4-cyclopentylphenyl)propionamide | 65 |
| N,N-pentamethylene α-chloro-β-(3-chloro-4-cyclopentylphenyl)propionamide | N,N-pentamethylene α-acetylthio-β-(3-chloro-4-cyclopentylphenyl)propionamide | 65 |
| N,N-oxydiethylene α-chloro-β-(3-chloro-4-cyclopentylphenyl)propionamide | N,N-oxydiethylene α-acetylthio-β-(3-chloro-4-cyclopentylphenyl)propionamide | 51 |
| α-acetylthio-β-(3-chloro-4-cyclopentylphenyl)propionic acid | α-acetylthio-β-(3-chloro-4-cyclopentylphenyl)propionic acid, sodium salt | 51 |
| α-acetylthio-β-(3-chloro-4-cylopentylphenyl)propionic acid | α-acetylthio-β-(3-chloro-4-cyclopentylphenyl)propionic acid, diethylammonium salt | 52 |
| α-acetylthio-β-(3-chloro-4-cyclopentylphenyl)propionic acid | α-acetylthio-β-(3-chloro-4-cyclopentylphenyl)propionic acid, piperazinium salt | 52 |
| α-chloro-β-(3-fluoro-4-cycloheptylphenyl)propionic acid | α-acetylthio-β-(3-fluoro-4-cycloheptylphenyl)propionic acid | 65 |
| α-chloro-β-(3-chloro-4-cycloheptylphenyl)propionic acid | α-acetylthio-β-(3-chloro-4-cycloheptylphenyl)propionic acid | 65 |
| α-chloro-β-(3-bromo-4-cycloheptylphenyl)propionic acid | α-acetylthio-β-(3-bromo-4-cycloheptylphenyl)propionic acid | 65 |
| α-chloro-β-(3-nitro-4-cycloheptylphenyl)propionic acid | α-acetylthio-β-(3-nitro-4-cycloheptylphenyl)propionic acid | 65 |
| α-chloro-β-(3-trifluoromethyl-4-cycloheptylphenyl)propionic acid | α-acetylthio-β-(3-trifluoromethyl-4-cycloheptylphenyl)propionic acid | 65 |
| α-chloro-β-(3-cyano-4-cycloheptylphenyl)propionic acid | α-acetylthio-β-(3-cyano-4-cycloheptylphenyl)propionic acid | 65 |
| α-chloro-β-(3-methylsulfonyl-4-cycloheptylphenyl)propionic acid | α-acetylthio-β-(3-methylsulfonyl-4-cycloheptylphenyl)propionic acid | 65 |
| α-chloro-β-(3-chloro-4-fluoro-4-cycloheptylphenyl)propionic acid | α-acetylthio-β-(3-chloro-5-fluoro-4-cycloheptylphenyl)propionic acid | 65 |
| α-chloro-β-(3,5-dichloro-4-cycloheptylphenyl)propionic acid | α-acetylthio-β-(3,5-dichloro-4-cycloheptylphenyl)propionic acid | 65 |
| α-chloro-β-(3-chloro-5-bromo-4-cycloheptylphenyl)propionic acid | α-acetylthio-β-(3-chloro-5-bromo-4-cycloheptylphenyl)propionic acid | 65 |
| α-chloro-β-(3-chloro-5-nitro-4-cycloheptylphenyl)propionic acid | α-acetylthio-β-(3-chloro-5-nitro-4-cycloheptylphenyl)propionic acid | 65 |
| α-chloro-β-(3-chloro-5-trifluoromethyl-4-cycloheptylphenyl)propionic acid | α-acetylthio-β-(3-chloro-5-trifluoromethyl-4-cycloheptylphenyl)propionic acid | 65 |
| α-chloro-β-(3-chloro-5-cyano-4-cycloheptylphenyl)propionic acid | α-acetylthio-β-(3-chloro-5-cyano-4-cycloheptylphenyl)propionic acid | 65 |
| α-chloro-β-(3-chloro-5-methylsulfonyl-4-cycloheptylphenyl)propionic acid | α-acetylthio-β-(3-chloro-5-methylsulfonyl-4-cycloheptylphenyl)propionic acid | 65 |
| α-chloro-β-(3-chloro-4-cycloheptylphenyl)propionic acid | α-mercapto-β-(3-chloro-4-cycloheptylphenyl)propionic acid | 63 |
| α-chloro-β-(3-nitro-4-cycloheptylphenyl)propionic acid | α-benzoylthio-β-(3-nitro-4-cycloheptylphenyl)propionic acid | 66 |
| α-chloro-β-(3,5-dichloro-4-cycloheptylphenyl)propionic acid | α-diethylcarbonylthio-β-(3,5-dichloro-4-cycloheptylphenyl)propionic acid | 63,74 |
| α-chloro-β-(3-chloro-5-nitro-4-cycloheptylphenyl)propionic acid | α-methylthio-β-(3-chloro-5-nitro-4-cycloheptylphenyl)propionic acid | 64 |
| α-chloro-β-(3-chloro-4-cycloheptylphenyl)propionic acid | α-thiosulfo-β-(3-chloro-4-cycloheptylphenyl)propionic acid | 70 |
| α-chloro-β-(3-nitro-4-cycloheptylphenyl)propionic acid | α-mercapto-β-(3-nitro-4-cycloheptylphenyl)propionic acid | 63 |
| α-chloro-β-(3,5-dichloro-4-cycloheptylphenyl)propionic acid | α-ethoxythiocarbamylthio-β-(3,5-dichloro-4-cycloheptylphenyl)propionic acid | 72 |
| α-chloro-β-(3-chloro-5-nitro-4-cycloheptylphenyl)propionic acid | α-ethoxycarbonylthio-β-(3-chloro-5-nitro-4-cycloheptylphenyl)propionic acid | 63,73 |
| methyl α-chloro-β-(3-chloro-4-cycloheptylphenyl)propionate | methyl α-acetylthio-β-(3-chloro-4-cycloheptylphenyl)propionate | 65 |
| benzyl α-chloro-β-(3-chloro-4-cycloheptylphenyl)propionate | benzyl α-acetylthio-β-(3-chloro-4-cycloheptylphenyl)propionate | 65 |
| N-methyl α-chloro-β-(3-chloro-4-cycloheptylphenyl)propionamide | N-methyl α-acetylthio-β-(3-chloro-4-cycloheptylphenyl)propionamide | 65 |
| N,N-diethyl α-chloro-β-(3-chloro-4-cycloheptylphenyl)propionamide | N,N-diethyl α-acetylthio-β-(3-chloro-4-cycloheptylphenyl)propionamide | 65 |

Example 77—Continued

When the procedures of Examples 1–76 are followed but using the starting materials below, then the corresponding products are obtained.

| STARTING MATERIAL | PRODUCT | EXAMPLE |
|---|---|---|
| N,N-pentamethylene α-chloro-β-(3-chloro-4-cycloheptylphenyl)propionamide | N,N-pentamethylene α-acetylthio-α-chloro-β-(3-chlorocycloheptylphenyl)propionamide | 65 |
| N,N-oxydiethylene α-chloro-β-(3-chloro-4-cycloheptylphenyl)propionamide | N,N-oxydiethylene α-acetylthio-α-chloro-β-(3-chloro-4-cycloheptylphenyl)propionamide | 65 |
| α-acetylthio-α-chloro-β-(3-chloro-4-cycloheptylphenyl)propionic acid | α-acetylthio-α-chloro-β-(3-chloro-4-cycloheptylphenyl)propionic acid, sodium salt | 51 |
| α-acetylthio-α-chloro-β-(3-chloro-4-cycloheptylphenyl)propionic acid | α-acetylthio-α-chloro-β-(3-chloro-4-cycloheptylphenyl)propionic acid, diethylammonium salt | 52 |
| α-acetylthio-α-chloro-β-(3-fluoro-4-cyclohexylphenyl)propionic acid | d α-acetylthio-α-chloro-β-(3-fluoro-4-cyclohexylphenyl)propionic acid | 40 |
| α-acetylthio-α-chloro-β-(3-fluoro-4-cyclohexylphenyl)propionic acid | l α-acetylthio-α-chloro-β-(3-fluoro-4-cyclohexylphenyl)propionic acid | 39 |
| α-acetylthio-α-chloro-β-(3-chloro-4-cyclohexylphenyl)propionic acid | d α-acetylthio-α-chloro-β-(3-chloro-4-cyclohexylphenyl)propionic acid | 40 |
| α-acetylthio-α-chloro-β-(3-chloro-4-cyclohexylphenyl)propionic acid | l α-acetylthio-α-chloro-β-(3-chloro-4-cyclohexylphenyl)propionic acid | 39 |
| α-acetylthio-α-chloro-β-(3-bromo-4-cyclohexylphenyl)propionic acid | d α-acetylthio-α-chloro-β-(3-bromo-4-cyclohexylphenyl)propionic acid | 40 |
| α-acetylthio-α-chloro-β-(3-bromo-4-cyclohexylphenyl)propionic acid | l α-acetylthio-α-chloro-β-(3-bromo-4-cyclohexylphenyl)propionic acid | 39 |
| α-acetylthio-α-chloro-β-(3-nitro-4-cyclohexylphenyl)propionic acid | d α-acetylthio-α-chloro-β-(3-nitro-4-cyclohexylphenyl)propionic acid | 40 |
| α-acetylthio-α-chloro-β-(3-nitro-4-cyclohexylphenyl)propionic acid | l α-acetylthio-α-chloro-β-(3-nitro-4-cyclohexylphenyl)propionic acid | 39 |
| α-acetylthio-α-chloro-β-(3-trifluoromethyl-4-cyclohexylphenyl)propionic acid | d α-acetylthio-α-chloro-β-(3-trifluoromethyl-4-cyclohexylphenyl)propionic acid | 40 |
| α-acetylthio-α-chloro-β-(3-trifluoromethyl-4-cyclohexylphenyl)propionic acid | l α-acetylthio-α-chloro-β-(3-trifluoromethyl-4-cyclohexylphenyl)propionic acid | 39 |
| α-acetylthio-α-chloro-β-(3-cyano-4-cyclohexylphenyl)propionic acid | d α-acetylthio-α-chloro-β-(3-cyano-4-cyclohexylphenyl)propionic acid | 40 |
| α-acetylthio-α-chloro-β-(3-cyano-4-cyclohexylphenyl)propionic acid | l α-acetylthio-α-chloro-β-(3-cyano-4-cyclohexylphenyl)propionic acid | 39 |
| α-acetylthio-α-chloro-β-(3-methylsulfonyl-4-cyclohexylphenyl)propionic acid | d α-acetylthio-α-chloro-β-(3-methylsulfonyl-4-cyclohexylphenyl)propionic acid | 40 |
| α-acetylthio-α-chloro-β-(3-methylsulfonyl-4-cyclohexylphenyl)propionic acid | l α-acetylthio-α-chloro-β-(3-methylsulfonyl-4-cyclohexylphenyl)propionic acid | 39 |
| α-acetylthio-α-chloro-β-(3-chloro-5-fluoro-4-cyclohexylphenyl)propionic acid | d α-acetylthio-α-chloro-β-(3-chloro-5-fluoro-4-cyclohexylphenyl)propionic acid | 40 |
| α-acetylthio-α-chloro-β-(3-chloro-5-fluoro-4-cyclohexylphenyl)propionic acid | l α-acetylthio-α-chloro-β-(3-chloro-5-fluoro-4-cyclohexylphenyl)propionic acid | 39 |
| α-acetylthio-α-chloro-β-(3,5-dichloro-4-cyclohexylphenyl)propionic acid | d α-acetylthio-α-chloro-β-(3,5-dichloro-4-cyclohexylphenyl)propionic acid | 40 |
| α-acetylthio-α-chloro-β-(3,5-dichloro-4-cyclohexylphenyl)propionic acid | l α-acetylthio-α-chloro-β-(3,5-dichloro-4-cyclohexylphenyl)propionic acid | 39 |
| α-acetylthio-α-chloro-β-(3-chloro-5-bromo-4-cyclohexylphenyl)propionic acid | d α-acetylthio-α-chloro-β-(3-chloro-5-bromo-4-cyclohexylphenyl)propionic acid | 40 |
| α-acetylthio-α-chloro-β-(3-chloro-5-bromo-4-cyclohexylphenyl)propionic acid | l α-acetylthio-α-chloro-β-(3-chloro-5-bromo-4-cyclohexylphenyl)propionic acid | 39 |
| α-acetylthio-α-chloro-β-(3-chloro-5-nitro-4-cyclohexylphenyl)propionic acid | d α-acetylthio-α-chloro-β-(3-chloro-5-nitro-4-cyclohexylphenyl)propionic acid | 40 |
| α-acetylthio-α-chloro-β-(3-chloro-5-nitro-4-cyclohexylphenyl)propionic acid | l α-acetylthio-α-chloro-β-(3-chloro-5-nitro-4-cyclohexylphenyl)propionic acid | 39 |
| α-acetylthio-α-chloro-β-(3-chloro-5-trifluoromethyl-4-cyclohexylphenyl)propionic acid | d α-acetylthio-α-chloro-β-(3-chloro-5-trifluoromethyl-4-cyclohexylphenyl)propionic acid | 40 |
| α-acetylthio-α-chloro-β-(3-chloro-5-trifluoromethyl-4-cyclohexylphenyl)propionic acid | l α-acetylthio-α-chloro-β-(3-chloro-5-trifluoromethyl-4-cyclohexylphenyl)propionic acid | 39 |
| α-acetylthio-α-chloro-β-(3-chloro-5-cyano-4-cyclohexylphenyl)propionic acid | d α-acetylthio-α-chloro-β-(3-chloro-5-cyano-4-cyclohexylphenyl)propionic acid | 40 |
| α-acetylthio-α-chloro-β-(3-chloro-5-cyano-4-cyclohexylphenyl)propionic acid | l α-acetylthio-α-chloro-β-(3-chloro-5-cyano-4-cyclohexylphenyl)propionic acid | 39 |
| α-acetylthio-α-chloro-β-(3-chloro-5-methylsulfonyl-4-cyclohexylphenyl)propionic acid | d α-acetylthio-α-chloro-β-(3-chloro-5-methylsulfonyl-4-cyclohexylphenyl)propionic acid | 40 |
| α-acetylthio-α-chloro-β-(3-chloro-5-methylsulfonyl-4-cyclohexylphenyl)propionic acid | l α-acetylthio-α-chloro-β-(3-chloro-5-methylsulfonyl-4-cyclohexylphenyl)propionic acid | 39 |
| α-mercapto-α-chloro-β-(3-chloro-4-cyclohexylphenyl)propionic acid | d α-mercapto-α-chloro-β-(3-chloro-4-cyclohexylphenyl)propionic acid | 40 |
| α-mercapto-α-chloro-β-(3-chloro-4-cyclohexylphenyl)propionic acid | l α-mercapto-α-chloro-β-(3-chloro-4-cyclohexylphenyl)propionic acid | 39 |
| α-butyrylthio-α-chloro-β-(3-nitro-4-cyclohexylphenyl)propionic acid | d α-butyrylthio-α-chloro-β-(3-nitro-4-cyclohexylphenyl)propionic acid | 40 |
| α-butyrylthio-α-chloro-β-(3-nitro-4-cyclohexylphenyl)propionic acid | l α-butyrylthio-α-chloro-β-(3-nitro-4-cyclohexylphenyl)propionic acid | 39 |

Example 77—Continued

When the procedures of Examples 1–76 are followed but using the starting materials below, then the corresponding products are obtained.

| STARTING MATERIAL | PRODUCT | EXAMPLE |
|---|---|---|
| α-diethylcarbamylthio-α-chloro-β-(3,5-dichloro-4-cyclohexylphenyl)propionic acid | d α-diethylcarbamylthio-α-chloro-β-(3,5-dichloro-4-cyclohexylphenyl)propionic acid | 40 |
| α-diethylcarbamylthio-α-chloro-β-(3,5-dichloro-4-cyclohexylphenyl)propionic acid | l α-diethylcarbamylthio-α-chloro-β-(3,5-dichloro-4-cyclohexylphenyl)propionic acid | 39 |
| α-i-propylthio-α-chloro-β-(3-chloro-5-nitro-4-cyclohexylphenyl)propionic acid | d α-i-propylthio-α-chloro-β-(3-chloro-5-nitro-4-cyclohexylphenyl)propionic acid | 40 |
| α-i-propylthio-α-chloro-β-(3-chloro-5-nitro-4-cyclohexylphenyl)propionic acid | l α-i-propylthio-α-chloro-β-(3-chloro-5-nitro-4-cyclohexylphenyl)propionic acid | 39 |
| α-propionylthio-α-chloro-β-(3-chloro-4-cyclohexylphenyl)propionic acid | d α-propionylthio-α-chloro-β-(3-chloro-4-cyclohexylphenyl)propionic acid | 40 |
| α-propionylthio-α-chloro-β-(3-chloro-4-cyclohexylphenyl)propionic acid | l α-propionylthio-α-chloro-β-(3-chloro-4-cyclohexylphenyl)propionic acid | 39 |
| α-sulfino-α-chloro-β-(3-nitro-4-cyclohexylphenyl)propionic acid | d α-sulfino-α-chloro-β-(3-nitro-4-cyclohexylphenyl)propionic acid | 40 |
| α-sulfino-α-chloro-β-(3-nitro-4-cyclohexylphenyl)propionic acid | l α-sulfino-α-chloro-β-(3-nitro-4-cyclohexylphenyl)propionic acid | 39 |
| α-methylsulfinyl-α-chloro-β-(3,5-dichloro-4-cyclohexylphenyl)propionic acid | d α-methylsulfinyl-α-chloro-β-(3,5-dichloro-4-cyclohexylphenyl)propionic acid | 40 |
| α-methylsulfinyl-α-chloro-β-(3,5-dichloro-4-cyclohexylphenyl)propionic acid | l α-methylsulfinyl-α-chloro-β-(3,5-dichloro-4-cyclohexylphenyl)propionic acid | 39 |
| α-(σ-carboxybenzoylthio)-α-chloro-β-(3-chloro-5-nitro-4-cyclohexylphenyl)propionic acid | d α-(σ-carboxybenzoylthio)-α-chloro-β-(3-chloro-5-nitro-4-cyclohexylphenyl)propionic acid | 40 |
| α-(σ-carboxybenzoylthio)-α-chloro-β-(3-chloro-5-nitro-4-cyclohexylphenyl)propionic acid | l α-(σ-carboxybenzoylthio)-α-chloro-β-(3-chloro-5-nitro-4-cyclohexylphenyl)propionic acid | 39 |
| methyl α-acetylthio-α-chloro-β-(3-chloro-4-cyclohexylphenyl)propionic acid | d methyl α-acetylthio-α-chloro-β-(3-chloro-4-cyclohexylphenyl)propionic acid | 40 |
| methyl α-acetylthio-α-chloro-β-(3-chloro-4-cyclohexylphenyl)propionic acid | l methyl α-acetylthio-α-chloro-β-(3-chloro-4-cyclohexylphenyl)propionic acid | 39 |
| benzyl α-acetylthio-α-chloro-β-(3-chloro-4-cyclohexylphenyl)propionic acid | d benzyl α-acetylthio-α-chloro-β-(3-chloro-4-cyclohexylphenyl)propionic acid | 40 |
| benzyl α-acetylthio-α-chloro-β-(3-chloro-4-cyclohexylphenyl)propionic acid | l benzyl α-acetylthio-α-chloro-β-(3-chloro-4-cyclohexylphenyl)propionic acid | 39 |
| N-methyl α-acetylthio-α-chloro-β-(3-chloro-4-cyclohexylphenyl)propionic acid | d N-methyl α-acetylthio-α-chloro-β-(3-chloro-4-cyclohexylphenyl)propionic acid | 40 |
| N-methyl α-acetylthio-α-chloro-β-(3-chloro-4-cyclohexylphenyl)propionic acid | l N-methyl α-acetylthio-α-chloro-β-(3-chloro-4-cyclohexylphenyl)propionic acid | 39 |
| N,N-diethyl α-acetylthio-α-chloro-β-(3-chloro-4-cyclohexylphenyl)propionic acid | d N,N-diethyl α-acetylthio-α-chloro-β-(3-chloro-4-cyclohexylphenyl)propionic acid | 40 |
| N,N-diethyl α-acetylthio-α-chloro-β-(3-chloro-4-cyclohexylphenyl)propionic acid | l N,N-diethyl α-acetylthio-α-chloro-β-(3-chloro-4-cyclohexylphenyl)propionic acid | 39 |
| N,N-pentamethylene α-acetylthio-α-chloro-β-(3-chloro-4-cyclohexylphenyl)propionic acid | d N,N-pentamethylene α-acetylthio-α-chloro-β-(3-chloro-4-cyclohexylphenyl)propionic acid | 40 |
| N,N-pentamethylene α-acetylthio-α-chloro1β-(3-chloro-4-cyclohexylphenyl)propionic acid | l N,N-pentamethylene α-acetylthio-α-chloro-β-(3-chloro-4-cyclohexylphenyl)propionic acid | 39 |
| N,N-oxydiethylene α-acetylthio-α-chloro-β-(3-chloro-4-cyclohexylphenyl)propionic acid | d N,N-oxydiethylene α-acetylthio-α-chloro-β-(3-chloro-4-cyclohexylphenyl)propionic acid | 40 |
| N,N-oxydiethylene α-acetylthio-α-chloro-β-(3-chloro-4-cyclohexylphenyl)propionic acid | l N,N-oxydiethylene α-acetylthio-α-chloro-β-(3-chloro-4-cyclohexylphenyl)propionic acid | 39 |
| α-acetylthio-β-(3-chloro-4-cyclohexylphenyl)propionic acid, sodium salt | d α-acetylthio-β-(3-chloro-4-cyclohexylphenyl)propionic acid, sodium salt | 40 |
| α-acetylthio-β-(3-chloro-4-cyclohexylphenyl)propionic acid, sodium salt | l α-acetylthio-β-(3-chloro-4-cyclohexylphenyl)propionic acid, sodium salt | 39 |
| α-acetylthio-β-(3-chloro-4-cyclohexylphenyl)propionic acid, diethylammonium salt | d α-acetylthio-β-(3-chloro-4-cyclohexylphenyl)propionic acid, diethylammonium salt | 40 |
| α-acetylthio-β-(3-chloro-4-cyclohexylphenyl)propionic acid, diethylammonium salt | l α-acetylthio-β-(3-chloro-4-cyclohexylphenyl)propionic acid, diethylammonium salt | 39 |
| α-acetylthio-β-(3-chloro-4-cyclohexylphenyl)propionic acid, piperazinium salt | d α-acetylthio-β-(3-chloro-4-cyclohexylphenyl)propionic acid, piperazinium salt | 40 |
| α-acetylthio-β-(3-chloro-4-cyclohexylphenyl)propionic acid, piperazinium salt | l α-acetylthio-β-(3-chloro-4-cyclohexylphenyl)propionic acid, piperazinium salt | 39 |
| α-acetylthio-β-(3-chloro-4-cyclopentylphenyl)propionic acid | d α-acetylthio-β-(3-chloro-4-cyclohexylphenyl)propionic acid | 40 |
| α-acetylthio-β-(3-chloro-4-cyclopentylphenyl)propionic acid | l α-acetylthio-β-(3-chloro-4-cyclohexylphenyl)propionic acid | 39 |
| α-acetylthio-β-(3,5-dichloro-4-cyclopentylphenyl)propionic acid | d α-acetylthio-β-(3,5-dichloro-4-cyclopentylphenyl)propionic acid | 40 |
| α-acetylthio-β-(3,5-dichloro-4-cyclopentylphenyl)propionic acid | l α-acetylthio-β-(3,5-dichloro-4-cyclopentylphenyl)propionic acid | 39 |
| α-mercapto-β-(3-chloro-4-cyclopentylphenyl)propionic acid | d α-mercapto-β-(3-chloro-4-cyclopentylphenyl)propionic acid | 40 |
| α-mercapto-β-(3-chloro-4-cyclopentylphenyl)propionic acid | l α-mercapto-β-(3-chloro-4-cyclopentylphenyl)propionic acid | 39 |

Example 77—Continued

When the procedures of Examples 1–76 are followed but using the starting materials below, then the corresponding products are obtained.

| STARTING MATERIAL | PRODUCT | EXAMPLE |
|---|---|---|
| α-benzoylthio-β-(3,5-dichloro-4-cyclopentylphenyl)-propionic acid | d α-benzoylthio-β-(3,5-dichloro-4-cyclopentylphenyl)propionic acid | 40 |
| α-benzoylthio-β-(3,5-dichloro-4-cyclopentylphenyl)-propionic acid | l α-benzoylthio-β-(3,5-dichloro-4-cyclopentylphenyl)propionic acid | 39 |
| α-diethylcarbamylthio-β-(3-chloro-4-cyclopentyl-phenyl)propionic acid | d α-diethylcarbamylthio-β-(3-chloro-4-cyclopentylphenl)propionic acid | 40 |
| α-diethylcarbamylthio-β-(3-chloro-4-cyclopentyl-phenyl)propionic acid | l α-diethylcarbamylthio-β-(3-chloro-4-cyclopentylphenyl)propionic acid | 39 |
| α-ethoxythiocarbonylthio-β-(3,5-dichloro-4-cyclopentylphenyl)propionic acid | d α-ethoxythiocarbonylthio-β-(3,5-dichloro-4-cyclopentylphenyl)propionic acid | 40 |
| α-ethoxythiocarbonylthio-β-(3,5-dichloro-4-cyclopentylphenyl)propionic acid | l α-ethoxythiocarbonylthio-β-(3,5-dichloro-4-cyclopentylphenyl)propionic acid | 39 |
| α-acetylthio-β-(3-chloro-4-cyclopentylphenyl)propionic acid, sodium salt | d α-acetylthio-β-(3-chloro-4-cyclopentylphenyl)propinoic acid, sodium salt | 40 |
| α-acetylthio-β-(3-chloro-4-cyclopentylphenyl)propionic acid, sodium salt | l α-acetylthio-β-(3-chloro-4-cyclopentylphenyl)propionic acid, sodium salt | 39 |
| α-acetylthio-β-(3-chloro-4-cycloheptylphenyl)propionic acid | d α-acetylthio-β-(3-chloro-4-cycloheptylphenyl)propionic acid | 40 |
| α-acetylthio-β-(3-chloro-4-cycloheptylphenyl)propionic acid | l α-acetylthio-β-(3-chloro-4-cycloheptylphenyl)propionic acid | 39 |
| α-acetylthio-β-(3,5-dichloro-4-cycloheptylphenyl)propionic acid | d α-acetylthio-β-(3,5-dichloro-4-cycloheptylphenyl)propionic acid | 40 |
| α-acetylthio-β-(3,5-dichloro-4-cycloheptylphenyl)propionic acid | l α-acetylthio-β-(3,5-dichloro-4-cycloheptylphenyl)propionic acid | 39 |
| α-mercapto-β-(3-chloro-4-cycloheptylphenyl)propionic acid | d α-mercapto-β-(3-chloro-4-cycloheptylphenyl)propionic acid | 40 |
| α-mercapto-β-(3-chloro-4-cycloheptylphenyl)propionic acid | l α-mercapto-β-(3-chloro-4-cycloheptylphenyl)propionic acid | 39 |
| α-benzoylthio-β-(3,5-dichloro-4-cycloheptylphenyl)-propionic acid | d α-benzoylthio-β-(3,5-dichloro-4-cycloheptylphenyl)propionic acid | 40 |
| α-benzoylthio-β-(3,5-dichloro-4-cycloheptylphenyl)-propionic acid | l α-benzoylthio-β-(3,5-dichloro-4-cycloheptylphenyl)propionic acid | 39 |
| α-diethylcarbamylthio-β-(3-chloro-4-cycloheptyl-phenyl)propionic acid | d α-diethylcarbamylthio-β-(3-chloro-4-cycloheptylphenyl)propionic acid | 40 |
| α-diethylcarbamylthio-β-(3-chloro-4-cycloheptyl-phenyl)propionic acid | l α-diethylcarbamylthio-β-(3-chloro-4-cycloheptylphenyl)propionic acid | 39 |
| α-ethoxythiocarbonylthio-β-(3,5-dichloro-4-cycloheptylphenyl)propionic acid | d α-ethoxythiocarbonylthio-β-(3,5-dichloro-4-cycloheptylphenyl)propionic acid | 40 |
| α-ethoxythiocarbonylthio-β-(3,5-dichloro-4-cycloheptylphenyl)propionic acid | l α-ethoxythiocarbonylthio-β-(3,5-dichloro-4-cycloheptylphenyl)propionic acid | 39 |
| α-acetylthio-β-(3-chloro-4-cycloheptylphenyl)propionic acid | d α-acetylthio-β-(3-chloro-4-cycloheptylphenyl)propionic acid | 40 |
| α-acetylthio-β-(3-chloro-4-cycloheptylphenyl)propionic acid | l α-acetylthio-β-(3-chloro-4-cycloheptylphenyl)propionic acid | 39 |
| α-chloro-α-methyl-β-(3-fluoro-4-cyclohexylphenyl)-propionic acid | α-acetylthio-α-methyl-β-(3-fluoro-4-cyclohexylphenyl)propionic acid | 65 |
| α-chloro-α-methyl-β-(3-bromo-4-cyclohexylphenyl)-propionic acid | α-acetylthio-α-methyl-β-(3-bromo-4-cyclohexylphe-yl)propionic acid | 65 |
| α-chloro-α-methyl-β-(3-iodo-4-cyclohexylphenyl)propionic acid | α-acetylthio-α-methyl-β-(3-iodo-4-cyclohexylphenyl)propionic acid | 65 |
| α-chloro-α-methyl-β-(3-nitro-4-cyclohexylphenyl)propionic acid | α-acetylthio-α-methyl-β-(3-nitro-4-cyclohexylphenyl)propionic acid | 65 |
| α-chloro-α-methyl-β-(3-trifluoromethyl-4-cyclohexylphenyl)propionic acid | α-acetylthio-α-methyl-β-(3-trifluoromethyl-4-cyclohexylphenyl)propionic acid | 65 |
| α-chloro-α-methyl-β-(3-mercapto-4-cyclohexylphenyl)propionic acid | α-acetylthio-α-methyl-β-(3-mercapto-4-cyclohexylphenyl)propionic acid | 65 |
| α-chloro-α-methyl-β-(3-acetylthio-4-cyclohexylphenyl)propionic acid | α-acetylthio-α-methyl-β-(3-acetylthio-4-cyclohexylphenyl)propionic acid | 65 |
| α-chloro-α-methyl-β-(3-methylmercapto-4-cyclohexylphenyl)propionic acid | α-acetylthio-α-methyl-β-(3-methylmercapto-4-cyclohexylphenyl)propionic acid | 65 |
| α-chloro-α-methyl-β-(3-methylsulfinyl-4-cyclohexylphenyl)propionic acid | α-acetylthio-α-methyl-β-(3-methylsulfinyl-4-cyclohexylphenyl)propionic acid | 65 |
| α-chloro-α-methyl-β-(3-methylsulfonyl-4-cyclohexylphenyl)propionic acid | α-acetylthio-α-methyl-β-(3-methylsulfonyl-4-cyclohexylphenyl)propionic acid | 65 |
| α-chloro-α-methyl-β-(3-amino-4-cyclohexylphenyl)-propionic acid | α-acetylthio-α-methyl-β-(3-amino-4-cyclohexylphenyl)propionic acid | 65 |
| α-chloro-α-methyl-β-(3-acetylamino-4-cyclohexylphenyl)propionic acid | α-acetylthio-α-methyl-β-(3-acetylamino-4-cyclohexylphenyl)propionic acid | 65 |
| α-chloro-α-methyl-β-(3-methylamino-4-cyclohexylphenyl)propionic acid | α-acetylthio-α-methyl-β-(3-methylamino-4-cyclohexylphenyl)propionic acid | 65 |
| α-chloro-α-methyl-β-(3-dimethylamino-4-cyclohexylphenyl)propionic acid | α-acetylthio-α-methyl-β-(3-methylamino-4-cyclohexylphenyl)propionic acid | 65 |
| α-chloro-α-methyl-β-(3-hydroxy-4-cyclohexylphenyl)-propionic acid | α-acetylthio-α-methyl-β-(3-hydroxy-4-cyclohexylphenyl)propionic acid | 65 |
| α-chloro-α-methyl-β-(3-acetyloxy-4-cyclohexyl-phenyl)propionic acid | α-acetylthio-α-methyl-β-(3-acetyloxy-4-cyclohexylphenyl)propionic acid | 65 |
| α-chloro-α-methyl-β-(3-methoxy-4-cyclohexylphenyl)-propionic acid | α-acetylthio-α-methyl-β-(3-methoxy-4-cyclohexylphenyl)propionic acid | 65 |
| αα-acetylthio-α-methyl-β-(3-acetoxy-4-cyclohexyl-phenyl)propionic acid | | 65 |
| α-chloro-α-methyl-β-(3-methyl-4-cyclohexylphenyl)-propionic acid | α-acetylthio-α-methyl-β-(3-methyl-4-cyclohexylphenyl)propionic acid | 65 |
| α-chloro-α-methyl-β-(3,5-dichloro-4-cyclohexyl-phenyl)propionic acid | α-acetylthio-α-methyl-β-(3,5-dichloro-4-cyclohexylphenyl)propionic acid | 65 |
| α-chloro-α-methyl-β-(5-nitro-4-cyclohexylphenyl)-propionic acid | α-acetylthio-α-methyl-β-(5-nitro-4-cyclohexylphenyl)propionic acid | 65 |

Example 77—Continued

When the procedures of Examples 1-76 are followed but using the starting materials below, then the corresponding products are obtained.

| STARTING MATERIAL | PRODUCT | EXAMPLE |
|---|---|---|
| α-chloro-α-methyl-β-(3-chloro-4-cyclohexylphenyl)propionic acid | α-mercapto-α-methyl-β-(3-chloro-4-cyclohexylphenyl)propionic acid | 63 |
| α-chloro-α-methyl-β-(3-chloro-4-cyclohexylphenyl)propionic acid | α-propionylthio-α-methyl-β-(3-chloro-4-cyclohexylphenyl)propionic acid | 65 |
| α-chloro-α-methyl-β-(3-chloro-4-cyclohexylphenyl)propionic acid | α-butyrylthio-α-methyl-β-(3-chloro-4-cyclohexylphenyl)propionic acid | 63,75 |
| α-chloro-α-methyl-β-(chloro-4-cyclohexylphenyl)propionic acid | α-butenoylthio-α-methyl-β-(3-chloro-4-cyclohexylphenyl)propionic acid | 63,75 |
| α-chloro-α-methyl-β-(3-chloro-4-cyclohexylphenyl)propionic acid | α-benzoylthio-α-methyl-β-(3-chloro-4-cyclohexylphenyl)propionic acid | 66 |
| α-chloro-α-methyl-β-(3-chloro-4-cyclohexylphenyl)propionic acid | α-methylsulfonyl-α-methyl-β-(3-chloro-4-cyclohexylphenyl)propionic acid | 64,76 |
| α-chloro-α-methyl-β-(3-chloro-4-cyclohexylphenyl)propionic acid | α-methylthio-α-methyl-β-(3-chloro-4-cyclohexylphenyl)propionic acid | 64 |
| α-chloro-α-methyl-β-(3-chloro-4-cyclohexylphenyl)propionic acid | α-diethylcarbamylthio-α-methyl-β-(3-chloro-4-cyclohexylphenyl)propionic acid | 63,75 |
| α-chloro-α-methyl-β-(3-chloro-4-cyclohexylphenyl)propionic acid | α-ethylcarbamylthio-α-methyl-β-(3-chloro-4-cyclohexylphenyl)propionic acid | 63,74 |
| α-chloro-α-methyl-β-(3-chloro-4-cyclohexylphenyl)propionic acid | α-i-propylthio-α-methyl-β-(3-chloro-4-cyclohexylphenyl)propionic acid | 64 |
| α-chloro-α-methyl-β-(3-chloro-4-cyclohexlphenyl)propionic acid | α-thiosulfo-α-methyl-β-(3-chloro-4-cyclohexylphenyl)propionic acid | 70 |
| α-chloro-α-methyl-β-(3-chloro-4-cyclohexylphenyl)propionic acid | α-thiocyanato-α-methyl-α-(3-chloro-4-cyclohexylphenyl)propionic acid | 68 |
| α-chloro-α-methyl-β-(3-fluoro-4-cyclohexylphenyl)propionic acid | α-benzoylthio-α-methyl-β-(3-fluoro-4-cyclohexylphenyl)propionic acid | 66 |
| α-chloro-α-methyl-β-(3-bromo-4-cyclohexylphenyl)propionic acid | α-benzoylthio-α-methyl-β-(3-bromo-4-cyclohexylphenyl)propionic acid | 66 |
| α-chloro-α-methyl-β-(3-nitro-4-cyclohexylphenyl)propionic acid | α-sulfino-α-methyl-β-(3-nitro-4-cyclohexylphenyl)propionic acid | 69 |
| α-chloro-α-methyl-β-(3-trifluoromethyl-4-cyclohexylphenyl)propionic acid | α-sulfo-α-methyl-β-(3-trifluoromethyl-4-cyclohexylphenyl)propionic acid | 69 |
| α-chloro-α-methyl-β-(3-cyano-4-cyclohexylphenyl)propionic acid | α-amidinothio-α-methyl-β-(3-cyano-4-cyclohexylphenyl)propionic acid | 71 |
| α-chloro-α-methyl-β-(3-chloro-5-fluoro-4-cyclohexylphenyl)propionic acid | α-benzyloxycarbonylthio-α-methyl-β-(3-chloro-5-fluoro-4-cyclohexylphenyl)propionic acid | 63,73 |
| α-chloro-α-methyl-β-(3-chloro-4-cyclohexylphenyl)propionic acid | α-methylsulfinyl-α-methyl-β-(3-chloro-4-cyclohexylphenyl)propionic acid | 64,76 |
| α-chloro-α-methyl-β-(3-chloro-4-cyclohexylphenyl)propionic acid | α-methylsulfonyl-α-methyl-β-(3-chloro-4-cyclohexylphenyl)propionic acid | 64,76 |
| α-chloro-α-methyl-β-(3-chloro-4-cyclohexylphenyl)propionic acid | α-(σ-carboxybenzoylthio)-α-methyl-β-(3-chloro-4-cyclohexylphenyl)propionic acid | 63,75 |
| α-chloro-α-methyl-β-(3-chloro-4-cyclohexylphenyl)propionic acid | α-(σ-carboxybenzoylthio)-α-methyl-β-(3-chloro-4-cyclohexylphenyl)propionic acid | 63,75 |
| α-chloro-α-methyl-β-(3-chloro-4-cyclohexylphenyl)propionic acid | α-thiosulfo-α-methyl-β-(3-chloro-4-cyclohexylphenyl)propionic acid | 70 |
| ethyl α-chloro-α-methyl-β-(3-chloro-4-cyclohexylphenyl)propionate | ethyl α-methyl-α-acetylthio-β-(3-chloro-4-cyclohexylphenyl)propionic acid | 65 |
| N,N-dimethyl α-chloro-α-methyl-β-(3-chloro-4-cyclohexylphenyl)propionamide | N,N-diethyl α-methyl-α-acetylthio-β-(3-chloro-4-cyclohexylphenyl)propionamide | 65 |
| α-chloro-α-methyl-β-(3-chloro-4-cyclopentylphenyl)propionic acid | α-acetylthio-α-methyl-β-(3-chloro-4-cyclopentylphenyl)propionic acid | 65 |
| α-chloro-α-methyl-β-(3-nitro-4-cyclopentylphenyl)propionic acid | α-benzoylthio-α-methyl-β-(3-nitro-4-cyclopentylphenyl)propionic acid | 66 |
| α-chloro-α-methyl-β-(3-chloro-4-cycloheptylphenyl)propionic acid | α-acetylthio-α-methyl-β-(3-chloro-4-cycloheptylphenyl)propionic acid | 65 |
| α-chloro-α-methyl-β-(3-chloro-4-cycloheptylphenyl)propionic acid | α-benzoylthio-α-methyl-β-(3-chloro-4-cycloheptylphenyl)propionic acid | 66 |
| α-acetylthio-α-methyl-β-(3-chloro-4-cyclohexylphenyl)propionic acid | d α-acetylthio-α-methyl-β-(3-chloro-4-cyclohexylphenyl)propionic acid | 40 |
| α-acetylthio-α-methyl-β-(3-chloro-4-cyclohexylphenyl)propionic acid | l α-acetylthio-α-methyl-β-(3-chloro-4-cyclohexylphenyl)propionic acid | 39 |
| α-acetylthio-α-methyl-β-(3-nitro-4-cyclohexylphenyl)propionic acid | d α-acetylthio-α-methyl-β-(3-nitro-4-cyclohexylphenyl)propionic acid | 40 |
| α-acetylthio-α-methyl-β-(3-nitro-4-cyclohexylphenyl)propionic acid | l α-acetylthio-α-methyl-β-(3-nitro-4-cyclohexylphenyl)propionic acid | 39 |

EXAMPLE 78

Ethyl β-hydroxy-β-(3-chloro-4-cyclohexylphenyl)butyrate

A mixture of 23.6 g. (0.1 mole) 3-chloro-4-cyclohexylphenyl methyl ketone, 20 g. of ethyl bromoacetate and 8 g. of zinc are combined in 75 ml. of benzene. The reaction mixture is refluxed and vigorously stirred for 1 hr. The mixture is then cooled and diluted with sulfuric acid. The organic layer is separated, dried over calcium chloride and distilled to obtain ethyl β-hydroxy-β-(3-chloro-4-cyclohexylphenyl)butyrate.

When 3-chloro4-cyclohexylphenyl methyl ketone in the above reaction is replaced by the ketones of Table I, below, then the corresponding product of Table II below is obtained.

TABLE I 3-bromo-4-cyclohexylphenyl methyl ketone
3-nitro-4-cyclohexylphenyl methyl ketone
3,5-dichloro-4-cyclohexylphenyl methyl ketone
3-chloro-5-nitro-4-cyclohexylphenyl methyl ketone
3-chloro-4-cyclopentylphenyl methyl ketone
3-chloro-4-cycloheptylphenyl methyl ketone

TABLE II ethyl β-hydroxy-β-(3-bromo-4-cyclohexylphenyl)butyrate ethyl β-hydroxy-β-(3-nitro-4-cyclohexylphenyl)butyrate ethyl β-hydroxy-β-(3,5-dichloro-4-cyclohexylphenyl)butyrate ethyl β-hydroxy-β-(3-chloro-5-nitro-4-cyclohexylphenyl)butyrate ethyl β-hydroxy-β-(3-chloro-4-cyclopentylphenyl)butyrate ethyl β-hydroxy-β-(3-chloro-4-cycloheptylphenyl)butyrate

EXAMPLE 79

Ethyl β-methyl-β-(3-chloro-4-cyclohexylphenyl)cinnamic acid

To 31 g. of ethyl β-hydroxy-β-(3-chloro-4-cyclohexylphenyl)-butyrate in 80 ml. of benzene is added 6 ml. of phosphorousoxychloride and heated for ½ hour at the boiling point. The mixture is then cooled, washed twice with water, dried over calcium chloride and distilled to obtain ethyl β-methyl-β-(3-chloro-4-cyclohexylphenyl)cinnamic acid.

When ethyl β-hydroxy-β-(3chloro-4-cyclohexylphenyl)butyrate in the above example is replaced by the butyrates of Table II, Example 78, then the products obtained are shown in Table I, below.

TABLE I ethyl β-methyl-β-(3-bromo-4-cyclohexylphenyl)cinnamic acid ethyl β-methyl-β-(3-nitro-4-cyclohexylphenyl)cinnamic acid ethyl β-methyl-β-(3,5-dichloro-4-cyclohexylphenyl)cinnamic acid ethyl β-methyl-β-(3-chloro-5-nitro-4-cyclohexylphenyl)cinnamic acid ethyl β-methyl-β-(3-chloro-4-cyclopentylphenyl)cinnamic acid ethyl β-methyl-β-(3-chloro-4-cycloheptylphenyl)cinnamic acid

EXAMPLE 80

When the compounds of Example 79 are used as starting materials for Example 7 and subsequently in Examples 8–77, then the corresponding β-alkyllatic acids, α-halo-β-alkylpropionic acids, α-thio-β-alkylpropionic acids and their various derivatives are prepared.

I claim:
1. A compound of the formula:

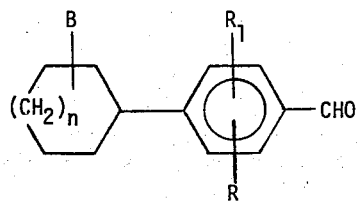

where:
n is 0–2;
B is hydrogen or loweralkyl;
R is chloro or bromo in the 3 or 5 position, nitro in the 3 or 5 position, loweralkyl in the 3 or 5 position;
R' is hydrogen, chloro in the 3 or 5 position, bromo in the 3 or 5 position, or nitro in the 3 or 5 position.

2. The compound of claim 1 where:
B is hydrogen.

3. A compound of claim 2 where:
n is 1;
B is hydrogen;
R is nitro; and
R' is hydrogen; thus forming 3-nitro-4-cyclohexylbenzaldehyde.

4. A compound of the formula

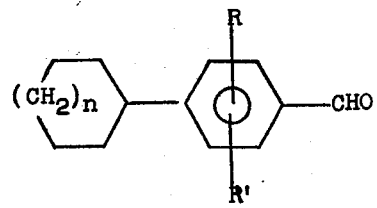

in which
n is 0–2;
R is chloro or bromo in the 3 or 5 position; and
R' is hydrogen, chloro, or bromo in the 3 or 5 position.

5. The compound of claim 4 where:
R is chloro or bromo; and
R' is hydrogen.

6. The compound of claim 4 where:
R is chloro or bromo; and
R' is chloro; or bromo.

7. The compound of claim 5 where:
n is 1 and
R is the 3- position.

8. A compound of claim 7 where:
R is chloro; thus forming 3-chloro-4-cyclohexylbenzaldehyde.

9. A compound of claim 7 where:
R is bromo; thus forming 3-bromo-4-cyclohexylbenzaldehyde.

10. A compound of claim 6 where:
n is 1;
R is in the 3- position; and
R' is in the 5- position.

11. A compound of claim 10 where:
R and R' are chloro; thus forming 3,5-dichloro-4-cyclohexylbenzaldehyde.

* * * * *